United States Patent [19]

Fuji et al.

[11] Patent Number: 5,361,247
[45] Date of Patent: Nov. 1, 1994

[54] INFORMATION RECORDING AND REPRODUCING DEVICE WITH REPRODUCTION AND AUTOMATIC GAIN CONTROL CIRCUIT

[75] Inventors: Hiroshi Fuji; Toshihisa Deguchi, both of Nara; Shigeo Terashima, Tenri; Takeshi Yamaguchi, Nara, all of Japan

[73] Assignee: Sharp Kabushiki Kaisha, Osaka, Japan

[21] Appl. No.: 581,218

[22] Filed: Sep. 11, 1990

[30] Foreign Application Priority Data

| Sep. 12, 1989 | [JP] | Japan | 1-236655 |
| Sep. 14, 1989 | [JP] | Japan | 1-239010 |
| Sep. 14, 1989 | [JP] | Japan | 1-239011 |
| Sep. 14, 1989 | [JP] | Japan | 1-239012 |
| Sep. 14, 1989 | [JP] | Japan | 1-239013 |

[51] Int. Cl.$^5$ .................................................. G11B 7/00
[52] U.S. Cl. .......................................... 369/48; 369/54; 369/124; 369/58; 369/44.35
[58] Field of Search .......... 369/48, 44.31, 44.34, 369/47, 124, 44.26, 44.27, 44.36, 44.35, 54, 58; 330/279, 127, 129; 360/77.04

[56] References Cited

U.S. PATENT DOCUMENTS

| 4,509,155 | 4/1985 | Masuda et al. | 369/48 |
| 4,611,317 | 9/1986 | Takeuchi et al. | 369/44.34 |
| 4,910,479 | 3/1990 | Fuji et al. | 330/279 |
| 5,001,693 | 3/1991 | Kakuta | 369/48 |

FOREIGN PATENT DOCUMENTS

| 095766 | 5/1983 | European Pat. Off. |
| 0219037 | 4/1987 | European Pat. Off. |
| 0325491 | 1/1989 | European Pat. Off. |
| 58-121814 | 7/1983 | Japan . |
| 59-193544 | 11/1984 | Japan . |
| 60-214614 | 10/1985 | Japan . |
| 62-40665 | 2/1987 | Japan . |
| 62-82813 | 4/1987 | Japan . |
| 63-25858 | 2/1988 | Japan . |
| 64-14772 | 1/1989 | Japan . |
| 1173475 | 7/1989 | Japan . |

Primary Examiner—Aristotelis Psitos
Assistant Examiner—Nabil Hindi

[57] ABSTRACT

An information recording and reproducing device having an automatic gain control device wherein its amplification degree is adjusted according to an AGC voltage varying with an amplitude of a reproduced signal. The automatic gain control device has a holding circuit which holds the AGC voltage in each of recording and erasing operations, and also holds the AGC voltage in reproducing an un-recorded area of information. The AGC voltage is also used for determining an optimum recording condition for a recording medium. Instead of the holding circuit, by installing a limiter circuit for limiting an amplitude of a reproduced signal, and by the use of transient response of the reproduced signal due to an coupling situated before the limiter circuit, an appropriate amplification degree can also be obtained in the automatic gain control device. Further, the limiter circuit which is disposed at a stage before a reproduction circuit and also before a capacitor having the ac coupling, may restrain influence of the transient response of the ac coupling given on the reproduced signal, thereby making it possible to reproduce a signal with small amplitude immediately after recording or erasing operation.

29 Claims, 82 Drawing Sheets

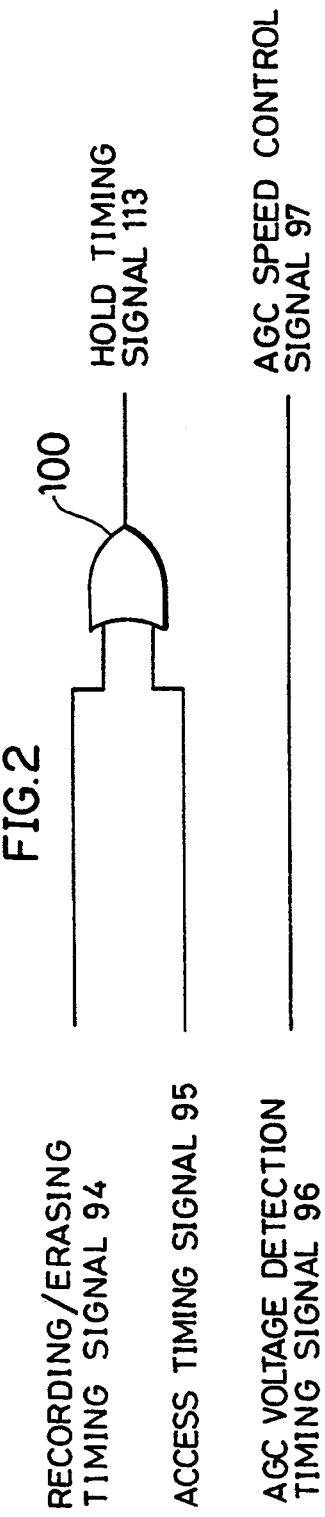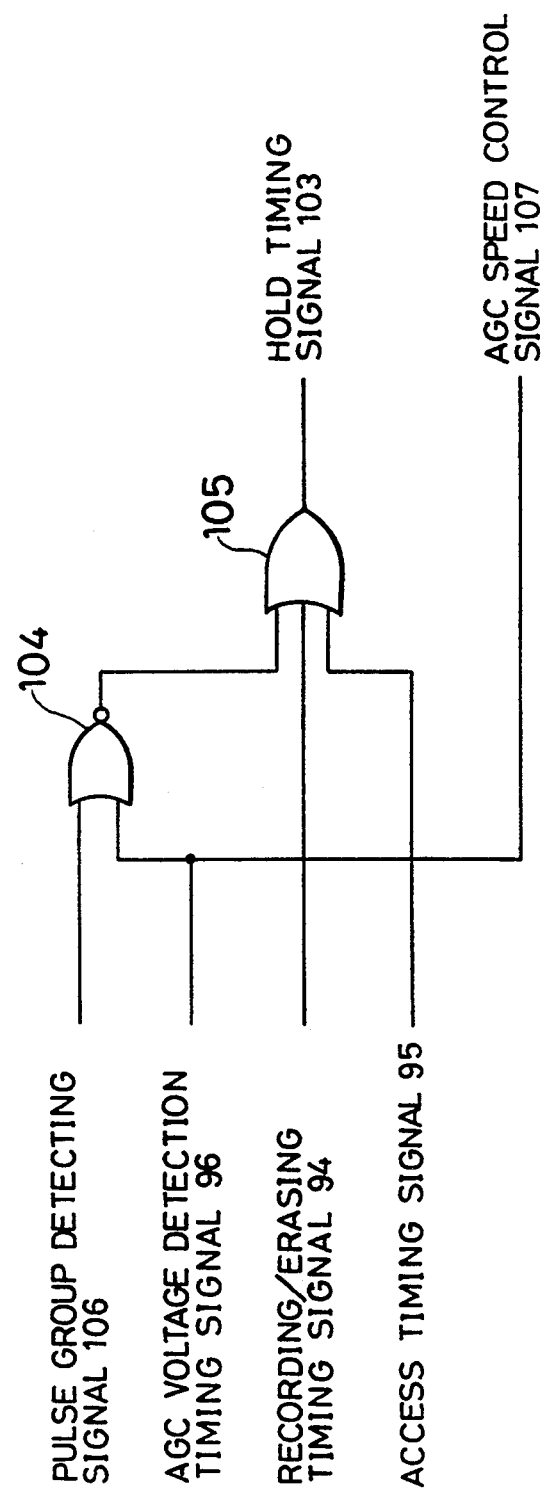

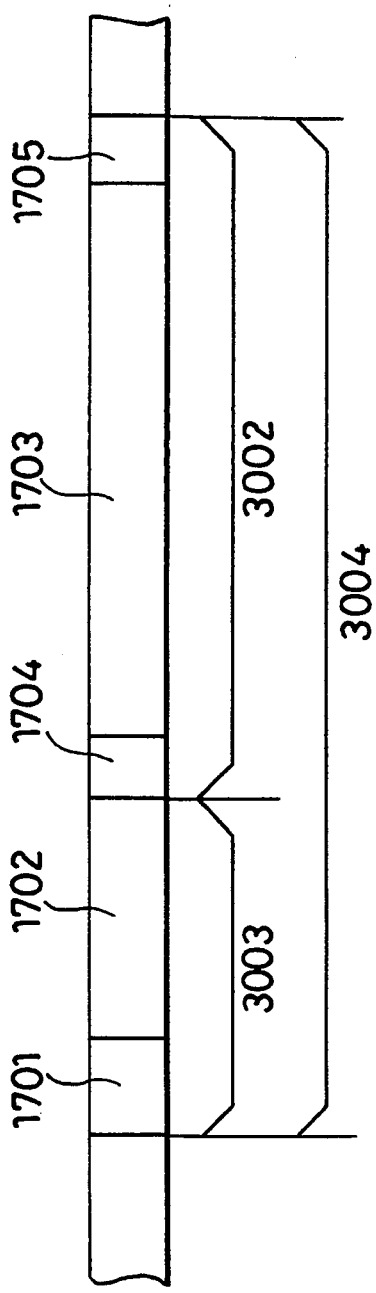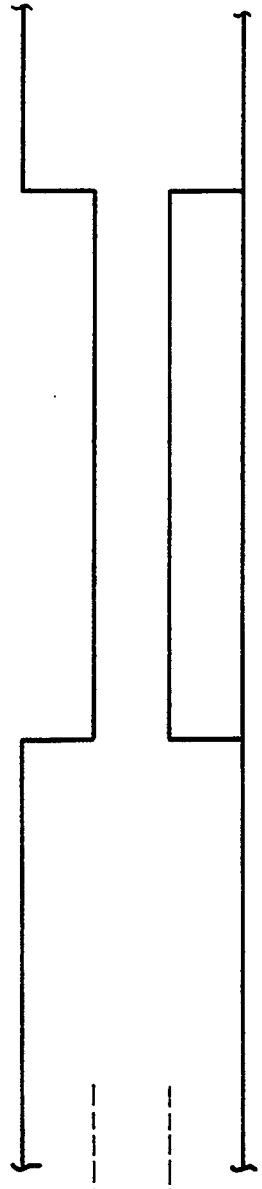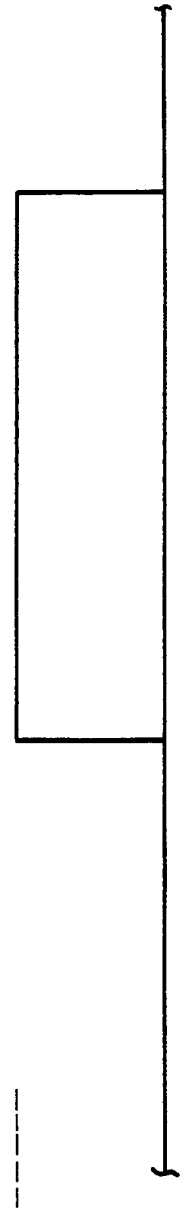

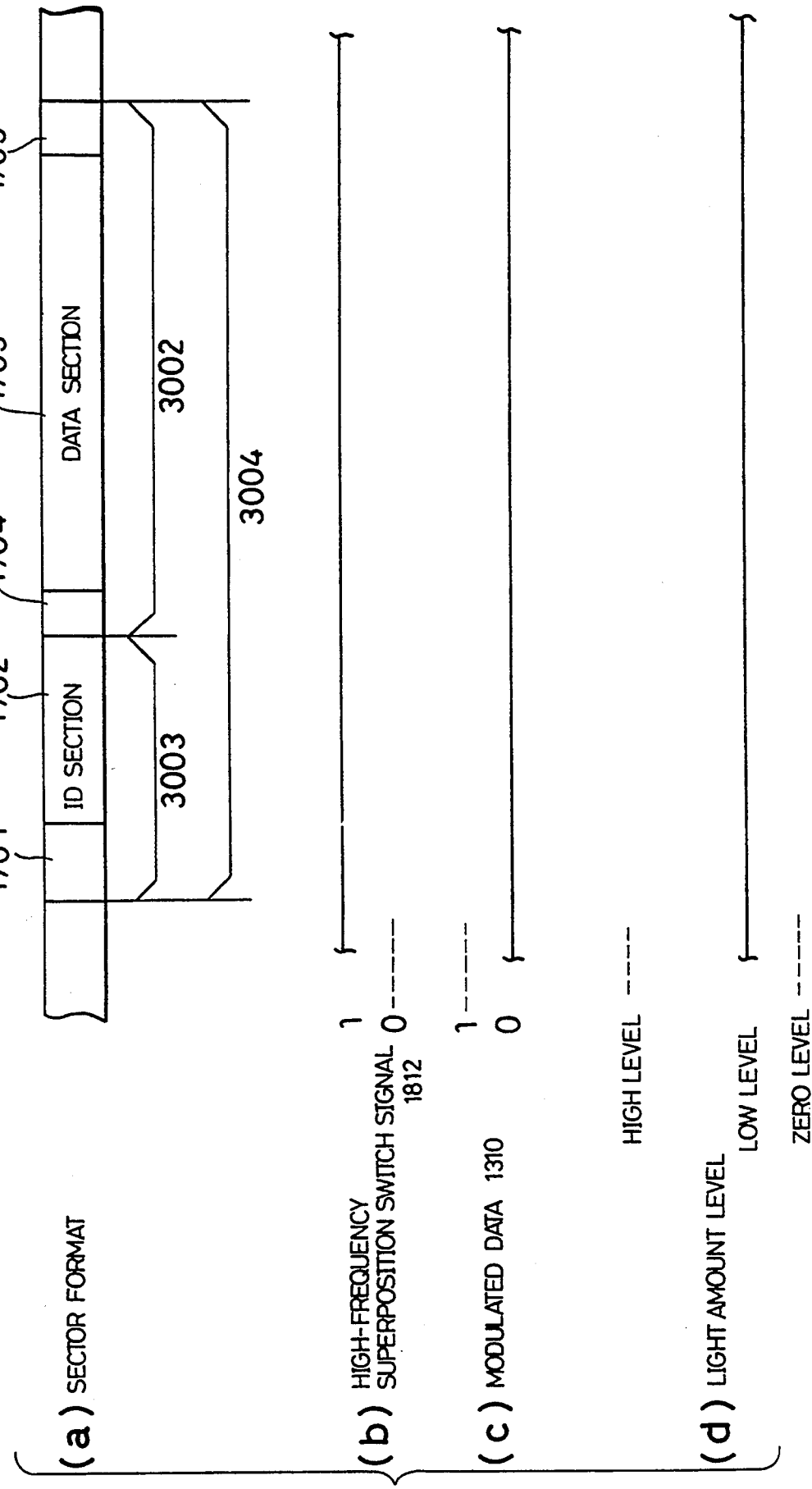

FIG.21
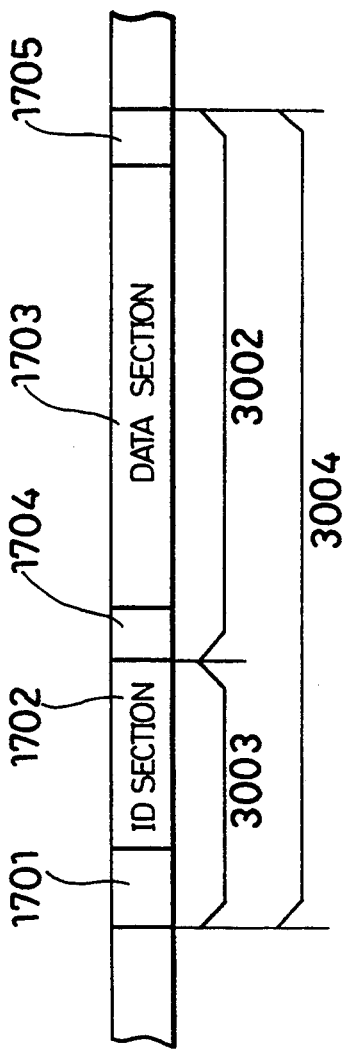
(a) SECTOR FORMAT
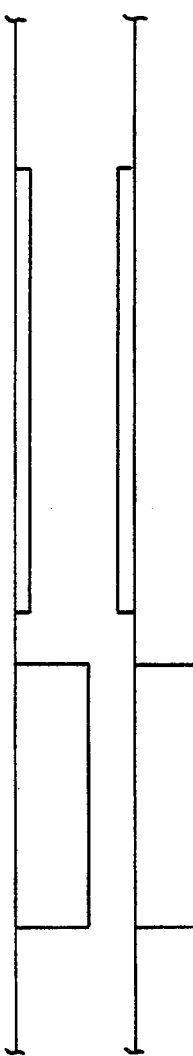
(b) REPRODUCED SIGNAL S1
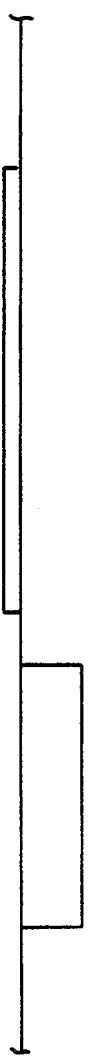
(c) REPRODUCED SIGNAL S2
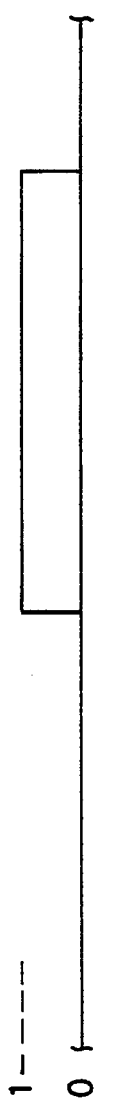
(d) MO BINARY CODED SIGNAL 2511
(e) ID BINARY CODED SIGNAL 2512
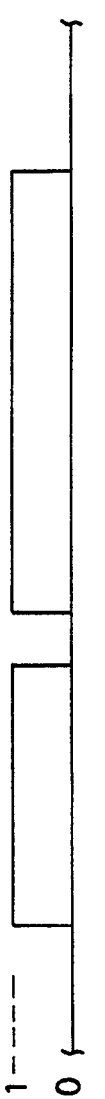
(f) SYNCHRONOUS DATA 2513
(g) SECTOR MARK SIGNAL 1411

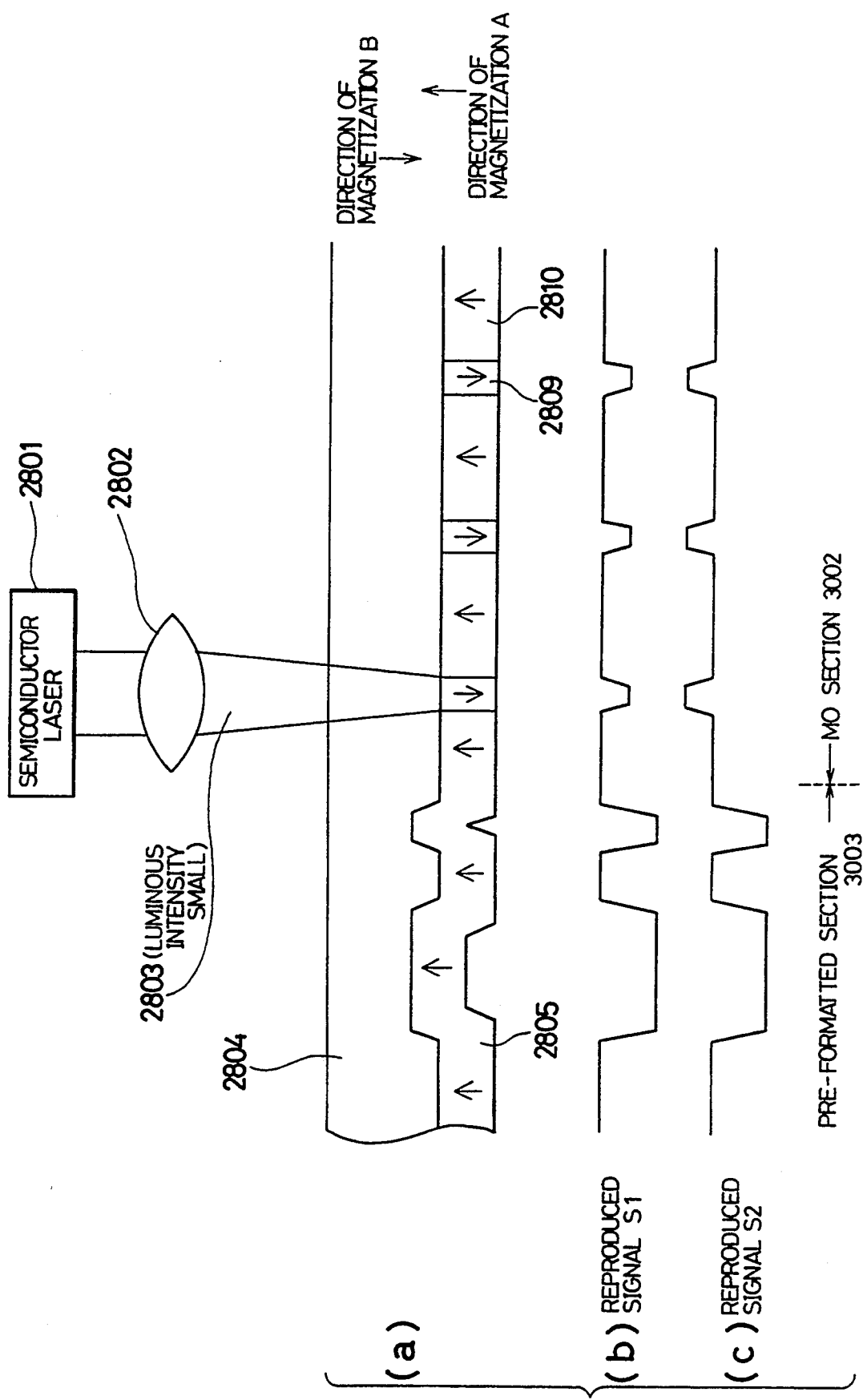

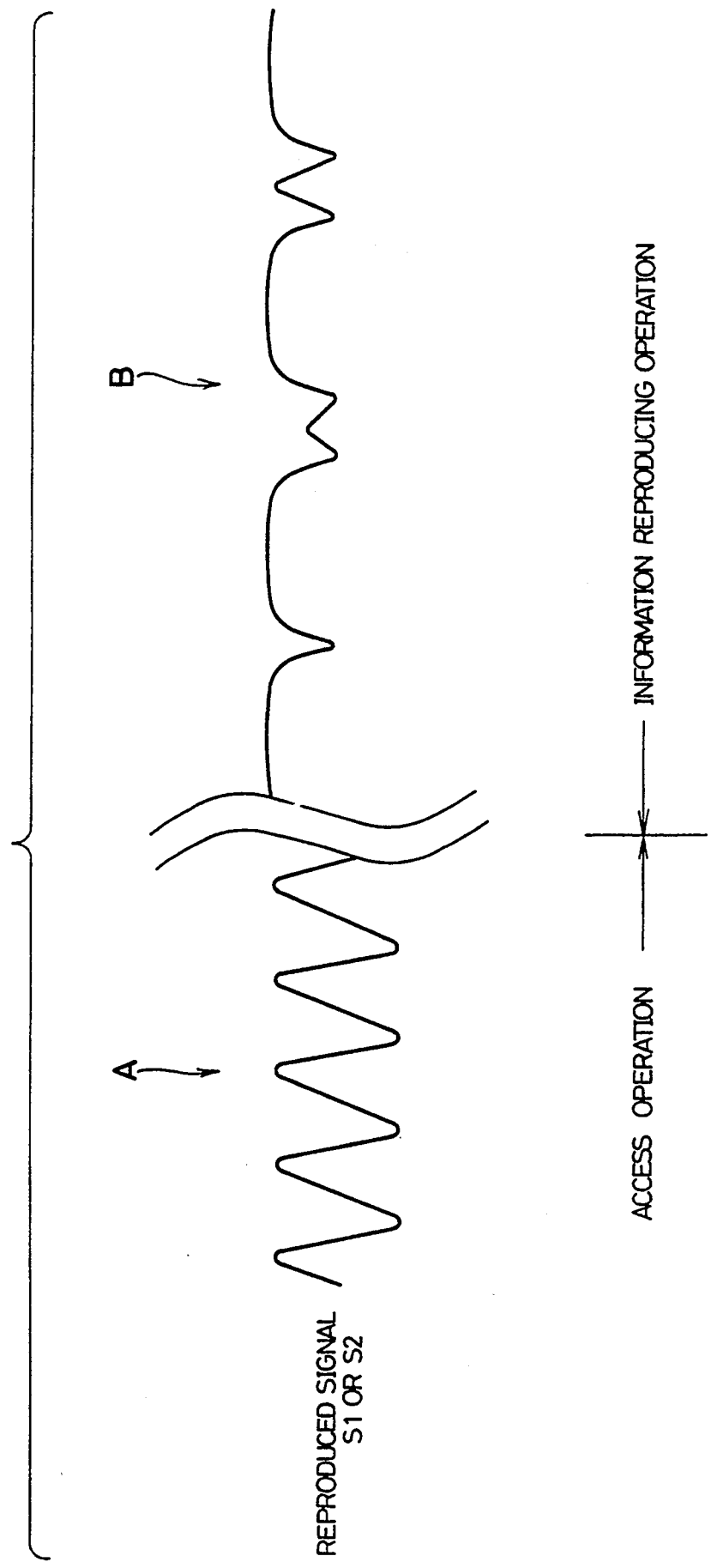

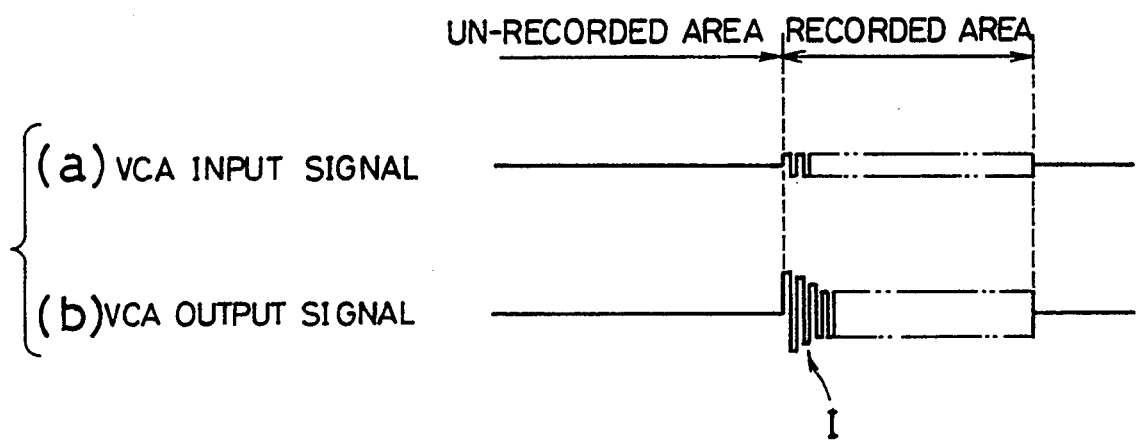
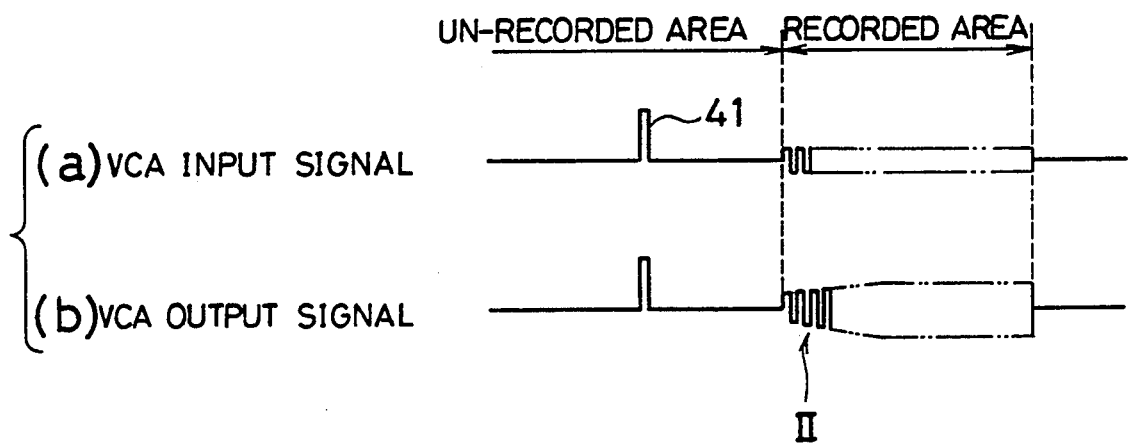

FIG. 79 PRIOR ART (a) MODULATED DATA
(b) MARK
(c) REPRODUCED SIGNAL
(d) DIFFERENTIATED SIGNAL
(e) EQUALIZER OUTPUT SIGNAL
(f) DIFFERENTIATED ZERO-CROSSING DETECTION SIGNAL
(g) GATE SIGNAL
(h) DATA SIGNAL
(i) REPRODUCED DATA (a) MARK
(b) REPRODUCED SIGNAL

INFORMATION RECORDING AND REPRODUCING DEVICE WITH REPRODUCTION AND AUTOMATIC GAIN CONTROL CIRCUIT

FIELD OF THE INVENTION

The present invention relates to various kinds of information recording and reproducing devices such as a magneto-optical recording and reproducing device, and more specifically to a reproduction circuit and its AGC (Automatic Gain Control) circuit in an information recording and reproducing device.

BACKGROUND OF THE INVENTION

As an example of the conventional information recording and reproducing devices, the following description will discuss a magneto-optical memory device for recording, erasing, and reproducing on and from a magneto-optical disk.

As shown in FIG. 61(a), the magneto-optical disk is fabricated by forming a recording magnetic film 2805 on a disk substrate 2804 thereof. The recording magnetic film 2805 is formed so as to have an axis of easy magnetization whose direction is perpendicular to the film surface, and is initialized so that the directions of magnetization indicated by arrows in the recording magnetic film 2805 may direct a predetermined direction (for example, direction of magnetization A in FIG. 61(a)).

In a recording process, a laser beam 2803 projected from a semiconductor laser 2801 is applied to the recording magnetic film 2805 with a diameter of substantially 1 μm focused by an objective lens 2802. In this example, luminous intensity of the laser beam 2803 is controlled according to a recording signal 2807 (shown by (b) in the figure) corresponding to information to be recorded. A local portion on the disk on which a laser beam with strong luminous intensity has been applied has a temperature rise to exceed the Curie temperature, and coercive force in the portion is lowered extremely. As a result, a direction of magnetization in the portion where the coercive force has been lowered is reversed so as to have the same direction as that of an externally applied magnetic field 2806 (direction of magnetization B in FIG. 61(a)) which is applied simultaneously as the projection of the laser beam 2803. In this manner, the information corresponding to the recording signal 2807 is recorded on the recording magnetic film 2805. The portions on which the magnetization with the direction B is recorded in the above-mentioned manner are hereinafter called "marks" 2809 while the other portions having the magnetization with the direction A is recorded are called "non-marks" 2810. An erasing process of the information recorded on the recording magnetic film 2805 is performed by a similar manner in the recording process, wherein the direction of the externally applied magnetic field 2806 is reversed to that in the recording process by returning the direction of the magnetization to the original direction when initialized (direction of magnetization A in FIG. 61). As a result, the portions on which the erasing process is performed become non-marks 2810.

In the present example, the light modulation method is adopted, i.e. recording is executed by modulating the intensity of the laser beam 2803 in accordance with the recording signal 2807, and applying an external constant magnetic field. However, the magnetic modulation method may as well be adopted and recording can be executed by making the luminous intensity of the laser beam 2803 constant and modulating the direction of the external magnetic field in accordance with the recording signal 2807.

The disk substrate 2804 mentioned earlier is made of glass, plastic or other material. Protrusions and recessions 2808 are preliminarily etched on the disk substrate 2804, as shown in FIG. 61(a). The protrusions and recessions 2808 represent address data indicating the addresses of tracks and sectors.

The above address data are preliminarily etched onto the disk substrate 2804 according to a predetermined format. Hence, they cannot be recorded or erased thereafter. Hereinafter, areas where a plurality of protrusions and recessions 2808 are formed in a group will be referred to as pre-formatted sections 3003. On the other hand, information is recorded and erased in areas other than the pre-formatted sections 3003. These areas will be referred to hereinafter as MO (magneto-optical) sections 3002. As shown ill FIG. 63, pre-formatted sections 3003 and MO sections 3002 are usually disposed alternately on a track 3005 formed in a spiral shape or in the shape of concentric circles. A sector 3004 is constituted by a pair composed of a pre-formatted section 3003 and MO section 3002. A magneto-optical disk 3001 comprises a plurality of sectors 3004 formed on the track 3005. Each sector 3004 is provided with address data, and information is recorded, reproduced and erased by each sector 3004.

As illustrated in FIG. 64, the pre-formatted sections 3003 of the tracks 3005 are arranged such that either the recessions or the protrusions that compose the protrusions and recessions 2808 shown in FIG. 61(a) form marks 2811, and such that the other components of the protrusions and recessions 2808 form non-marks 2812. Marks 2809 and non-marks 2810 are recorded in the MO section 3002 in response to MO signals as described earlier.

When reproduction is performed on the magneto-optical disk 3001, a laser beam 2803 projected from a semiconductor laser 2801 is irradiated upon the recording magnetic film 2805 with a diameter of 1 μm, as illustrated in FIG. 62(a). Here, the luminous intensity of the laser beam 2803 is weaker when information is reproduced than when information is recorded or erased. The laser beam 2803 is a linearly polarized light and its plane of polarization is rotated as the laser beam 2803 passes through or is reflected by the recording magnetic film 2805 due to the Faraday effect or the Kerr effect. The plane of polarization of the laser beam 2803 is rotated in mutually opposite directions depending on whether the laser beam 2803 is projected on a mark 2809 or a non-mark 2810. Reproduction is performed by detecting the difference in polarization direction. Consequently, two types of reproduced signals S1 and S2, shown by (b) and (c) in FIG. 62, are generated.

Referring to FIG. 65, the reproduction optical system employed for producing the reproduced signals S1 and S2 will be described briefly below.

As illustrated in FIG. 65, a reflected light 3201 from the magneto-optical disk 3001 is directed toward a PBS (analyzer) 3202 where it is split into two detected lights 3210 and 3211 according to its polarization direction. The two detected lights 3210 and 3211 are respectively directed toward photodetectors 3203 and 3204 where they are converted into electric signals that vary according to the respective luminous intensities of the detected lights 3210 and 3211, and released as reproduced signals S1 and S2. As it will be described in detail later, the signals from the pre-formatted section 3003 and the MO section 3002 are obtained separately by determining the sum and the difference of the reproduced signals S1 and S2. In addition, the marks 2809 and the non-marks 2810 may be reproduced separately through the signals of the MO section 3002 thereby enabling the information recorded on the recording magnetic film 2805 to be reproduced.

As illustrated in FIG. 66(a), assume that $\alpha$ represents the vector of a reflected light from a non-mark 2810 (direction of magnetization A) of the MO section 3002, and $\beta$ represents the vector of a reflected light from a mark 2809 (direction of magnetization B) of the MO section 3002. The reflected light vectors $\alpha$ and $\beta$ are rotated in opposite directions by an angle corresponding to the rotation angle of their respective plane of polarization. The X direction components and Y direction components of the reflected light vectors $\alpha$ and $\beta$ are detected in the analyzer (PBS) 3202 that transmits light having a X or Y polarization direction. These two polarization directions X and Y form a right angle. The reflected light vector $\alpha$ is projected in the polarization direction X and the polarization direction Y thereby producing detected light vectors $\alpha_X$ and $\alpha_Y$. Similarly, the reflected light vector $\beta$ is projected in the polarization detection X and the polarization direction Y thereby producing detected light vectors $\beta_X$ and $\beta_Y$. The magnitudes of detected light vectors $\alpha_X$ and $\beta_Y$ correspond to reproduced signals S1 and the magnitudes of the detected light vectors $\alpha_X$ and $\beta_Y$ corresponds to reproduced signals S2. Further, the detected light vectors $\alpha_X \cdot \beta_X$ and $\beta_Y \cdot \alpha_Y$ respectively correspond to the two kinds of detected light 3210, 3211 shown in FIG. 65.

As shown in FIG. 66(a), the high level of the reproduced signal S1 corresponds to a non-mark 2810 and the low level of the reproduced signal corresponds to a mark 2809. As to the reproduced signal S2, its low level corresponds to a non-mark 2810 and its high level to a mark 2809. The polarity of the reproduced signal S1 and the polarity of the reproduced signal S2 are opposite to each other. The reproduced signals S1 and S2 are then fed into a differential amplifier where the reproduced signals S1 and S2 are differentially amplified and their S/N ratios are improved, and information is reproduced.

Reproduced signals S1 and S2 obtained from the pre-formatted sections 3003 will be described below with reference to FIG. 66(b). As there is no recording nor erasing operation taking place in the pre-formatted sections 3003, the direction of magnetization therein coincides with the direction A only. When the laser beam is irradiated on a pre-formatted section 3003, the shape of the marks 2811 and non-marks 2812, i.e. the protrusions and recessions 2808 causes the laser beam to be diffracted. As a result, a long reflected light vector $\alpha$ (corresponding to the reproduction of a non-mark 2812) or a short reflected light vector $\gamma$ (corresponding to the reproduction of a mark 2811) is produced according to the protrusions and recessions 2808, as illustrated in FIG. 66(b).

An analyzer vector $\alpha_X \cdot \gamma_X$ and an analyzer vector $\gamma_Y \cdot \alpha_Y$ are produced by, projecting these reflected light vectors in the polarization directions X and Y of the analyzer (PBS) 3202. The magnitudes of the analyzer vector $\alpha_X \cdot \gamma_X$ and of the analyzer vector $\gamma_Y \cdot \alpha_Y$ correspond to the reproduced signals S1, S2. The high level of the reproduced signals S1 and the high level of the reproduced signals S2 both correspond to non-marks 2812 of the protrusions and recessions 2808, the low level of the reproduced signals S1 and the low level of reproduced signals S2 correspond to marks 2811. Accordingly, different from the mark 2809 and the non-mark 2810 for the magneto-optical recording in the case shown in FIG. 66(a), the reproduced signals S1, S2 have the same polarity. More specifically, as illustrated in FIGS. 66(b) and (c), the reproduced signals S1 and S2 have the same polarity for the pre-formatted section 3003 while they have mutually inverted polarities for the MO section 3002.

Accordingly, by adding the reproduced signals S1 and S2, only the signal corresponding to the pre-formatted section 3003 may be obtained, and by subtracting the reproduced signal S1 from S2, only the signal corresponding to the MO section 3002 may be obtained. Thus, the S/N ratio may be improved.

When the differential signal or the sum signal from the above-mentioned two types of reproduced signals S1 and S2 are amplified by an AGC amplifier with their amplification degree being adjusted therein, the amplitudes after the amplification become substantially constant.

As shown by a reference numeral 10 in FIG. 67, the AGC amplifier, for example, comprises a voltage control amplifier (hereinafter called VCA) 11 whose amplification degree varies according to a control voltage (hereinafter called AGC voltage), a signal level detection circuit 12 for generating a voltage in accordance with the level of a signal released from VCA 11 and an operational amplifier 13 for releasing the AGC voltage which is directly proportional to the difference between the level of the output signal from the VCA 11 detected by the signal level detection circuit 12 and the level of a reference signal preliminarily set. With the arrangement, a feedback control is performed so as to keep the level of the reproduced signal substantially constant by entering the AGC voltage released from the operational amplifier 13 to the VCA 11.

However, such a conventional magneto-optical recording and reproducing device has the drawback that reproducing operation is not always performed appropriately due to the fact that the amplification degree of the AGC amplifier becomes extremely small immediately after a recording or erasing operation. The following description will discuss the drawback referring to FIG. 68.

Here, assume that at a sector 3004 shown by A in FIG. 68(a), a reproducing operation of a pre-formatted section 3003 and a recording operation of an MO section 3002 are performed, and that at a sector 3004 shown by B, a reproducing operation is performed, and that at a sector 3004 shown by C, a reproducing operation of a pre-formatted section 3003 and an erasing operation of information recorded on an MO section 3002 are performed.

In that case, at the sector 3004 shown by A, since light amount of the semiconductor laser 2801 (see FIG. 61) increase to a quantity corresponding to the recording light amount as aforementioned, the amplitude of the reproduced signals S1, S2 at the MO section 3002 become extremely great, as shown in FIG. 68(b) (here, the reproduced signals S1, S2 are signals obtained from reflected lights derived from the laser beam 2803 for recording which is reflected from the surface of the magneto-optical disk 3001). As a result, since the AGC voltage starts increasing as shown in FIG. 68(d) while the amplification degree of the VCA 11 starts decreasing, the level of the output signal of the VCA 11 gradually lowers as shown in FIG. 68(c).

However, after the above process, when the relevant process comes to the pre-formatted section 3003 of the sector 3004 shown by B or C to perform a reproducing operation thereof, since the amplification degree of the VCA 11 has still remained small, the amplitude of the reproduced signal of the pre-formatted section 3003 becomes extremely small after having been amplified by the VCA 11 as shown by $B_1$ and $C_1$, thereby causing a possibility of reproduction error.

Similarly, when an erasing operation is performed on the sector 3004 shown by C, since light amount of the semiconductor 2801 becomes greater in comparison with that in reproducing operation, the amplitude of the reproduced signals S1 (S2) becomes great as shown in FIG. 68(b) (here, the reproduced signals S1 (S2) are signals obtained from reflected lights derived from the laser beam 2803 for erasing which is reflected from the surface of the magneto-optical disk 3001). As a result, since the amplification degree of the VCA 11 becomes small, the level of the output signal of the VCA 11 also becomes small in reproducing the pre-formatted section 3002 of the sector 3004 shown by D (see $D_1$ section), and consequently an accurate reproducing operation may not be obtained.

Furthermore, in access operation in the magneto-optical recording and reproducing device, as shown in FIG. 69, a laser beam 2803 moves on the disk substrate 2804 in the radius direction shown by arrow P or Q while transversing the tracks 3005 disposed in the form of guiding grooves on the disk substrate 2804 or the protrusions and recessions 2808 at pre-formatted sections. In that case, since an amount of the reflected light is different between in portions including the tracks 3005 or protrusions and recessions 2808 and in other portions not including those, a reproduced signal S1 or S2 shown by A in FIG. 70 may be obtained. On the other hand, a reproduced signal S1 or S2 in reproducing information is shown by B in FIG. 70.

Thus, in access operation, the amplitude of the reproduced signal S1 or S2 sometimes becomes greater or smaller than that in reproducing operation for information. The amplitude varies depending on the depth and width of the guiding grooves. According to the variation, the amplification degree of the AGC amplifier sometimes becomes great or small. As a result, there is also a possibility of reproduction error also in reproducing operation for information immediately after an access operation. Additionally, when an access speed is comparatively slow, by providing a high-pass filter in the processing system for the reproduced signals S1 or S2, oscillatory components caused by the tracks 3005 or protrusions and recessions 2808 may be eliminated, thereby reducing an occurrence of reproduction error immediately after an access operation. However, since it is normally desirable to make the access speed as fast as possible, it is difficult to eliminate reproduction errors due to the decrease or increase of the amplification degree of the AGC amplifier immediately after an access operation.

The reproduction errors immediately after the recording, erasing, or access operation may be reduced by making the AGC amplifier respond quickly to the variation of the amplitude of the input signal.

However, in the case where the response speed of the AGC amplifier is set extremely fast, for example, when a defect pulse occurs because of a damaged portion, dust or the like on the magneto-optical disk 3001, a reproduction error tends to occur since the amplification degree of the AGC amplifier immediately becomes small in response to the defect pulse. In addition, the response speed of the AGC amplifier is originally set low in order to reduce the reproduction errors due to the defect pulses.

As aforementioned, in either case where the response speed of the AGC amplifier is set low or is set high, the reproduction errors tend to occur due to the respective different reasons. Basically, it is preferable to set the response speed of the AGC amplifier low so as to minimize the influence of the defect pulses; however, in the arrangement, the reproduction errors due to the response delay of the AGC amplifier are not avoidable.

In the meantime, MO sections 3002 of all the sectors 3004 on the magneto-optical disk 3001 do not necessarily have information made of MO signals recorded therein, and normally there exist some MO sections 3004 which have no information recorded therein.

In that case, when an instantaneous reproducing position is located in a sector 3004 with no information recorded therein, the AGC amplifier 10 responds to a low-level reproduced signal without a group of pulses made of MO signals, thereby making the amplification degree of the VCA 11 become extremely great. After this process, when the instantaneous reproducing position comes to reach a sector 3004 with information recorded therein and a reproduced signal with a group of information pulses made of MO signals is about to be entered to the VCA 11, the amplification degree may not immediately follow the level of the reproduced signal.

More specifically, immediately after the reproduced signal with the pulse signals (see FIG. 71(a)) have been entered to the VCA 11, the level of the output signal of the VCA 11 increases sharply as shown in FIG. 71(b) as an example. As a result, a problem is presented in that a normal reproduced signal may not be obtained during the time until the amplification degree achieves an appropriate degree by following the level of the reproduced signal.

On the other hand, in the case where the magneto-optical disk 3001 has a scratch or dust on the surface thereof, the input signal of the VCA 11 sometimes contains a defect pulse 41 in an un-recorded area as shown in FIG. 72(a). When the AGC amplifier responds to the defect pulse 41, the amplification degree of the VCA 11 becomes extremely small. It normally takes more time to recover an appropriate amplification degree from the amplification degree which has become extremely small than to recover it from the amplification degree which has become extremely great.

Thus, as shown by II in FIG. 72(b), after the occurrence of the defect pulse 41, the level of the output signal of the VCA 11 decreases sharply for a long period. Therefore also in this case, a normal reproduced signal may not be obtained.

Furthermore, in order to restrain the variation of the amplification degree of the AGC amplifier 10 due to the existence of MO sections 3002 with no information recorded therein on the magneto-optical disk 3001, it is proposed to install a pulse group detection circuit for detecting whether there is a group of pulses in the MO sections 3002 or not. With the arrangement, in an un-recorded area having MO sections without a group of information pulses, an AGC voltage immediately before the reproduction in the un-recorded area is held so as to keep the amplification degree of the VCA 11 constant, and when the next recorded area having a group of information pulses is reproduced, the holding operation of the AGC voltage is released. In this manner, the irregular variation of the amplification degree of the AGC amplifier 10 due to the existence of un-recorded areas with no information recorded therein is substantially restrained.

In that case, however, the holding operation of the AGC voltage is apt to be released by mistaking the defect pulse 41 for a group of information pulses. Especially in a magneto-optical disk recording and reproducing device whose AGC amplifier 10 is preliminarily set so as to have a maximum amplification degree upon its resetting operation, the possibility that the AGC amplifier 10 might respond to the defect pulse 41 becomes higher immediately after the resetting operation of the AGC amplifier 10 or immediately after the start of the magneto-optical disk recording and reproducing device.

In that case, the amplification degree of the AGC amplifier 10 varies according to an amplitude of the defect pulse 41, and the amplification degree is fixed at the end of the defect pulse 41. Accordingly, when the reproduction of information in the next recorded area is performed, a problem is apt to occur in reproducing information derived from MO signals. Especially, in the case of great amplitude of the defect pulse 41, since the amplification degree of the AGC amplifier 10 is fixed to be extremely small at the end of the defect pulse 41, the information recorded therein might not be reproduced due to the extremely small amplification degree during the next recorded area. Thereafter, since the amplification degree is kept at the extremely small degree which was fixed at the end of the defect pulse 41, the reproducing operation of information may not be executed until the AGC amplifier 10 or the magneto-optical disk recording and reproducing device is reset in the next occasion.

As aforementioned, although reliability of the AGC amplifier 10 may be improved to a certain extent by the use of the pulse group detection circuit, the arrangement may not provide a decisive solution to the defect pulse 41 or other problems.

Additionally, in general it has been known that those defect pulses occur more frequently in an optical memory such as magneto-optical disk than in a magnetic disk. Accordingly, it is necessary to prevent the occurrence of errors in reproducing information, especially due to defect pulses.

The following description will discuss a reproduction circuit of the magneto-optical disk recording and reproducing device referring to FIG. 73 and FIG. 74.

As shown in FIG. 73, the reproduced signals S1 and S2 are entered to a reproduction circuit 3501, and a binary coded output signal 3510 therefrom is entered to an address generation circuit 3502 and a timing generation circuit 3503. In the address generation circuit 3502, address information in the pre-formatted section 3003 of each sector shown in FIG. 63 is read from the output signal 3510, and an address signal 3511 is released therefrom. On the other hand, in the timing generation circuit 3503, a sector mark for synchronizing sectors, which is also located in the pre-formatted section, is detected, and a reference timing signal 3512 for recording, reproducing, or erasing is released therefrom.

Referring to FIG. 74, the following description will discuss a pre-formatted waveform processing circuit which is disposed in the conventional reproduction circuit 3501 of FIG. 73. The reproduced signals S1 and S2 are entered to a summing amplifier 3602. In the summing amplifier 3602, the information derived from the MO (data) section where the polarities of the reproduced signals S1 and S2 are opposite to each other is removed, and only the information derived from the pre-formatted section where those signals have the same polarity is separated to form an output signal 3605 therefrom. The output signal 3605 of the pre-formatted section thus obtained is entered to an AGC amplifier 3603. According to an AGC voltage released from an AGC voltage generation section (not shown) in an AGC circuit, the AGC amplifier 3603 controls its amplification degree so as to have a predetermined signal level as a reproduced signal. An output signal 3606 of the AGC amplifier 3603 is entered to a binary code circuit 3604 to be converted into a binary coded signal, and released as the binary coded signal 3510. Then, from the binary coded signal 3510, as shown in FIG. 73, an address signal 3511 and a reference timing signal 3512 for recording, reproducing, or erasing are obtained in an address generation circuit 3502 and a timing generation circuit 3503 respectively. The magneto-optical disk recording and reproducing device performs a recording, reproducing or erasing operation of information on or from a sector having a desired address according to the address signal 3511 and the reference timing signal 3512.

However, the above-mentioned conventional device using the AGC amplifier 3603 shown in FIG. 74 sometimes fails in reproducing address information in a pre-formatted section 3003. Therefore, each recording, reproducing or erasing operation can not be performed because of the failure in finding a sector 3004, where information is to be recorded, reproduced or erased. The following description will discuss the above drawback referring to FIG. 75 and FIG. 76. FIG. 75 shows shapes of the marks 2808 in the pre-formatted section 3003 on the magneto-optical disk and amplitudes of reproduced signals obtained according to the respective shapes. The pre-formatted section 3003 includes a sector mark section 1701 having sector synchronous information recorded therein and an ID section 1702 having address information recorded therein, and each piece of information is preliminarily recorded in the form of a protrusion and a recession physically etched. As shown in FIG. 75(a), the sector mark section 1701 consists of a series of marks 2808 with a shape of elongated circle which has an apparently different arrangement from that of other information located in ID section and data section. On the other hand, as shown in FIG. 75(b), the ID section 1702 consists of a series of marks 2808 with a shape of circle which may be obtained, for example, by 2-7 modulation method (which will be described later). As shown in FIG. 75(c) and (d), depending on the different shapes of the marks, an amplitude of the reproduced signal derived from the sector mark section 1701 having the marks 2808 with a shape of elongated circle becomes greater than that of the reproduced signal derived from the ID section having the marks 2808 with a shape of circle, and for example, becomes twice as great as that. This is because, as the total area of the mark 2808 within a laser spot 2701 becomes closer to the total area of non-mark within the laser spot 2701, interference between reflected lights from the laser beam becomes greater, and therefore makes the amplitude of the reproduced signal also become greater. Further, the amplitude varies depending on the width and depth of the mark. For example, waveforms shown in FIG. 75 are respectively obtained by reproducing the sector mark section 1701 and the ID section 1702 both of whose marks 2808 have the depth of substantial 100 nm and the width of substantial 0.4 $\mu$m by the use of a laser spot having the diameter of 1.3 $\mu$m (which is a Gaussian beam). Therefore, if the depth or width of the mark 2808 is changed or if the diameter of the laser spot 2701 is changed, the waveforms shown in FIG. 75 will change.

Referring to FIG. 76, the following description will discuss the fact that, when the reproduced signals of the pre-formatted section 3003 including the signal of the sector mark section 1701 having a greater amplitude and the signal of the ID section 1702 having a smaller amplitude are entered to the pre-formatted waveform processing circuit shown in FIG. 74, the conventional AGC amplifier 3603 does not respond to the amplitude of the signal derived from the ID section 1702.

As shown in FIG. 76(a), the pre-formatted section 3003 includes the sector mark section 1701 and the ID section 1702. For the aforementioned reason, an amplitude 3801 of the reproduced signal of the sector mark section 1701 is greater than an amplitude 3802 of the reproduced signal of the ID section 1702 as shown in FIG. 76(b). Those reproduced signals are entered to the AGC amplifier 3603 after having been removed their dc components by ac coupling. An output signal after the ac coupling has a waveform shown in FIG. 76(c) due to a transient response characteristic of the ac coupling. In the AGC amplifier 3603, an AGC voltage is generated from an AGC voltage generation section not shown in the figure, responding to the amplitudes of the input signals, and the output signal is automatically controlled in its amplification degree by the AGC voltage so as to have a predetermined amplitude.

However, in the case of the reproduced signals of the pre-formatted section 3003, where the signal of the ID section 1702 with a small amplitude follows immediately after the AGC amplifier having responded to the signal of the sector mark section 1701 with a great amplitude, the amplification degree still remains responding to the amplitude of the signal from the sector mark section 1701 because the AGC voltage does not change instantly. Accordingly, the amplification degree remains low to the signal of the ID section 1702. Originally, it is necessary to make the AGC amplifier respond to the amplitude of the signal from the ID section 1702 when the signal of the ID section 1702 is reproduced.

The conventional AGC amplifier 3603, however, does not respond to the amplitude of the signal of the ID section 1702. Moreover, a ratio of the amplitude of the signal of the sector mark section 1701 to the amplitude of the signal of the ID mark section 1702 is not necessarily constant. For that reason, as shown in FIG. 76(d), the amplitude of the signal from the ID section 1702 in the output signal of the AGC amplifier 3603 is small and is not constant, and consequently address information located therein may not be reproduced. Thus, a problem is presented in that information in a desired sector 3004 may not be retrieved.

In the meantime, in the aforementioned magneto-optical recording system, the sizes of the marks are changed according to each of recording conditions such as the recording light amount, recording pulse length, and external magnetic field. The following description will discuss the relationship between the recording conditions and the sizes of the marks to be recorded under the conditions, referring to FIG. 77.

As shown in FIG. 77(a) and (b), the size of the mark to be recorded becomes greater as the amplitude of the recording pulses, that is, the recording light amount increases, (supposing that each of the recording pulses has a given length). On the other hand, as shown in FIG. 77(c) and (d), when the length of the recording pulse (pulse width) is increased with its amplitude kept at a given value, the size of the mark to be recorded also becomes greater in directly proportional to the length of the pulses.

If the recording conditions are not properly controlled, an error sometimes occurs in reproducing data in a reproducing operation. The following description will discuss the occurrence of the error in reproducing data referring to FIGS. 78 to 85.

FIG. 78 shows a main arrangement of an MO waveform processing section 2502, and the reproduced signal obtained by differentially amplifying the signals S1 and S2 is entered to an equalizer 50 in the MO waveform processing section 2502. An output of the equalizer 50 is released from a zero-crossing detection circuit 52 as a differentiating zero-crossing detection signal through a differentiating circuit 51. Further, the output of the equalizer 50 is also entered to a level detection circuit 53 from which it is released as a gate signal. Referring to FIG. 79, the following description will discuss a reproducing operation in the MO waveform processing circuit 2502 shown in FIG. 78.

According to modulated data shown in FIG. 79(a) (for example, data modulated by 2-7 modulation method), marks are recorded (in magneto-optical recording) as shown in FIG. 79(b). In a reproducing operation, when a laser spot 2701 having a diameter indicated by an alternate long and short dash line in FIG. 79(b) is applied onto the MO section where those marks have been thus recorded, a reproduced signal (a differential signal or a sum signal of reproduced signals S1 and S2, in the case of a pre-formatted section) is reproduced, which has a maximum amplitude, for example, at the center of the recorded mark as shown in FIG. 79(c). As shown in FIG. 79(c), in the places where a distance between the marks is short, a peak to peak value of the reproduced signal is small, and the frequency components thereof are high. The reproduced signal has its high frequency component emphasized in the equalizer 50, and has an equalizer output signal waveform as shown in FIG. 79(e). The equalizer output signal is differentiated in the differentiating circuit 51 from which it is released as a differentiating signal as shown in FIG. 79(d). Further, from the differentiating signal, a differentiating zero-crossing detection signal is formed and generated in a zero-crossing detection circuit 52 as shown in FIG. 79(f). Additionally, zero-crossing noise in the differentiating zero-crossing detection signal is produced at a portion in a vicinity of zero-level where a rate of change is small in the differentiating signal as shown in FIG. 79(d). Moreover, as shown in FIG. 79(g), a gate signal derived from the equalizer output signal is generated from a level detection circuit 53. When a falling edge of the differentiating zero-crossing detection signal is detected during the period the gate signal is in the high level, a data signal rises from the low level to the high level, and falls to the low level upon the end of the gate signal, as shown in FIG. 79(h). With the above process, reproduction data may be obtained by reproducing the modulated data (see FIG. 79(i)).

On the other hand, as shown by broken lines in FIG. 79(b), when the marks are recorded under different recording conditions, an S/N ratio deteriorates and Jitters in the differentiating zero-crossing detection signal increase according to the S/N ratio as shown by broken lines in FIG. 79(f). Further, although not shown in FIG. 79(e), the S/N ratio of the equalizer output signal also deteriorates, and therefore jitters in the gate signal also increase according to the ratio. Accordingly, jitters occur in the reproduction data, and its S/N ratio deteriorates. In addition, the above-mentioned data signal is produced, for example, by a gate circuit 54 as shown in FIG. 80.

More specifically, the differentiating zero-crossing detection signal is transmitted to a clock input terminal CLK of a flip-flop 56 through an inverter 55 in the gate circuit 54. When the differentiating zero-crossing detection signal falls from the high level to the low level, the input of the clock input terminal CLK rises from the low level to the high level. As a result, an output terminal Q of the flip-flop 56 changes from the low level to the high level, and holds the condition until the gate signal falls to the low level. In other words, when the gate signal becomes the low level, it is transmitted to a clear terminal CL of the flip-flop 56, and therefore the output of the output terminal Q becomes the low level. Consequently, the data signal is produced, which is kept in the high level synchronizing to the falling edge of the differentiating zero-crossing detection signal, only during the high level of the gate signal.

As an example of the marks in different recording methods, there is shown a case wherein information is recorded by the use of edges of the marks. In this case, a circuit configuration shown in FIG. 82 is used as a MO waveform processing section.

The MO waveform processing section comprises a cosine equalization circuit 57, a comparison voltage generation circuit 58 and a comparator 59. The reproduced signal is entered to the cosine equalization circuit 57. The output of the cosine equalization circuit 57 is released as a binary coded signal through the comparison voltage generation circuit 58 and the comparator 59. The following description will discuss a reproducing operation of the MO waveform processing section shown in FIG. 82, referring to FIG. 83.

Based on modulated data shown in FIG. 83(a), marks are recorded (in magneto-optical recording) as shown in FIG. 83(b). In a reproducing operation, when a laser spot, which is not shown in the figure, is projected onto the MO section where those marks have been thus recorded, a reproduced signal is reproduced, which has a great amplitude, for example, at the center of the recorded mark as shown in FIG. 83(c). As shown in FIG. 83(c), in the places where a distance between the marks is short, a peak to peak value of the reproduced signal is small, and the frequency components thereof are high. The reproduced signal has its high frequency components emphasized in the cosine equalization circuit 57, and has an cosine equalization output signal waveform as shown in FIG. 83(d). The cosine equalization circuit 57 shapes the waveform of the reproduced signal, while maintaining its quality. According to the cosine equalization output signal, the comparator 59 generates a binary coded signal shown in FIG. 83(e) by using the output of the comparison voltage generation circuit 58 as a threshold value. In addition, the comparison voltage generation circuit 58 may be constituted of, for example, a low-pass filter or an envelope detection circuit, and the threshold value varies according to the input of the comparison voltage generation circuit 58. By using the binary coded signal thus obtained and a PLL clock shown in FIG. 83(f), reproduction data (see FIG. 83(i)) is generated, for example, in a conversion circuit 60 shown in FIG. 81. Referring to FIG. 81 and FIG. 83, the following description will discuss the generation of the reproduction data, more specifically.

As shown in FIG. 81, the binary coded signal is entered to a data input terminal D of a first flip-flop 61 in the conversion circuit 60. The PLL clock is transmitted to each input terminal CLK of the first flip-flop 61 and a second flip-flop 62. Synchronizing to the rising edge of the PLL clock, the output of an output terminal Q of the first flip-flop 61 varies according to the binary coded signal. For example, when a binary coded signal shown in FIG. 83(e) is entered to the data input terminal D and a PLL clock shown in FIG. 83(f) is entered to the clock input terminals CLK, the signal from the output terminal Q of the first flip-flop 61 shapes a waveform as shown in FIG. 83(g). Since the signal with the waveform is entered to the data input terminal D of the second flip-flop 62, the output of the output terminal Q of the second flip-flop 62 shapes a waveform as shown in FIG. 83(h). Therefore, there is a phase shift by one clock of the PLL clock between the waveforms from the respective output terminals Q of the first flip-flop 61 and the second flip-flop 62.

Then, the outputs of the first flip-flop 61 and the second flip-flop 62 are respectively transmitted to input terminals of exclusive OR gate 63 disposed in the next stage thereof, and exclusive OR operation is performed to form reproduction data shown in FIG. 83(i), which is released from the gates 63.

On the other hand, when marks are recorded under different recording conditions as shown by broken lines in the figure, the phase of the reproduced signal shifts due to the conditions as shown by broken lines in FIG. 83(c). Further, although not shown in FIG. 83(d), since the phase of the cosine equalization output signal also shifts, this makes the phase of the binary coded signal shift following the deviation. Thus, those shifts cause jitters, and errors may occur in the reproduction data, thereby deteriorating the S/N ratio.

As aforementioned, in order to obtain reproduction data without errors in reproducing operation, recording conditions should be always controlled most appropriately. For optimum control on the recording conditions, it has been conventionally known that by test writing information having a predetermined reference frequency on a magneto-optical recording medium while changing recording light amount or other factors, and by finding conditions for permitting the reproduced signal to have a maximum amplitude thereof in reproducing operation, recording operation thereafter is performed under the conditions thus found. For example, as shown in FIG. 84(a) and (b), an S/N ratio is the most appropriate under the recording conditions wherein the marks shown by solid lines in the reproduced signal were recorded, and in recording operation, in either case where recording light amount (or recording pulse length) is greater than that shown by the solid lines or is smaller than that, the amplitude (peak to peak value) of the reproduced signal becomes smaller, as shown by broken lines in FIG. 24(b). (see, for example, Japanese Unexamined Patent Publication No. 80138/1983 (Tokukaisho 58-80138)).

As a circuit for detecting the amplitude of the reproduced signal, there has been known and adopted, for example, an envelope detection circuit 24 as shown in FIG. 85. The circuit 24 mainly comprises a buffer circuit 25, a first peak hold circuit 26, a second peak hold circuit 27 and a differential amplification circuit 28.

The reproduced signal is entered through the buffer circuit 25 to the first and second peak hold circuits 26, 27 where both of the upper and lower peak values thereof are hold, and then an amplitude level signal corresponding to the peak to peak value of the reproduced signal is released from the differential amplification circuit 28. The optimum recording conditions may be determined depending on the size of the amplitude level signal. As another method, there is an example wherein the optimum recording conditions are also determined by detecting an envelope or primary and secondary higher harmonic waves in the reproduced signal. (see, for example, Japanese Unexamined Patent Publication No. 193544/1984 (Tokukaisho 59-193544) or No. 13334/1985 (Tokukaisho 60-13334)).

However, the above conventional arrangement has a drawback that it is necessary to install extra circuits for detecting a maximum amplitude, an envelope, or primary and secondary higher harmonic waves of the reproduced signal in reproducing process, and it makes the circuit configuration more complicated, thereby resulting in a high manufacturing cost of the entire system. Moreover, the arrangement having an AGC circuit has a drawback that a holding operation has to be performed in the AGC circuit, and therefore its control becomes complicated, thereby making it difficult to provide a small size and low cost system.

Referring to FIG. 86, the following description will discuss a buffer amplifier 3601 disposed at an input stage of the conventional reproduction circuit 3501 of FIG. 73.

The reproduced signal S1 is entered to a high-pass filter comprising a capacitor 3602 and a resistor 3603, located in the buffer amplifier 3601. As shown in FIG. 86, a voltage $V_O$ is applied to one terminal of the resistor 3603. A dc component in the reproduced signal S1 is removed by the high-pass filter, thereby making it easy to reproduce only an information signal contained in an ac component. An output signal 3610 from the high-pass filter is entered to an amplifier 3604 from which an output signal 3612 thereof is transmitted to the reproduction circuit 3501 located at a stage downstream.

The reproduced signal S2 is also entered to a high-pass filter comprising a capacitor 3605 and a resistor 3606, located in the buffer amplifier 3601, and a dc component of the reproduced signal S2 is thus removed, thereby making it easy to reproduce only an information signal contained in an ac component. An output signal of the high-pass filter is transmitted to the reproduction circuit 3501 located at a stage downstream as an output signal 3613 through an amplifier 3607.

However, the above conventional device by the use of the buffer amplifier 3601 of FIG. 86 sometimes fails to read information in the pre-formatted section immediately after each of recording and erasing operations for information. The drawback becomes critical especially in performing high-speed transfers or high density recording for information. The following description will discuss the drawback referring to FIG. 87 and FIG. 88.

FIG. 87 and FIG. 88 show an example of a waveform of each section in the buffer amplifier 3601. As shown in FIG. 87(a), it is supposed that a recording operation for information is performed in a sector constituted of a pre-formatted section 3701 and an MO (data) section 3702, and a reproducing operation for information is performed in a sector constituted of a pre-formatted section 3703 and an MO (data) section 3704, and further, an erasing operation for information is performed in a sector constituted of a pre-formatted section 3705 and an MO (data) section 3706. Each of these recording, reproducing and erasing operations for information has to be executed while reading synchronous timing information and address information recorded in the pre-formatted sections 3701, 3703 and 3705, detecting each predetermined synchronous timing, and successively identifying whether the address is a predetermined one or not.

In the meantime, the reproduced signal S1 and S2 form a signal whose amplitude becomes great in each of the recording and erasing operations, as shown in FIG. 87(b). This is because in each of the recording and erasing operations, a reflected light with great luminous intensity is entered to photo detectors 3203, 3204. According to the above process, as shown in FIG. 87(c), the output signals 3612, 3613 from the buffer amplifier 3601 form a waveform which is influenced by a transient response of the high-pass filter. In other words, the level of the signal fluctuates up and down immediately after each of the recording and erasing operations. A reproducing operation must be performed in each of pre-formatted sections 3703, 3707 immediately after each of the recording and erasing operations.

On the other hand, the reproduction circuit 3501 including the buffer amplifier 3601 has its range of reproduction limit between its upper and lower reproduction levels (hereinafter called reproduction limit range) as shown in FIG. 87(c), and it is impossible to read information from the signals S1 (S2) if the signal level is located out of the range.

The above reproduction limit range indicates a range wherein the circuits are normally operable electrically, and for example, it shows a range at which the signal level does not become saturated. Further, if there is installed an AGC amplifier at a step downstream, it shows a range wherein reproduction is operable and the AGC amplifier can respond within a given time.

In that case, as shown in FIG. 87(c), the output signal 3612 (3613) from the buffer amplifier 3601 in the pre-formatted sections 3703, 3707 is located far away from the range immediately after each of the recording and erasing operations. Since a dc component of the reproduced signal S1 (S2) especially in erasing operation is much greater than that in recording operation, it is located father away from the range immediately after the erasing operation. Accordingly, the conventional arrangement has drawbacks that it is difficult to read synchronous timing information and address information, both obtained by reproducing the pre-formatted sections 3703 and 3707 immediately after each of the recording and erasing operations; therefore each predetermined synchronous timing can not be detected; and further, it can not be identified whether the address is a predetermined one or not. Consequently, it is impossible to properly perform each of recording, reproducing and erasing operations, and this disadvantage is particularly remarkable immediately after the erasing operation.

The above problem may be solved by taking into consideration transient response time of the high-pass filter and by disposing the pre-formatted sections 3703, 3707 with intervals corresponding to a period of time sufficiently longer than the transient response time. However, the above arrangement causes lowering of transfer speed for information since the intervals between the pre-formatted sections become greater, and also fails to provide high density in recording information, and thus it can not give a decisive solution to the problem. Moreover, by minimizing the time constant of the high-pass filter, the transient response time can be shortened, thereby giving a solution to the above problem. However, such an arrangement causes phase shifts of data in the reproduced signals, thereby resulting in errors in reproducing operation. Accordingly, the time constant of the high-pass filters has its lower limit, and it is difficult to make the time constant lower than the limit.

Referring to FIG. 87, the following description will discuss how the AGC amplifier influence the output signal 3801 in the case where information recorded in the pre-formatted sections can not be read immediately after each of recording and erasing operations.

The AGC amplifier automatically adjusts the amplification degree of the reproduced signal S1 (S2), and responds to the recording or erasing level. Accordingly, when a signal shown in FIG. 88(b) is entered to the AGC amplifier, the amplification degree of the signal gradually decreases to a very low level in comparison with a proper amplification degree for normal reproducing operation. Following the process, as shown in FIG. 88(c), the level of the output signal of the AGC amplifier gets lowered extremely. As mentioned above, since the amplification degree of the AGC amplifier is not restored to an original one instantaneously, the amplitude of the reproduced signal upon reproducing the pre-formatted sections 3703, 3707 becomes very small immediately after the output signal 3801 of the AGC amplifier reached a steady state, and therefore reading operation for information can not be performed properly.

Accordingly, as with the case described referring to FIG. 87, also in this case, the conventional arrangement has drawbacks that it is difficult to read synchronous timing information and address information, both obtained by reproducing the pre-formatted sections 3703 and 3707 immediately after each of the recording and erasing operations; therefore each predetermined synchronous timing can not be detected; and further, it can not be identified whether the address is a predetermined one or not. Consequently, it is impossible to properly perform each of recording, reproducing and erasing operations. Additionally, the above problem may be solved by taking into consideration response time of the AGC amplifier and by disposing the pre-formatted sections 3703, 3707 with intervals corresponding to a period of time sufficiently longer than the response time. However, the above arrangement causes lowering of transfer speed for information since the intervals between the pre-formatted sections become greater, and also fails to provide high density in recording information, and thus it can not give a decisive solution to the problem.

As described referring to FIG. 87 and FIG. 88, the conventional device can not properly provide each of recording, reproducing and erasing operations for information on and from a desired sector, and fails to provide high transfer speed and high density for information as a magneto-optical recording and reproducing device.

SUMMARY OF THE INVENTION

It is an object of the present invention to reduce errors in reproducing operation by automatically controlling amplification degree of an AGC amplifier in order to maintain an appropriate amplification degree even in reproducing a signal with a small amplitude following immediately after the reproduction of a signal with a large amplitude.

It is another object of the present invention to determine the optimum recording conditions according to an AGC voltage obtained by sampling operation without the need for a more complicated circuit configuration and control system.

It is still another object of the present invention to maintain the level of a reproduced signal always within a range of possible reproduction without being affected by a transient response due to ac coupling and a response of AGC circuit.

In order to achieve the above objects, an information recording and reproducing device of the present invention comprises first control means for holding a control voltage of an AGC circuit in recording or erasing operation, recorded area judgement means for judging whether an instantaneous area has information recorded therein or not in reproducing operation and second control means for holding the control voltage upon receiving an area without information recorded therein according to the judgement of the recorded area judgement means. With the arrangement, even in a reproducing operation immediately after the completion of a recording or erasing operation, a reproduced signal may be amplified at a substantially appropriate amplification degree, and therefore errors in reproducing operation may be reduced.

Moreover, in order to achieve the above objects, another information recording and reproducing device of the present invention comprises recording condition decision means for determining the most appropriate recording conditions according to a plurality of AGC voltages from an AGC circuit sampled to indicate respective recording conditions. With the arrangement, the most appropriate recording conditions may be determined by the recording condition decision means, based on the AGC voltages which do not show an amplitude of a reproduced signal directly, but increase or decrease monotonically according to the amplitude of the reproduced signal. By applying this process to the device at the start thereof, a recording operation for information may be always performed under the most appropriate conditions.

Furthermore, in order to achieve the above objects, still another information recording and reproducing device in accordance with the present invention comprises signal level limiting means disposed at a stage before a reproduction circuit, for limiting an excessive amplitude contained in a reproduced signal in recording or erasing operation for information to a predetermined level. With the arrangement, when a reproducing operation is executed on a pre-formatted section immediately after a recording or erasing operation, the influence of a transient response due to ac coupling given on a reproduced signal may be minimized. Accordingly, the reproduced signal is always restrained to stay within a range of possible reproduction. As a result, since the disposition of pre-formatted sections is determined without being affected by a transient response due to ac coupling and a response of AGC circuit, high-speed transfer as well as high density recording for information may be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a flow chart showing the procedure for AGC voltage hold control of an AGC amplifier.

FIG. 2 is an explanatory view showing a logic circuit conducting AGC voltage hold control for the pre-format use AGC amplifier.

FIG. 3 is an explanatory view showing a logic circuit conducting AGC voltage hold control for the MO signal use AGC amplifier.

FIG. 14 is an explanatory view showing the change-over timing for the recording operation of the high frequency superposition switch signal.

FIG. 15 is an explanatory view showing the change-over timing for the reproduction time of the high frequency superposition switch signal.

FIG. 21 is an explanatory view showing the waveforms for each part of the signal processing circuit.

FIG. 60 is a circuit diagram showing a modified example of the limiter.

FIGS. 61 to 88 show conventional examples.

FIG. 61 is an explanatory view showing recording operation for a magneto-optical recording and reproducing device.

FIG. 62 is an explanatory view showing reproducing operation for a magneto-optical recording and reproducing device.

FIG. 63 is a schematic plan view of a magneto-optical disk.

FIG. 64 is an enlarged view of the essential parts of FIG. 63.

FIG. 65 is an explanatory view showing a reproduction processing system.

FIG. 66 (a) is an explanatory view showing the polarity relation of 2 reproduced signals in the MO section.

FIG. 66 (b) is an explanatory view showing the polarity relation of 2 reproduction signals in the pre-formatted section.

FIG. 67 is a circuit diagram showing structural examples of an AGC amplifier.

FIG. 68 is an explanatory view showing the relation of the reproduced signals and the VCA output signals.

FIG. 69 is a perspective explanatory view showing access operations.

FIG. 70 is an explanatory view showing the reproduced signal waveforms during access and reproducing operation.

FIG. 71 is an explanatory view showing the relation of the VCA input signals and output signals.

FIG. 72 is an explanatory view showing the relation of the VCA input signal and output signal when a defect pulse exists in the un-recorded area.

FIG. 73 is a block diagram showing the relation of the reproduction circuit, the address generation circuit, and the timing generation circuit, FIG. 74 is a block diagram showing the essential parts of the structure of the pre-format waveform processing section.

FIG. 75 is an explanatory view showing mark configuration and the reproduced signal amplitude corresponding thereto.

FIG. 76 is an explanatory view showing the waveforms for each part of the pre-format waveform processing section of FIG. 74.

FIG. 77 is an explanatory view showing the relation of the marks to the recording light amount and the recording pulse length.

FIG. 78 is a block diagram showing a structural example of the essential parts of the MO waveform processing section.

FIG. 79 is an explanatory view showing the waveforms for each part of the MO waveform processing section shown in FIG. 78 at the time of reproducing operation.

FIG. 80 is a block diagram showing structural examples of the essential parts of a gate circuit.

FIG. 81 is a block diagram showing a structural example of the essential part of a conversion circuit.

FIG. 82 is a block diagram showing a structural example of the essential part of another MO waveform processing section.

FIG. 83 is an explanatory view showing the waveforms for each part of the MO waveform processing section shown in FIG. 82 at the time of reproducing operation.

FIG. 84 is an explanatory view showing the relation of the marks and the peak-to-peak values of the reproduced signals.

FIG. 85 is a circuit diagram showing a structural example of an envelope detection wave circuit.

FIG. 86 is a circuit diagram showing a structural example of a buffer amplifier.

FIG. 87 is an explanatory view showing the influence on the output signal of the buffer amplifier when excessive amplitude is input into the ac coupling section which constitutes the input stage of the buffer amplifier of FIG. 86.

FIG. 88 is an explanatory view showing the influence on the output signal of the buffer amplifier when excessive amplitude is input into the ac coupling section which constitutes the input stage of the AGC amplifier of FIG. 86.

DESCRIPTION OF THE EMBODIMENTS

The following description will discuss of the present invention in detail. To begin with, a description will be given on an arrangement of a magneto-optical recording and reproducing device as an example of an information recording and reproducing device, for performing recording, reproducing and erasing operations on and from a magneto-optical disk 1201.

Figure 9:
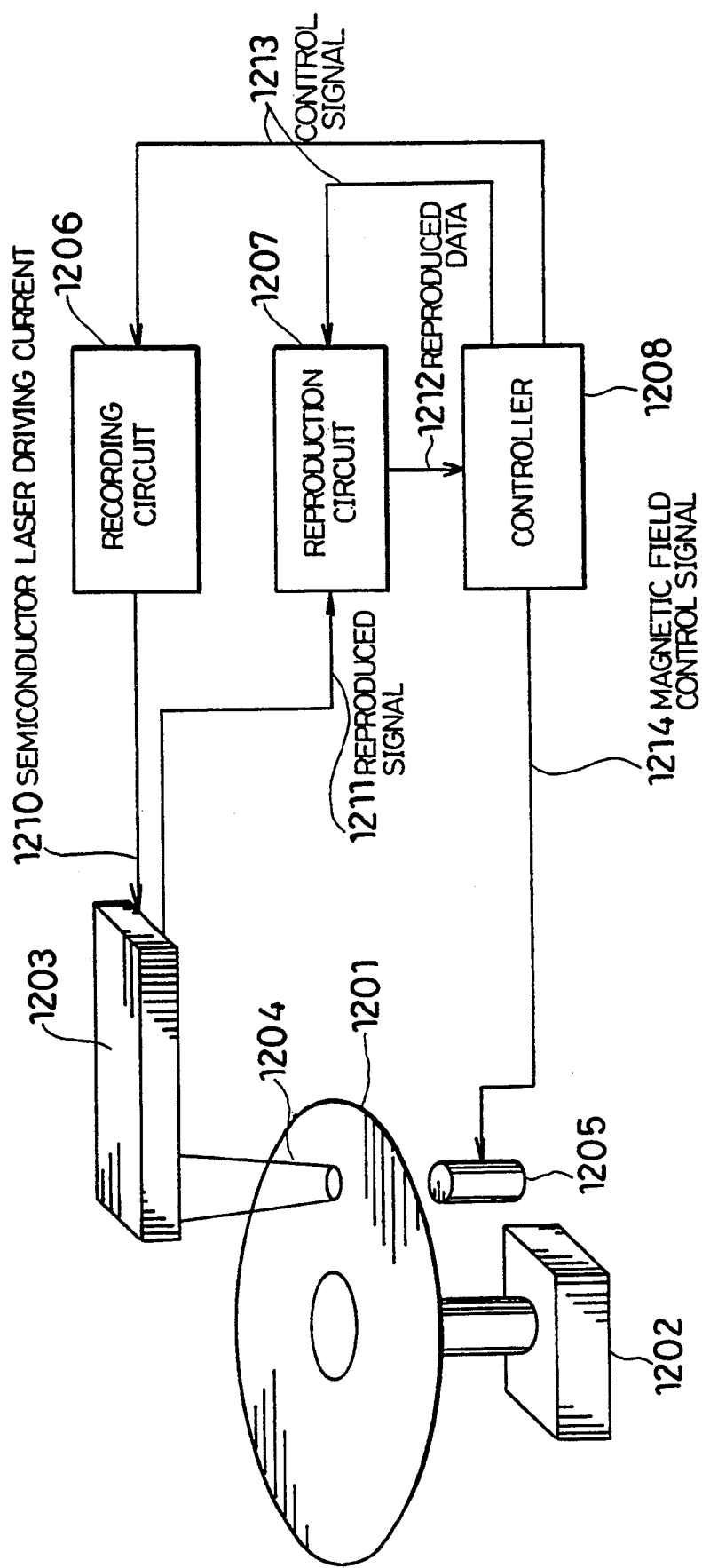
FIG. 9 is an explanatory view showing an outline of the structure of the magneto-optical recording and reproducing device.

As shown in FIG. 9, the magneto-optical disk 1201 is rotatively driven by a spindle motor 1202, and recording, reproducing and erasing operations for information are performed on and from the disk 1201 by a laser beam 1204 projected thereon from an optical head 1203. In a recording or erasing operation, simultaneously with a projection of the laser beam 1204, an external magnetic field is projected onto the disk 1201 from a magnet 1205 for applying an external magnetic field (hereinafter referred to as magnet 1205). Additionally, a reversing operation of the direction of the external magnetic field is executed, for example, by rotating the magnet 1205 by the use of a motor or other means which is not shown in the figure. Moreover, an electromagnet may be used as the magnet 1205 to obtain an external magnetic field for providing recording and erasing operations.

In a recording operation, a semiconductor laser driving current 1210 from a recording circuit 1206 is entered to a semiconductor laser 2801 (see FIG. 10) in the optical head 1203. The luminous intensity of the semiconductor laser 2801 is properly controlled by the semiconductor laser driving current 1210.

On the other hand, in a reproducing operation, a reproduced signal 1211 (consisting of two kinds of signals S1, S2 as shown in FIG. 62) is released from the optical head 1203 to a reproduction circuit 1207. Reproduced data 1212 reproduced in the reproduction circuit 1207 are entered to a controller 1208.

In the controller 1208, timing is provided for various kinds of control signals 1213 according to the reproduced data 1212, and those control signals 1213 are entered to the recording circuit 1206 and reproduction circuit 1207. Further, a magnetic field control signal 1214 is entered from the controller 1208 to the magnet 1205 so as to control the direction of the external magnetic field.

Figure 10:
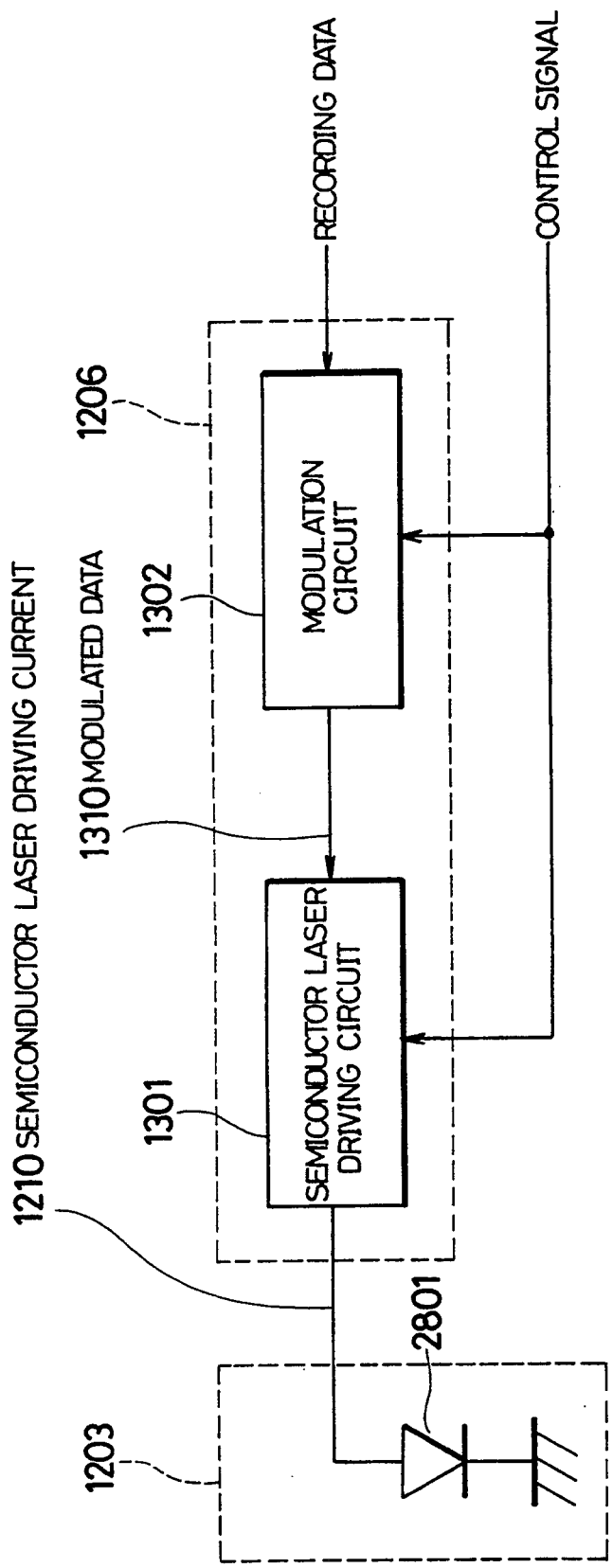
FIG. 10 is a block diagram showing a recording circuit.

As shown in FIG. 10, the recording circuit 1206 comprises a modulation circuit 1302 to which recording data 1311 released from the controller 1208 (see FIG. 9) are entered. In the modulation circuit 1302, the recording data 1311 are converted into modulated data 1310 corresponding to a predetermined recording format by the control signal 1213. The modulation is performed, for example, by a 2-7 modulation method which will be described later.

The modulated data 1310 are entered to the semiconductor laser driving circuit 1301 from which the semiconductor laser driving current 1210 is released according to the modulated data 1310 to be entered to the semiconductor laser 2801 in the optical head 1203. Simultaneously with this process, the control signal 1213 from the controller 1208 is entered to the semiconductor laser driving circuit 1301, and thus the luminous intensity of the semiconductor laser 2801 is properly controlled to perform each of recording, reproducing and erasing operations.

Figure 11:
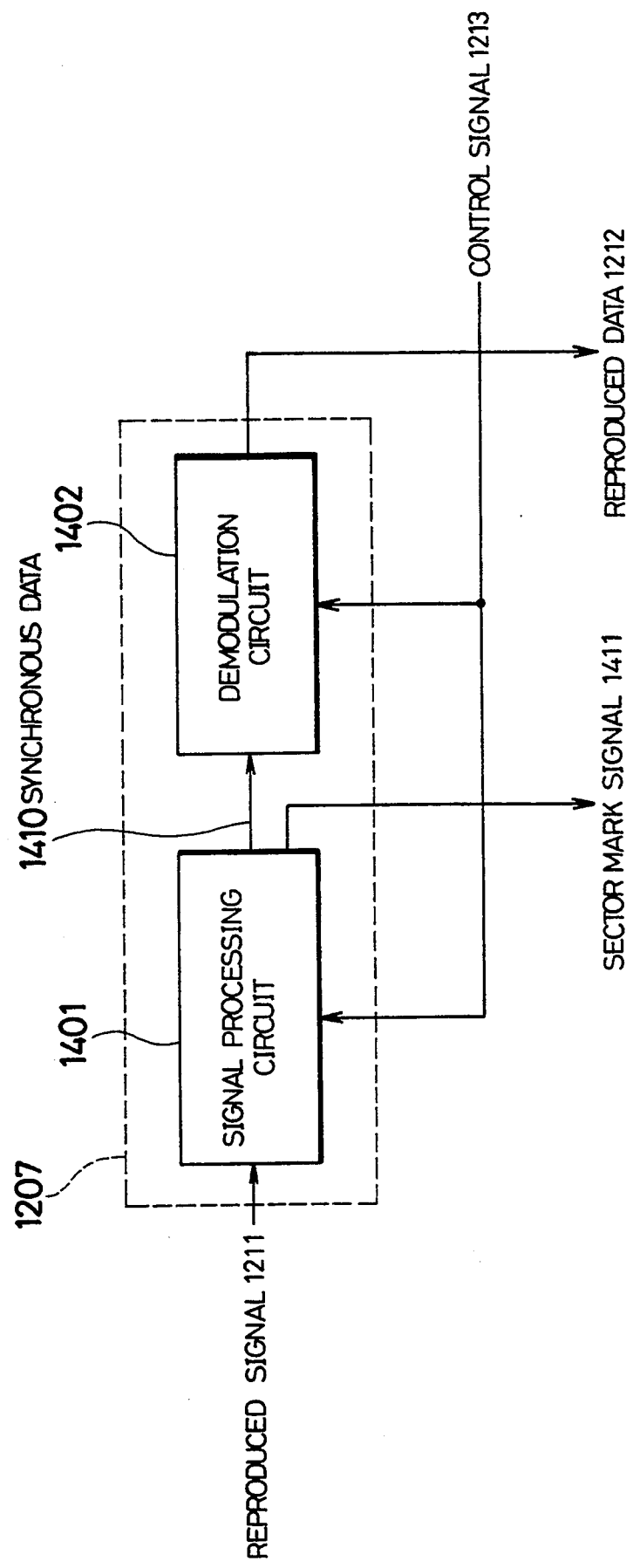
FIG. 11 is a block diagram showing a reproduction circuit.

Moreover, as shown in FIG. 11, the reproduction circuit 1207 includes a signal processing circuit 1401, and the reproduced signal 1211 (reproduced signals S1, S2) from the optical head 1203 (see FIG. 9) is entered to the signal processing circuit 1401 where synchronization is provided. From the signal processing circuit 1401, synchronous data 1410 are entered to a demodulation circuit 1402, while a sector mark signal 1411 is entered to the controller 1208 at the same time. The demodulation of the synchronous data 1410 is achieved by applying a reversed converting process to the process of the modulation circuit 1302 shown in FIG. 10. The various kinds of control signals 1213 from the controller 1208 are entered to the signal processing circuit 1401 and the demodulation circuit 1402 respectively. The reproduced data 1212 having been demodulated are released from the demodulation circuit 1402 to the controller 1208.

Figure 12:
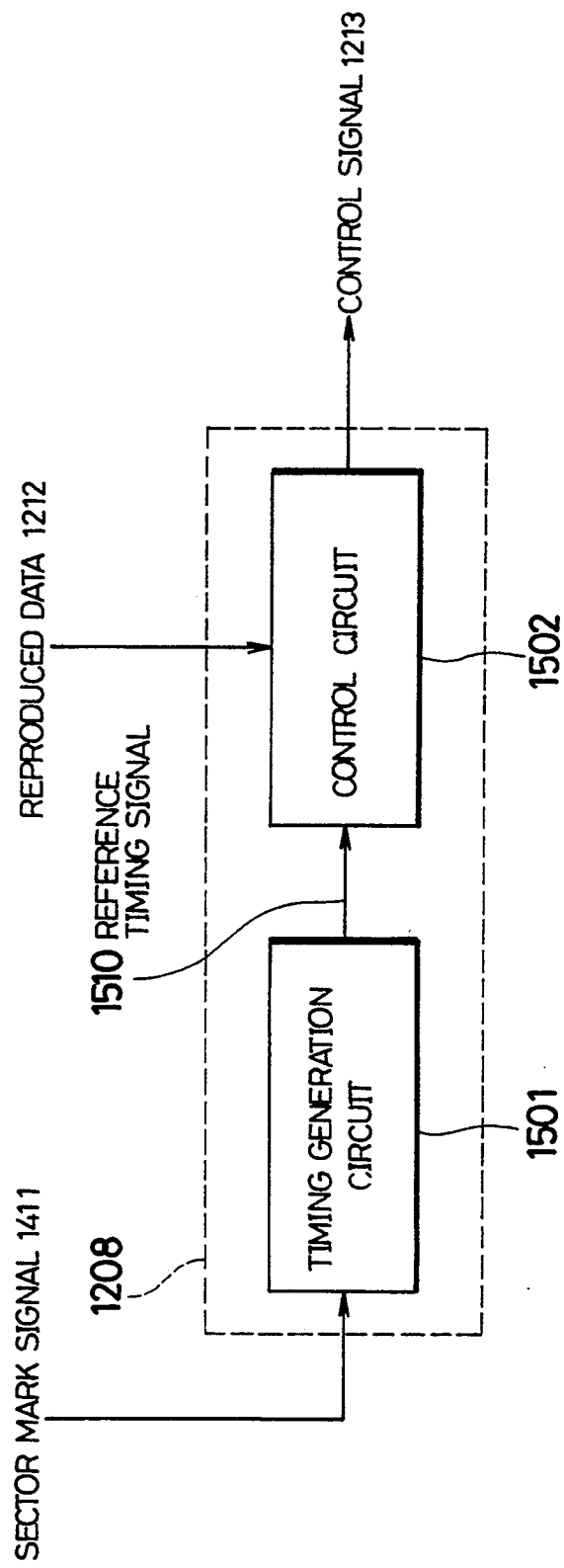
FIG. 12 is a block diagram showing the essential part of a controller.

As shown in FIG. 12, the controller 1208 comprises a timing generation circuit 1501. The sector mark signal 1411 from the signal processing circuit 1401 (see FIG. 11) is entered to the timing generation circuit 1501, where a reference timing signal 1510 is generated in synchronism with each sector, and is entered to a control circuit 1502. Further, the reproduced data 1212 from the demodulation circuit 1402 (see FIG. 11) are also entered to the control circuit 1502. The control circuit 1502 on the one hand generates the various kinds of control signals 1213 made from the above two kinds of input signals, and on the other hand performs input and output operations for information to and from external devices.

In the modulation circuit 1302 shown in FIG. 10, for example, the modulation is performed using a modulation method as shown in Table 1. This method is referred to as a so-called 2-7 modulation method. Input data (recording information) shown in the left column of Table 1 are converted to predetermined modulated data shown in the right column of Table 1. At this time, provision is made such that the number of consecutive bits of the logical value "0" in the modulated data is within 2 to 7. The modulated data 1310 that conform to the sector format shown in FIG. 14(a), is then sent at a proper timing to the semiconductor laser driving circuit 1301 shown in FIG. 10.

TABLE 1

| Input data | Modulated data |
| --- | --- |
| 10 | 0100 |
| 010 | 100100 |
| 0010 | 00100100 |
| 11 | 1000 |
| 011 | 001000 |
| 0011 | 00001000 |
| 000 | 000100 |

Figure 61:
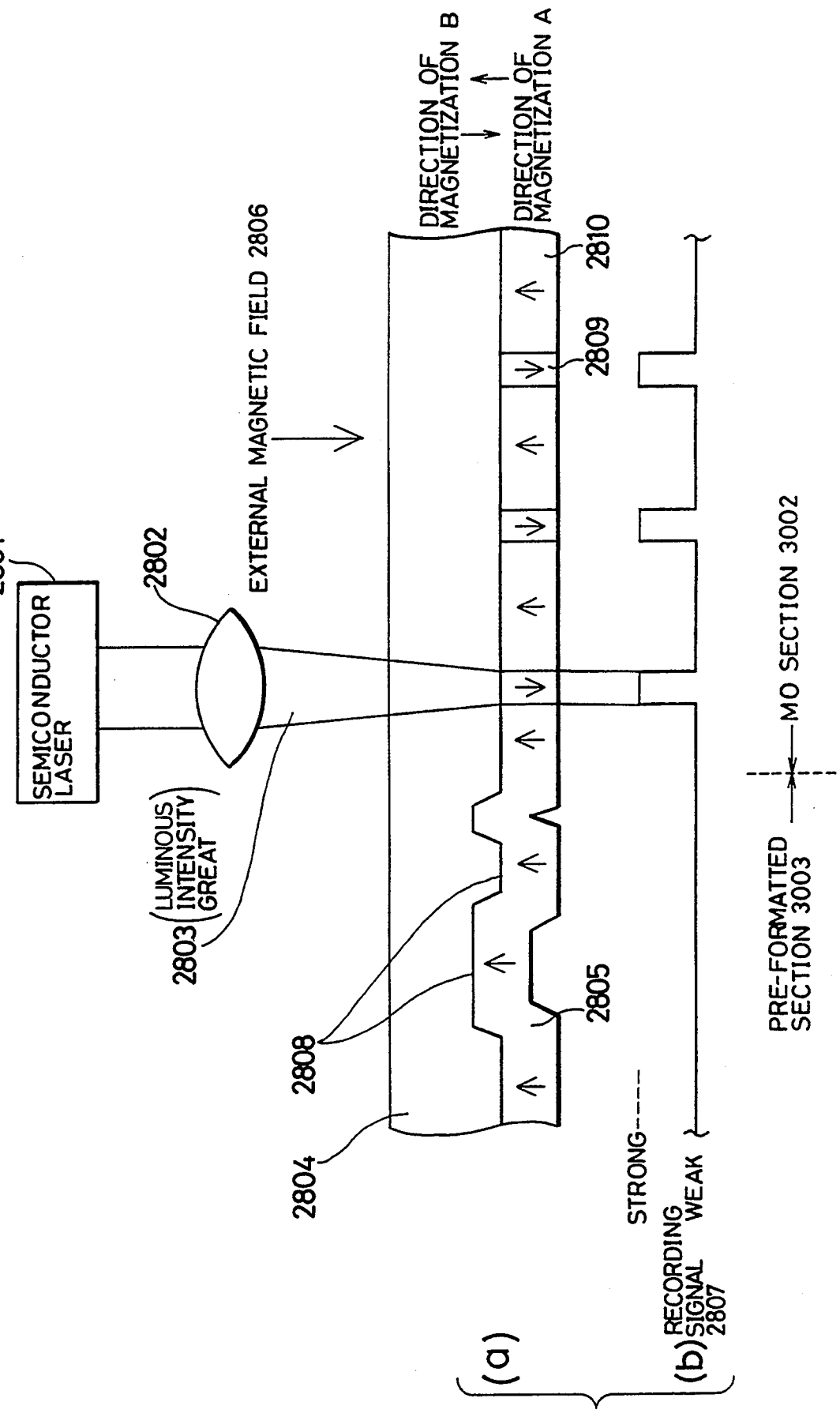
Figure 64:
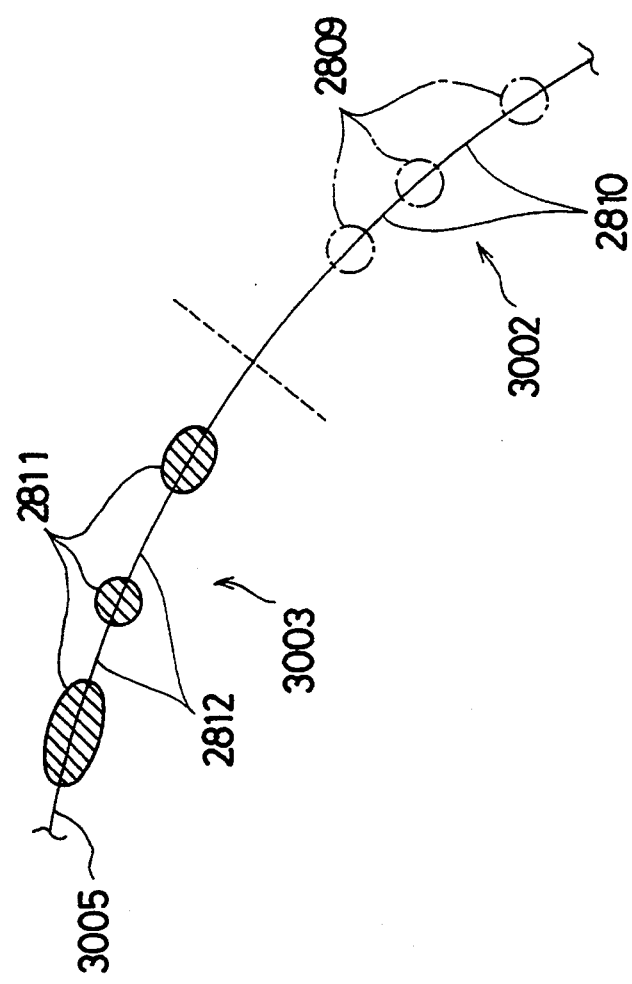
Figure 63:
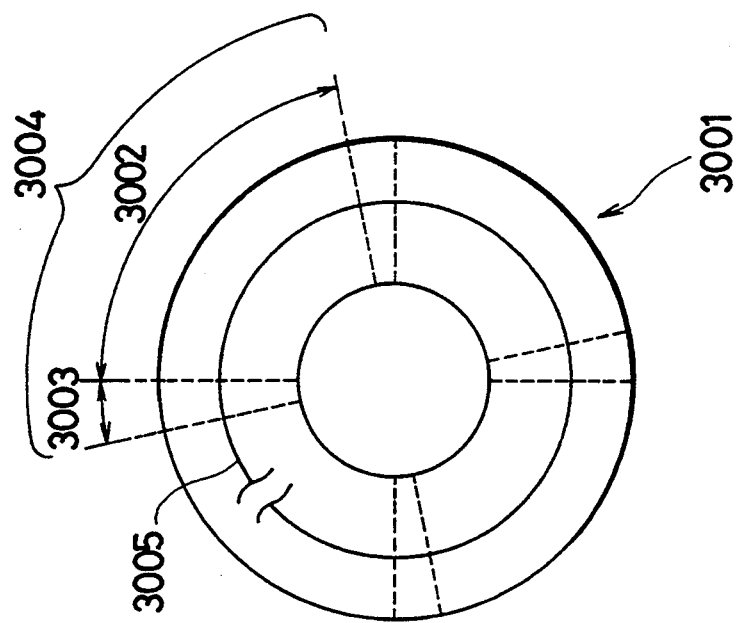
Figure 65:
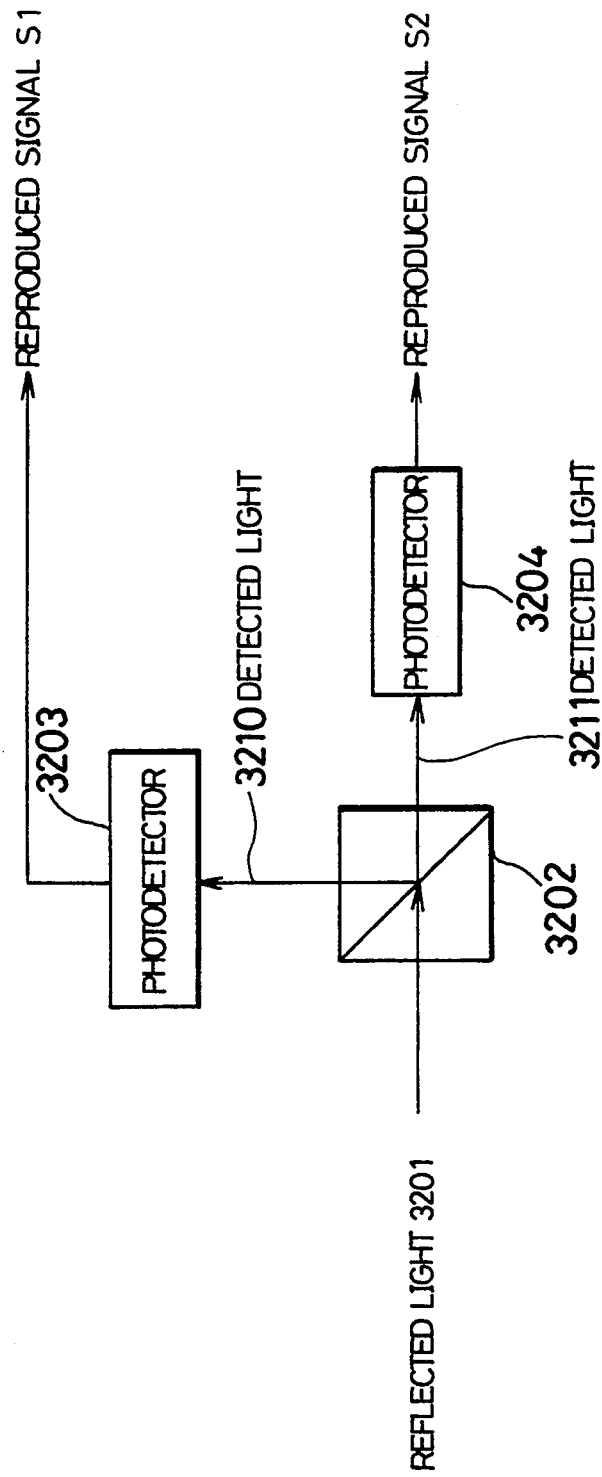

As shown in FIG. 14(a), a pre-formatted section 3003 is composed of a sector mark section 1701 for obtaining timing of synchronization by each sector and an ID section having address information for each sector. As shown in FIG. 61, these sections are formed on the magneto-optical disk 1201 in the form of physical protrusions and recessions 2808 etched thereon corresponding to respective marks 2811 and non-marks 2812 which are unrecordable as well as unerasable. The MO section 3002 as a data section is composed of a normal service area 1703 for recording, reproducing and erasing information data therein and a pair of gap sections 1704, 1705 located before and after the normal service area 1703. The modulated data 1310 are recorded in the normal service area 1703. A recording process at this time is performed by forming marks 2809 and non-marks 2810 by the use of MO signals. Additionally, the gap sections 1704, 1705 disposed between the pre-formatted section 3003 and the MO section 3002 are margin areas for giving safety margins in recording information in the normal service area 1703. More specifically, these gap sections 1704, 1705 are areas for alleviating a drawback during a recording operation that a recording start position and a recording end position may be shifted forward or backward due to a phase shift or the like caused by errors between rotation of the spindle motor 1202 and timing of synchronization by each sector 3004.

Figure 13:
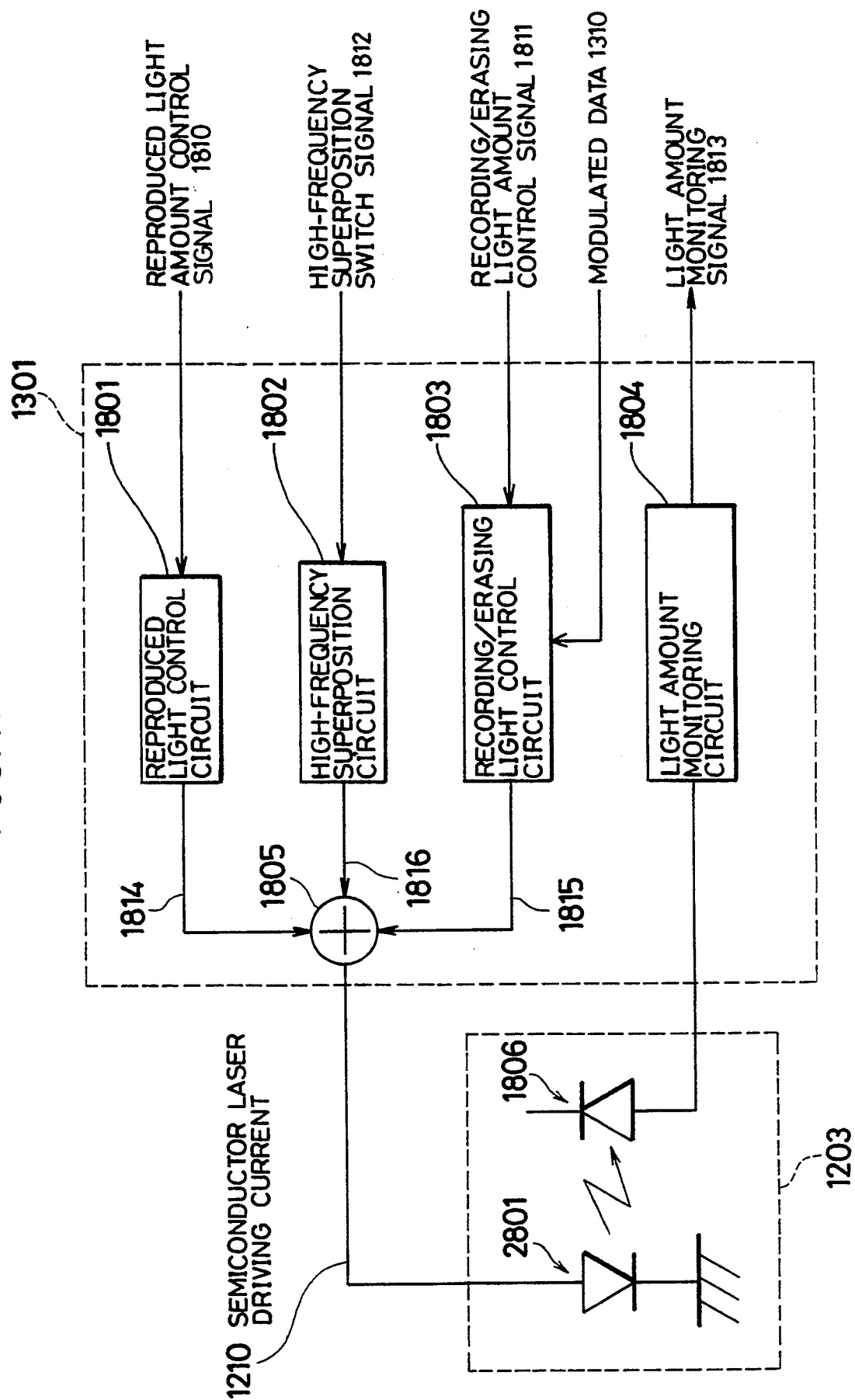
FIG. 13 is a block diagram showing a semiconductor laser driving circuit.

As shown in FIG. 13, the semiconductor laser driving circuit 1301 comprises a recording/erasing light control circuit 1803 to which the modulated data 1310 from the modulation circuit 1302 (see FIG. 10) are entered.

Moreover, a reproduced light control signal 1810 from the controller 1208 (see FIG. 9) is entered to a reproduced light control circuit 1801 whereby reproduced light amount from the semiconductor laser 2801 in the optical head 1203 is properly controlled in reproducing operation.

A recording/erasing light control signal 1811 from the controller 1208 is entered to the recording/erasing light control circuit 1803 whereby light amount of the semiconductor laser 2801 is controlled according to a recording or erasing operation. Moreover, a high-frequency superposition switch signal 1812 from the controller 1208 is entered to a high-frequency superposition circuit 1802. According to the signal 1812, an output signal 1816 which is switched on and off in a high frequency generated in the high-frequency superposition circuit 1802. The output signal 1816 is superposed on the output signal 1814 of the reproduced light control circuit 1801 in a summing circuit 1805. With the arrangement, noise from the semiconductor laser 2801 which is generated due to return light from the magneto-optical disk 1201, is reduced. Additionally, the output signal 1816 of the high-frequency superposition circuit 1802 is released to the summing circuit 1805 only in reproducing operation.

These three output signals 1814, 1815, 1816 of the reproduced light control circuit 1801, recording/erasing light control circuit 1803 and high-frequency superposition circuit 1802 are summed up in the summing circuit 1805, and a semiconductor laser driving current 1210 as an output current therefrom is sent to the semiconductor laser 2801. Light amount (luminous intensity) of the semiconductor laser 2801 is converted into an electric signal which varies with the light amount by a photo detector 1806 installed in the optical head 1203. Further, a light monitoring signal 1813 which is generated in a light monitoring circuit 1804 and varies with the luminous intensity, is sent to the controller 1208. In the controller 1208, according to the light monitoring signal 1813, the reproduced light control signal 1810, recording/erasing light control signal 1811 and high-frequency superposition switch signal 1812 are released. In other words, luminous intensity (light amount) of the semiconductor laser 2801 is controlled so as to have a proper luminous intensity depending oil each of reproducing operation and recording/erasing operation.

The following description will discuss each of recording, erasing and reproducing operations for information referring to FIG. 14 and FIG. 15.

As shown in FIG. 14(*b*), the high-frequency superposition switch signal 1812 is maintained low ("0") within the normal service area 1703 (see FIG. 14(*a*)), and is maintained high ("1") in areas other than the normal service area 1703. In other words, a high-frequency superposing operation by the high-frequency superposition circuit 1802 is switched off within the normal service area 1703 of the MO section 3002, and is switched on in the areas other than the normal service area 1703. With the above process, the modulated data 1310 are recorded as MO signals in the normal service area 1703, as shown in FIG. 14(*c*). In that case, as shown FIG. 14(*d*), a level of light amount (luminous intensity) 1910 of the semiconductor laser 2801 is maintained comparatively high within the normal service area 1703, and is maintained comparatively low in the areas other than the above area. More specifically, information is recorded or erased in the MO section 3002 while sector synchronous timing is detected from the sector mark section 1701 of the pre-formatted section 3003, address information and the like is read from the ID section 1702, and desired addresses are identified.

On the other hand, as shown in FIG. 15(*b*), in a reproducing operation for information recorded in a normal service area 1703, the high-frequency superposition switch signal 1812 is maintained high ("1") in both of the pre-formatted section 3003 and the MO section 3002. Further, since recording operation is not performed, the modulated data 1310 are kept low ("0") as shown in FIG. 15(*c*), while the level of the light amount 1910 is kept comparatively low as shown in FIG. 15(*d*). In other words, information recorded as MO signals is reproduced from the MO section 3002 while the sector synchronous timing for the sector 3004 is detected from the sector mark section 1701 of the pre-formatted section 3003 (FIG. 15(*a*)), address information and the like is read from the ID section 1702, and desired addresses are successively identified.

Figure 16:
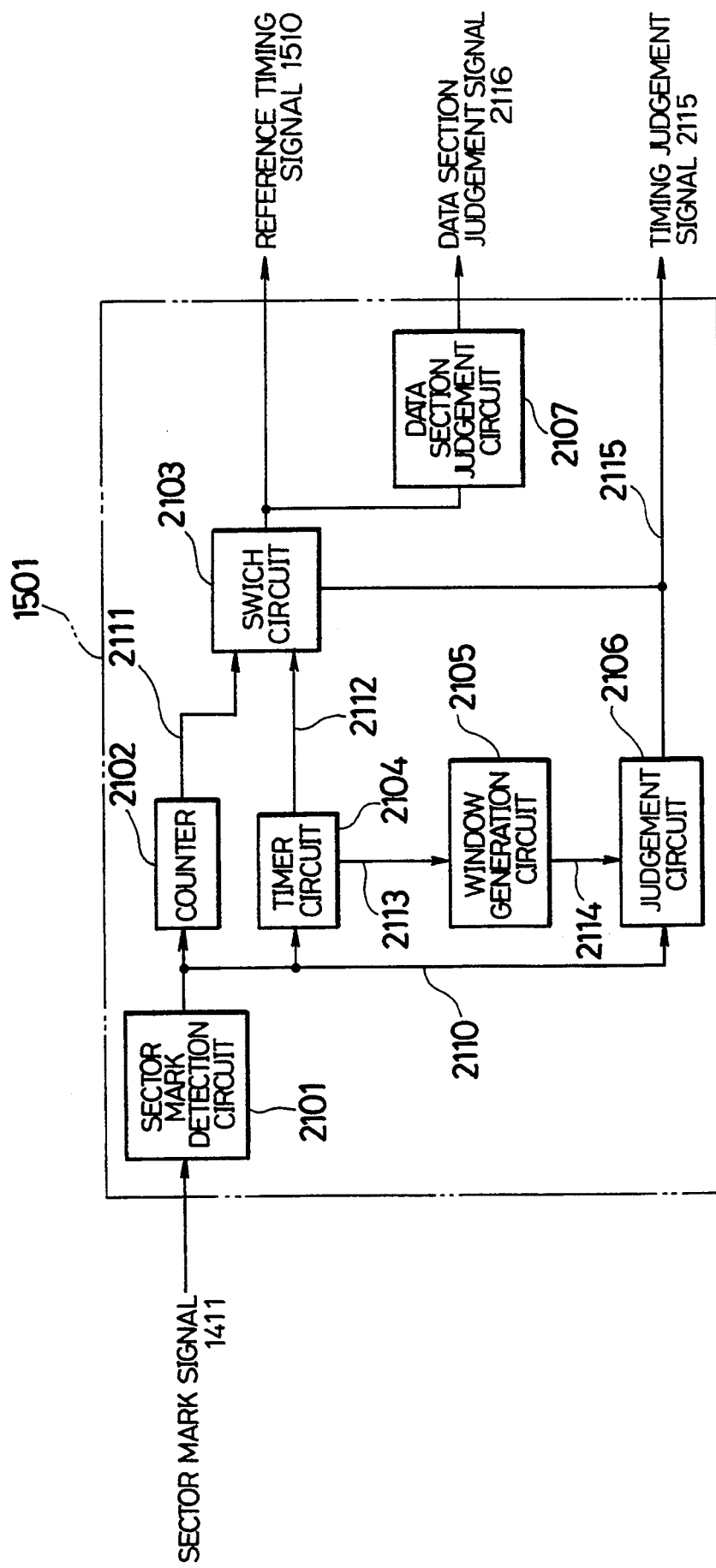
FIG. 16 is a block diagram showing a timing generation circuit.

The following description will discuss the timing generation circuit 1501 of FIG. 12 more specifically, referring to FIG. 16.

The timing generation circuit 1501 comprises a sector mark detection circuit 2101 to which the sector mark signal 1411 released from the signal processing circuit 1401 (see FIG. 11) is entered, as shown in FIG. 16. In the sector mark detection circuit 2101, the existence or non-existence of the sector mark is detected, and according to the result, a sector mark detecting signal 2110 is released. The sector mark detecting signal 2110 is sent to each of a counter 2102, a timer circuit 2104 and a judgement circuit 2106.

Output signals 2111 and 2112 of the respective counter 2102 and timer circuit 2104 are sent to a switch circuit 2103. Either of the output signals 2111 or 2112 is selected in the switch circuit 2103 and is released as the reference timing signal 1510.

The reference timing signal 1510 is also entered to a data section judgement circuit 2107, and according to the signal, a data section judgement signal 2116 is released. An output signal 2113 of the timer circuit 2104 is sent to a window generation circuit 2105. An output signal 2114 of the window generation circuit 2105 is entered to the judgement circuit 2106.

In the judgement circuit 2106, a timing judgement signal 2115 (which will be described later) is generated based on the output signal 2114 and the sector mark detecting signal 2110. According to the timing judgement signal 2115, either the output signal 2111 of the counter 2102 or the output signal 2112 of the timer circuit 2104 is selected in the switch circuit 2103. Each of the reference timing signal 1510, the data section judgement signal 2116 and the timing judgement signal 2115 is sent to the control circuit 1502 (see FIG. 12). Based on the signals 1510, 2115, 2116 released from the timing generation circuit 1501 and the reproduced data 1212, the control circuit 1502 sends the control signals 1213 to the recording circuit 1206 and the reproduction circuit 1207 (see FIG. 9), thereby performing each control of recording, reproducing and erasing operations for information.

Figure 17:
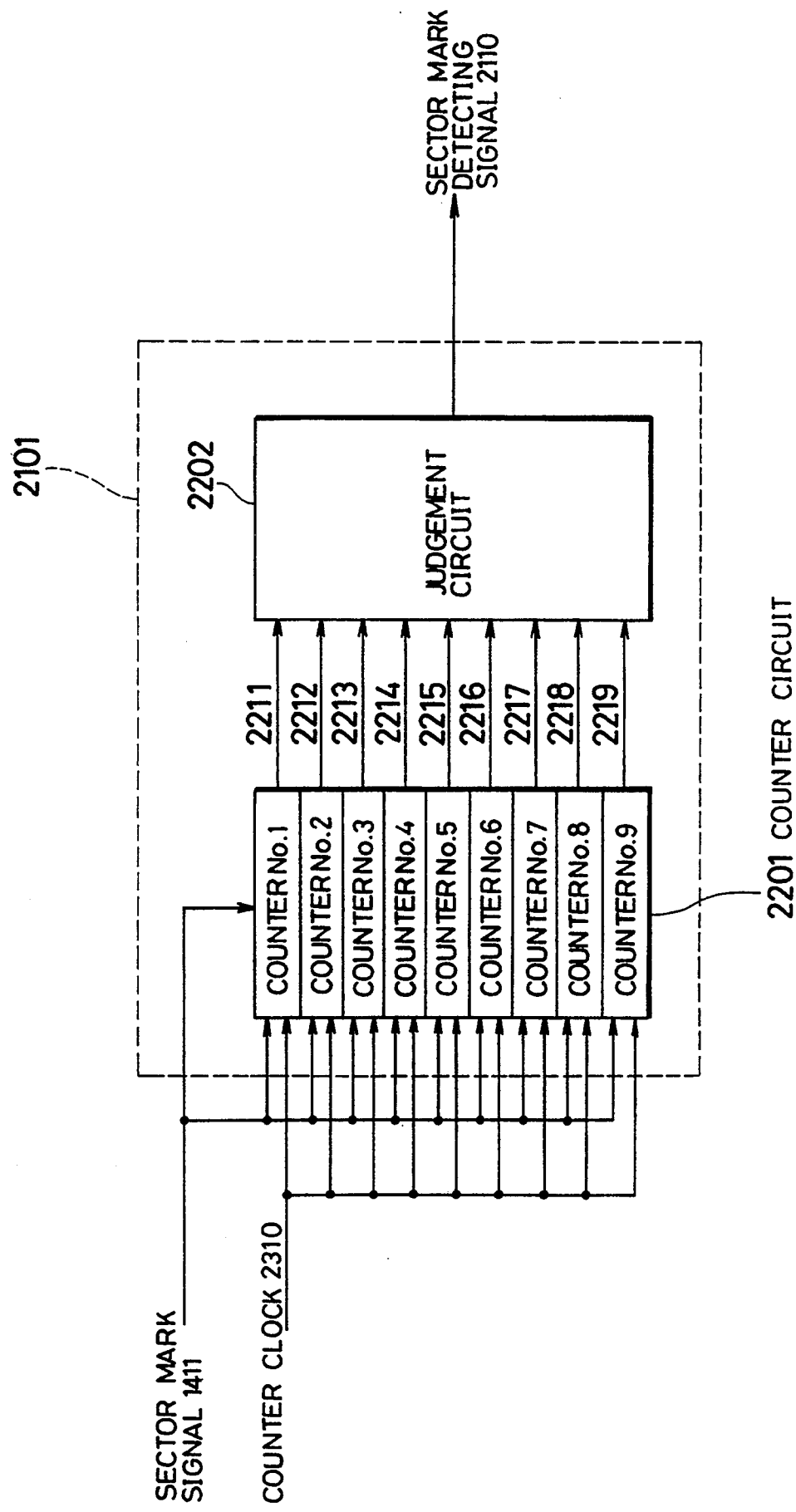
FIG. 17 is a block diagram showing the structure of a sector mark detection circuit.

As shown in FIG. 17, the sector mark detection circuit 2101 comprises a counter circuit 2201. The sector mark signal 1411 released from the signal processing circuit 1401 (see FIG. 11) is sent to each of, for example, nine counters No. 1 to No. 9 which compose the counter 2201. Each of the output signals 2211 to 2219 of the respective counters No. 1 to No. 9 is sent to a judgement circuit 2202 from which the sector mark detecting signal 2110 is released according to the results of the judgement. As described above, the sector mark detection circuit 2101 functions as a circuit for obtaining synchronous timing required to perform each of the recording, reproducing and erasing operations by each sector by detecting the sector mark sections 1701 (for example, see FIG. 14(*a*)).

Figure 18:
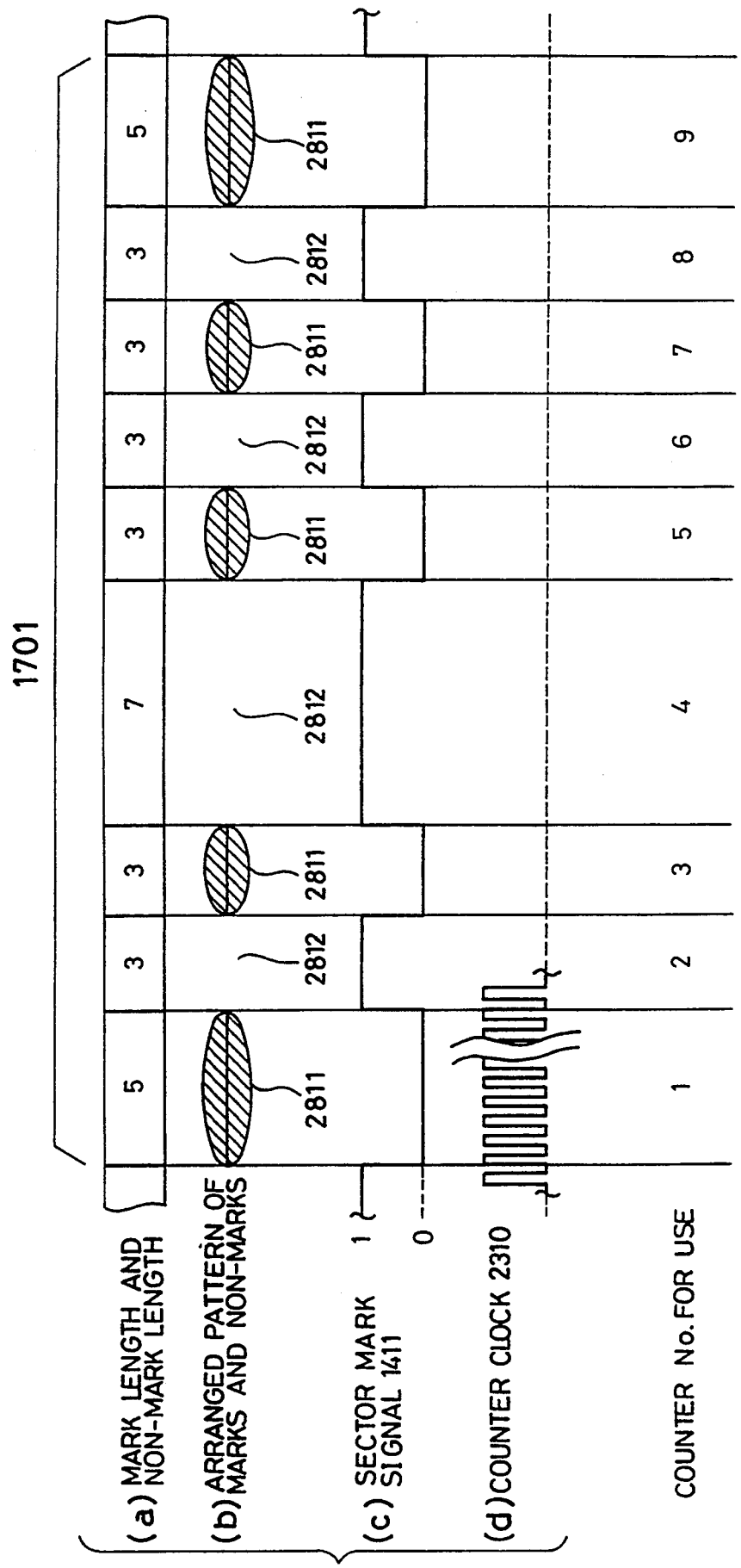
FIG. 18 is an explanatory view showing a sector mark detection procedure.

Referring to FIG. 18, the following description will discuss the operation of the counters No. 1 to No. 9 of the counter 2201. Here, it is supposed that there is a pattern of the sector mark section 1701 which is composed of the marks 2811 and non-marks 2812, for example as is shown in FIG. 18(*b*). In this example, as shown in FIG. 18(*a*), a plurality of the marks 2811 are physically etched so that a ratio of the mark lengths to the non-mark lengths can be expressed as 5:3:3:7:3:3:3:5.

The sector mark signal 1411 obtained by reproducing the pattern of those marks 2811 and non-marks 2812 is converted into a binary signal which is, for example, low ("0") in the mark portion, and high ("1") in the non-mark portion, as shown in FIG. 18(c).

When the sector mark signal 1411 is entered to each of the counters No. 1 to No. 9, firstly the counter No. 1 counts the number of clocks of a counter clock 2310, which number corresponds to a mark length "5". The counter clock 2310 has a higher frequency than that of the sector mark signal 1411, as shown in FIG. 18(d). When the count number is within a predetermined range, it is confirmed that the leading mark 2811 (the mark length "5") is accurately detected. Successively, in the counter No. 2, through a process similar to the above, the following non-mark 2812 (the non-mark length "3") is detected. In this way, the marks 2811 and the non-marks 2812 in the sector mark section 1701 are detected one after another, and finally the counter No. 9 detects the mark length "5". Detection signals 2211 to 2219 derived from those nine marks 2811 and non-marks 2812 are sent to the judgement circuit 2202 (see FIG. 17).

Then, it is judged whether all or a part of those nine results of the detection conform to the pattern of the sector mark section 1701, and whether an order of each of those marks 2811 and non-marks 2812 is properly followed. As a result, only in the case where a relevant position is judged to be the sector mark section 1701, the sector mark detecting signal 2110 becomes low ("0"). The sector mark detecting signal 2110 thus obtained may be used to provide synchronous timing by each sector 3004.

Figure 19:
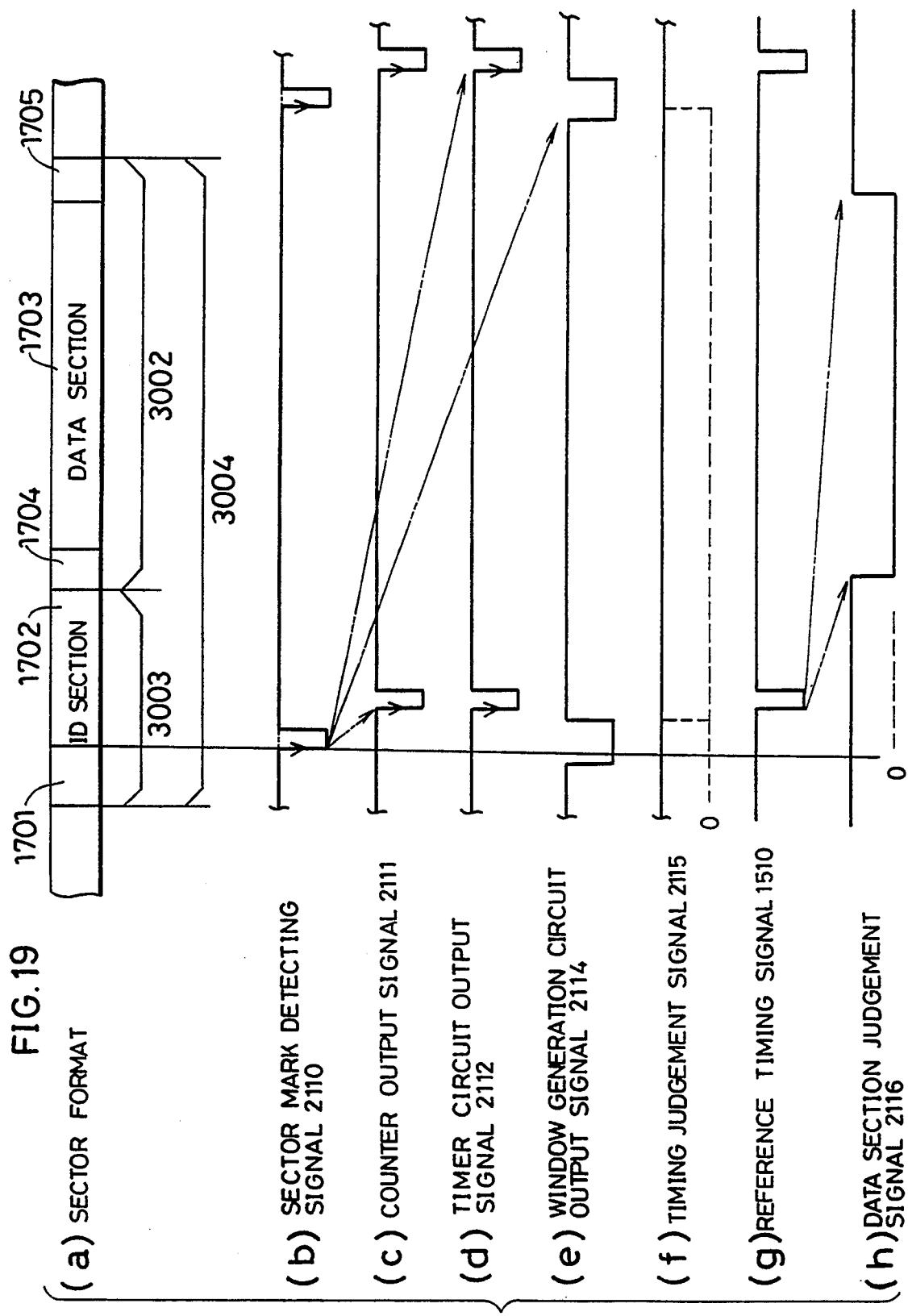
FIG. 19 is an explanatory view showing the waveforms for each part of the timing generation circuit.

Referring to FIG. 19, the following description will discuss a waveform of each section in the timing generation circuit 1501.

As shown in FIG. 19(b), the sector mark detecting signal 2110 becomes low upon detecting a sector mark section 1701 (see FIG. 19(a)) in a pre-formatted section 3003, as was described before, and the falling edge of the sector mark detecting signal 2110 provides synchronous timing for the sector 3004. The counter 2102, after having counted up to a predetermined count number since the falling edge of the sector mark detecting signal 2110, makes a counter output signal 2111 fall to the low level as shown in FIG. 19(c).

On the other hand, the count number of the timer circuit 2104 is predeterminately set so as to become greater than that of the count number of the counter 2102 by one sector length of the sector 3004. Accordingly, as shown in FIG. 19(d), a falling edge of the output signal 2112 of the timer circuit 2104 substantially coincides with a falling edge of the counter output signal 2111 indicating the next sector 3004 in its timing.

Furthermore, as shown in FIG. 19(e), taking up a falling edge of the sector mark detecting signal 2110 as a reference, the output signal 2114 of the window generation circuit 2105 becomes low with a predetermined window width in a vicinity of the falling edge of the sector mark detecting signal 2110 of the next sector 3004. The timing judgement signal 2115 from the judgement circuit 2106 becomes high as shown in a solid line in FIG. 19(f) if there exists a falling edge of the sector mark detecting signal 2110 while the output signal 2114 of the window generation circuit 2105 is low. On the other hand, it becomes low if there exists no falling edge of the sector mark detecting signal 2110 (shown in a broken line in FIG. 19(f)). Accordingly, the timing judgement signal 2115 functions as a signal for judging whether the detection of a sector mark section 1701 was performed within a predetermined range or it was unsuccessful.

In the switch circuit 2103, the counter output signal 2111 is selected when a sector mark section 1701 was detected, and a timer circuit output signal 2112 is selected when the detection was unsuccessful on the contrary. As a result, as shown in FIG. 19(g), even if an error occurs in detecting a sector mark section 1701, the reference timing signal 1510 may be released accurately by executing correction according to timing provided by the preceding sector 3004. The reference timing signal 1510 thus obtained is sent to the data section judgement circuit 2107.

The data section judgement circuit 2107 is a kind of counter, and the data section judgement signal 2116 as its output signal, is maintained low (see FIG. 19(h)) in the normal service area 1703 in the MO section 3002. Therefore, the data section judgement signal 2116 may be used as a signal for discriminating between the pre-formatted section 3003 and the MO section 3002. The reference timing signal 1510, timing judgement signal 2115 and data section judgement signal 2116 thus obtained are sent to the control circuit 1502 shown in FIG. 12. In the control circuit 1502, the control signals 1213 are generated according to the signals 1510, 2115 and 2116.

Figure 20:
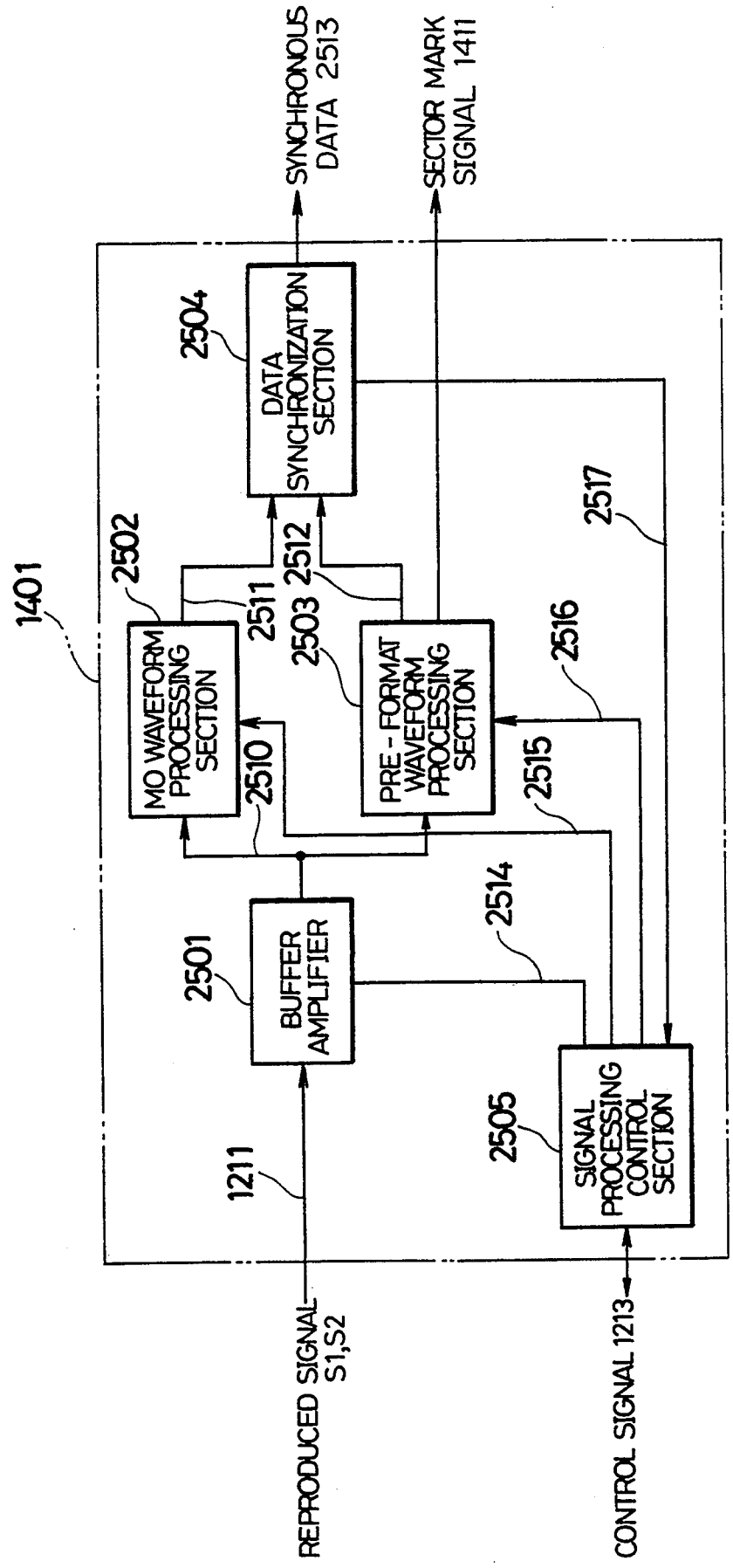
FIG. 20 is a block diagram showing the structure of a signal processing circuit.
Figure 22:
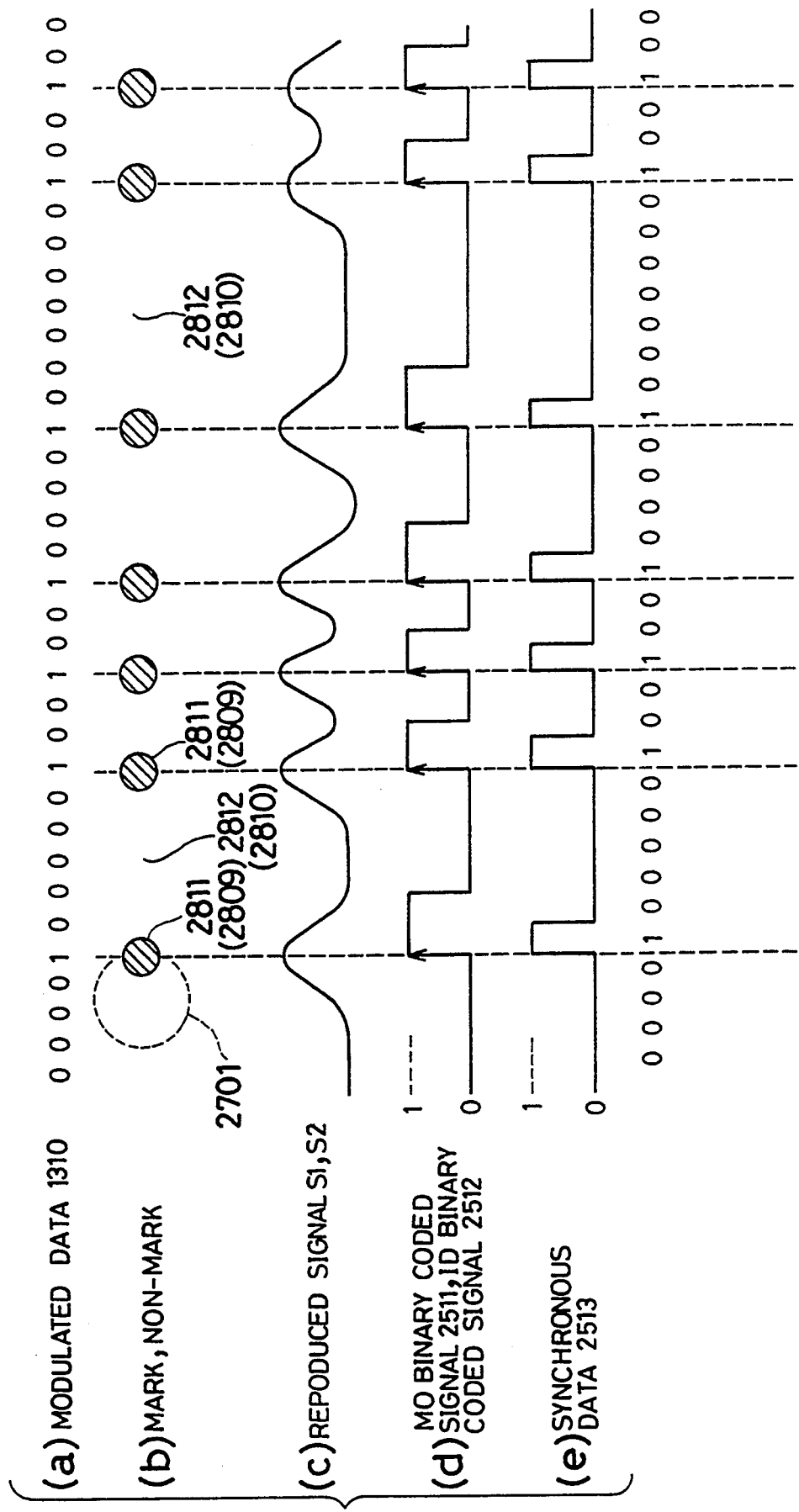
FIG. 22 is an explanatory view showing the relations between mark/non-mark and the reproduced signals.

The following description will discuss the operation of the signal processing circuit 1401 shown in FIG. 11, referring to FIGS. 20 to 22.

The reproduced signal 1211 (reproduced signals S1, S2) reproduced from the magneto-optical disk 1201 is entered to a buffer amplifier 2501 in the signal processing circuit 1401 (see FIG. 20). An output signal 2510 of the buffer amplifier 2501 is sent to an MO waveform processing section 2502 and a pre-format waveform processing section 2503. From the MO waveform processing section 2502, is released an MO binary coded signal 2511 (reproduced digital signal) corresponding to the marks 2809 and non-marks 2810 recorded in the MO section 3002 as MO signals. On the other hand, from the pre-format waveform processing section 2503, is released an ID binary coded signal 2512 corresponding to the marks 2811 and non-marks 2812 recorded in the pre-formatted section 3003. These binary coded signals 2511, 2512 are entered to a data synchronization section 2504, and synchronous data 2513 synchronizing to a clock are generated in a PLL (PHASE LOCKED LOOP) in the data synchronization section 2504, and is sent to the demodulation circuit 1402 (see FIG. 11).

Moreover, the sector mark signal 1411 is generated in the pre-format waveform processing section 2503 and sent to the timing generation circuit 1501 (see FIG. 12). In the signal processing control section 2505, input and output operations of various control signals 2514 to 2517 are performed to and from other sections of the signal processing circuit 1401. Further, input and output operations of the various control signals 1213 are performed between the control section 2505 and the controller 1208 shown in FIG. 12.

A waveform of each section in the signal processing circuit 1401 is shown in FIG. 21. As shown in FIG. 21(b)(c), the reproduced signals S1, S2 are differentially amplified in the MO waveform processing section 2502. As a result, only an MO signal of the MO section 3002 is separated and further binary coded, and consequently an MO binary coded signal 2511 is generated (see FIG.

21(*d*)). Moreover, the reproduced signals S1, S2 are summed up in the pre-format waveform processing circuit 2503. As a result, only information of the pre-formatted section 3003 is separated and further binary coded, and consequently the ID binary coded signal 2512 and the sector mark signal 1411 are obtained (see FIG. 21 (*e*)(*g*)).

Figure 66A:
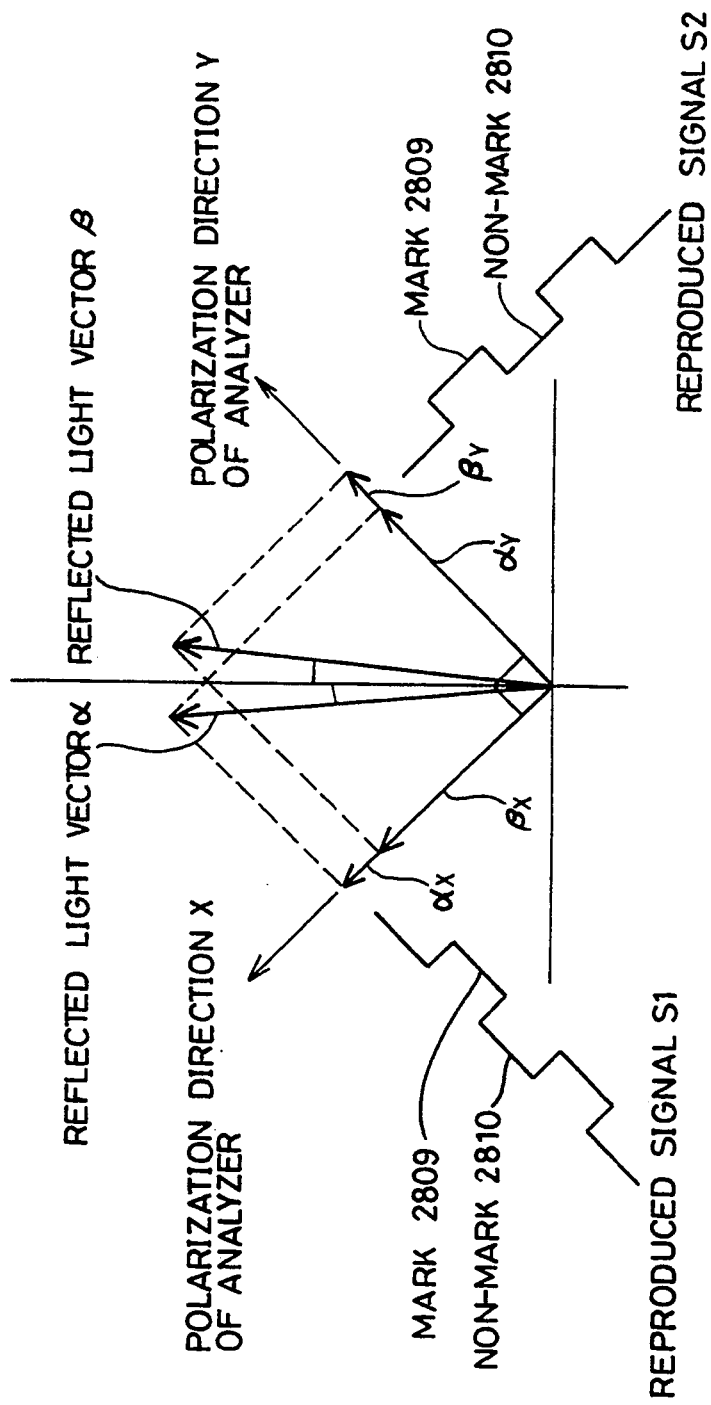
Figure 66B:
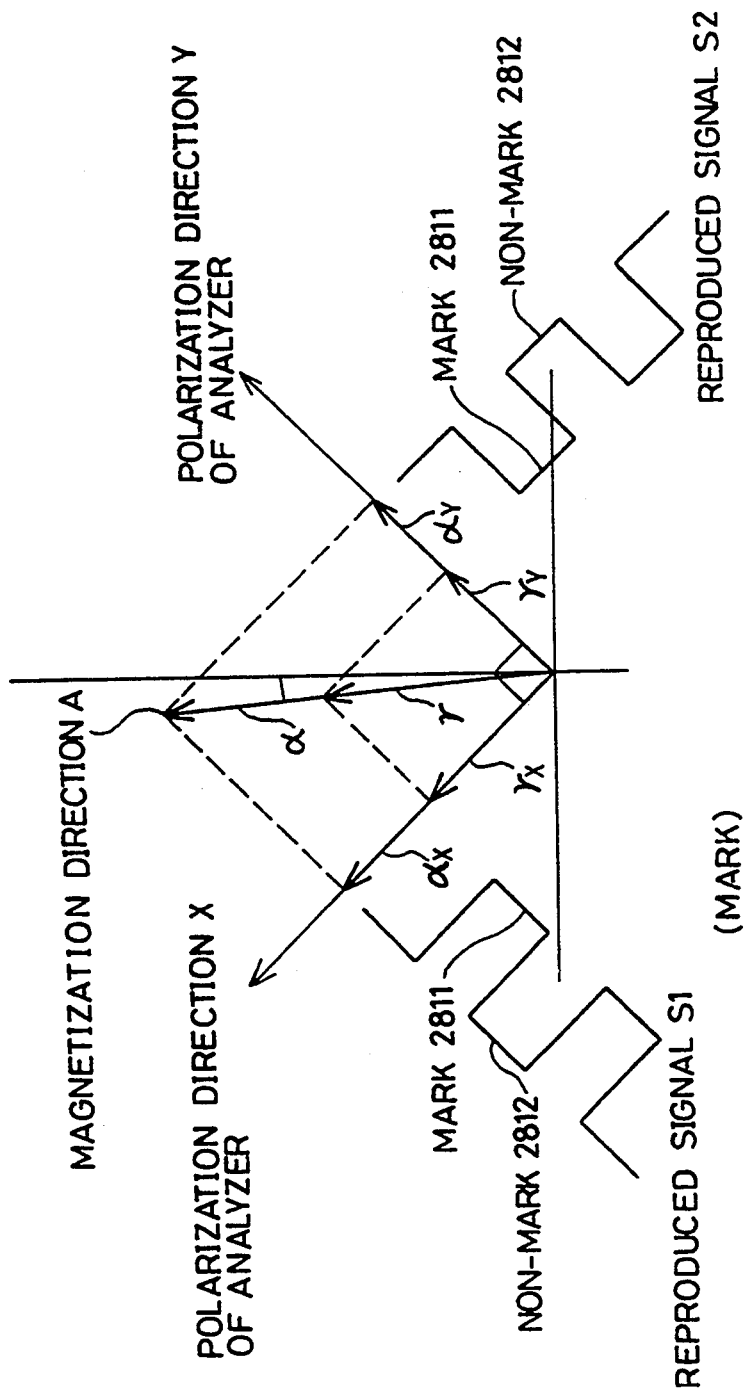
Figure 67:
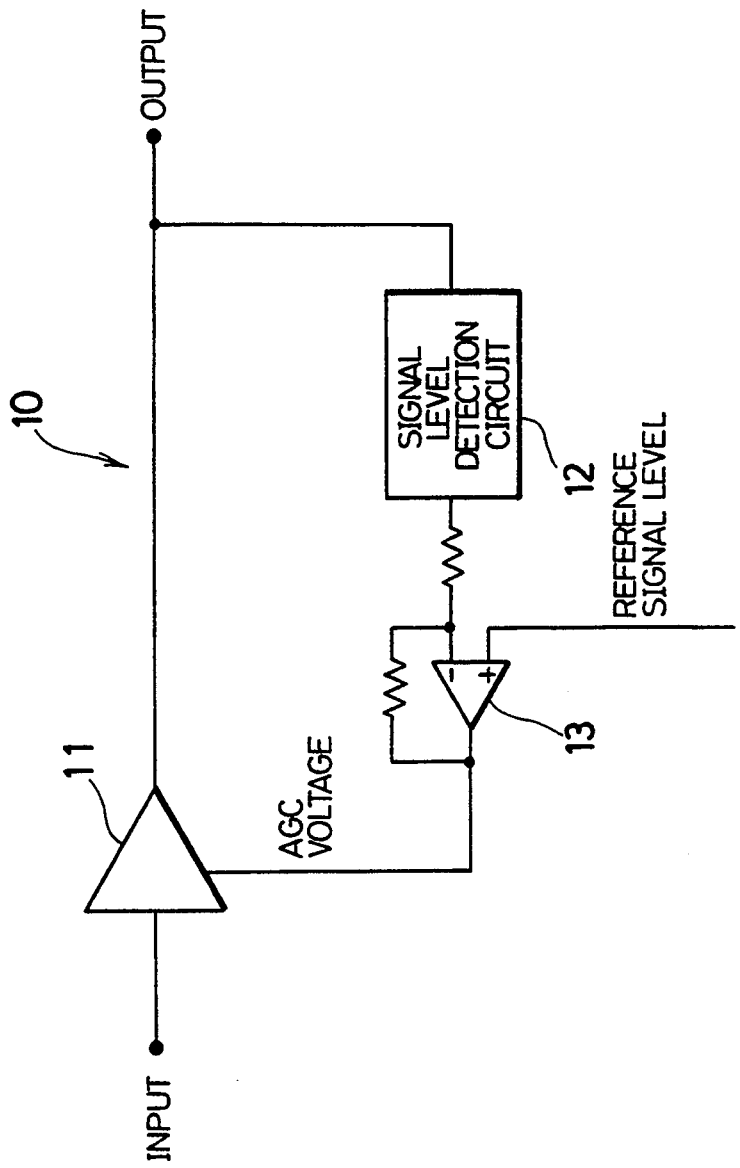

The reason why the MO section 3002 and the pre-formatted section 3003 may be separated by the differential or summing operation of the reproduced signals S1, S2, is that the reproduced signals S1, S2 have reverse polarities in the MO section 3002 as shown in FIG. 66(*a*), and on the other hand have the same polarity in the pre-formatted section 3003 as shown in FIG. 66(*b*). The MO binary coded signal 2511 and the ID binary coded signal 2512 are respectively converted into synchronous data 2513 synchronizing to a clock in the data synchronization section 2504, as shown in FIG. 21(*f*).

FIG. 22 will describe the waveforms shown in FIG. 21 in detail. For example, it is supposed that the marks 2811 (or 2809) and the non-marks 2812 (or 2810) are recorded by the protrusions and recessions 2808 (or MO signals) according to the modulated data 1310 (see FIG. 22(*a*)) produced based on the aforementioned modulation method shown in Table 1. These marks 2811 (or 2809) and non-marks 2812 (or 2810) are reproduced by irradiation of a laser spot 2701, and as shown in FIG. 22(*c*), the reproduced signal S1 or S2 is a signal which has a peak value at the center of each mark 2811 (or 2809).

The MO binary coded signal 2511 or the ID binary coded signal 2512 is a signal formed by detecting those peak positions, and its rising edges coincide with the respective peak positions (see FIG. 22(*d*)). At the PLL in the data synchronization section 2504, a synchronous clock is generated from the MO binary coded signal 2511 or the ID binary coded signal 2512, and the synchronous data 2513 are obtained through the synchronization with this clock. As shown in FIG. 22(*e*), the synchronous data 2513 are obtained by faithfully reproducing the modulated data 1310.

Figure 7:
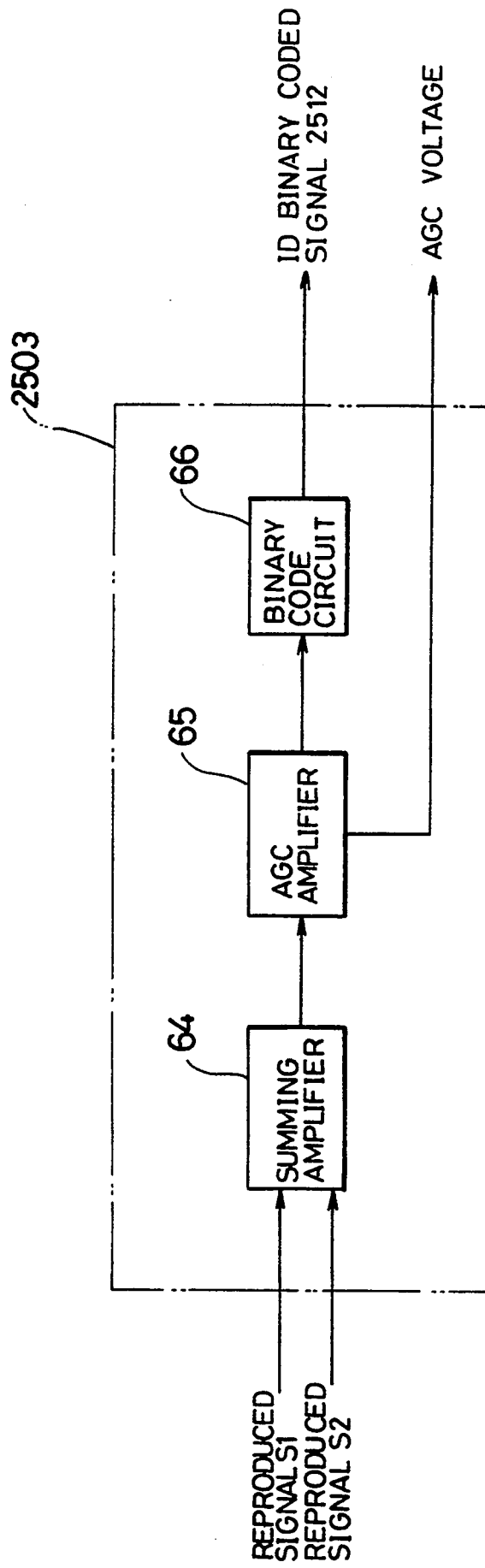
FIG. 7(a) is a block diagram showing a pre-format waveform processing section.
FIG. 7(b) is a block diagram showing an MO waveform processing section.
Figure 7:
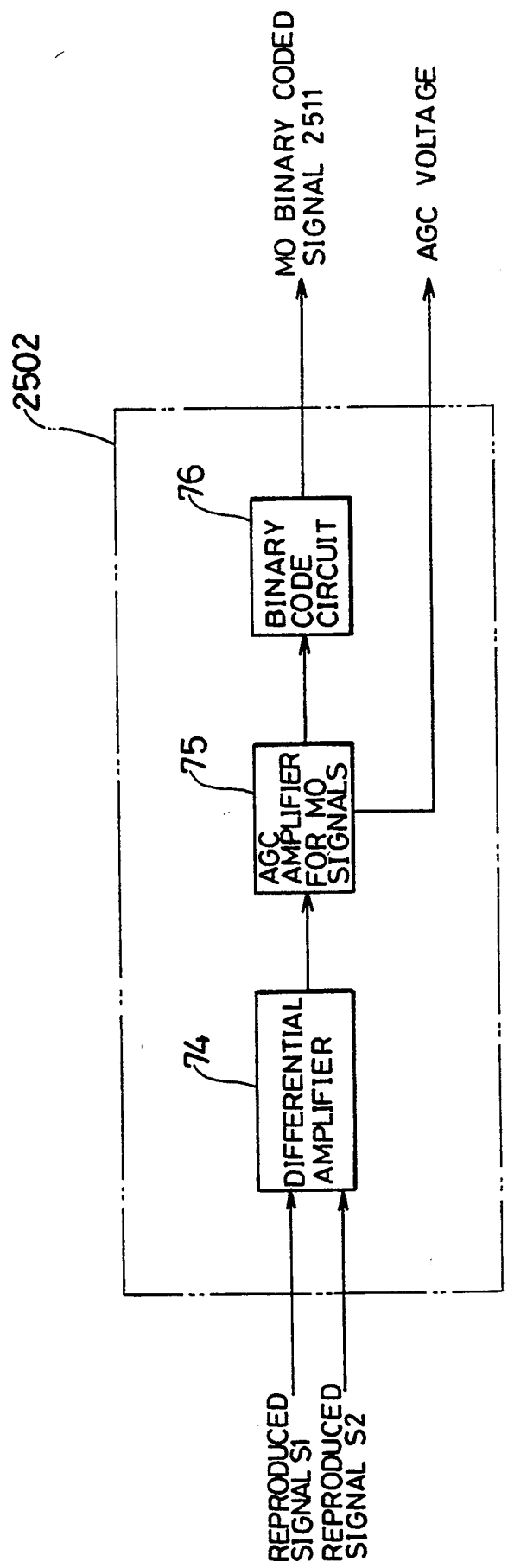

The following description will discuss a process for generating the above binary coded signals, referring to FIG. 7.

FIG. 7(*a*) shows main components of the pre-format waveform processing section 2503. The reproduced signals S1, S2 (see signals 1211 and 2510 of FIG. 20) are entered to a summing amplifier 64 in the pre-format waveform processing section 2503. Here, as aforementioned, only information for the pre-formatted section 3003 in the reproduced signals is separated by summing up the reproduced signals S1 and S2. The information for the pre-formatted section 3003 is entered to an AGC amplifier 65 for pre-formatted signal where it is amplified according to its amplitude, and then is binary coded in a binary code circuit 66 from which it is released as the aforementioned ID binary coded signal 2512.

Furthermore, FIG. 7(*b*) shows main components of the MO waveform processing section 2502. The reproduced signal S1, S2 (see signals 1211 and 2510 of FIG. 20) are entered to a differential amplifier 74 in the MO waveform processing section 2502. Here, as aforementioned, only the MO signal in the reproduced signals is separated by differentially amplifying S1 and S2. The MO signal is entered to an AGC amplifier 75 for MO signal where it is amplified according to its amplitude, and then is binary coded in a binary code circuit 76 from which it is released as the MO binary coded signal 2511.

According to the MO binary coded signal 2511, data recorded in the MO section 3002 are recognized. Additionally, an AGC voltage is released from the AGC amplifier 75 for MO signal to an A/D converter 49 in the controller 1208 (see FIG. 31).

Figure 4:
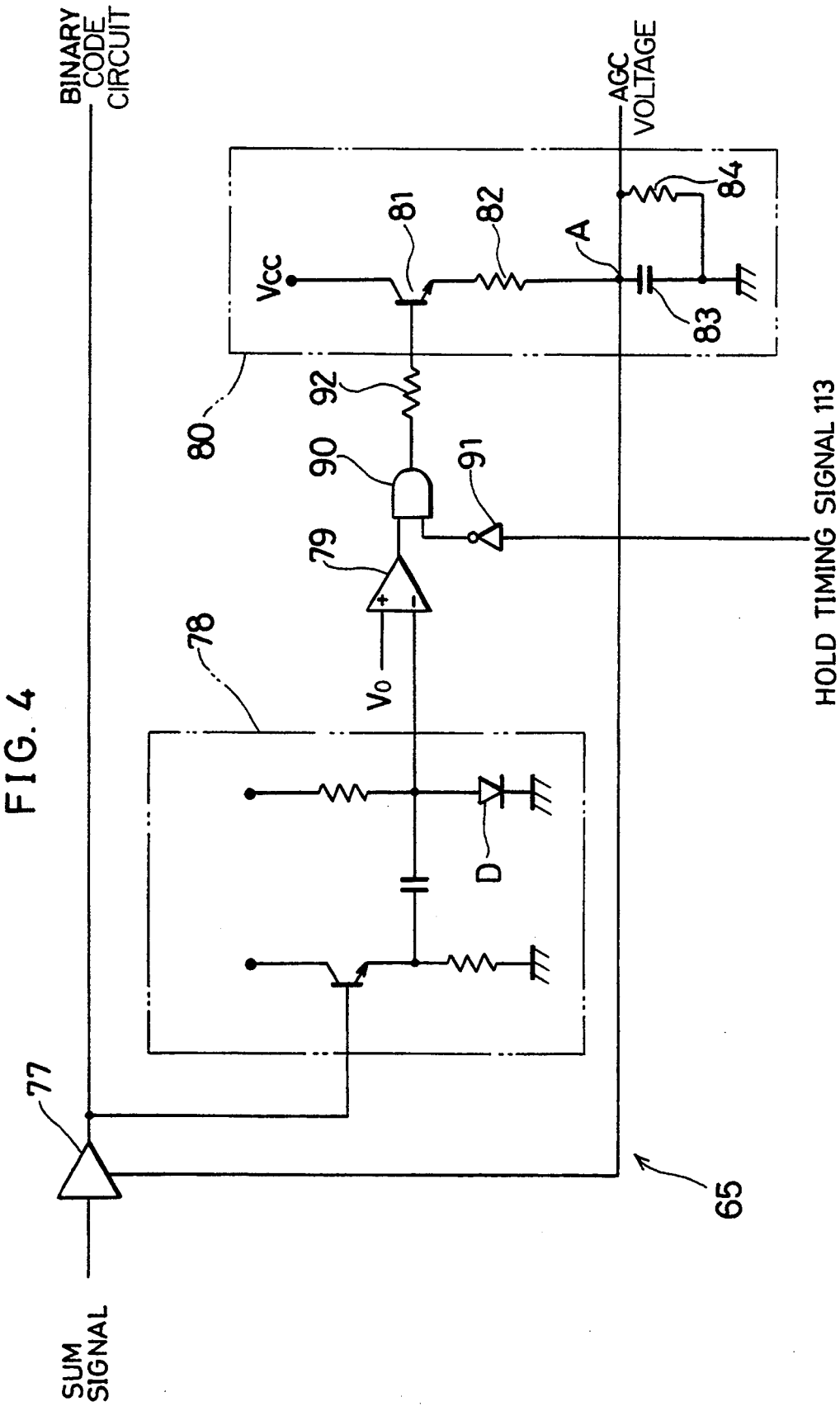
FIG. 4 is a circuit diagram showing the pre-format use AGC amplifier.

The following description will discuss the configuration of the AGC amplifier 65 for pre-formatted signal which functions as a first automatic gain control section in detail, referring to FIG. 4.

As shown in FIG. 4, the AGC amplifier 65 for pre-formatted signal comprises a clamping circuit 78, a comparator 79, an AGC voltage generation circuit 80 and a voltage control amplifier 77 (hereinafter called VCA) as an automatic gain control means, and a summing signal as the output signal of the summing amplifier 64 is entered to the VCA 77.

Figure 41:
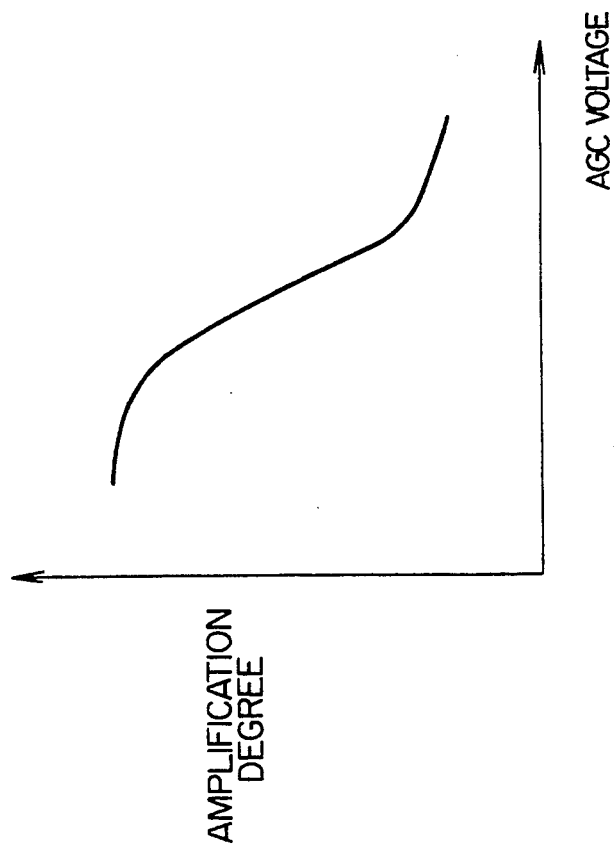
FIG. 41 is a graph showing the relation between the AGC voltage and the amplification degree.

The amplification degree of the VCA 77 varies with an AGC voltage which is an output of the AGC voltage generation circuit 80, and the amplification degree becomes smaller as the AGC voltage becomes greater, as is shown in FIG. 41.

An output of the VCA 77 is on the one hand sent to the binary code circuit 66 (see FIG. 7(*a*)), and on the other hand entered to the clamping circuit 78. In the clamping circuit 78, a dc component of the output signal of the VCA 77 is eliminated, and a positive output of all ac component (corresponding to peak-to-peak value) is clamped by a diode D in the clamping circuit 78 at a forward voltage drop value of the diode D, and on the other hand a negative output of the ac component is sent to an inverting input terminal of the comparator 79 disposed at the next stage without being clamped. In the comparator 79, an output voltage of the clamping circuit 78 is compared with a reference voltage $V_O$ being applied to a non-inverting input terminal thereof in their magnitude.

An output signal of the comparator 79 is entered to one terminal of an AND circuit 90 while to the other terminal of the AND circuit 90, is entered a hold timing signal 113 for pre-formatted section (which will be described later) through an inverter 91 as first control means. An output signal of the AND circuit 90 is entered to the AGC voltage generation circuit 80 through a resistor 92.

In the above arrangement, the following description will discuss the operation in the case where the hold timing signal 113 is kept low and the holding of the AGC voltage is not performed by the AGC amplifier 65.

Since an input signal to the AND circuit 90 from the inverter 91 is high, an output signal of the AND circuit 90 is decided depending on the input signal to the AND circuit 90 from the comparator 79.

When the output amplitude of the clamping circuit 78 is greater than that of the reference voltage $V_O$, the output signal of the comparator 79 becomes high. Accordingly, since the output of the AND circuit 90 also becomes high, a transistor 81 is switched on. Consequently, a capacitor 83 is charged by the power source $V_{CC}$ through a charge resistor 82, and the AGC voltage which is a voltage across the capacitor 83 becomes greater. In addition, a charge time constant is determined by the charge resistor 82 and the capacitor 83. The AGC voltage at a junction point A between the charge resistor 82 and the capacitor 83 is fed back to the VCA 77 as a control voltage for adjusting the amplification degree thereof. Following the electrical charge of the capacitor 83, the AGC voltage becomes greater, and the amplification degree of the VCA 77 becomes smaller, On the other hand, when the output amplitude of the clamping circuit 78 is smaller than that of the reference voltage $V_O$, the output signal of the comparator 79 as well as that of the AND circuit 90 becomes low. Accordingly, since the transistor 81 is switched off, the charge accumulated across the capacitor 83 is discharged through a discharge resistor 84. In addition, a discharge time constant is determined by the discharge resistor 84 and the capacitor 83. Following the electrical discharge of the capacitor 83, the AGC voltage becomes smaller, and the amplification degree of the VCA 77 becomes greater. In addition, the clamping circuit 78 may be composed of a full wave rectifying circuit.

The following description will discuss the operation of the AGC amplifier 65 for pre-formatted signal, wherein the AGC voltage is held. The holding operation of the AGC voltage in the AGC amplifier 65 for pre-formatted signal is only performed during a period when the optical head 1203 (see FIG. 9) is passing through the MO section 3002 of each sector 3004 in modes wherein the holding operation is necessary for recording, erasing, or other process, which will be described hereinbelow. While the optical head 1203 is passing through the pre-formatted section 3003 of each sector 3004, the holding operation of the AGC voltage is released even in recording, erasing or other process because it is necessary to reproduce address information or other information in the pre-formatted section 3003.

Accordingly, one holding period of the AGC voltage in the AGC amplifier 65 for pre-formatted signal is expressed by a period during which an MO section 3002 of one sector 3004 passes by. In the case where recording, erasing or other process is successively performed on a plurality of the sectors 3004, "on" period (release of holding) and the holding period of the AGC voltage are alternately repeated between the pre-formatted section 3003 and the MO section 3002 of each sector 3004.

In the AGC amplifier 65 for pre-formatted signal, in order to hold the AGC voltage, the hold timing signal 113 for pre-formatted signal is changed to the high level, and then the output signal of the inverter 91 is inverted from high to low. Following the process, if the output signal of the AND circuit 90 has been kept low until this moment (that is, the output signal of the comparator 79 is low), it is maintained low thereafter, and if the output signal of the AND circuit 90 has been kept high until this moment (that is, the output signal of the comparator 79 is high), it is inverted to low. Accordingly, if the transistor 81 has been in the "off" state until this moment, the "off" state is maintained thereafter, and if it has been ill the "on" state until this moment, the "on" state is switched to the "off" state.

Consequently, when the hold timing signal 113 for pre-formatted signal becomes high, the charge accumulated across the capacitor 83 is discharged thereafter. One holding period in the AGC amplifier 65 for pre-formatted signal is such a short period during which the optical head 1203 passes through an MO section 3002 in one of the sectors 3004 that by setting the discharge time constant determined by the capacitor 83 and the discharge resistor 84 large enough, the AGC voltage may be considered as being held substantially constant during the holding period. The reason is that the variation of the charge across the capacitor 83 during one holding period, that is, the variation of the AGC voltage is very small.

Figure 68:
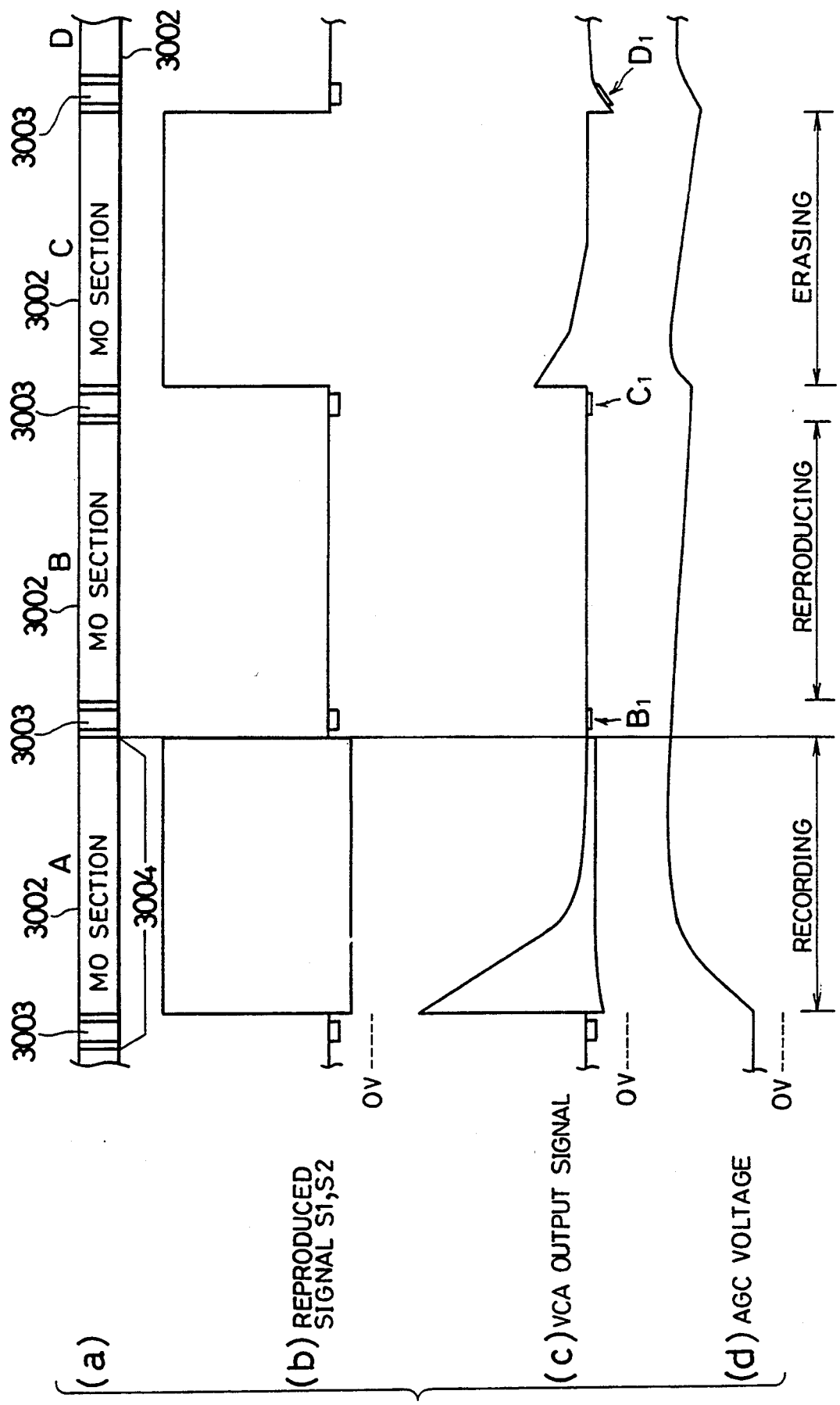
Figure 69:
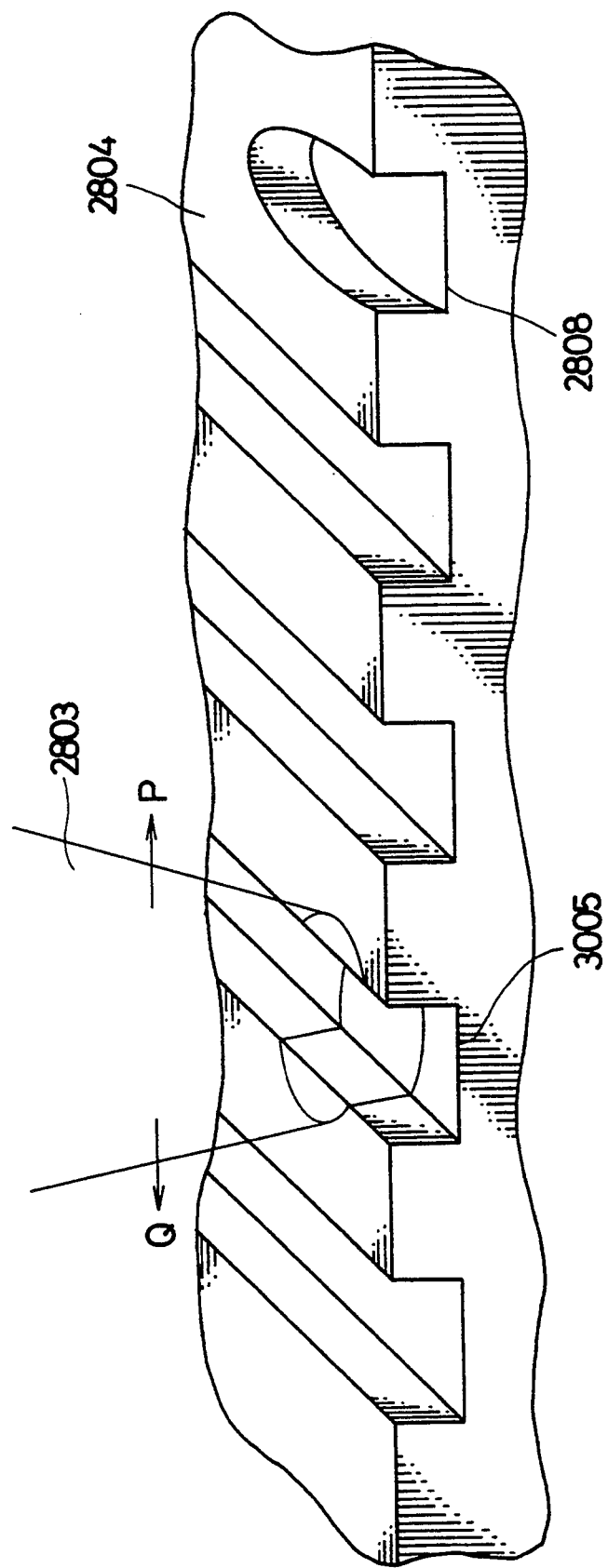
Figure 73:
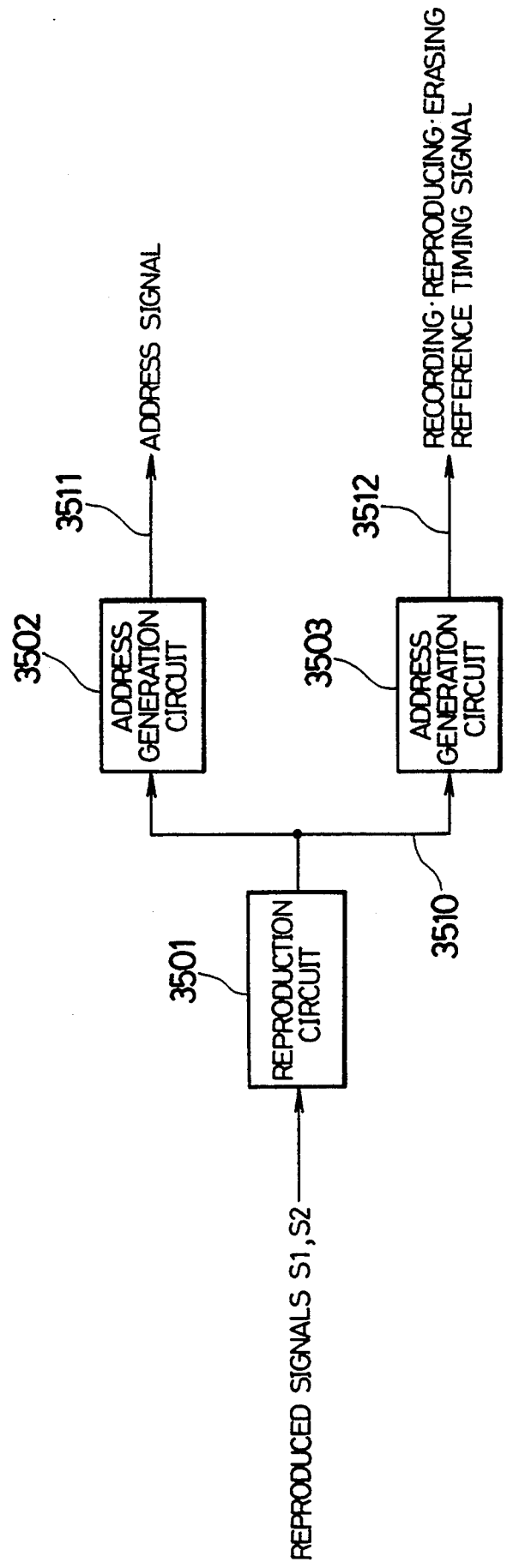
Figure 74:
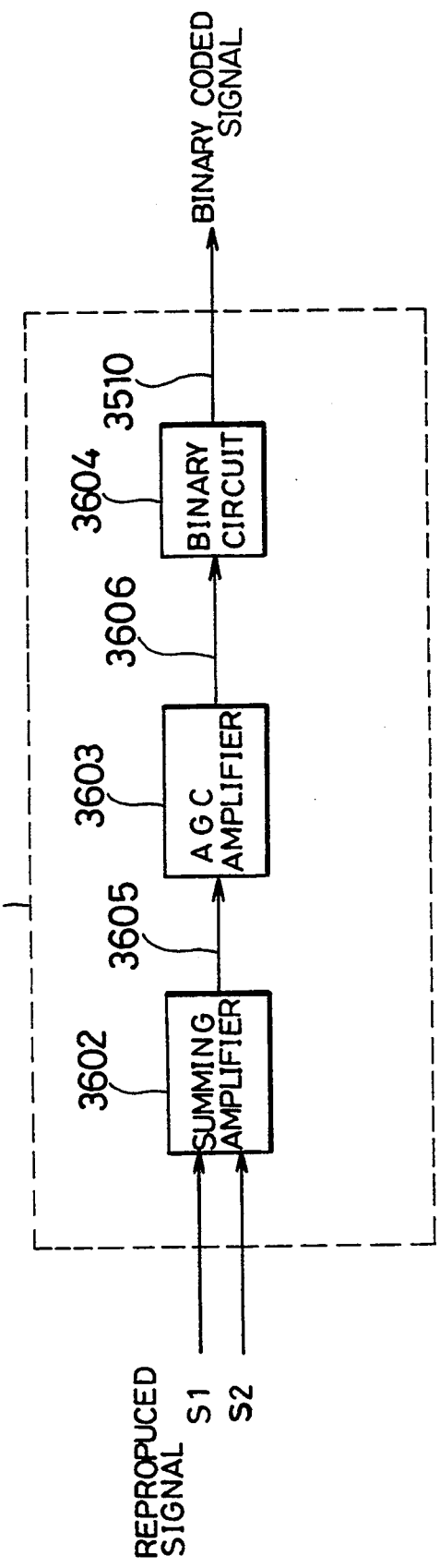

As aforementioned referring to FIGS. 68 to 70, it is in recording/erasing operation and in access operation that an accurate reproducing operation can not be achieved because of the fluctuation of the amplification degree of the AGC amplifier. For that reason, in the AGC amplifier 65 for pre-formatted signal, the AGC voltage is held in recording/erasing operation and in access operation (as aforementioned, the holding operation is limited to the period during which the optical head 1203 passes through the MO section 3002 of each sector 3004).

FIG. 2 shows a logical circuit for controlling the holding timing of the AGC voltage in the AGC amplifier 65 for pre-formatted signal.

The logical circuit is composed of an OR circuit 100 to which a recording/erasing timing signal 94 and an access timing signal 95 are entered. The recording/erasing timing signal 94 becomes high in recording or erasing operation, and is kept low in the other operations. The access timing signal 95 becomes high in access operation, and is kept low in the other operations. Accordingly, the hold timing signal 113 for pre-formatted signal obtained as an output signal of the OR circuit 100 becomes high ("1") in recording/erasing operation or in access operation, and is kept low ("0") in the other operations, as will be obvious by Table 2 hereinbelow.

Moreover, an AGC voltage detection timing signal 96 becomes high when the AGC voltage is detected in test writing operation, which will be described later, and is kept low in the other operations. In this arrangement, the AGC voltage detection timing signal 96, as it is, is employed as an AGC speed control signal 97 for pre-formatted section. The AGC speed control signal 97 for pre-formatted signal is a signal for switching a response speed of the AGC amplifier 65 for pre-formatted signal, for example, between two steps of high-speed and low-speed. As shown in Table 2, in detecting the AGC voltage, the AGC speed control signal 97 for pre-formatted signal becomes high ("1"), thereby making the response speed of the AGC amplifier 65 become high.

TABLE 2

| Input signals | | | Output signals | |
|---|---|---|---|---|
| AGC Vol. Detec. Timing Signal | Rec./ Eras. Timing Signal | Access Timing Signal | Hold Timing Signal | AGC Speed Timing Signal |
| 0 | — | — | — | 0 |
| 1 | — | — | — | 1 |
| — | 0 | 0 | 0 | — |
| — | 1 | x | 1 | — |
| — | x | 1 | 1 | — |

On the other hand, when the detection of the AGC voltage is not performed, the speed control signal 97 for pre-formatted signal falls to the low level ("0"), thereby making the response speed of the AGC amplifier 65 for pre-formatted signal become low. In addition, the symbols "x" of the Table 2 are irrelevant to "1" or "0".

The following description will discuss a circuit for switching the response speed of the AGC amplifier 65 for pre-formatted signal, for example, between two steps of high-speed and low-speed.

Figure 6:
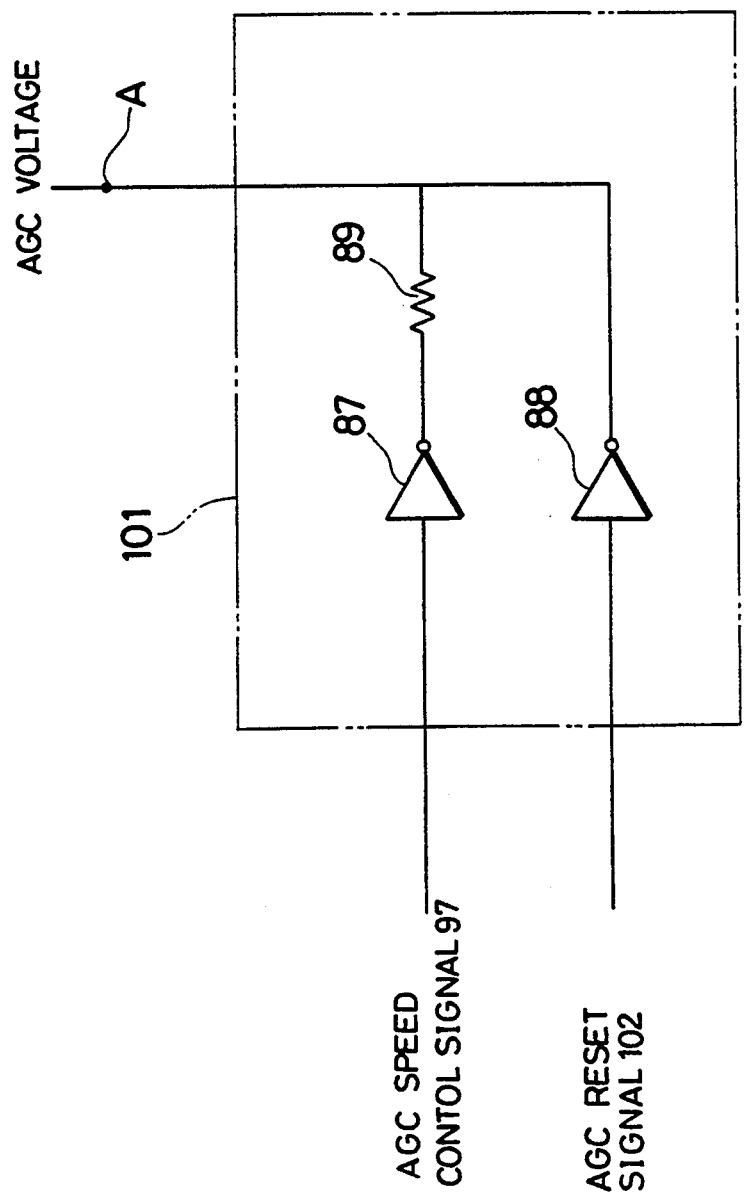
FIG. 6 is a circuit diagram showing a response speed change/reset circuit.

As shown in FIG. 6, this circuit, which functions as response speed changing means, is arranged as a response speed changing and resetting circuit 101 which also has a function for resetting the AGC voltage. More specifically, the response speed changing and resetting circuit 101 comprises a pair of open collectors 87, 88 and a discharge resistor 89. Additionally, an output of the open collector 88 is connected to the junction point A between the charge resistor 82 and the capacitor 83 in the AGC amplifier 65 for pre-formatted signal.

The AGC speed control signal 97 for pre-formatted signal is entered to the open collector 87, while an AGC reset signal 102 for pre-formatted section is entered to the open collector 88. The AGC speed control signal 97 for pre-formatted signal becomes high when the AGC voltage is detected. At this time, an output of the open collector 87 falls to the low level, thereby permitting the discharge resistor 89 to be connected to the discharge resistor 84 shown in FIG. 4 in parallel. As a result, time required for discharging the charge across the capacitor 83 may be shortened.

On the other hand, the AGC reset signal 102 for pre-formatted signal becomes high in starting the system or in the occurrence of emergency in the system. In that case, since the discharge resistor 84 is short-circuited, the discharge is completed momentarily.

The following description will discuss a more concrete example of the arrangement of the AGC amplifier 75 for MO signal as a second automatic gain control section.

Figure 5:
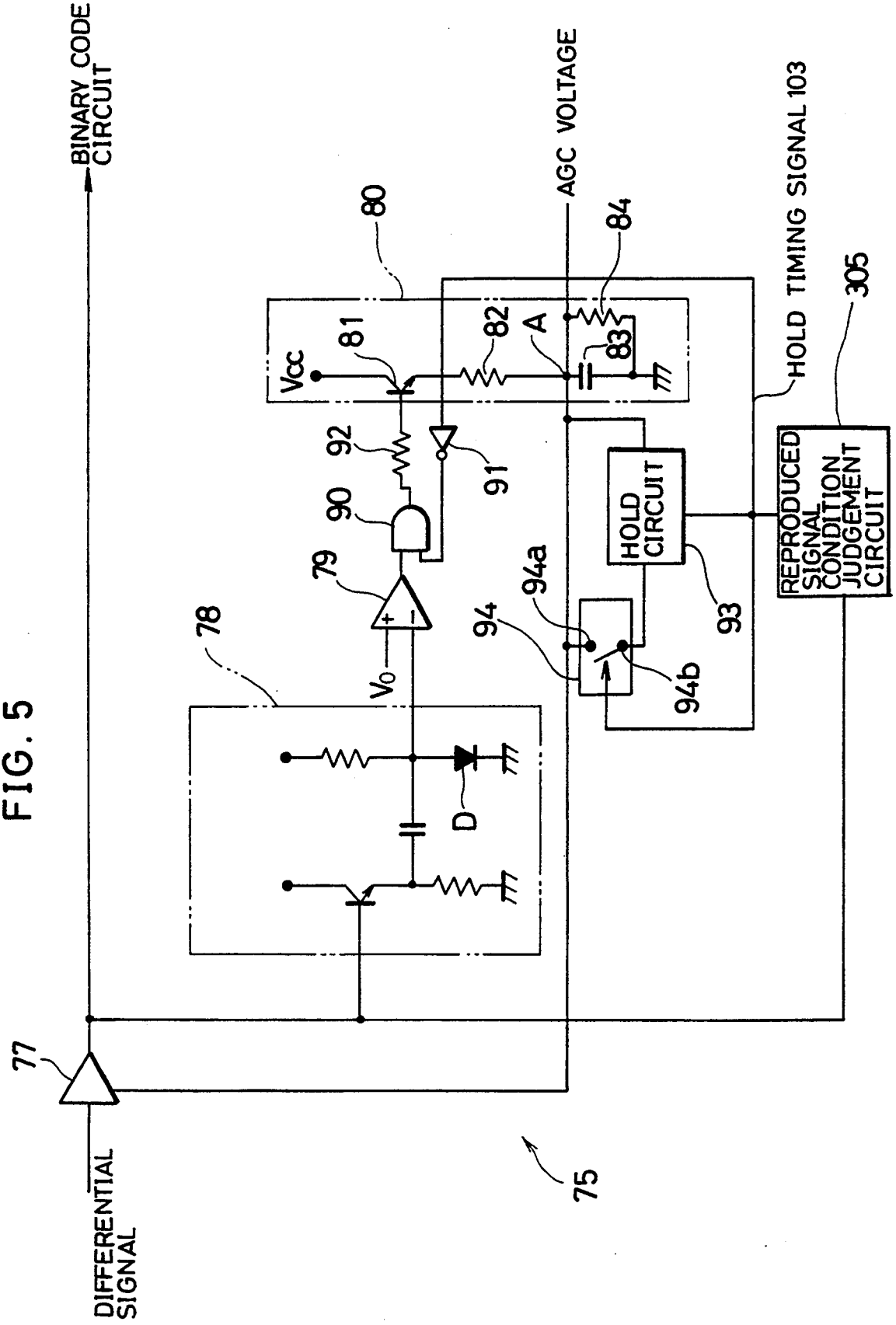
FIG. 5 is a circuit diagram showing the MO signal use AGC amplifier.

As shown in FIG. 5, the arrangement of the main components of the AGC amplifier 75 for MO signal is similar to that of the AGC amplifier 65 for pre-formatted signal except that a hold circuit 93, an analog switch 94 and a reproduced signal condition judgement circuit 305 are added thereto as its components. In addition, those of the members having the same functions as the AGC amplifier 65 are indicated by the same reference numerals and the detailed description thereof is omitted.

In the arrangement of the AGC amplifier 75 for MO signal, an AGC voltage generated in an AGC voltage generation circuit 80 is entered to the hold circuit 93 and a contact point 94a of the analog switch 94. The hold circuit 93, which functions as second control means and hold means, comprises, for example, an A/D converter and a D/A converter disposed at the next step thereof, and is arranged to sample the AGC voltage at predetermined timing and to hold the voltage value thereafter.

An output signal of the hold circuit 93 is entered to a contact point 94b of the analog switch 94. A hold timing signal 103 for MO signal released from the reproduced signal condition judgement circuit 305 which will be described later, is entered to the hold circuit 93 and the analog switch 94. When the hold timing signal 103 is low (i.e. holding operation of the AGC voltage is not performed in the AGC amplifier 75), the contact points 94a, 94b of the analog switch 94 are opened as shown in FIG. 5 and the AGC voltage, as it is, is fed back to a VCA 77. Additionally, in the case where the holding operation of the AGC voltage is not performed, operations of a clamping circuit 78 and all AGC voltage generation circuit 80 are the same as those of the clamping circuit 78 and the AGC voltage generation circuit 80 in the AGC amplifier 65 except that an input signal to the VCA 77 is a differential signal obtained from S1, S2.

On the other hand, as will be described later, ill the case where the holding operation of the AGC voltage is performed in recording/erasing process or other processes (i.e. the hold timing signal 103 for MO signal is high), the contact points 94a, 94b of the analog switch 94 are closed, and a constant AGC voltage after the holding operation is fed back to the VCA 77 (at this time, a potential of a capacitor 83 is kept constant), thereby maintaining the amplification degree of the VCA 77 at a constant value.

Additionally, in the AGC amplifier 75 for MO signal, the holding operation of the AGC voltage is applied to both of the pre-formatted section 3003 and the MO section 3002 of each sector 3004. Further, the same response speed changing and resetting circuit 101 as that in the AGC amplifier 65 is also provided in the AGC amplifier 75 for MO signal. Moreover, as the hold circuit 93, an analog sample hold circuit may be employed instead of the circuit including the A/D converter and the D/A converter. Furthermore, instead of the hold circuit 93, another system may be used, wherein the voltage is fixed at a constant value by the use of an analog switch. In that case, since the constant value of the voltage deviates more or less from an actual AGC voltage, it should be set so as to make the deviation as small as possible.

The AGC amplifier 75 for MO signal on the one hand holds the AGC voltage in recording/erasing operation and access operation just as the AGC amplifier 65 does, and on the other hand holds the AGC voltage also in all un-recorded area where no group of pulses for information is detected in reproducing the MO section 3002. The reason is described as follows: if the AGC amplifier 75 for MO signal is operated also in the un-recorded area, the amplification degree thereof rises to a substantial maximum level since the amplitude of the reproduced signal is in a substantial zero level ill the un-recorded area, and therefore an accurate reproducing operation may not be performed in the next recording area due to the excessive amplification degree.

On the other hand, since information such as address is always recorded in the pre-formatted section 3003, in the AGC amplifier 65 for signals in the pre-formatted section, control for holding or "on" (release of holding) operation of the AGC voltage according to detection of pulse groups (i.e. recorded areas) is not performed. Additionally, as to a circuit for detecting pulse groups, it will be described later.

A logical circuit for switching between the "holding" and "on" operations in the AGC amplifier 75 for MO signal, comprises a NOR circuit 104 and an OR circuit 105.

To the NOR circuit 104, are entered a pulse group detecting signal 106 and an AGC voltage detection timing signal 96. As will be described in detail later, the pulse group detecting signal 106 is a signal which is generated depending on the result of discrimination between recorded areas and un-recorded areas of the MO signals in the MO section 3002. The detecting signal 106, for example, becomes high if an instantaneous reproducing position is in a recorded area from which a group of pulses formed of MO signals is detected, and becomes low if it is in an un-recorded area from which no group of pulses are detected.

To the OR circuit 105, are entered an output signal from the NOR circuit 104, a recording/erasing timing signal 94 and an access timing signal 95, both described before. An output signal of the OR circuit 105 makes a hold timing signal 103 for MO signals. Further, also in this arrangement, an AGC voltage detection timing signal 96 directly makes an AGC speed control signal 107 for MO signals. In that case, in the combination with each of those input signals, the hold timing signal 105 and the AGC speed control signal 107 vary in the manner as shown in Table. 3. In other words, the hold timing signal 103 for MO signals becomes high when reproducing an un-recorded area without a group pulses in the MO (data) section 3002 in one of those recording, erasing, reproducing and access modes.

TABLE 3

| Input Signal | | | | Output Signal | |
|---|---|---|---|---|---|
| Pulse Group Detect. Signal | AGC Vol. Detect. Timing Signal | Rec./ Eras. Timing Signal | Access Timing Signal | Hold Timing Signal | AGC Speed Cont. Signal |
| 0 | 0 | 0 | 0 | 1 | 0 |
| 1 | 0 | 0 | 0 | 0 | 0 |
| x | 1 | 0 | 0 | 0 | 1 |
| x | x | 1 | x | 1 | x |
| x | x | x | 1 | 1 | x |

With the arrangement, the AGC amplifier 75 for MO signal is held at a value marked immediately before the start of a recording/erasing operation or other operation. Moreover, the hold timing signal 103 is also entered to an inverter 91 (see FIG. 5), and thus a charging operation to a capacitor 83 is not performed, thereby permitting the output of the hold circuit 93 to make an AGC voltage.

Figure 1:
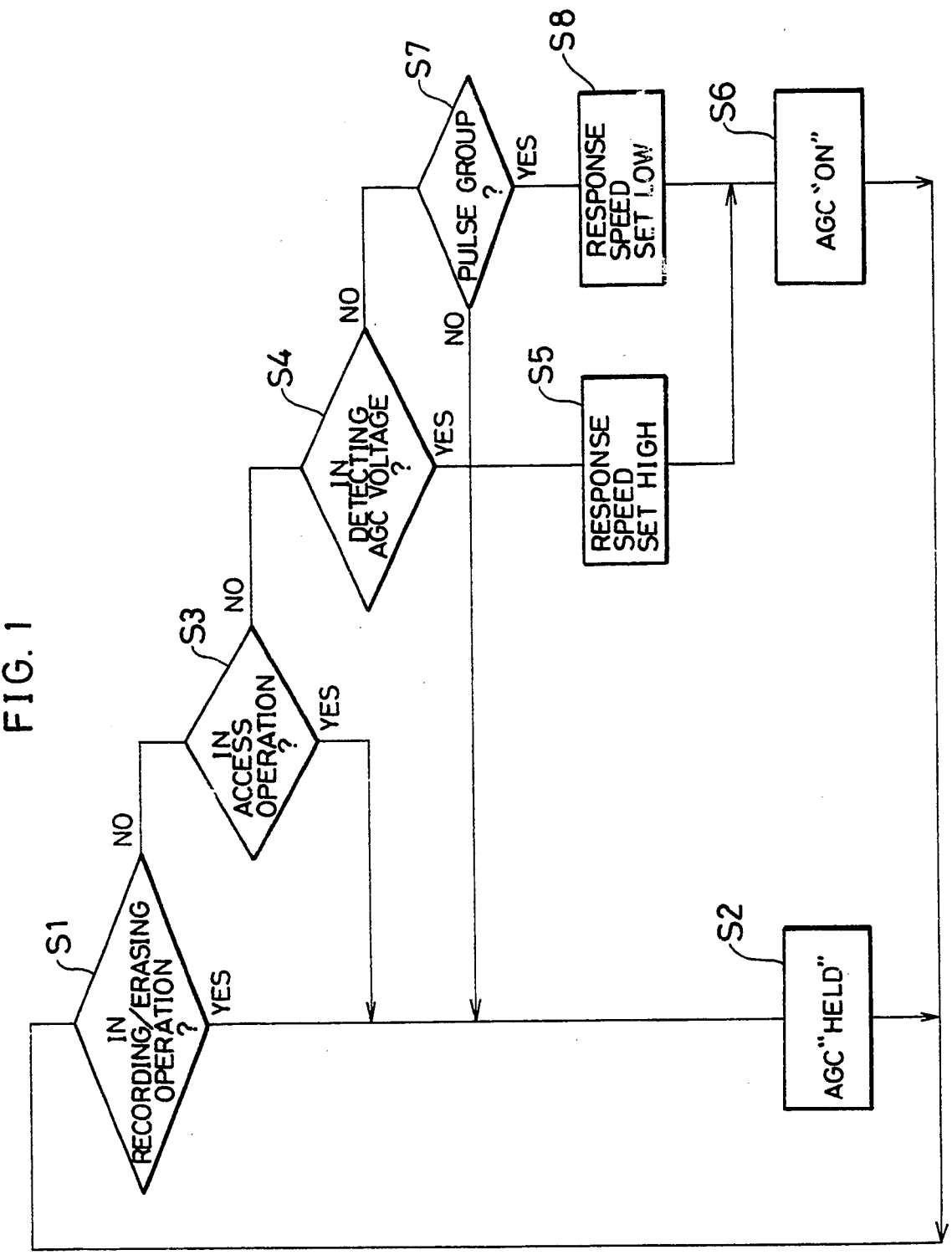
FIGS. 1 to 60 give detailed presentations of the present invention.

The following description will discuss control for switching the AGC voltage between the "holding" and "on" (release of holding) operations and that for switching the response speed in the case of adjusting the amplification degree according to the AGC voltage, in each of the AGC amplifiers 65, 75, referring to a flow chart in FIG. 1.

First, it is judged whether a relevant operation is a recording/erasing operation or not (S1), and if it is so, AGC voltages of both of the AGC amplifiers 65, 75 are held (S2).

On the other hand, when the relevant operation is not a recording/erasing operation at S1, it is Judged whether the relevant operation is an access operation or not (S3), and if it is so, AGC voltages of both of the AGC amplifiers 65, 75 are held (S2) also in this case.

When it is not an access operation, it is judged whether or not the relevant operation is a detecting operation of AGC voltage for test writing or the liken which will be described later (S4), and if it is so, after having set the response speed at a high speed (S5), the AGC voltages of both of the AGC amplifiers 65, 75 are switched "on" (S6).

On the other hand, when it is not a detecting operation of AGC voltage at S4, since only the remaining mode is a reproducing operation, it is judged that the reproducing operation for information recorded in the MO section 3002 is now performed. In that case, it is judged whether a group of pulses formed of MO signals is detected or not (S7), and if they are detected, since it is judged that a reproducing operation for a recorded area is now performed, after having set the response speed at a low speed (S8), the AGC voltages of both of the AGC amplifiers 65, 75 are switched "on", and adjusting of the amplification degree is performed according to an amplitude of a reproduced signal (S6).

On the other hand, when a group of pulses of MO signals is not detected at S7, since it is judged that a reproducing operation for an un-recorded area is now performed, only the AGC voltage of the AGC amplifier 75 for MO signal is held (S2).

Figure 8:
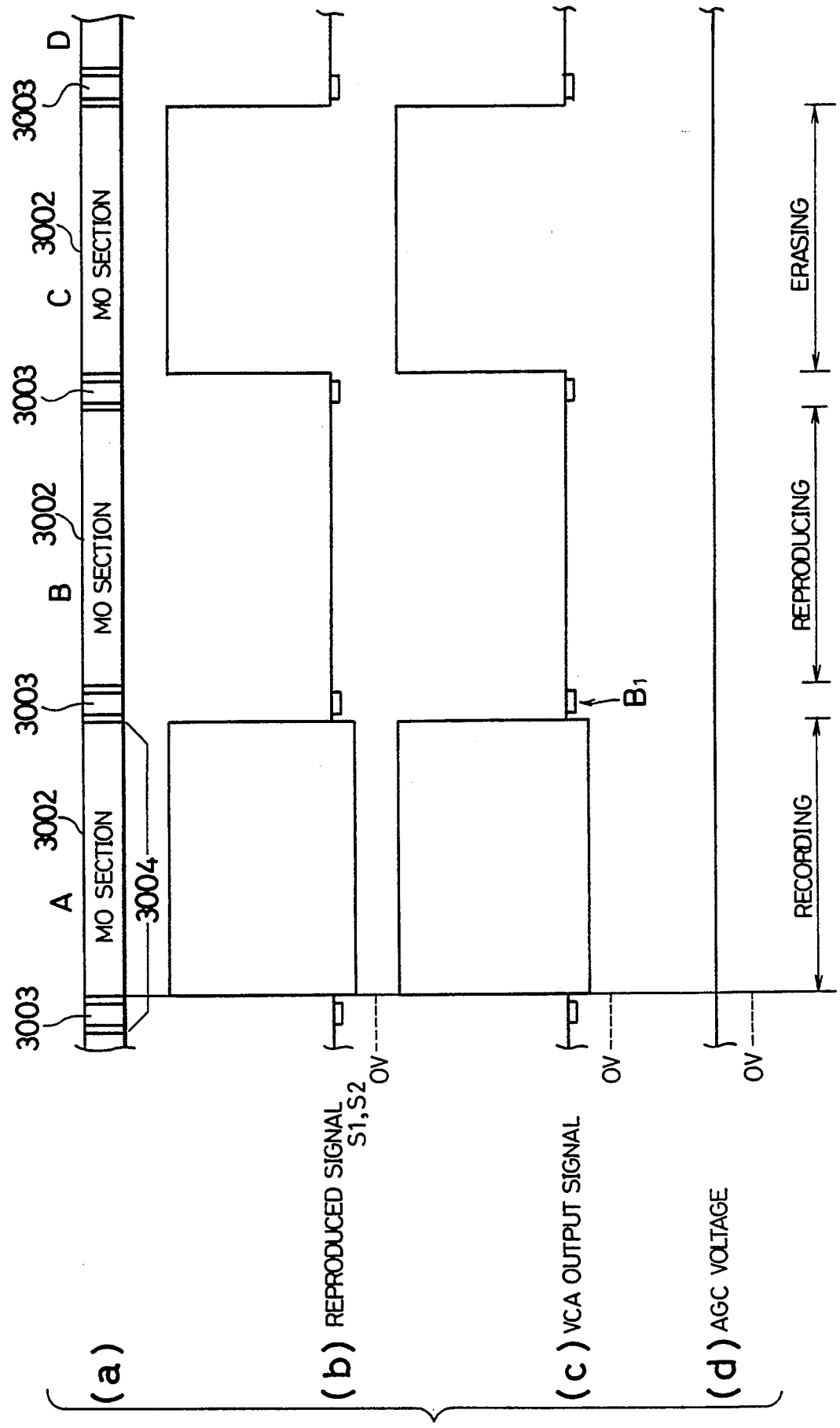
FIG. 8 is an explanatory view showing the relations of the reproduction signals, the VCA output signals, and AGC voltage.

In FIG. 8, it is supposed that a recording operation of MO signals on an MO section 3002 is performed in a sector 3004 shown by A (see FIG. 8($a$)); a reproducing operation of MO signals recorded in an MO section 3002 is performed in a sector 3004 shown by B; and an erasing operation of MO signals recorded in an MO section 3002 is performed in a sector 3004 shown by C.

In that case, in the MO section 3002 in the sector A, an amplitude of a reproduced signal S1 (S2) (see FIG. 8($b$)) becomes extremely great. In the present embodiment, the AGC voltages of both of the AGC amplifiers 65, 75 are held in the MO section 3002 in the sector A. Accordingly, compared with FIG. 68, in reproducing a pre-formatted section 3003 of the next sector B, since the AGC voltage (see FIG. 8($d$)) of the AGC amplifier 65 has been held at a value marked in the completion of the reproducing operation of the pre-formatted section 3003 in the sector A, the amplification degree of the AGC amplifier 65 becomes appropriate in reproducing signals in the pre-formatted section 3003 of the sector B, as shown by $B_1$ section in FIG. 8($c$). Therefore, the reproducing operation of signals in the pre-formatted section 3003 of the sector B is executed smoothly.

Similarly, in the sector C where the erasing operation is performed, since the AGC voltages of both of the AGC amplifiers 65, 75 are held in passing the MO section 3002, the reproducing operation of signals in the pre-formatted section 3003 of the next sector D is executed appropriately.

The following description will discuss another example of AGC amplifier 75 for MO signal with another arrangement for generating a hold timing signal for MO signals, which is employed for holding the AGC voltage in the AGC amplifier 75. In addition, those of the members having the same functions and described in the aforementioned AGC amplifier 75 are indicated by the same reference numerals and the description thereof is omitted.

In the arrangement, the reproduced signal condition judgement circuit 305 (reproduced signal condition judgement means) to which the output of the VCA 77 is entered, releases the hold timing signal 103 for MO signals to the hold circuit 93 and other circuits, as shown in FIG. 5. In the reproduced signal condition judgement circuit 305, for example, when a VFO (Variable Frequency Oscillator) mark, which will be described later, is detected in the MO section 3002 (i.e. when data are recorded in the MO section), the hold timing signal 103 for MO signals is set low, and therefore the holding operation of the AGC voltage is not performed. On the other hand, when a VFO mark is not detected, the hold timing signal 103 is set high, and therefore the AGC voltage is held. More specifically, in the AGC amplifier 75 for MO signal, the holding operation of the AGC voltage is applied to a section substantially corresponding to an un-recorded area of data, ranging from the detection of a VFO mark to the next detection of the succeeding VFO mark in the MO section 3002.

In the holding operation of the AGC voltage in the AGC amplifier 75, when the hold timing signal 103 is set high, the contact points 94$a$, 94$b$ of the analog switch 94 are closed, and a constant AGC voltage having been held in the hold circuit 93 is fed back to the VCA 77. Thus, the amplification degree of the VCA 77 is maintained constant until the next VFO mark is detected.

Next, a more concrete explanation will be made hereinbelow of the composition of the reproduced signal condition judgement circuit 305.

The reproduced signal condition Judgement circuit 305 judges whether or not there exist data formed of MO signals in the MO section 3002 on the magneto-optical disk 1201. More concretely, it is arranged to judge whether there exist data in the MO section 3002 or not by detecting the VFO marks, which for example, are recorded simultaneously with recording operation of data in the MO section 3002, and are erased simultaneously with erasing operation of data recorded therewith. In other words, if a VFO mark is detected in an MO section 3002, it is judged that there are data in the MO section 3002, and if it is not detected, it is judged that there are no data in the MO section 3002.

Those VFO marks are formed of a regular repetitive pattern such as (010010010 ... 0010, where the number of consecutive bits is 12 bytes), and are recorded with data so that the reproduction of the data are positively performed by permitting the PLL to be phase-locked with the VFO mark in the data synchronization section 2504 (see FIG. 20), even in the case where variation occurs on the rotation of the magneto-optical disk 1201 by the spindle motor 1202.

Figure 34:
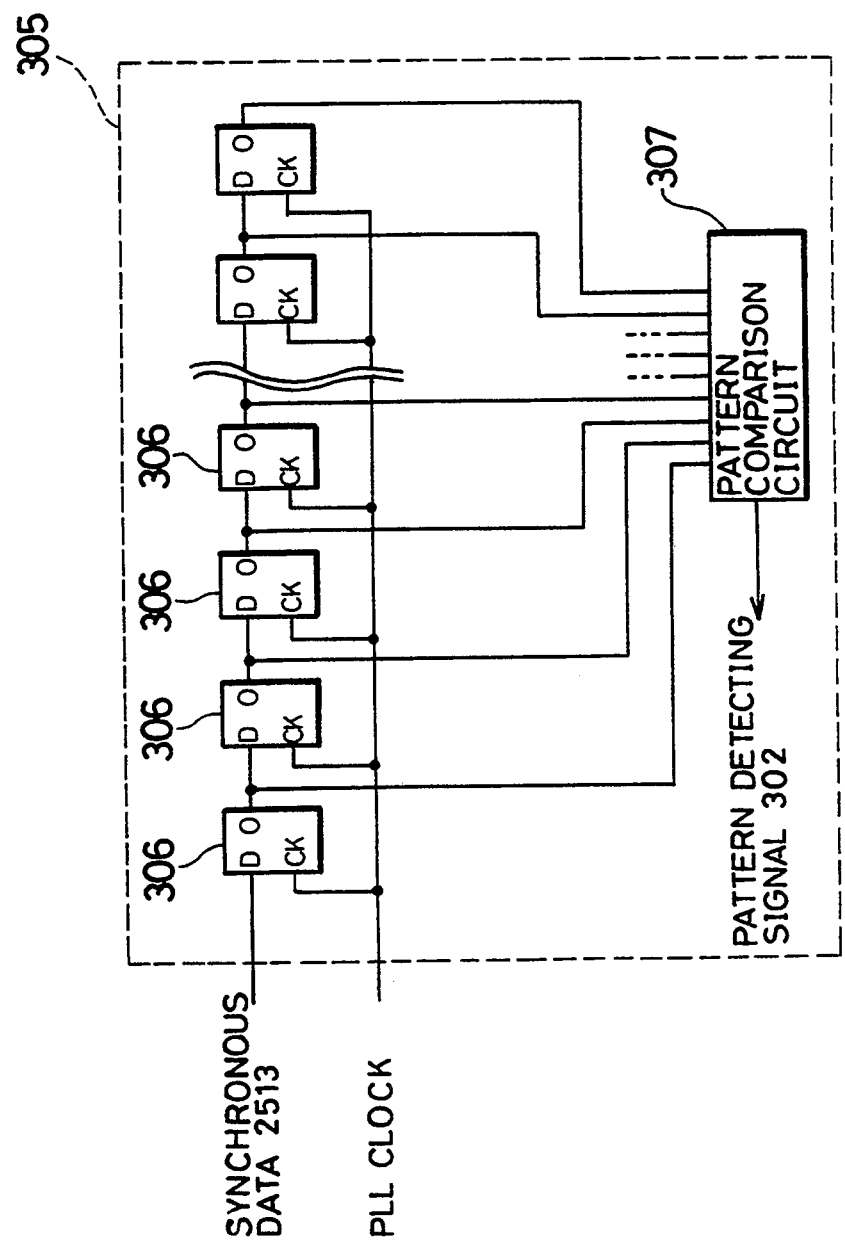
FIG. 34 is an explanatory view showing the internal structure of a reproduction signal condition judgement circuit.

FIG. 34 shows a concrete example of the reproduced signal condition Judgement circuit 305 in its operation for detecting un-recorded areas of data according to the VFO marks. The reproduced signal condition judgement circuit 305 comprises a shift register having a plurality of D-flip-flops 306 connected therein. To each of data input terminals D of the D-flip-flops 306 at the first step, is entered the synchronous data 2513 from the data synchronization section 2504 of FIG. 20, while to each of clock input terminals CK of D-flip-flops 306, is entered the clock generated in the PLL in the data synchronization section 2504 for generating the synchronous data 2513. Thus, every time the clock is entered, the synchronous data 2513 are shifted by one bit.

Thus, signals corresponding to a plurality of consecutive bits in the synchronous data 2513, released from respective output terminals O of the D-flip-flops 306 are compared with the pattern of the VFO mark in a pattern comparison circuit 307. When those signals coincide with the pattern of the VFO mark, a pattern detecting signal 302 as an output signal of the pattern comparison circuit 307 becomes high, under the recognition that the VFO mark has been detected.

Additionally, in the example disclosed above, since it is detected whether or not the VFO mark is recorded in the MO section 3002, the MO binary coded signal 2511 in the synchronous data 2513 are compared with the pattern of the VFO mark in the pattern comparison circuit 307.

Figure 35:
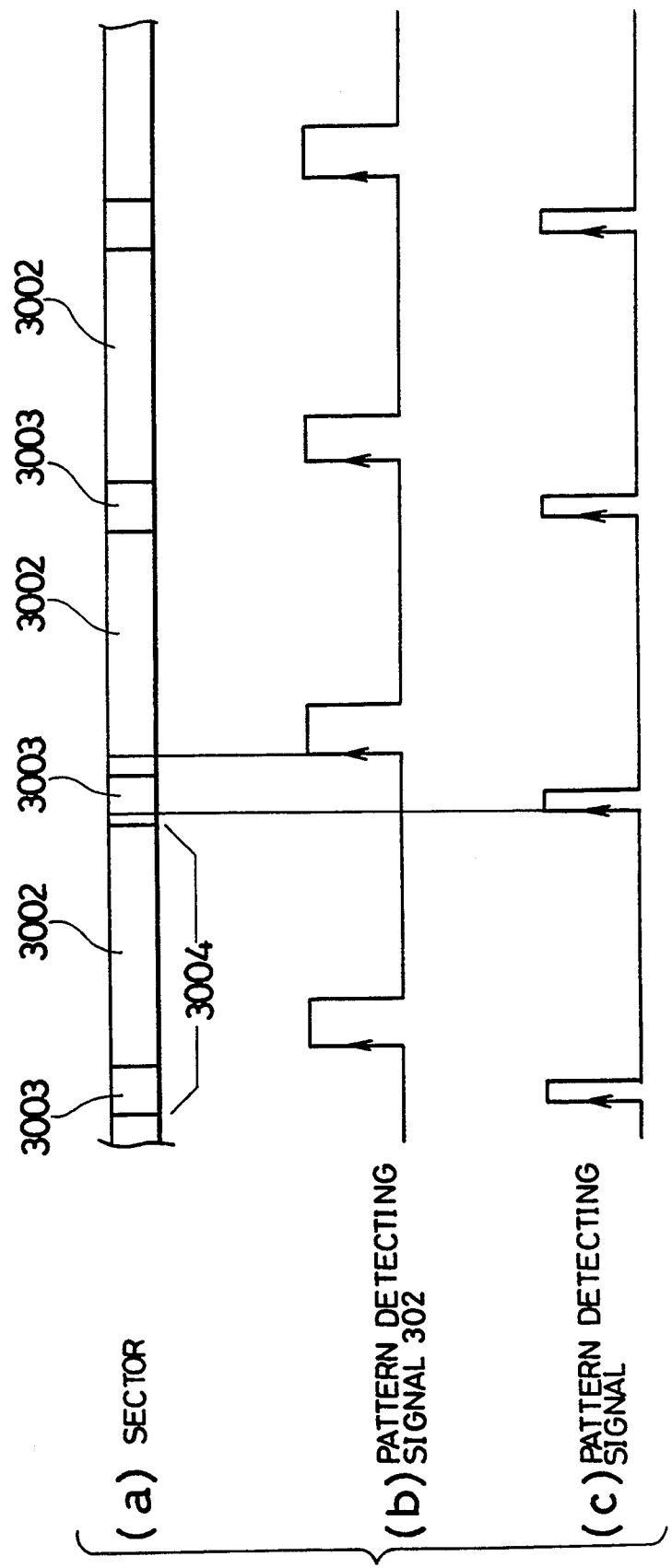
FIG. 35 is an explanatory view showing the waveform of the pattern detecting signals.

As aforementioned, when data are recorded in the MO section 3002 of each sector 3004, the pattern detecting signal 302 is set high upon receiving a position at which the VFO mark is recorded in each of the sectors 3004, as shown in FIG. 35(b). In addition, a signal formed by inverting the pattern detecting signal 302 makes the aforementioned hold timing signal 103.

Further, in the example disclosed above, the holding control of the AGC voltage by the use of the detection of the VFO mark or the like is only applied to the AGC amplifier 75 for MO signal. In order to apply similar control to the AGC amplifier 65 for signals in the pre-formatted section, switching control between "holding" and "on" operations of the AGC amplifier 65 may be provided, for example, by forming the VFO mark also in the pre-formatted section 3003 and by using a pattern detecting signal indicating that the VFO mark has been detected in the pre-formatted section 3003, as shown in FIG. 35(c).

Moreover, for example, in the case where data to be recorded in the MO section 3002 are modulated according to a regular modulation rule such as the aforementioned 2-7 modulation, in the reproduced signal condition judgement circuit 305, the judgement whether or not data have been recorded in the MO section 3002 is given by judging whether or not the data expressed as the MO binary coded signal 2511 in the synchronous data 2513 follow the modulation rule. When data reside in the MO section 3002, it is judged whether the data are normal data or formed of defect pulses.

Furthermore, in the case where along with data in the MO section 3002, synchronous signals, or either CRC's (Cyclic Redundancy Code) or additional marks for error detection are recorded, the judgement whether or not data have been recorded in the MO section 3002 may be given by judging whether or not those synchronous data, additional marks for error detection or the like exist, or whether or not the reproduced data contain errors.

The judgement of the reproduced signal conditions may be made by the combination of a plurality of the above detection methods of the data section.

Figure 33:
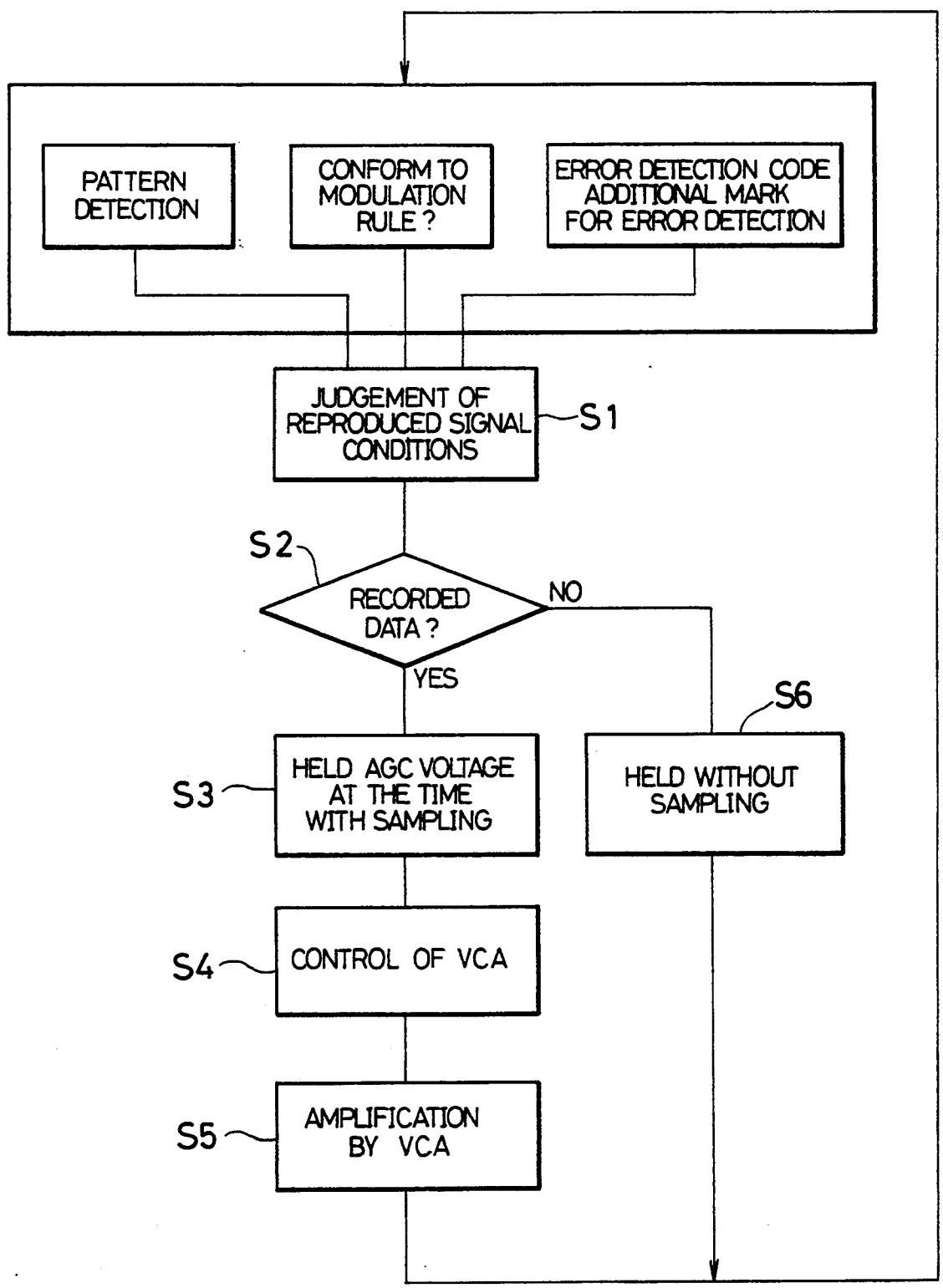
FIG. 33 is a flow chart showing the procedure for AGC voltage hold control of the MO signal use AGC amplifier.

The following description will discuss procedure of the holding control of the AGC voltage in the AGC amplifier 75 for MO signal referring to a flow chart in FIG. 33.

First, it is detected whether or not data have been recorded in an MO section 3002 through at least one of the following processes: a specific pattern of the VFO mark or the like is detected; it is detected whether a data train to be reproduced conforms to a regular modulation rule such as 2-7 modulation; and it is detected whether or not the reproduced data contain errors by the use of the CRC's or the additional marks for error detection (S1).

Next, based on the results of the above detecting process, it is judged whether or not data have been recorded in the MO section 3002 (S2), and if there are data recorded, an AGC voltage at this moment is sampled and held in the hold circuit 93 (S3). Then, an amplification degree of the VCA 77 is controlled in the AGC amplifier 75 for MO signal, according to the AGC voltage which has been held (S4), and amplification by the VCA 77 is performed at a constant amplification degree corresponding to the AGC voltage having been held (S5).

On the other hand, if there are no data recorded in the MO section 3002 at S2, without sampling the AGC voltage in the hold circuit 93, an AGC voltage which has been held at a recorded area of data located immediately before the relevant position is maintained as it is (S6).

Additionally, the above example shows a case where an AGC voltage is held as it is if data are not recorded; however, in addition to the arrangement, another processing may be employed, wherein interpolation or extrapolation is performed by data situated before or after the data by using a processor or the like.

Moreover, in the above example, it is disclosed that an analog operation of the AGC is performed by charge or discharge to or from the capacitor 83; however in addition to the arrangement, a so-called digital AGC operation may be performed, wherein the output of the A/D converter in the hold circuit 93 is entered to a processor, where a digital processing (by a filter or the like) is executed, and then the output data from the D/A converter are fed back to the VCA 77. In that case, the "holding" or "on" operation of the AGC is performed in digital process.

The following description will discuss a combined judgement process of the judgement of the reproduced signal conditions based on the VFO mark or the like and judgement of a recorded area of data by detection of a group of pulses.

As aforementioned, it is immediately after resetting the AGC voltage of the AGC amplifier 75 for MO signal or starting the magneto-optical recording and reproducing device itself that the AGC amplifier 75 for MO signal is apt to respond to defect pulses or the like. For that reason, in an example which will be disclosed hereinbelow, detection of recorded areas of data according to the VFO marks is performed only immediately after resetting the AGC voltage of the AGC amplifier 75 or starting the magneto-optical recording and reproducing device.

Thus, once the amplification degree of the AGC amplifier 75 for MO signal is set at an appropriate value by reproducing the detected data, the switching control between the "holding" and "on" (release of holding) operations of the AGC voltage is performed by detecting a group of pulses.

Additionally, since the judgement of the reproduced signal condition according to the detection of the VFO mark or the like is performed in the same manner as the aforementioned example, the description thereof is omitted, and the following description will discuss a concrete example of a pulse group detection circuit.

Figure 37:
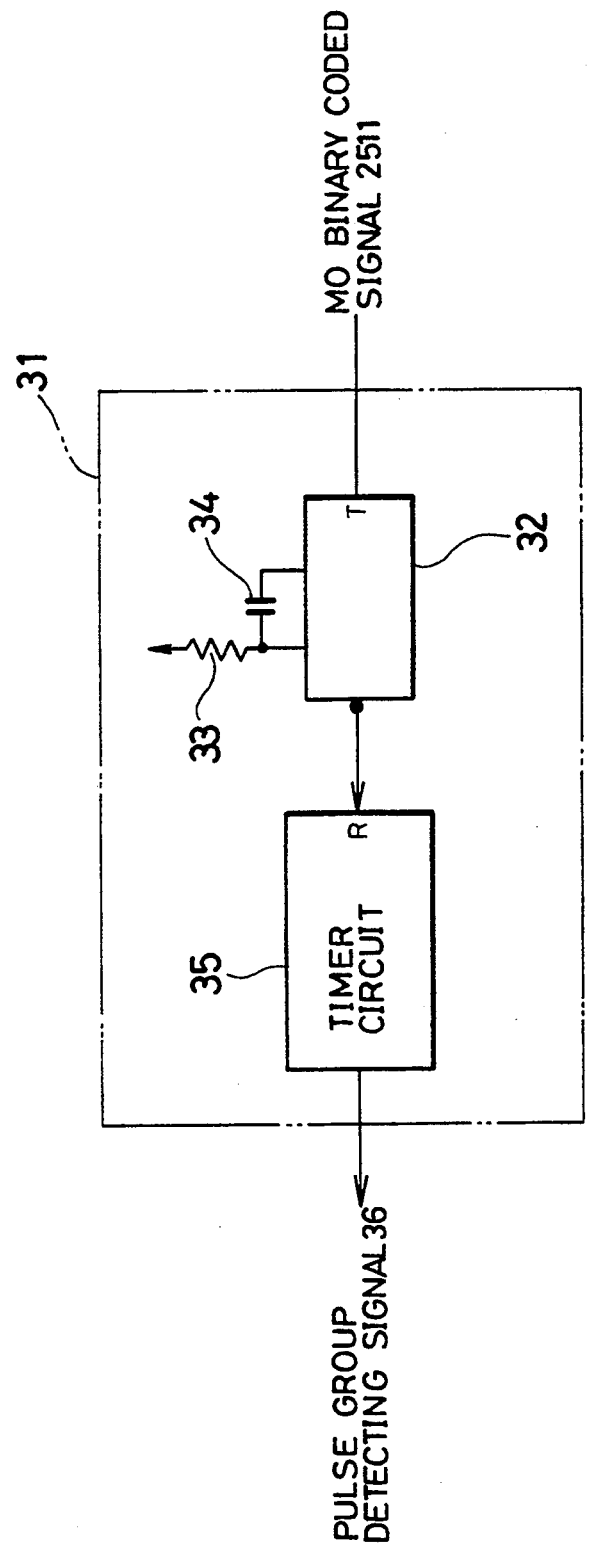
FIG. 37 is an explanatory view showing a pulse group detection circuit.

As shown in FIG. 37, the pulse group detection circuit 31 (recorded area judgement means) comprises a one shot multivibrator 32, and to a trigger input terminal T of the one shot multivibrator 32, is entered the MO binary coded signal 2511 (or the MO binary coded signal 2511 in the synchronous data 2513 synchronized in the data synchronization section 2504 shown in FIG. 20). The MO binary coded signal 2511 is the output signal of the binary code circuit 76 (see FIG. 7(b)) which permits MO signals, which are amplified in the AGC amplifier 75, to become binary signals.

Upon receiving a trigger signal (when a signal of one bit "1" exists in the MO binary coded signal 2511), the one shot multivibrator 32 releases a pulse signal of negative logic with a time interval of time constant $T_1$ determined by a resistor 33 and a capacitor 34, and enters the pulse signal to a reset input terminal R of a timer circuit 35. Further, the one shot multivibrator 32 is a so-called re-triggerable one shot multivibrator which is arranged such that when the next trigger signal is entered thereto within the time $T_1$, its output signal is maintained low until another period of time $T_1$ elapses.

The timer circuit 35 releases a signal set high when the signal entered to the reset input terminal R thereof has been maintained low during a period of time $T_2$, and simultaneously as the signal entered to the reset input terminal R thereof turns high, returns its output signal low. The output signal of the timer circuit 35 makes a pulse group detecting signal 36.

Figure 38:
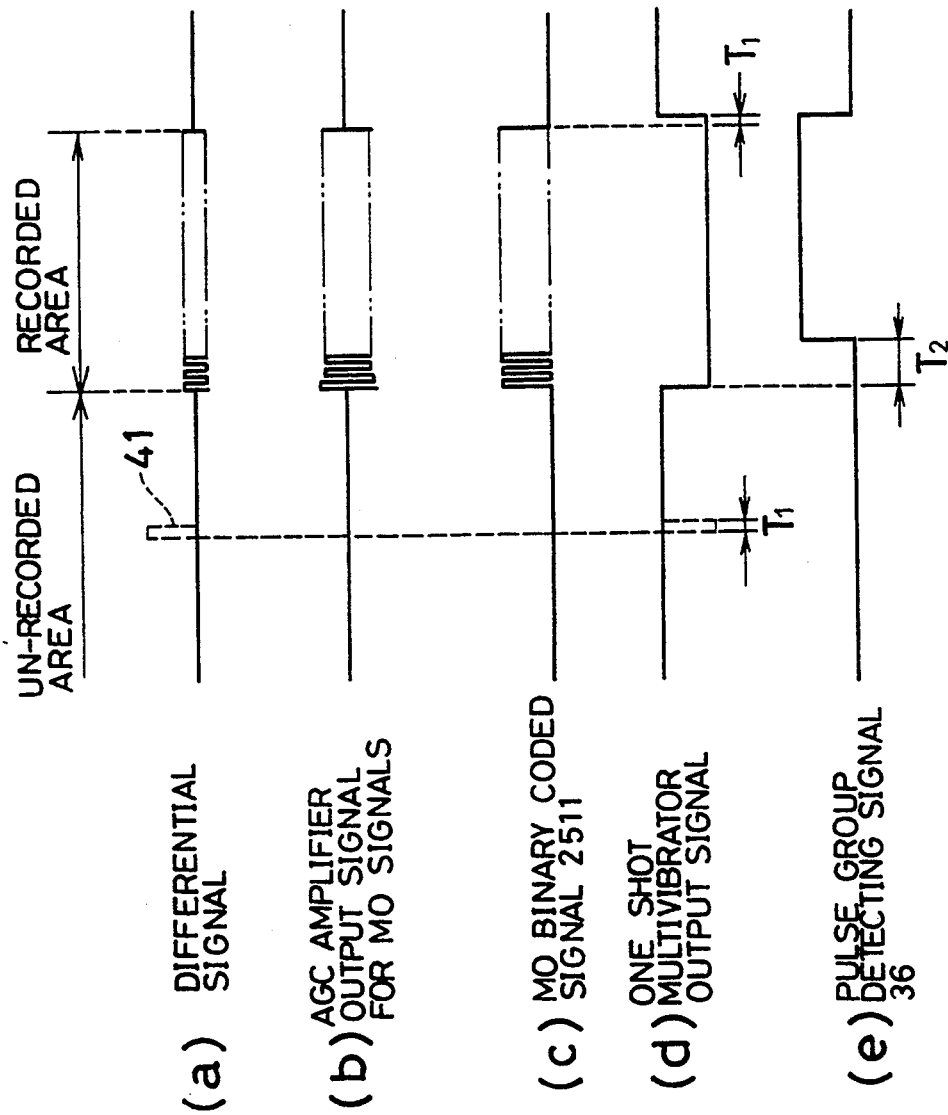
FIG. 38 is an explanatory view showing the waveforms for each part of the pulse group detection circuit.

The following description will discuss the operation of the pulse group detection circuit 31 referring to FIG. 38.

While a reproducing operation is performed on an un-recorded area with no data recorded therein of the MO section 3002, for example as shown in FIG. 38(a), a differential signal entered to the AGC amplifier 75 for MO signal contains no pulse signals. Accordingly, as shown in FIG. 38(b), an output signal which has been amplified in the AGC amplifier 75 and released therefrom is set low.

Thus, when the output signal of the AGC amplifier 75 for MO signal is converted into a binary coded signal by the binary code circuit 76, the MO binary coded signal 511 (see FIG. 38(c)) as the output signal of the binary code circuit 76 is constantly set low.

At this time, as shown in FIG. 38(d), the output signal of the one shot multivibrator 32 is maintained high while the pulse group detecting signal 36 as the output signal of the timer circuit 35 is still maintained low.

Additionally, when a defect pulse 41 is generated in the differential signal in the un-recorded area of data as shown by a broken line, the output signal of the one shot multivibrator 32 is set low only during the period of time $T_1$. If the generation of the defect pulse 41 further continues, the output signal of the one shot multivibrator 32 is continuously kept low.

However, as aforementioned, the pulse group detecting signal 36 as the output signal of the timer circuit 35 is not turned high until the output signal of the one shot multivibrator 32 has been kept low for not less than the time $T_2$. Since the time $T_2$ is predeterminately set to become substantially longer than the period of time during which the output signal of the one shot multivibrator 32 is kept low due to an ordinary defect pulse 41, there is little danger that the pulse group detecting signal 36 is set high because of the defect pulse 41.

Next, when the relevant reproducing position comes to a recorded area with data recorded therein of tile MO section 3002, the differential signal containing a group of pulses is entered to the AGC amplifier 75 for MO signal. The AGC amplifier 75 for MO signal amplifies the differential signal to release therefrom. The output signal of the AGC amplifier 75 is converted into a binary coded signal by the binary code circuit 76, and the MO binary coded signal 2511 therefrom is entered to the one shot multivibrator 32.

The output of the one shot multivibrator 32 turns low when the signal entered thereto from the binary code circuit 76 has a first rising pulse. Moreover, when one or more pulses from the binary code circuit 76 are successively entered thereto within the time $T_1$, the output of the one shot multivibrator 32 is continuously maintained low until the time $T_1$ has passed since a last rising pulse entered thereto.

Thus, the timer circuit 35 makes the pulse group detecting signal 36 high after the time $T_2$ has passed since the output of the multivibrator 32 became low, i.e. since the first rising pulse of a group of pulses contained in the reproduced signal was entered thereto. Further, simultaneously as the output of the one shot multivibrator 32 returns high, the timer circuit 35 makes the pulse group detecting signal 36 low.

Figure 39:
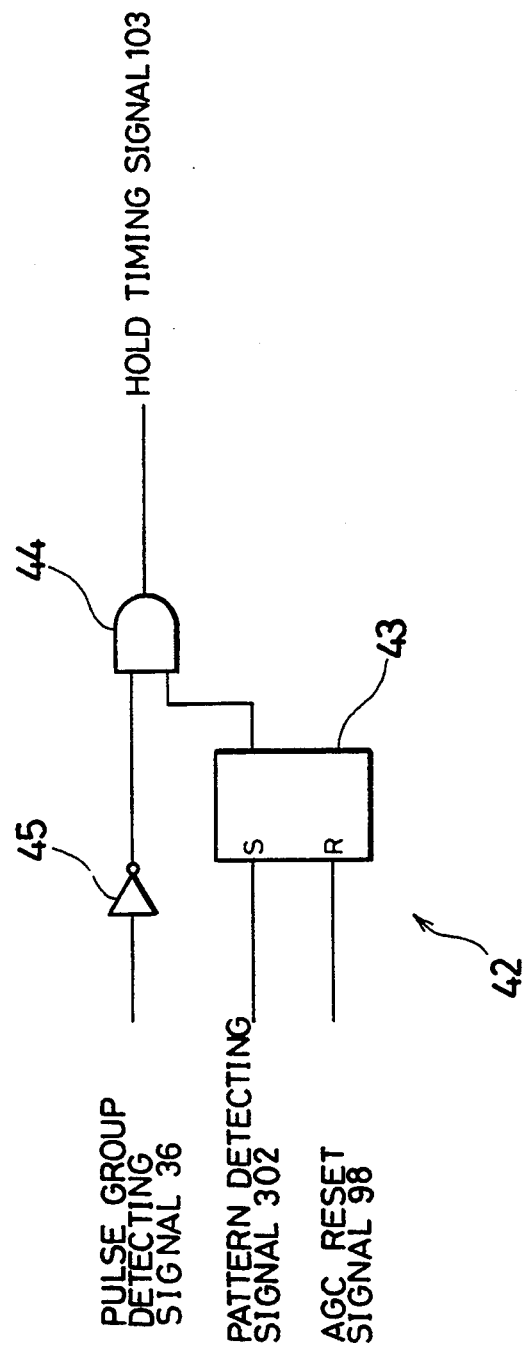
FIG. 39 is a circuit diagram showing a hold timing generation circuit.

In the above example, the hold timing signal 103 is generated in a circuit shown in FIG. 39, which signal 103 provides the "holding" or "on" (release of holding) operation of the AGC voltage of the AGC amplifier 75 for MO signal according to the pulse group detecting signal 36 and the aforementioned pattern detecting signal 302.

More specifically, the hold timing generation circuit 42 comprises an RS flip-flop 43, an AND circuit 44 and an inverter circuit 45. To a set input terminal S of the RS flip-flop 43, is entered the pattern detecting signal 302 (see FIG. 34) which is, for example, set high at the detection of VFO mark, while the aforementioned AGC reset signal 98 is entered to the reset input terminal R. The AGC reset signal 98 is a signal which turns high at the reset of the AGC voltage in the AGC amplifier 75 for MO signal.

An output signal of the RS flip-flop 43 is entered to one of input terminals of the AND circuit 44, and the pulse group detecting signal 36 is entered to the other input terminal of the AND circuit 44 through the inverter circuit 45. Thus, an output signal of the AND circuit 44 makes the hold timing signal 103.

In the hold timing generation circuit 42, the AGC reset signal 98 turns high at the reset of the AGC voltage in the AGC amplifier 75 for MO signal, and therefore an output signal of the RS flip-flop 43 is set low. Similarly, the output signal of the RS flip-flop 43 turns low at the start of the magneto-optical recording and reproducing device. Moreover, at the reset of the AGC voltage or at the start of the magneto-optical recording and reproducing device, the hold timing signal 103 turns low regardless of the level of the pulse group detecting signal 36. Accordingly, the holding operation of the AGC voltage in the AGC amplifier 75 is not performed. As a result, if the AGC amplifier 75 for MO signal should respond to the defect pulse 41 at the reset of the AGC voltage or at the start of the magneto-optical recording and reproducing device, wherein it is apt to respond to the defect pulse 41, an extremely low amplification degree at this time would not be held.

Next, after the reset of the AGC voltage or the start of the magneto-optical recording and reproducing device, data formed of MO signals are detected by detecting VFO marks and by other processes. When the pattern detecting signal 302 turns high, the output signal of the RS flip-flop 43 turns high in response to the change. When the output signal of the RS flip-flop 43 turns high, from this time on, the hold timing signal 103 has its level inverted according to tile pulse group detecting signal 36.

More specifically, as is obvious by a comparison between FIG. 71 and FIG. 72, ill the recorded area of data with a group of pulses to be detected (where the pulse group detecting signal 36 is high), the hold timing signal 103 is set low, and therefore the holding operation of the AGC voltage is not performed. On the other hand, ill tile un-recorded area of data without a group of pulses (where the pulse group detecting signal 36 is low), the hold timing signal 103 is set high. Accordingly, the AGC voltage of the AGC amplifier 75 for MO signal is held at a value marked at the end of the recorded area just before the relevant position, and the amplification degree is maintained constant until the next recorded area. Additionally, once the AGC amplifier 75 responds to regular data recorded in the MO section 3002, the amplification degree is kept appropriate. Thereafter, only by switching between the "holding" and "on" operations of the AGC voltage according to only the detection of the group of pulses, the data in the MO section 3002 may be properly reproduced.

Figure 36:
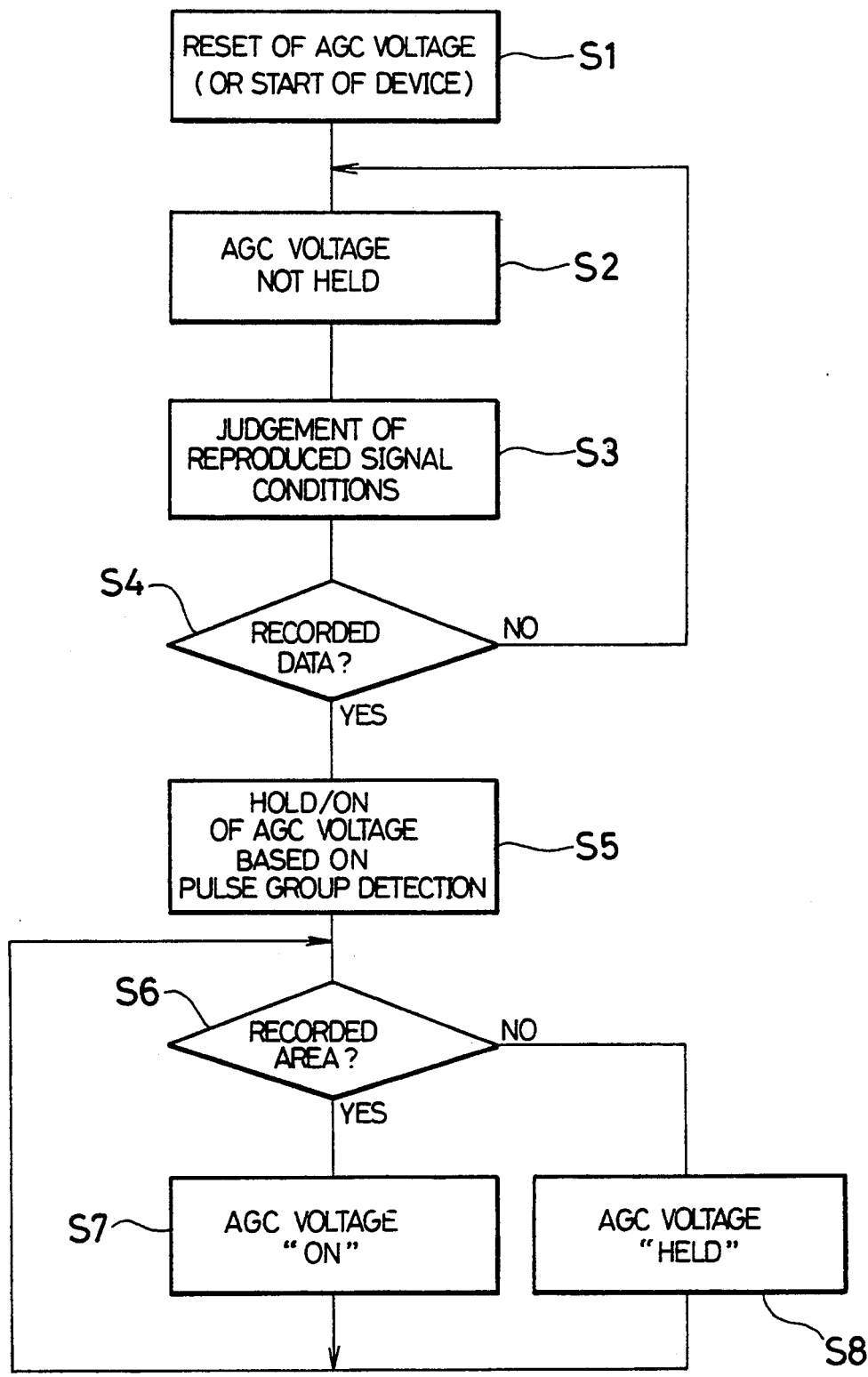
FIG. 36 is a flow chart showing the procedure for AGC voltage hold control of the MO signal use AGC amplifier.

The following description will discuss holding control of the AGC voltage referring to a flow chart in FIG. 36.

If it is at the reset of the AGC amplifier 75 for MO signal (or at the start of the magneto-optical recording and reproducing device) (S1), the holding operation of the AGC voltage is not performed (S2), and detection of reproduced signal conditions is performed by the detection of VFO marks and by other processes (S3).

Then, it is judged whether MO signals to be reproduced conform to recorded data or not (S4), and if they do not conform to the recorded data, the sequence returns to S2 and a state without the holding operation of the AGC voltage applied thereto is maintained. On the other hand, if they conform to the recorded data, from this time on, the switching control between the "holding" and "on" (release of holding) operations of the AGC voltage is performed according to the detection of the group of pulses (S5). More concretely, it is judged whether the relevant position is in a recorded area or not according to the detection of the group of pulses (S6), and if it is in a recorded area, the AGC voltage of the AGC amplifier 75 for MO signal is turned on, and the amplification is performed according to the amplitude of the recorded data (S7). If it is not in a recorded area, the AGC voltage is held, and an amplification degree marked at the end of the recorded area situated just before the relevant position is maintained (S8).

Additionally, in the above example, the arrangement is made so that the judgement whether there are data recorded or not by the use of VFO marks etc. or by the use of detection of pulse groups is given only on the MO section 3002 in each sector 3004. Besides the arrangement, for example, similar judgement may be given on the pre-formatted section 3003, and according to the results of the judgement, switching control between the "holding" and "on" operations of the AGC voltage may be provided with respect to the AGC amplifier 65 for signals in pre-formatted section.

Moreover, in the example shown in FIG. 36, the arrangement is made so that the judgement of reproducing conditions is given only once; however, besides arrangement, by making a plurality of judgements, reliability is further increased.

Furthermore, in the above example, by summing two reproduced signals S1 and S2 or by differentially amplifying them, data in the pre-formatted section 3003 or in the MO section 3002 are obtained; however, the present invention is not limited to this arrangement.

Moreover, in the above example, the description discussed a case where the tracks 1205 on the magneto-optical disk 1201 are divided into a plurality of sectors 3004, each including the pre-formatted section 3003 and the MO section 3002 for use in the device; however, the present invention is applicable to the case where recording, reproducing or other operation is performed on a magneto-optical disk 1201 with a format other than the above format. Further, not limited to magneto-optical disks, the present invention is applicable to the case where recording, reproducing or other operation is performed on an optical disk of phase transition type as a so-called re-writable optical disk or on that of DRAW type capable of writing desired information only once. Moreover, it is obvious that the combination of the circuit of FIG. 39, the circuit of FIG. 2 or FIG. 3 and the circuit of FIG. 6 may provide a normal operation of the AGC in recording, erasing or access operation and also in detection of the AGC voltage.

As aforementioned, the present invention comprises reproduced signal condition judgement means for judging whether or not reproduced signals are representative of recorded data according to reproduced signal conditions and control means for permitting an AGC circuit to adjust amplification degree when it is judged by the reproduced signal condition judgement means that the reproduced signals are representative of the recorded data, and for fixing the amplification degree when it is judged that the reproduced signals are not representative of the recorded data.

With the arrangement, it is possible to judge whether an instantaneous reproducing operation is performed in a recorded area of information or in an un-recorded area thereof, and when there are a group of information pulses, it is also possible to judge whether the group of pulses are recorded data or defect pulses. Accordingly, based on the results of the judgement by the reproduced signal condition judgement means, by applying the adjustment of the amplification degree by the AGC circuit only to a recorded area of data and by fixing the amplification degree at a value marked at the end of the recorded area situated just before the relevant position in reproducing an un-recorded area or in the occurrence of defect pulses, reproducing operation in a recorded area of information may always be performed properly.

Additionally, for the judgement of a recorded area of data by the reproduced signal condition judgement means, the following methods may be adopted: for example, in the case where a regular pattern (VFO marks etc) is recorded with data in an optical memory in order to provide synchronization for reproduction in the optical memory, the detection of the pattern may be used; in the case where data are modulated following a regular modulation rule, by detecting whether data contained in the reproduced signal conform to the modulation rule or not, it is judged whether they are normal data or not; and in the case where error detection marks are added to data, by detecting the error detection marks, a portion where the data are recorded may be detected.

In the meantime, as aforementioned, the size of the mark 2809 for use in the magneto-optical recording varies with recording conditions such as light amount for recording, recording pulse length and magnetic field externally applied. Accordingly, since variations of the size of the mark 2809 sometimes cause errors in reproduced data, it is necessary to control recording conditions always most appropriately, in order to obtain data without errors.

Therefore, if the magneto-optical recording and reproducing device is provided therein with the AGC amplifier 75 for MO signal, it is suggested that by sampling the AGC voltage for controlling the amplification degree of the AGC amplifier 75, the amplitude of the reproduced signal may be found. More specifically, for example, in the case of recording marks shown in FIG. 84, the amplification degree of the AGC amplifier for MO signals is considered to become close to a substantially minimum level, under the recording conditions wherein the amplitude of the reproduced signal reaches a maximum level. Accordingly, when recording conditions are found under which the amplification degree (decided by the AGC voltage) of the AGC amplifier 75 for MO signal becomes minimum by performing test writing under a plurality of different recording conditions, they are considered to be the optimum recording conditions.

Figure 40:
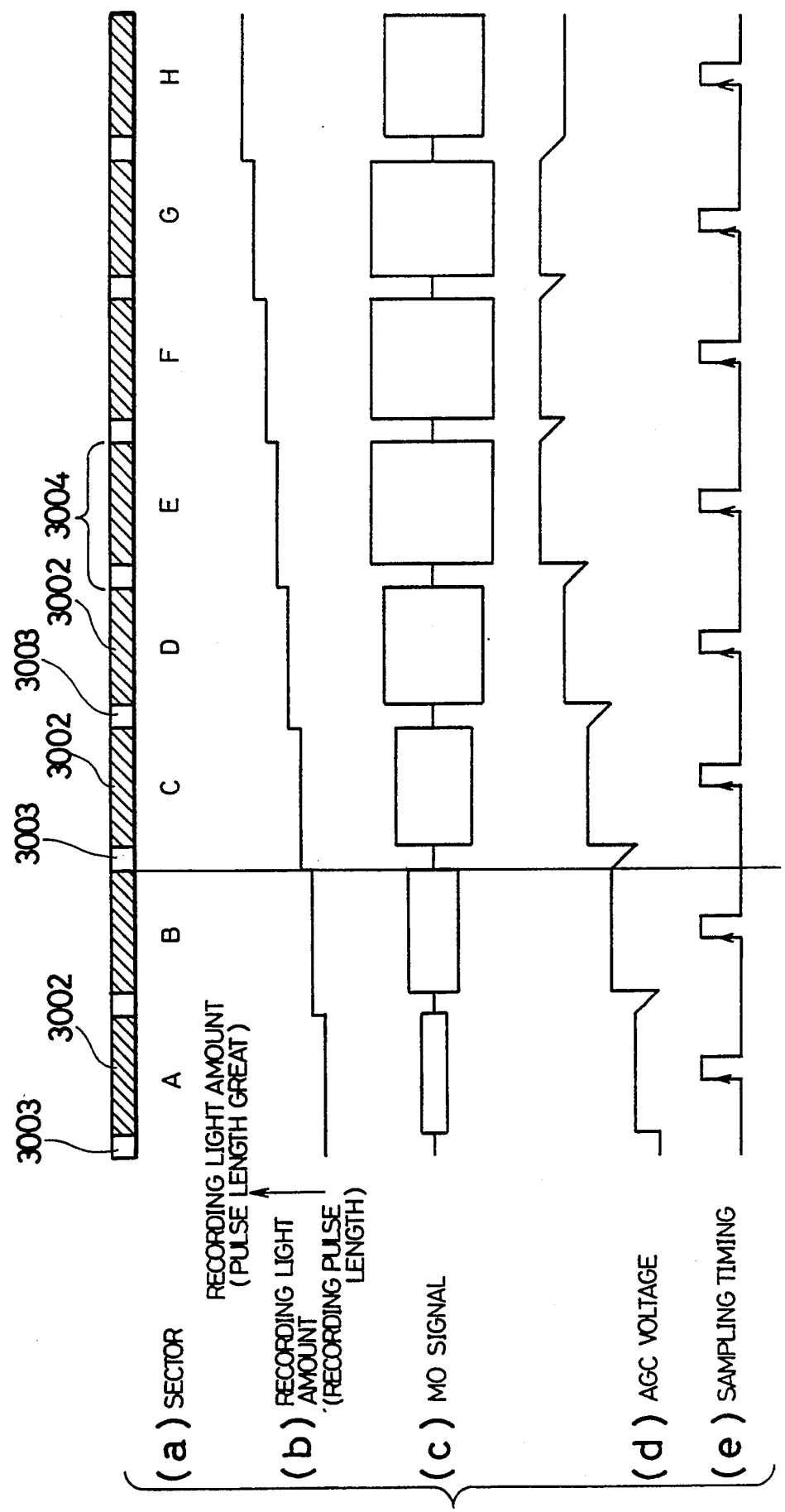
FIG. 40 is an explanatory view showing a test writing procedure.
Figure 84:
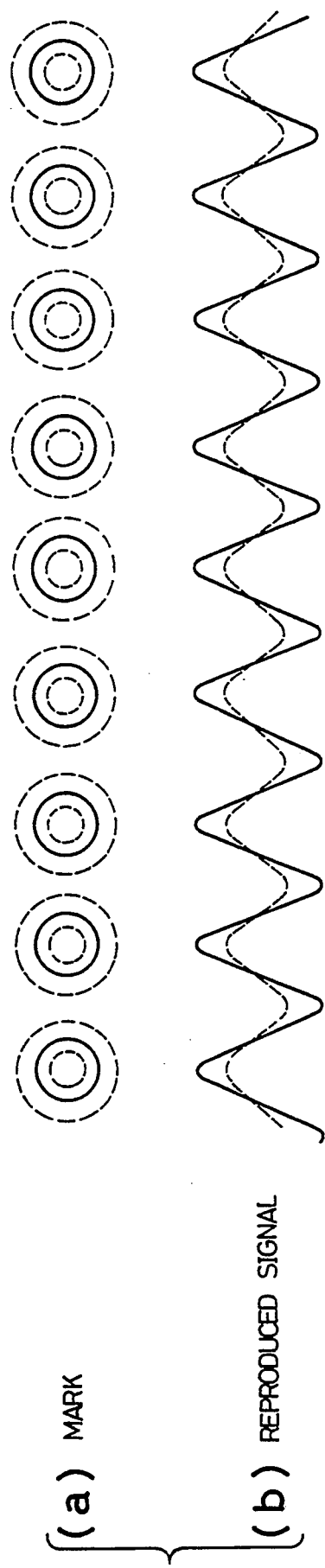
Figure 85:
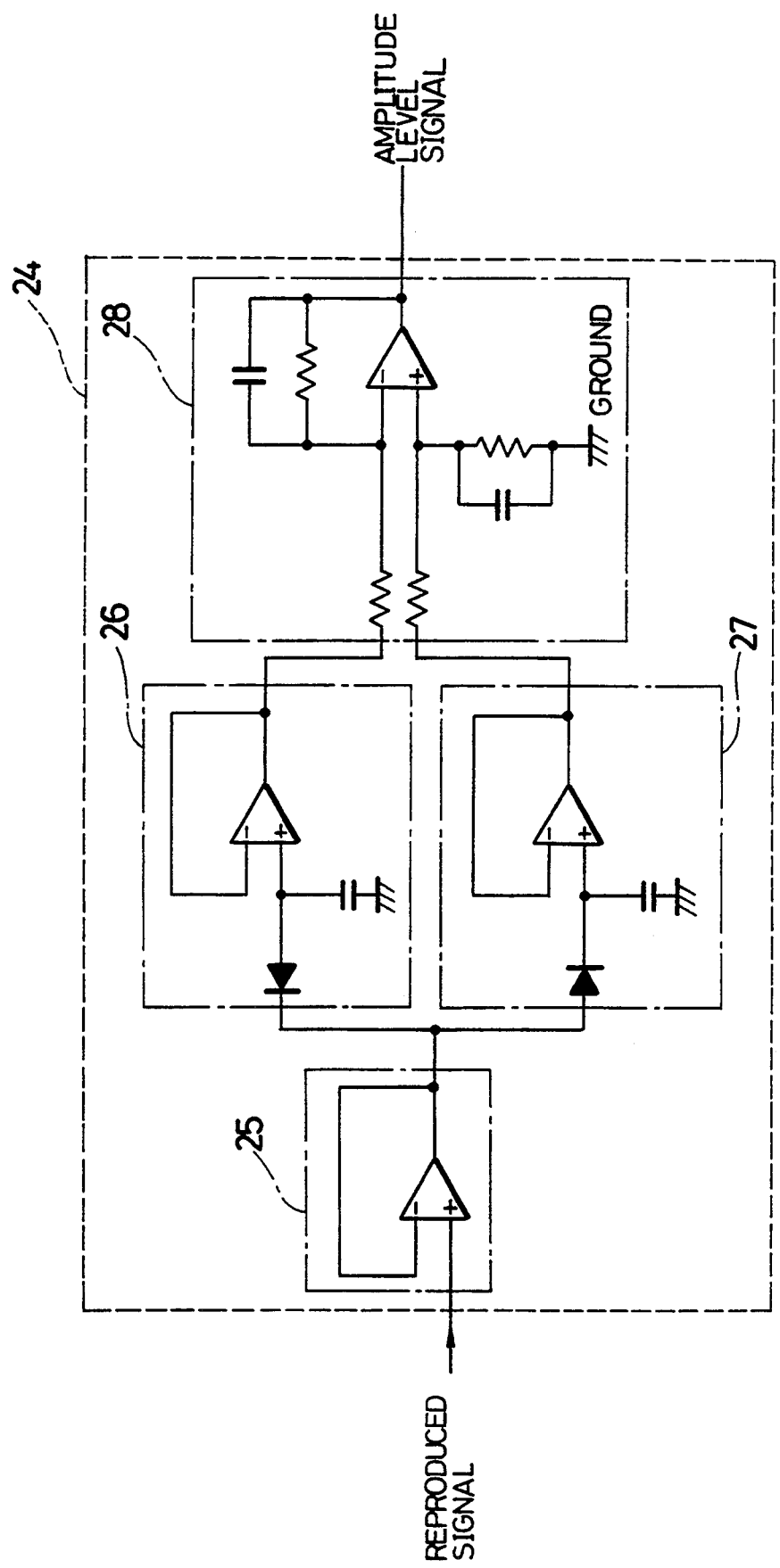

Explained more concretely referring to FIG. 40, for example, eight sectors 3004 shown by A to H in FIG. 40(a) are employed as recording areas for the test writing, and the test writing of marks shown in FIG. 84 is performed on each of the MO sections 3002 by the use of a recording light amount (or recording pulse length) successively increasing as shown in FIG. 40(b).

When information in the MO section 3002 of the sector 3004, recorded therein in the above method is reproduced, as shown in FIG. 40(c), for example an MO signal formed of a differential signal of the reproduced signals S1, S2 is obtained from each of the sectors 3004. Moreover, between the AGC voltage and the amplification degree of the AGC amplifier 75, there is a relationship wherein the AGC voltage increases as the amplification degree thereof decreases as shown in FIG. 41, and therefore the AGC voltage varies according to the amplitude of MO signals in each sector 3004, as shown in FIG. 40(d).

Figure 42:
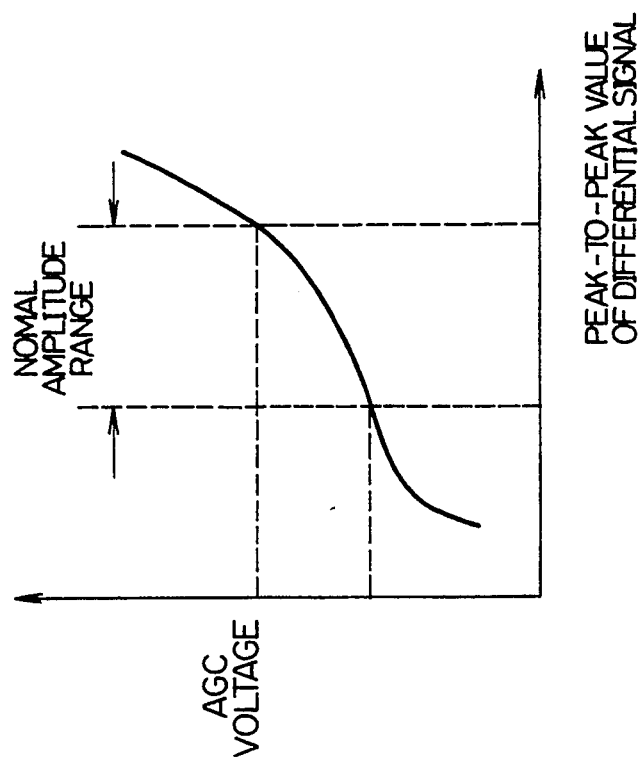
FIG. 42 is a graph showing the relation between the signal amplitude of the peak-to-peak (P—P) value and the AGC voltage.

More specifically, the AGC voltage increases as the amplitude of the MO signal increases, and following the process, the amplification degree of the AGC amplifier 75 for MO signal decreases. Additionally, there is a relationship shown in FIG. 42 between the peak-to-peak value (P-P value) of the differential signal of S1, S2, and the AGC voltage, and within a normal amplitude range shown in FIG. 42, the AGC voltage monotonically increases substantially according to the increase of the peak-to-peak value of the differential signal.

The AGC voltage of each sector 3004 is sampled with a sampling timing as shown in FIG. 40(e) (for example, with a rising edge of each pulse). Thus, a recording light amount (or recording pulse length) corresponding to a maximum value of the AGC voltage (corresponding to a position where the amplitude of the MO signal becomes maximum). Thereafter, each of recording and erasing operations is performed using this recording light amount (or recording pulse length).

In the above example, it is noted that the AGC voltages of the AGC amplifier 75 for MO signal, obtained by reproducing the respective sectors E, F and G are in the same level, and in either case where the recording light amount (or recording pulse length) of the sector G is made greater or is made smaller than the level, the AGC voltage is reduced (i.e. the amplitude of the MO signal is reduced). Accordingly, the optimum recording conditions are determined based on the recording light amount (or recording pulse length) of the sector E, F, or G.

Figure 43:
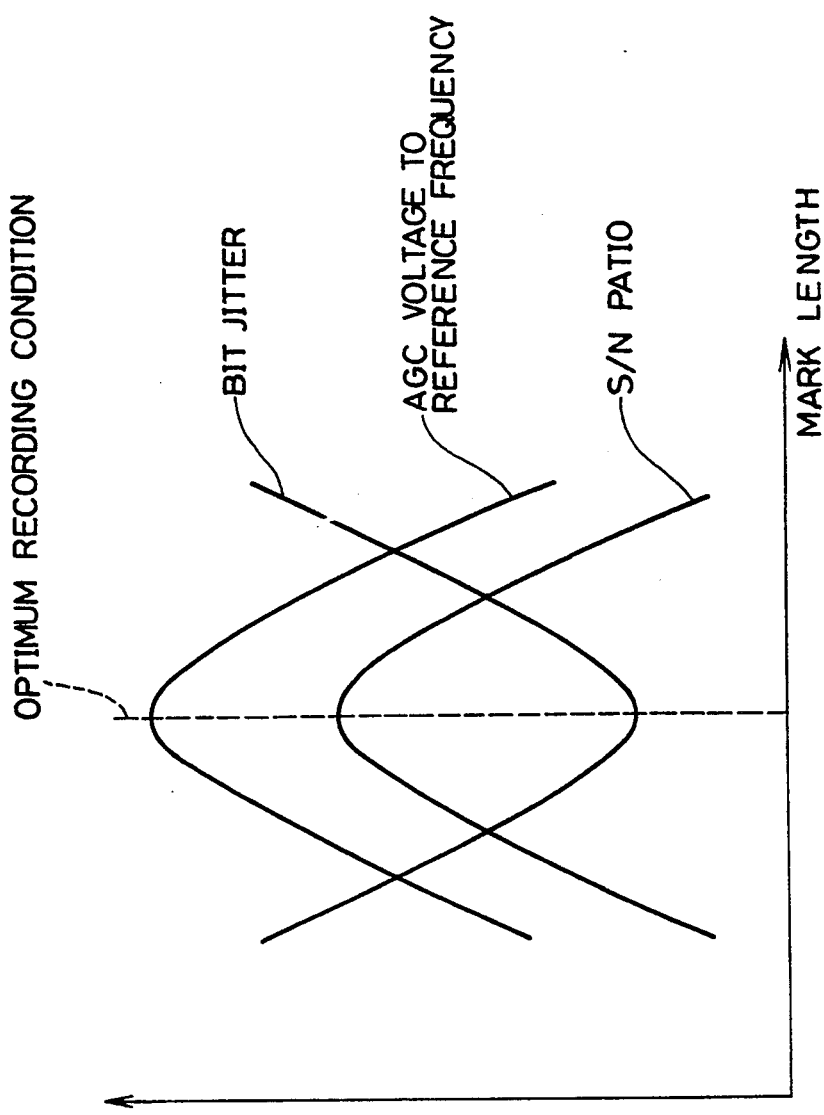
FIG. 43 is a graph showing the relation between mark length and each type of characteristic.

Generally, when recording conditions such as recording light amount and recording pulse length are changed, the mark length also varies according to the change, and as shown in FIG. 43, in both cases where the mark length is longer than a length corresponding to the optimum recording conditions and where conversely it shorter than the length, the AGC voltage becomes smaller as shown in FIG. 40, thereby lowering a S/N ratio. Further, at this time, bit jitters become greater. In addition, for convenience of explanation, in changing the recording conditions, the recording pulse length is kept constant when the recording light amount is changed, and the recording light amount is kept constant when the recording pulse length is changed.

Moreover, besides the above recording conditions, the intensity of the magnetic field externally applied may be changed. Furthermore, in the above example, the optimum recording conditions are determined by finding a maximum value of the AGC voltage; however, not limited to the above method, when the polarity of the AGC voltage is reversed, the optimum recording conditions may be determined by finding a minimum value of the AGC voltage.

As described above, by finding the optimum recording conditions and by performing recording or erasing operation of information under the optimum recording conditions, reproduced signals with high reliability are obtained.

Figure 31:
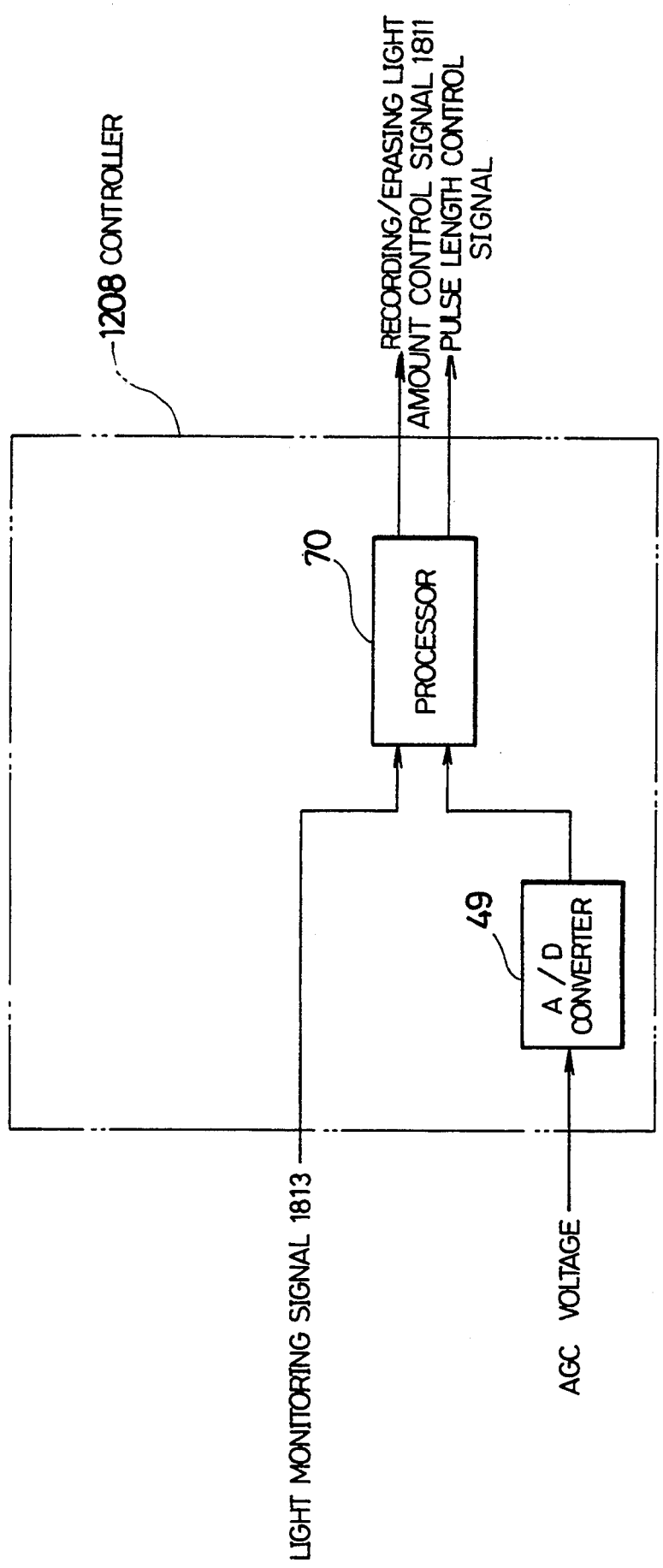
FIG. 31 is a block diagram showing the essential part of the controller.

In performing the test writing, for example, in the case where the recording light amount is successively changed, the light monitoring signal 1813 is entered to a processor 70 (recording condition decision means) in the controller 1208 shown in FIG. 31 through the light monitoring circuit 1804 (see FIG. 13), and is stored, for example, in a memory element such as RAM or $E^{2}$-PROM installed in the processor 70.

Thus, as shown in FIG. 40(c), in reproducing successively MO signals recorded in the sectors 3004 indicated by A to H, an AGC voltage of the AGC amplifier 75 for MO signal is sampled by each sector 3004, and stored in the memory element.

Then, the optimum recording conditions are found at the time when the AGC voltage shows a maximum value, and in recording operation thereafter, the recording/erasing light control signal 1811 and a recording pulse length control signal corresponding to the optimum recording conditions are released from the processor 70 (recording condition decision means).

The recording/erasing light control signal 1811 is entered to the recording/erasing light control circuit 1803 (see FIG. 13), thereby controlling a light amount of the semiconductor laser 2801 so as to be properly applied to the recording or erasing operation.

On the other hand, the pulse length control signal is entered to the modulation circuit 1302, thereby controlling modulated data according to the signal.

Figure 32:
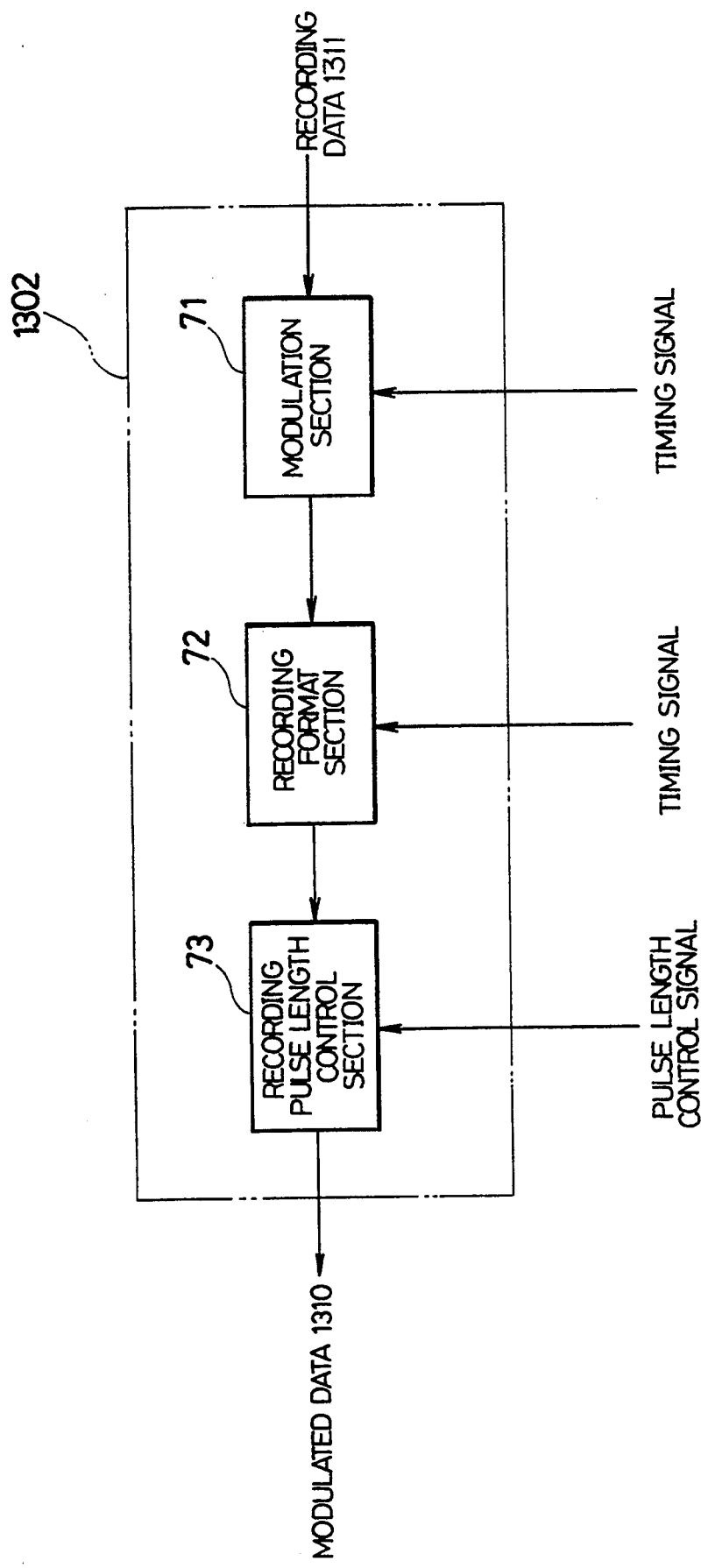
FIG. 32 is a block diagram showing a modulation circuit.

More specifically, as shown in FIG. 32, the recording data 1311 released from the controller 1208 is entered to a modulation section 71 of the modulation circuit 1302. In the modulation section 71, modulation is performed in synchronism with the timing signal, following, for example, the 2-7 modulation method as shown in Table 1. The modulated recording data 1311 are processed in a recording format section 72 so as to conform to a recording format in synchronism with the timing signal, and further, in a recording pulse length control section 73, the modulated data 1310 are generated according to the pulse length control signal. The modulated data 1310 are released to the semiconductor laser driving circuit 1301 shown in FIG. 13, and the semiconductor laser driving current 1210 is released from the driving circuit 1301. Then, the semiconductor laser driving current 1210 is fed to the semiconductor laser 2801 in the optical head 1203. In this manner, the recording pulse length may be controlled.

Additionally, in reproducing information recorded under different recording conditions as described above, only MO data in the reproduced signal are separated in the MO waveform processing section 2502 as was shown in FIG. 7(b). Then, the MO data are converted into a binary coded signal through the AGC amplifier 75 and the binary code circuit 76, and reproduced data are produced according to the binary coded signal.

As described above, the present invention comprises recording condition decision means for determining the optimum recording conditions according to a plurality of AGC voltages sampled by each recording condition, released from the AGC circuit. Therefore, since the arrangement eliminates the need for circuits for detecting a maximum amplitude, an envelope and primary and secondary harmonic waves of the reproduced signals in reproducing operation, a simplified circuit configuration is available and consequently a compact device can be achieved, thereby reducing the cost of the whole system. Further, in each of recording or erasing operation, since the arrangement eliminates the need for the holding operation of the AGC circuit, control can be simplified.

The following description will discuss a pulse group detection circuit for detecting whether or not there is a group of pulses formed of MO signals in the MO section 3002.

Figure 23:
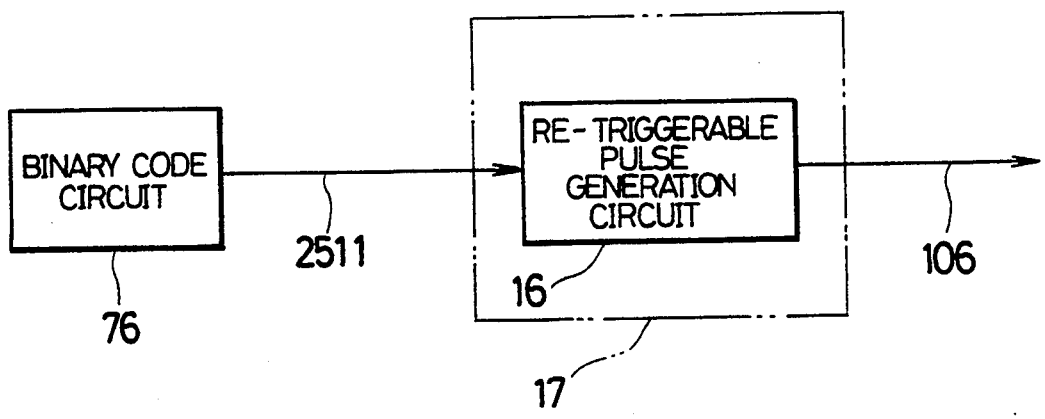
FIG. 23 is an explanatory view showing an outline of the structure of a pulse group detection circuit.

As shown in FIG. 23, the pulse group detection circuit 17 comprises, for example, a re-triggerable pulse generation circuit 16. The MO binary coded signal 2511 is entered to the re-triggerable pulse generation circuit 16. The MO binary coded signal 2511 is an output signal of the binary code circuit 76 which converts MO signals amplified by the AGC amplifier 75 for MO signal into binary signals.

Figure 30:
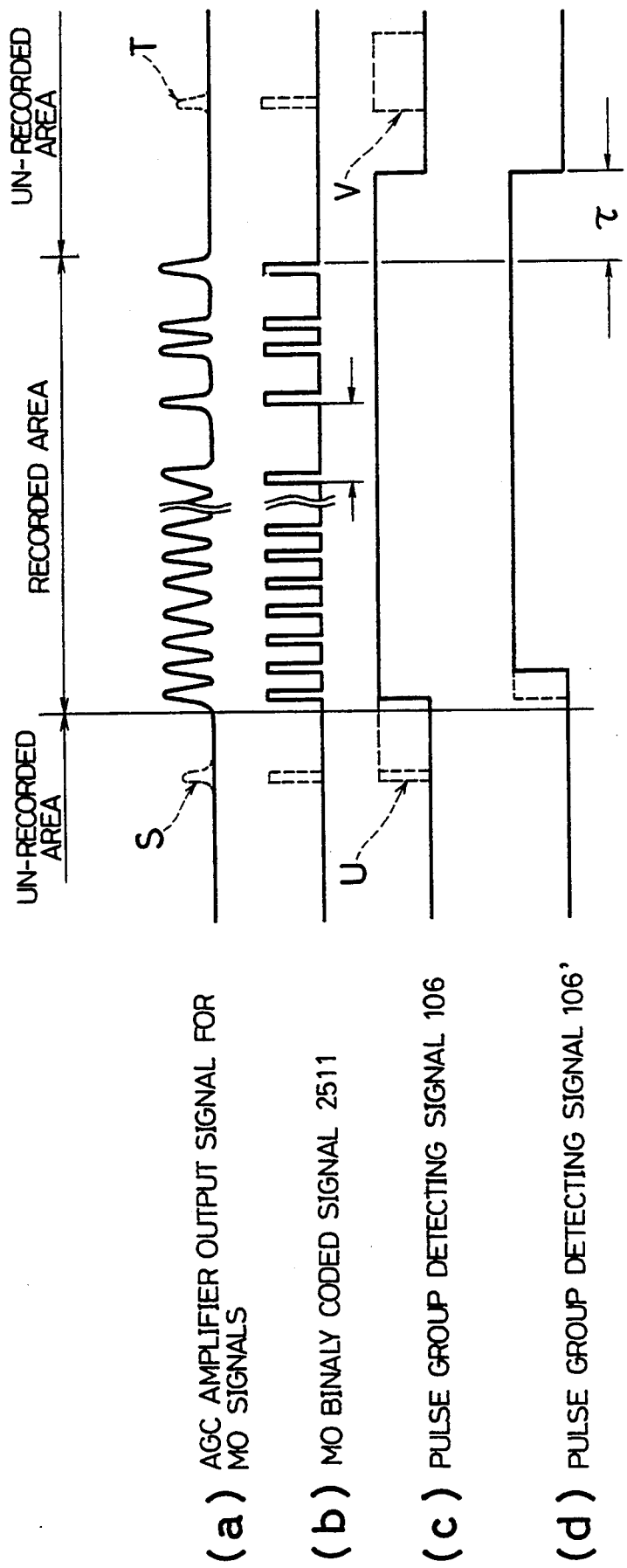
FIG. 30 is an explanatory view showing the relation of each type of signal to the recorded area and to the un-recorded area.

The pulse group detection circuit 17 sets the aforementioned pulse group detecting signal 106 (see FIG. 30(c)) high for next $\tau$ seconds when a pulse exists in the MO binary coded signal 2511. The re-triggerable pulse generation circuit 16 keeps the pulse group detecting signal 106 high successively for another $\tau$ seconds if the next pulse is entered within the $\tau$ seconds after the preceding pulse was entered in the MO binary coded signal 2511.

Figure 24:
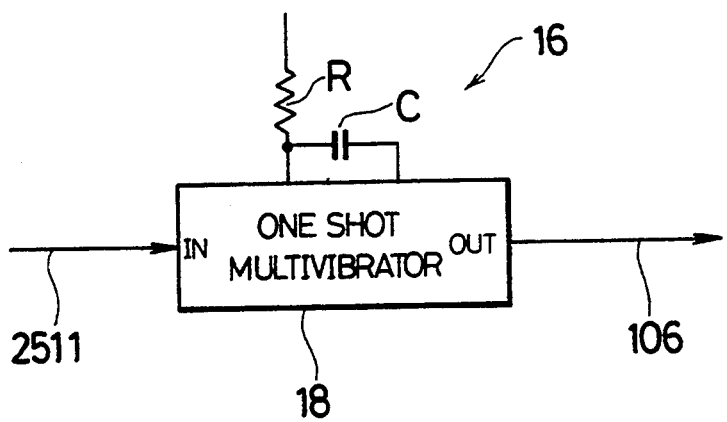
FIGS. 24 to 26 are each explanatory views showing concrete examples of the pulse group detection circuit.

One example of an arrangement of the re-triggerable pulse generation circuit 16 is shown in FIG. 24. Here, the re-triggerable pulse generation circuit 16 includes a re-triggerable one shot multivibrator 18. The period of time $\tau$ for keeping the pulse group detecting signal 106 high is predeterminately set by a resistor R and a capacitor C. Concretely, $\tau$ is directly proportional to a time constant $(R \times C)$.

Figure 25:
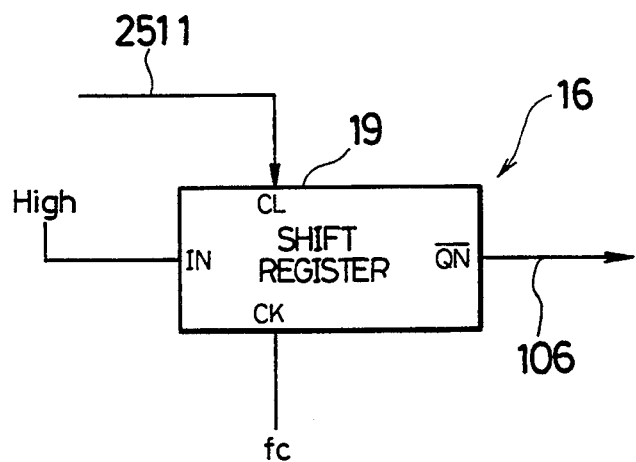
Figure 26:
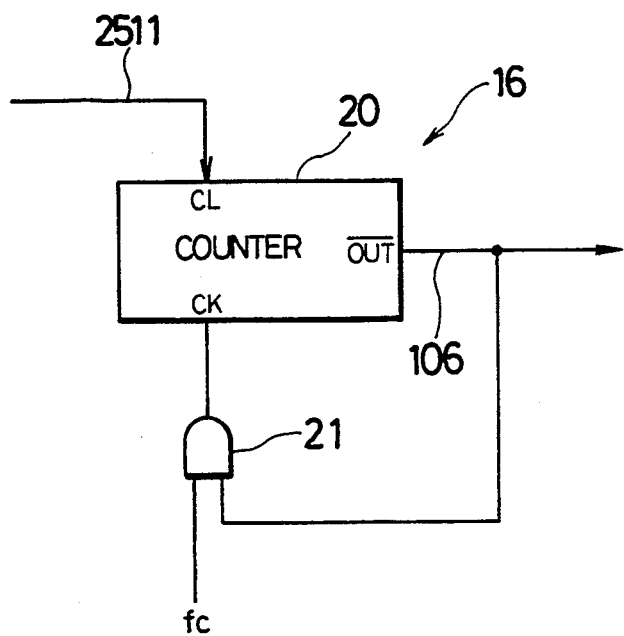

FIG. 25 shows another example of an arrangement of the re-triggerable pulse generation circuit 16 wherein a shift register 19 is employed. A serial input terminal IN is set high, and clock pulses having a frequency $f_c$ are entered to a clock terminal CK, and then an N-th output of a shift output terminal $\overline{QN}$ is released as a recorded area detecting signal P. Further, the MO binary coded signal 2511 is entered to a clear terminal CL. In that case, the equation is expressed as: $\tau = N \times (1/f_c)$ FIG. 26 shows the other example of an arrangement of the re-triggerable pulse generation circuit 16 wherein a modulo-N divider 20 is employed. The MO binary coded signal 2511 is entered to a clear terminal CL, and an output of an output terminal $\overline{OUT}$ is released as the pulse group detecting signal 106. The pulse group detecting signal 106 is also entered to one of the input terminals of an AND circuit 21. Further, the clock pulses having a frequency $f_c$ are entered to the other of the input terminals of the AND circuit 21, and an output signal of the AND circuit 21 is entered to a clock terminal CK of the modulo-N divider 20. In that case, the equation is also expressed as: $\tau = N \times (1/f_c)$ FIG. 30(a) shows an example of the output signal of the AGC amplifier 75 for MO signal; FIG. 30(b) shows an example of the MO binary coded signal 2511 converted into a binary signal in the binary code circuit 76;

and FIG. 30(c) shows an example of the pulse group detecting signal 106 generated according to the MO binary coded signal 2511 respectively.

Here, when a pulse exists ill the MO binary coded signal 2511, the period of time $\tau$ during which the pulse group detecting signal 106 is kept high is predeterminately set so as to become more than a maximum pulse period $T_{max}$ between two adjacent pulses in the MO binary coded signal 2511. As a result, the pulse group detecting signal 106 of the pulse group detection circuit 17 has a shape shown in FIG. 30(c), wherein the "high" period is substantially equal to the period during which a group of pulses exists (the time required to reproduce a recorded area), which pulses are formed of MO signals in the output signal of the AGC amplifier 75 for MO signal.

The following description will discuss an example of a modified pulse group detection circuit.

The example of the modified circuit deals with the case where a defect pulse such as shown by a dotted line s or t in FIG. 30(a) occurs in an un-recorded area without a group of pulses formed of MO signals. In other words, the modified circuit gives proper measures to prevent the occurrence of an error in reproducing MO signals due to malfunction that the pulse group detecting signal 106 is set high erroneously as shown by a dotted line U or V in FIG. 30(c), according to the defect pulse.

Figure 27:
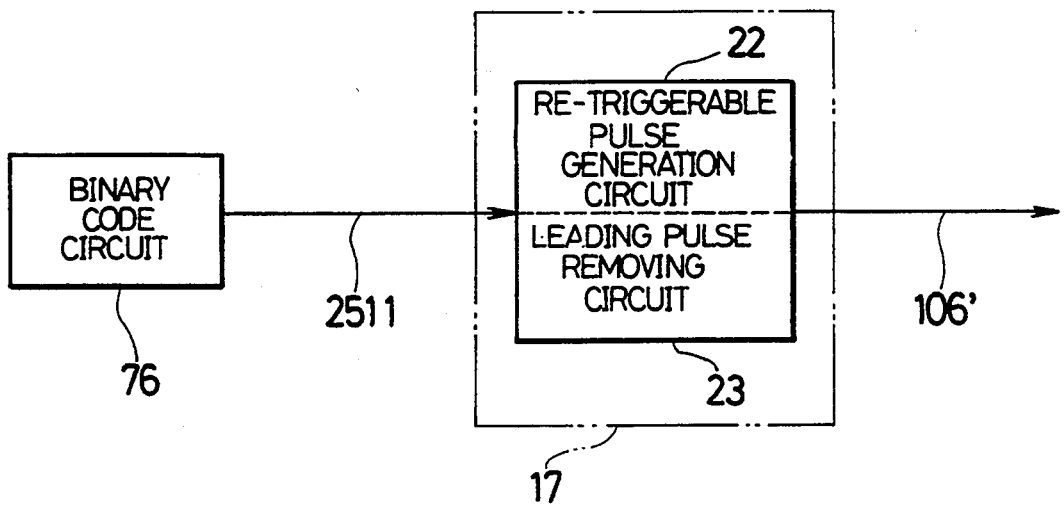
FIG. 27 is an explanatory view showing another structural outline of the pulse group detection circuit.

More specifically, the pulse group detection circuit 17 in the example comprises a re-triggerable pulse generation circuit 22 and a leading pulse removing circuit 23, as is shown in FIG. 27. The leading pulse removing circuit 23 functions as a circuit for nullifying the output of the re-triggerable pulse generation circuit 22 for one or more leading pulses the number of which is given by integer M in the MO binary coded signal 2511.

Figure 28:
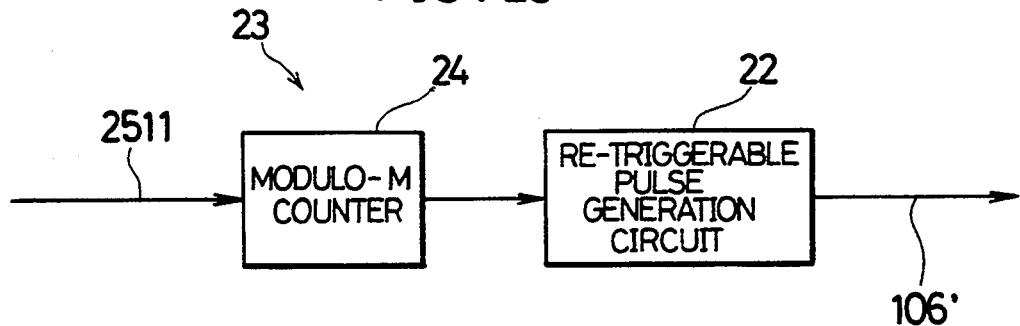
FIGS. 28 and 29 are each explanatory views showing concrete examples of the pulse group detection circuit corresponding to FIG. 27.

A concrete example of an arrangement of the leading pulse removing circuit 23 is shown in FIG. 28. Here, a modulo-M counter 24 is disposed as the leading pulse removing circuit 23 in a stage before the re-triggerable pulse generation circuit 22, and the modulo-M counter 24 removes the leading pulses the number of which is given by integer M from the MO binary coded signal 2511. Additionally, instead of the modulo-M counter 24, M-shift register may be used.

Figure 29:
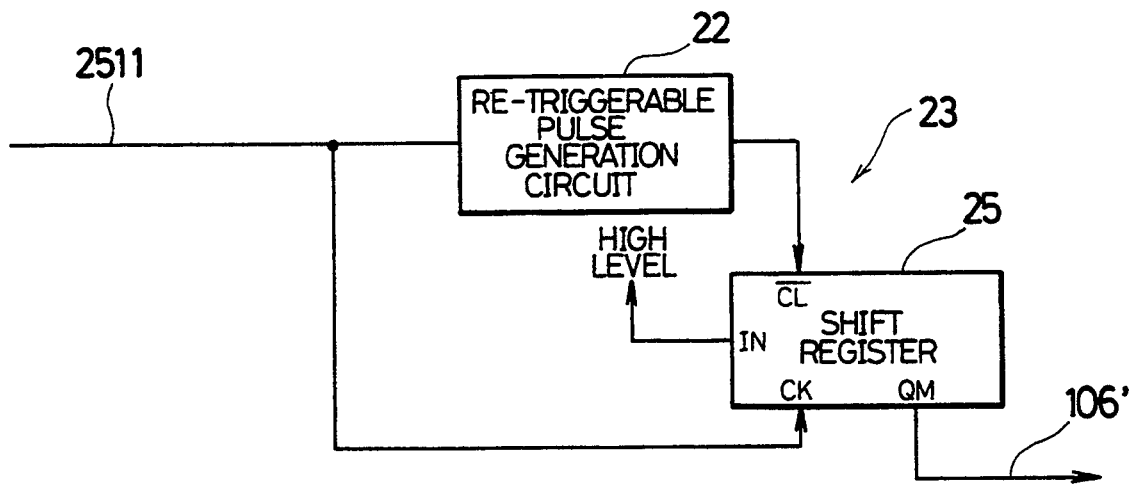

FIG. 29 shows another example of the arrangement of the leading pulse removing circuit 23, where a shift register 25 is disposed as the leading pulse removing circuit 23 at a stage after the re-triggerable pulse generation circuit 22, and an output of the pulse generation circuit 22 is entered to a clear terminal $\overline{CL}$ of the shift register 25, while the MO binary coded signal 2511 is entered to a clock terminal CK of the sift register 25, thereby releasing an M-th shifted output QM as a pulse group detecting signal 106'. In addition, an input terminal IN is always set high.

The following description will discuss, for example, timing control of a case where M=1, that is to say, the output of the re-triggerable pulse generation circuit 22 is nullified only for one leading pulse of the MO binary coded signal 2511.

As shown in FIG. 30(a), if there is only one defect pulse within an un-recorded area of MO signals, the defect pulse is nullified by the leading pulse removing circuit 23, and therefore there occurs no such case wherein the pulse group detecting signal 106' is set high due to the defect pulse, as shown in FIG. 30(d).

Moreover, in a recorded area with a group of pulses of MO signals, the timing to make the pulse group detecting signal high delays only by one pulse; however, for example, the hold timing of the AGC voltage is not affected by the delay of such a few pulses. Thus, reliability for the operation of the AGC is not adversely affected. Further, the pulse group detection circuit 31 and the pulse group detecting signal 36, shown in FIG. 37 have the same functions and effects as the above pulse group detection circuit 17 and the pulse group detecting signal 106, and therefore they may be replaced respectively.

In addition, in the above example, it is arranged that the AGC voltages of both of the AGC amplifiers 65, 75 are held in access operation; however, as aforementioned, in the case of slow access speed, the holding of the AGC voltages is not necessarily required.

Further, in the above example, either signal representative of the pre-formatted section 3003 or the MO section 3002 is obtained by summing or differentially amplifying the two kinds of reproduced signals S1 and S2; however, one kind of original reproduced signal may be used.

Moreover, in the above example, a magneto-optical recording and reproducing device is taken as an example of information recording and reproducing devices, wherein information recording, reproducing and erasing operations are performed on and from the magneto-optical disk 1201; and besides the application, the present invention is also applicable to an automatic gain control device for use in optical memory devices which perform recording, reproducing and other operations on and from an optical disk or the like of phase transition type capable of re-writing information or of DRAW (Direct Read After Write) type capable of writing desired information only once.

As described above, the present invention comprises first control means for holding a control voltage generated according to amplitude of the reproduced signal in recording or erasing operation. With the arrangement, in recording or erasing operation, the amplification degree of the AGC circuit is maintained at a value marked before the start of recording or erasing operation. Accordingly, the amplification degree at the start of reproducing operation immediately after the completion of a preceding recording or erasing operation has the same value as that marked in the completion of a preceding reproducing operation, and therefore the amplification of the reproduced signal may be operated at an appropriate amplification degree. Thus, errors in reproducing operation immediately after the completion of recording or erasing operation are reduced.

The present invention further comprises recorded area judgement means for identifying a recorded area for information in reproducing operation, second control means for holding the control voltage at an un-recorded area for information according to the identification of the recorded area judgement means. With the arrangement, while the optical head is passing through an un-recorded area, the amplification degree is maintained at the value marked in the reproducing operation of a preceding recorded area, and therefore the amplification of the reproduced signal may be operated at an appropriate amplification degree immediately after the optical head comes to the next recorded area.

The present invention further comprises response speed changing means for changing response speed in multiple stages. With the arrangement, for example, in detecting the AGC voltage for test writing or the like, by increasing the response speed of the AGC circuit, variations of the amplitude of the reproduced signal which occur in minute intervals such as sector units may be properly treated. On the other hand, in normal reproducing or other operation for information, by setting the response speed at a comparatively low level so as to eliminate the influence of defect pulses or the like, errors in reproducing operation may be reduced.

Moreover, the present invention may comprise a first automatic gain control section for adjusting a gain of the reproduced signal from the pre-formatted section and a second automatic gain control section for adjusting a gain of the reproduced signal from the data section, and only in the second automatic gain control section, there may be provided recorded area judgement means for identifying a recorded area for information in reproducing operation and holding means for holding the control voltage at an un-recorded area for information according to the identification of the recorded area judgement means.

Furthermore, since there are invariably recorded information such as addresses in the pre-formatted section, the judgement whether it is the recorded area or the un-recorded area and the holding of the AGC amplifier are not necessary in the pre-formatted section. Taking the above point into consideration, only in the second automatic gain control section, there may be provided recorded area judgement means for identifying a recorded area for information in reproducing operation and holding means for holding the control voltage at an un-recorded area for information according to the identification of the recorded area judgement means.

As a result, the recorded area judgement means and the holding means are not necessary in the first automatic gain control section for the pre-formatted section, and thus the arrangement of the first automatic gain control section for the pre-formatted section may be simplified.

The following description will discuss the AGC amplifier installed in the pre-format waveform processing section 2503 in detail referring to FIGS. 44 to 49.

To begin with, the operation of the pre-format waveform processing section 2503 will be described hereinbelow with reference to FIG. 44. Additionally, the reproduced signals 2510 released from the buffer amplifier 2501 are referred to as S1' and S2'. The reproduced signals S'1, S'2 are entered to a summing VCA (voltage control amplifier) 151 as an automatic gate control section, where signals representative of the MO (data) section 3002 with the reverse polarity are removed therefrom. Succeedingly, signals representative of the pre-formatted section 3003 with the same polarity are separated so as to be released. An output signal 164 of the summing VCA 151 is sent to both of a clamping circuit 157 and a low-pass filter 152.

In the clamping circuit 157, a dc component of the input signal is removed therefrom, and an upper limit or a lower limit of the signal is clamped at a predetermined value of voltage. An output signal 170 of the clamping circuit 157, after having been compared with a reference voltage (not shown in the figures) in its magnitude, is converted into a binary signal and sent to the timing generation circuit 1501 shown in FIG. 16 as the sector mark signal 1411. On the other hand, the output signal 164 of the summing VCA 151, which was entered to the low-pass filter 152 where high-frequency noise is eliminated therefrom, is sent to an equalizer 153 and a zero-crossing detection differentiating circuit 159 respectively. The equalizer 153 which has an amplification degree characteristic for emphasizing high-frequency band, separates overlapping of reproduced signals having high-frequency-band components, produced due to the close disposition of protrusions and recessions (marks).

An output signal 166 of the equalizer 153 is entered to limiter circuit 154 (limiting means), where only the amplitude of the signal derived from the sector mark section 1701 is limited so that it has the same level as the amplitude of the signal derived from the ID section 1702. An output signal 167 of the limiter circuit 154 is entered to a clamping circuit 155, where a dc component is removed therefrom and an upper limit or a lower limit of the signal is clamped at a predetermined value of voltage. An output signal 168 of the clamping circuit 155 is sent to an AGC voltage generation circuit 156 and a gate generation circuit 162. In the AGC voltage generation circuit 156, an AGC voltage 169 is generated according to an output signal 168 of the clamping circuit 155. Thus, the amplification degree of the summing VCA 151 is automatically controlled by the AGC voltage 169.

On the other hand, an output signal 165 of the low-pass filter 152 is entered to the zero-crossing detection differentiating circuit 159 where its zero-crossing is detected by a differentiating circuit (not shown), and released therefrom as an ID zero-crossing signal 160. The ID zero-crossing signal 160 together with an ID gate signal 163 generated from the gate generation circuit 162, makes an ID binary coded signal.

Figure 44:
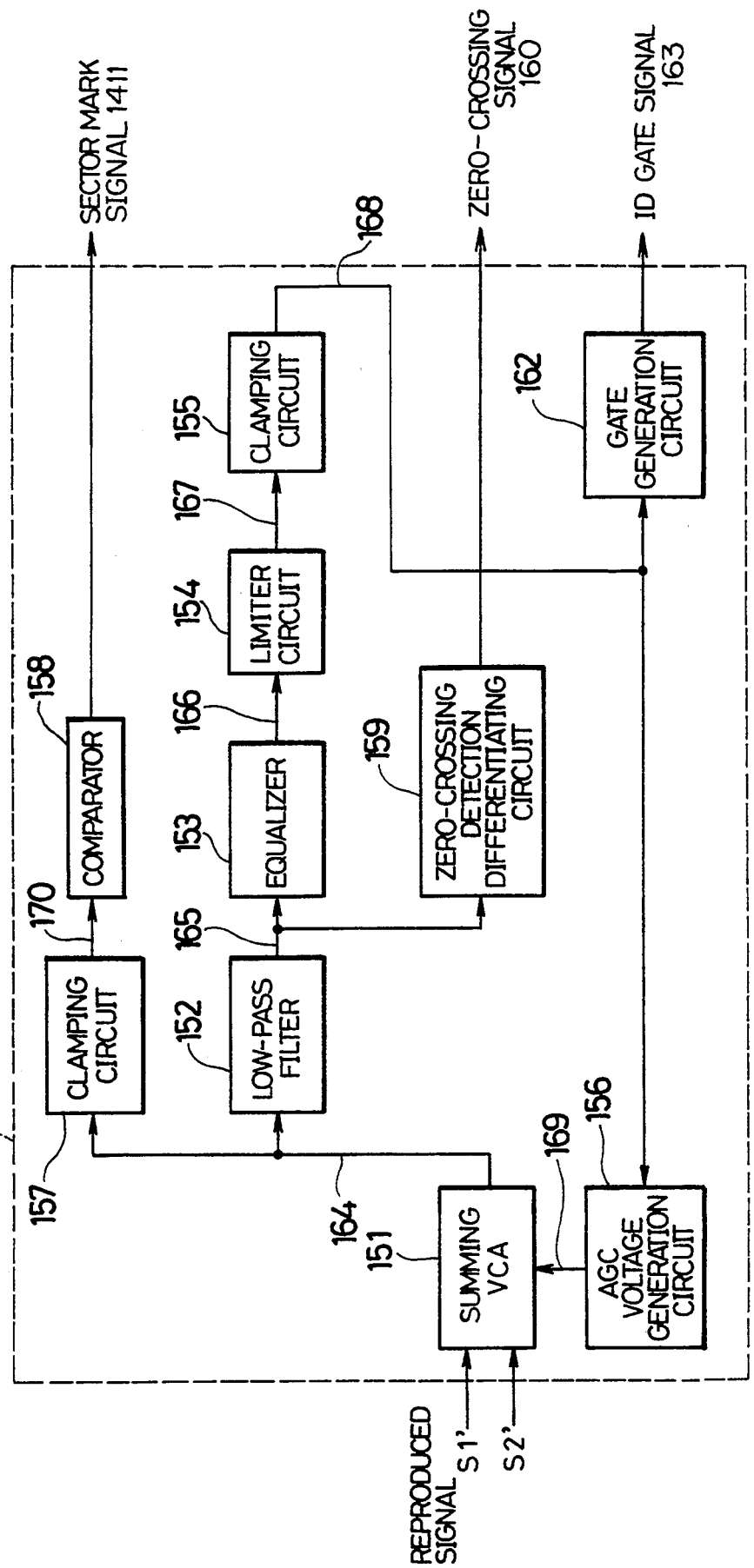
FIG. 44 is a block diagram showing the structure of a pre-format waveform processing section.
Figure 45:
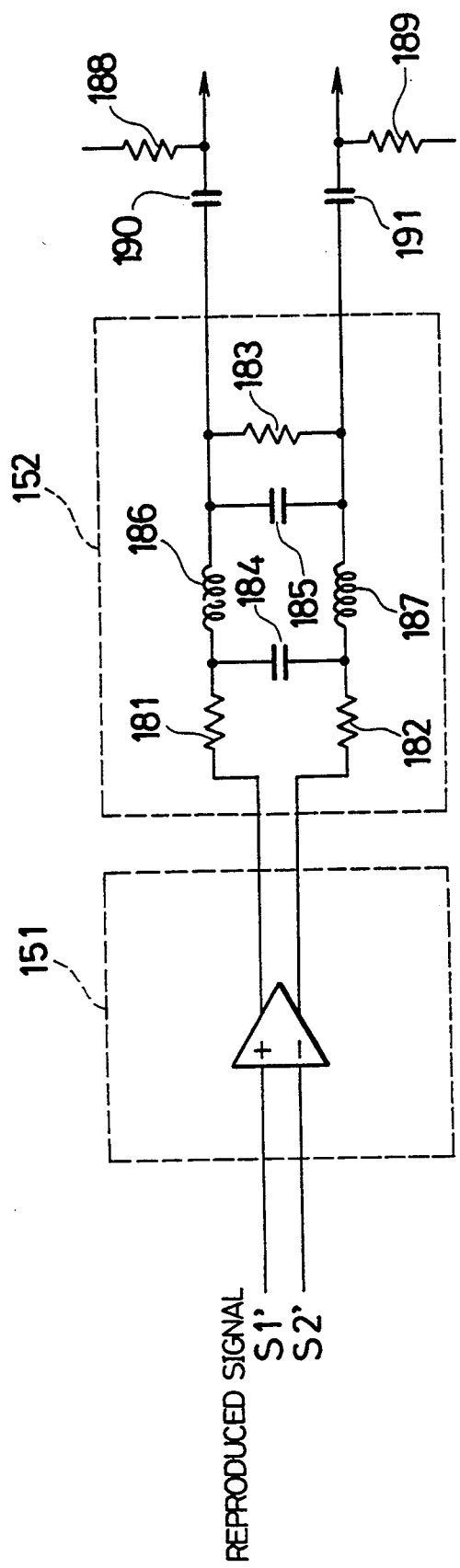
FIG. 45 is a view showing the circuit structure of a low-pass filter.

FIG. 45 shows an example of the arrangement of the low-pass filter 152 of FIG. 44.

The low-pass filter 152 comprises resistors 181, 182, 183, capacitors 184, 185, and coils 186, 187 as shown in FIG. 45. The low-pass filter 152 functions as a circuit for eliminating a high-frequency noise component contained in the output signal of the summing VCA 151. An output signal of the low-pass filter 152 is ac-coupled to the equalizer 153 and the zero-crossing detection differentiating circuit 159 by a high-pass filter including resistors 188, 189 and capacitors 190, 191. Predetermined voltage is always applied to the resistors 188 and 189. The reproduced signals S1', S2' are entered to the low-pass filter 152 through the summing VCA 151.

Figure 46:
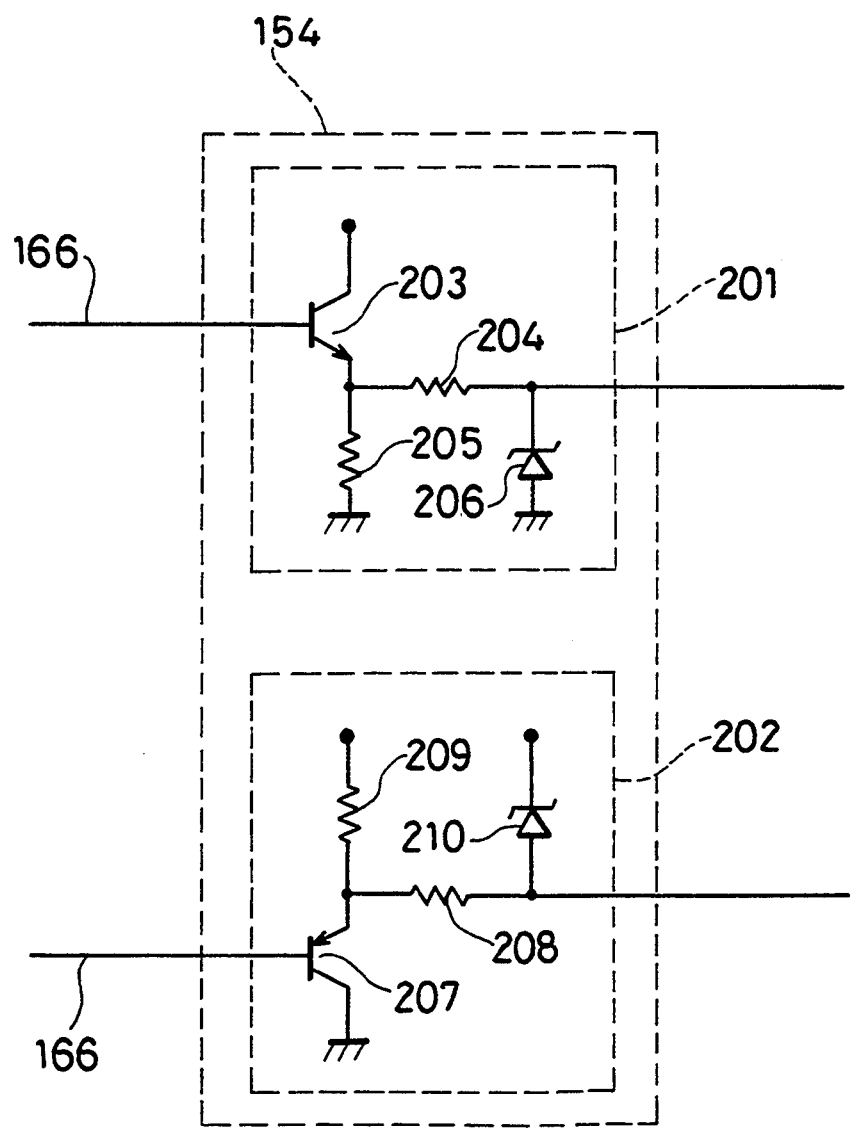
FIG. 46 is a view showing the circuit structure of a limiter circuit.

FIG. 46 shows a circuit diagram as an example of the arrangement of the limiter circuit 154 of FIG. 44.

The limiter circuit 154 includes two limiters 201, 202. The limiter 201 comprises an NPN transistor 203, resistors 204, 205 and a zener diode 206, while the limiter 202 comprises a PNP transistor 207, resistors 208, 209 and a zener diode 210. From the equalizer 153, two output signals 166 having reverse polarity to each other are differentially released to the limiters 201 and 202. When the output signals 166 are entered to the limiters 201 and 202, they are limited in their respective amplitudes so that an upper limit of the signal amplitude should not become greater than a zener voltage (rated output voltage) to ground in the limiter 201 and a lower limit of the signal amplitude should not become smaller than a zener voltage to a source voltage applied to the zener diode 210 in the limiter 202.

Figure 47:
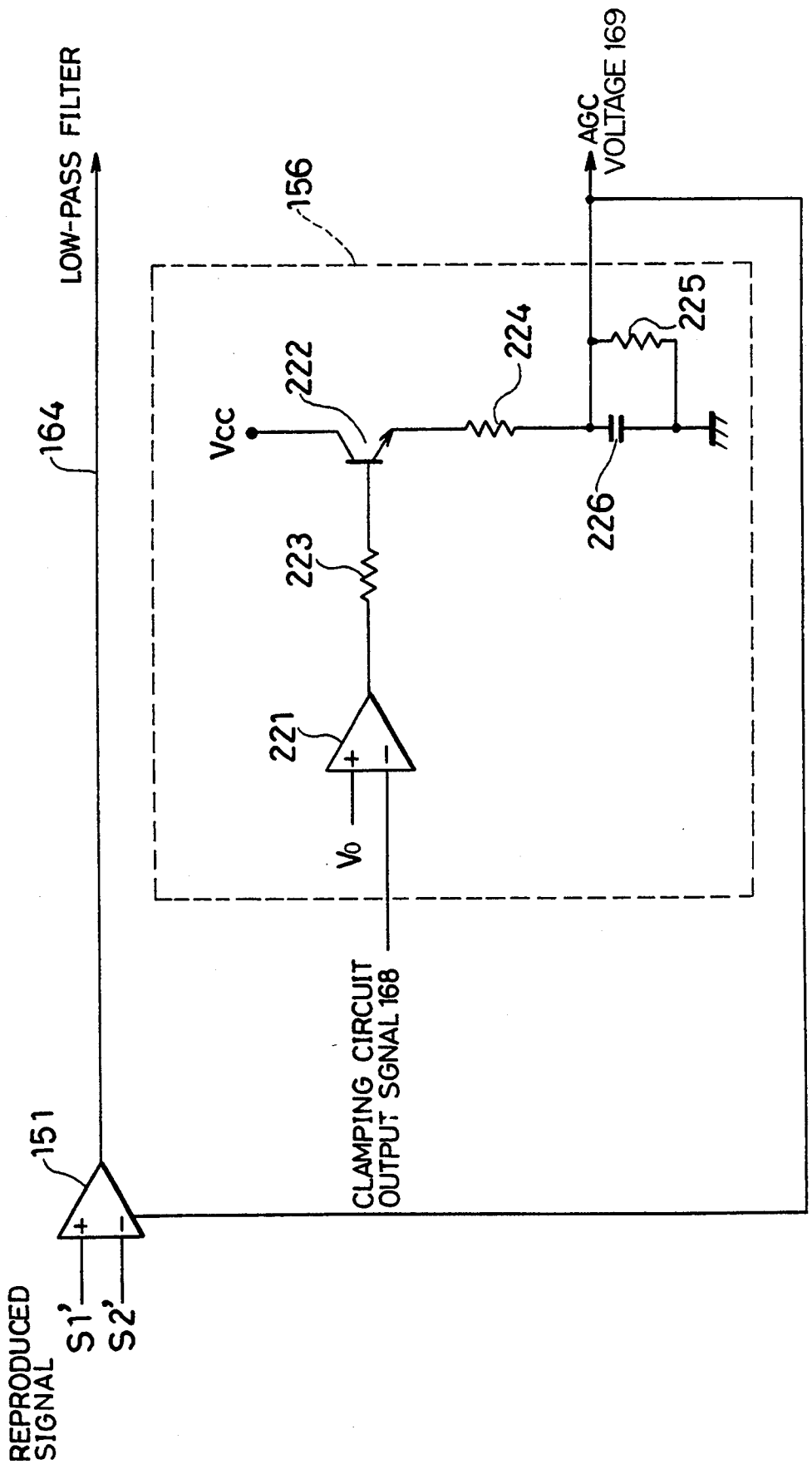
FIG. 47 is a view showing tile circuit structure of an AGC voltage generating section.

FIG. 47 shows an example of the arrangement of the main components of the AGC voltage generation section 156 of FIG. 44. Additionally, the main components shown in FIG. 47 have the same functions as those of FIG. 4 and therefore may replace those in the circuit shown in FIG. 4.

An input signal 168 of the clamping circuit 155 is entered to an inverting input terminal of a comparator 221, and is compared with a reference voltage $V_O$ applied to a non-inverting input terminal thereof in its magnitude. When the amplitude of the output signal 168 exceeds the reference voltage $V_O$, an output of the comparator 221 is set high. Accordingly, since a transistor 222 is switched on, a capacitor 226 is charged by power source $V_{CC}$ through a charge resistor 224, thereby increasing a voltage across the capacitor 226. A charge time constant at this time is determined by the charge resistor 224 and the capacitor 226. A voltage across the capacitor 226 thus obtained is sent to the summing VCA 151 as the AGC voltage 169 for controlling amplification degree, thereby decreasing the amplification degree of the summing VCA 151.

On the other hand, when the amplitude of the output signal 168 does not exceed the reference voltage $V_O$, the output of the comparator 221 is set low, and since the transistor 222 is switched off, the charge accumulated in the capacitor 226 is discharged through a discharge resistor 225, thereby decreasing the voltage across the capacitor 226. A discharge time constant at this time is determined by the discharge resistor 225 and the capacitor 226. A voltage across the capacitor 226 thus obtained is sent to the summing VCA 151 as the AGC voltage 169 for controlling amplification degree, thereby increasing the amplification degree of the summing VCA 151.

Figure 48:
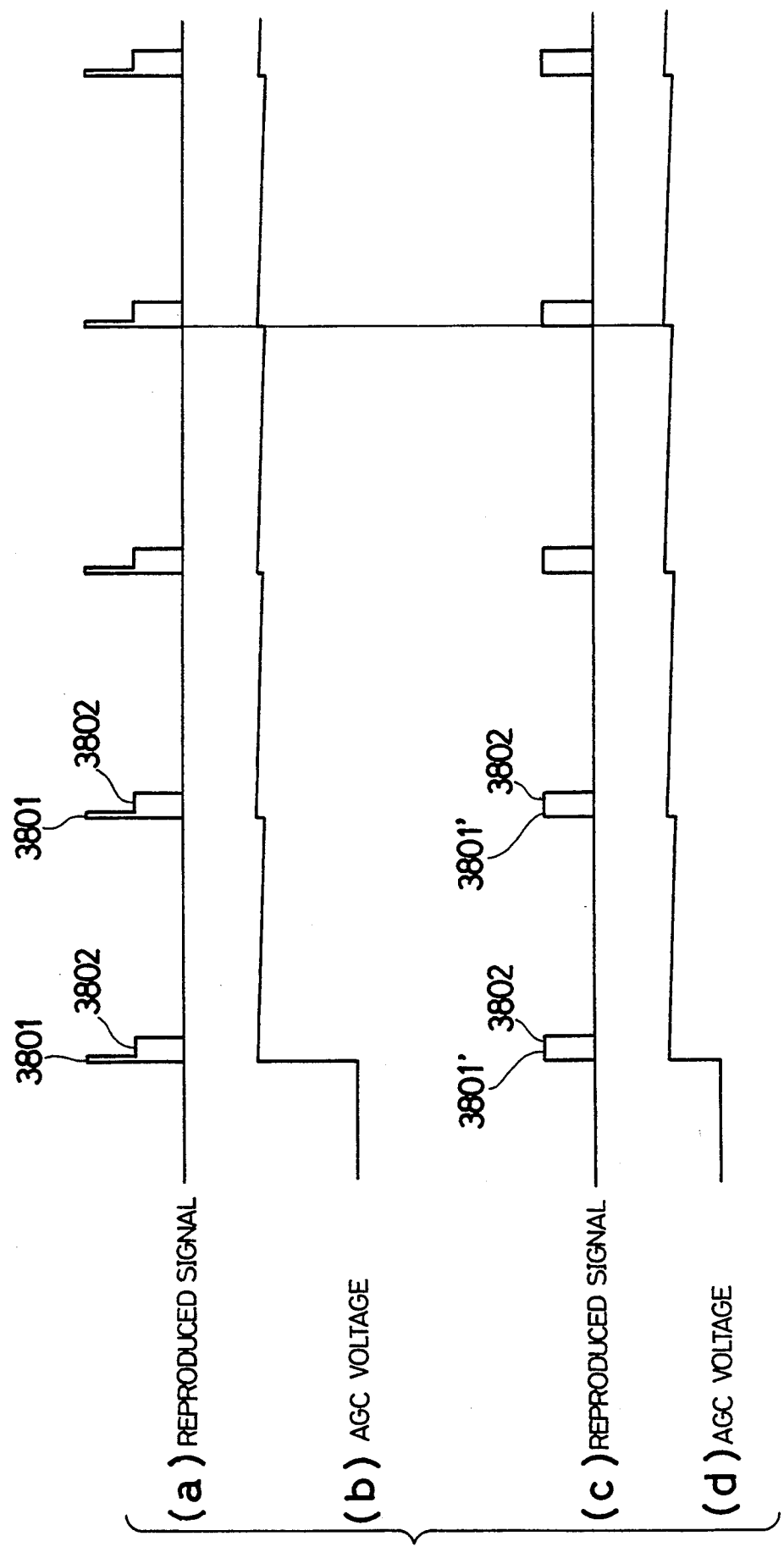
FIG. 48 is a view showing the AGC voltage waveforms as they compare to the conventional examples.
Figure 75:
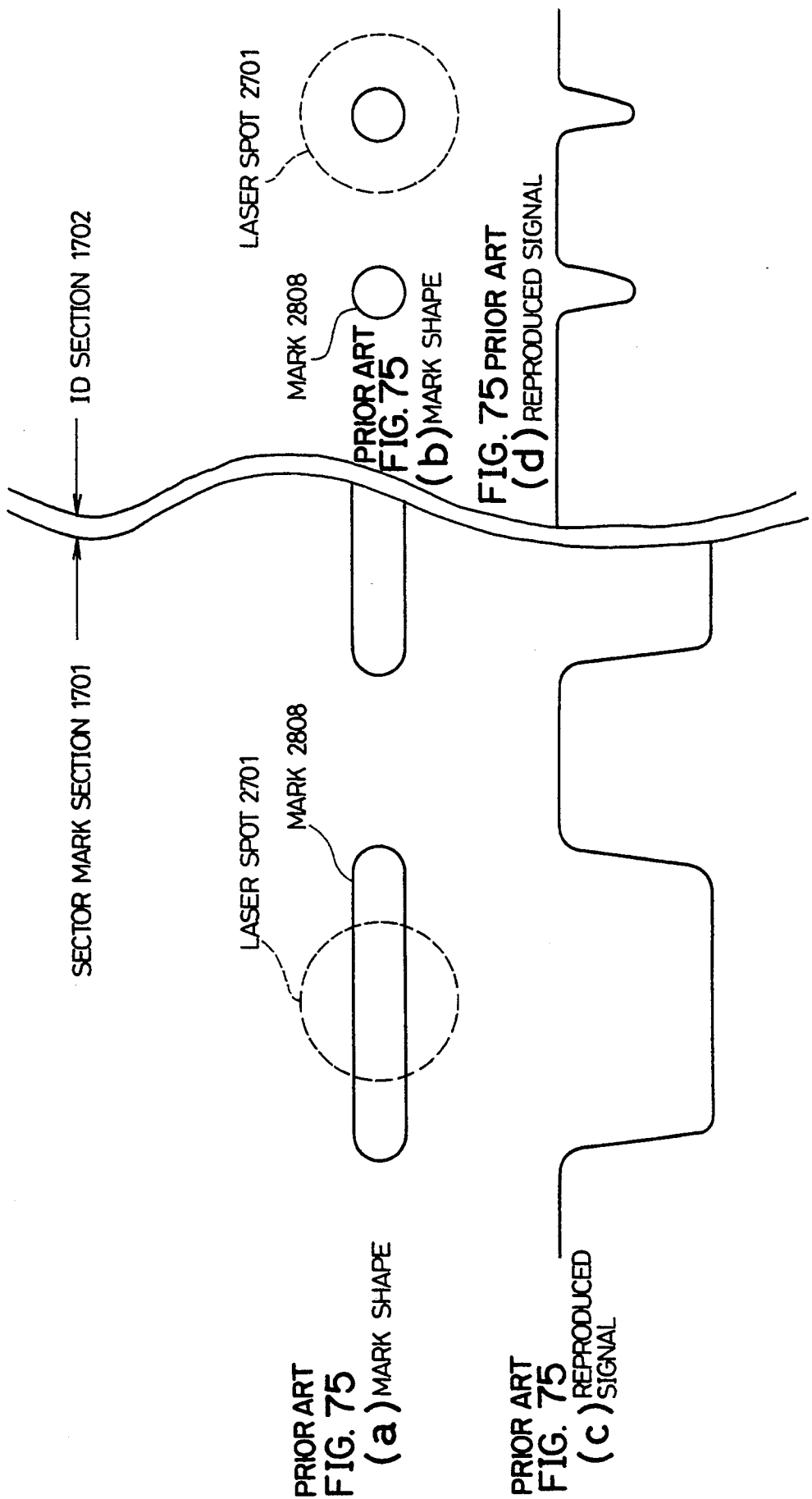

Referring to FIG. 48, the following description will discuss effects of the limiter circuit 154 (limiting means) on the AGC voltage caused by installing the circuit 154 at a stage before the AGC voltage generation section 156. As described in FIG. 75, the pre-formatted section 3003 is divided into the sector mark section 1701 with a great amplitude of the reproduced signal and the ID section 1702 with a small amplitude of the reproduced signal, and signals of the former are shown by 3801 of FIG. 48(a) while signals of the latter are shown by 3802 of FIG. 48(a).

In the case where the limiter circuit is not employed, as shown in FIG. 48(b), the AGC voltage becomes greater in response to a greater amplitude 3801 (see FIG. 48(a)) of the sector mark section 1701 as an area with great amplitude in the reproduced signal of the pre-formatted section 3003. Further, since the discharge time constant is limited, the AGC voltage is still great even at the ID section 1702 as an area with small amplitude (the amplification degree of the summing VCA 151 is small), and therefore does not fall to a preferred value which should be marked responding to the ID section 1702. Accordingly, a sufficient amplification degree is not achieved with respect to a signal from the ID section.

On the other hand, in the case of disposing the limiter circuit 154 at a stage before the AGC voltage generation section 156, in the reproduced signal of the pre-formatted section 3003, an amplitude 3801' of the sector mark section 1701 is limited to become substantially the same as tile amplitude 3802 of the ID section 1702 by the limiter circuit 154 (see FIG. 48(c)). Thus, the AGC voltage is permitted to respond to the amplitude of the signal from the ID section 1702, as is shown in FIG. 48(d). Accordingly, an appropriate amplification degree for the signal from the ID section 1702 may be obtained.

Figure 49:
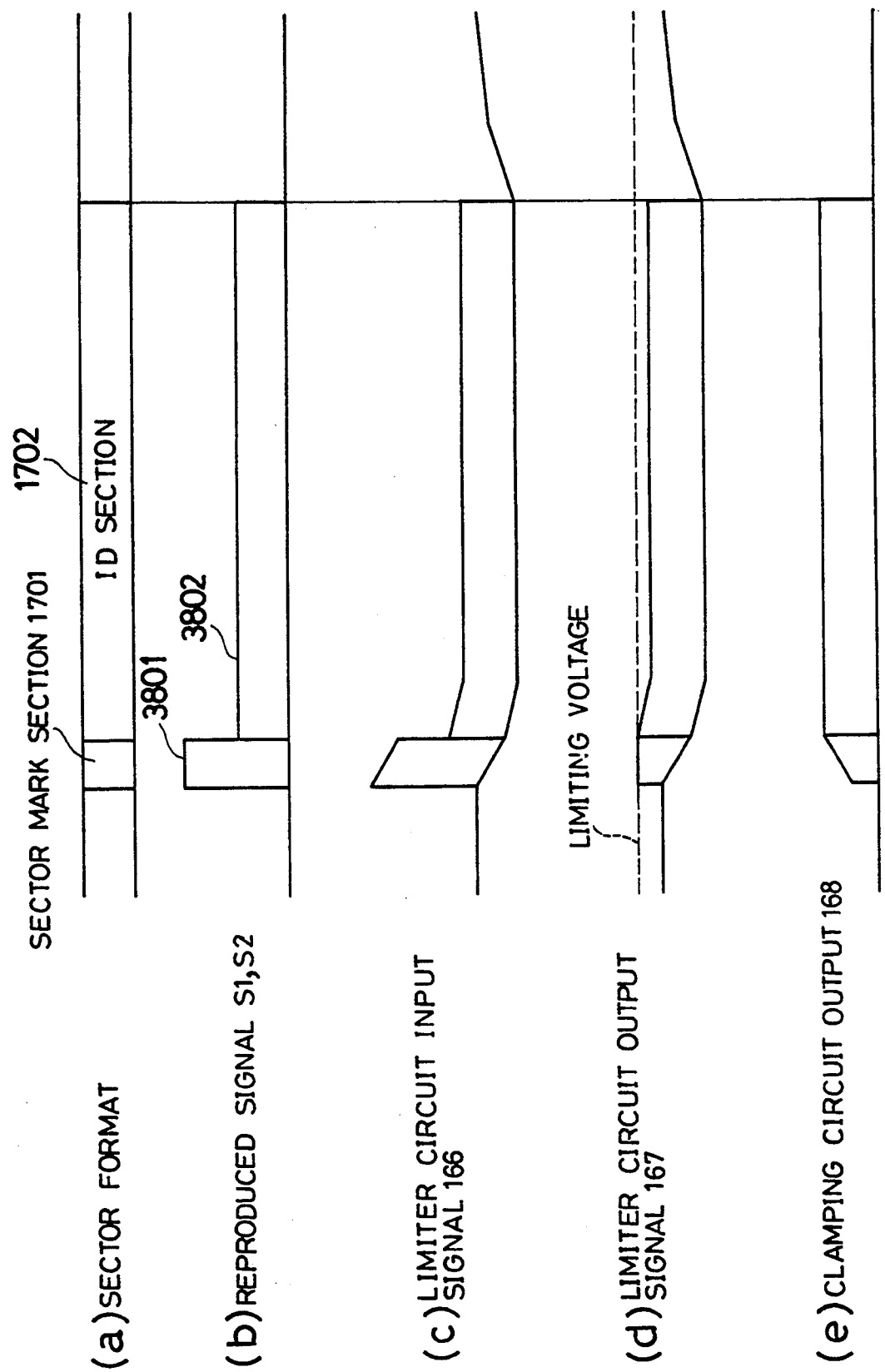
FIG. 49 is a view showing tile waveforms for each part of the pre-format waveform processing section shown in FIG. 44.

FIG. 49 shows waveforms of the respective sections in the pre-format waveform processing section of FIG. 44.

FIG. 49(a) shows the sector format, and FIG. 49(b) shows the signal amplitude 3801 of the sector mark section 1701 and the signal amplitude 3802 of the ID section, with respect to the reproduced signal S1 or S2. Different from reproduced signals obtained by magnetic memories or the like, those obtained by (magneto-) optical memories have a dc component. Therefore, the reproduced pulses are produced not in both upward and downward directions but only in one direction. For that reason, the signal amplitude 3801 of the sector mark section becomes greater only in one direction with respect to the signal amplitude 3802 of the ID section. FIG. 49(c) shows the input signal 166 of the limiter circuit 154. It has a waveform shown there because of transient response of the ac coupling disposed at a stage before the limiter circuit 154.

Figure 76:
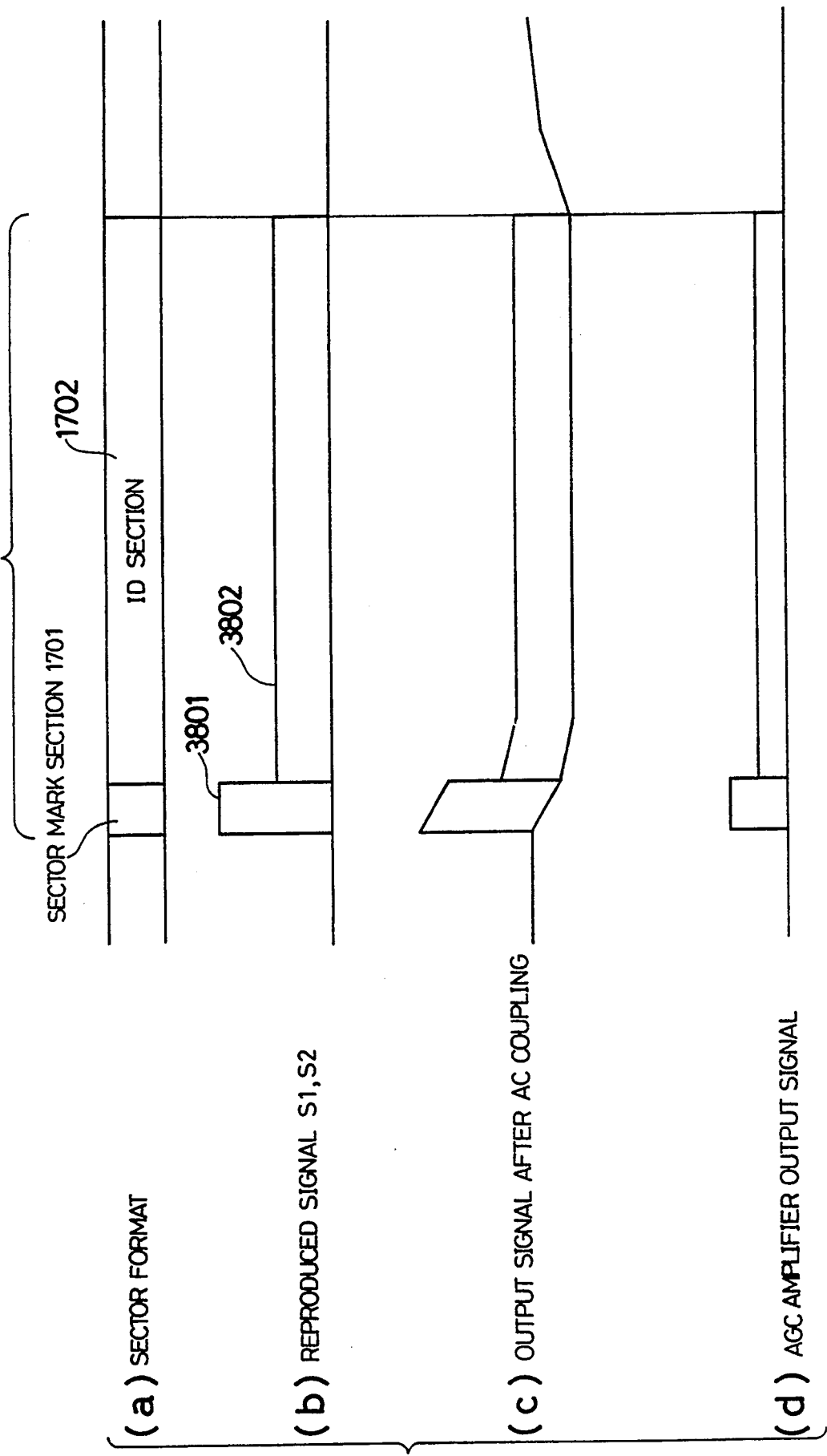
Figure 77:
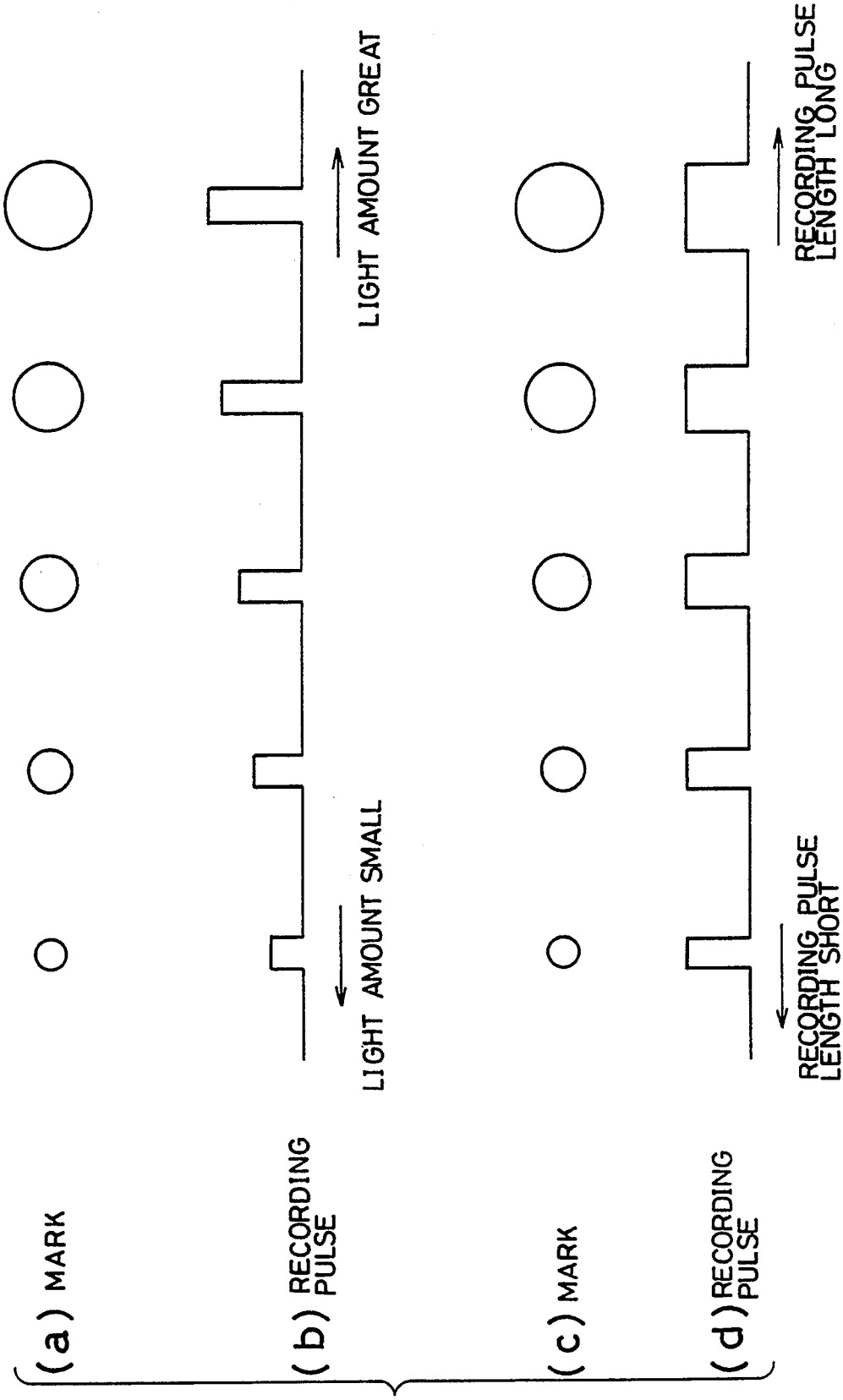
Figure 78:
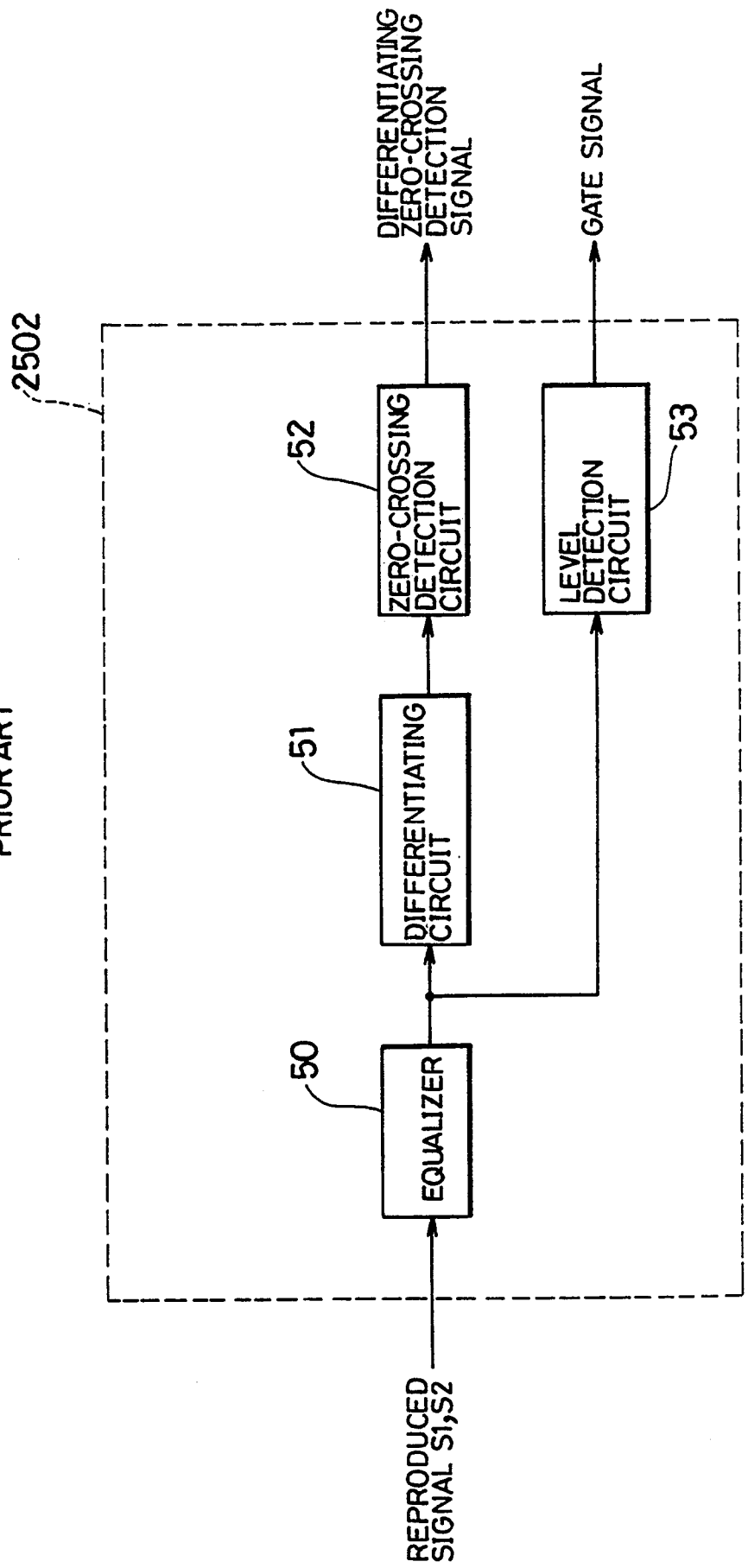
Figure 80:
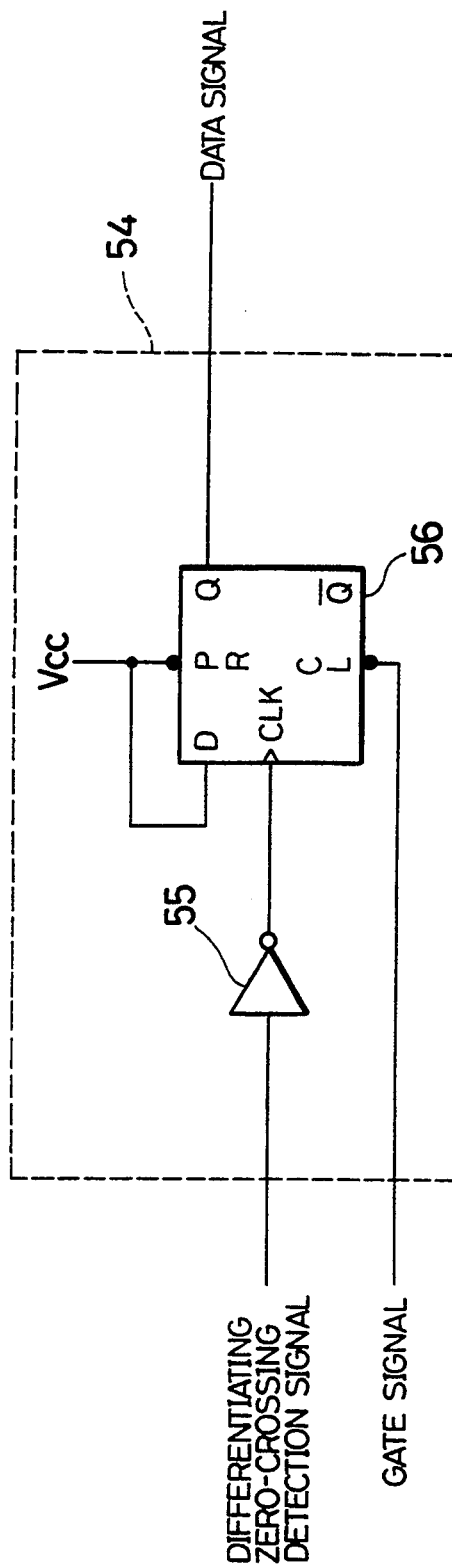
Figure 81:
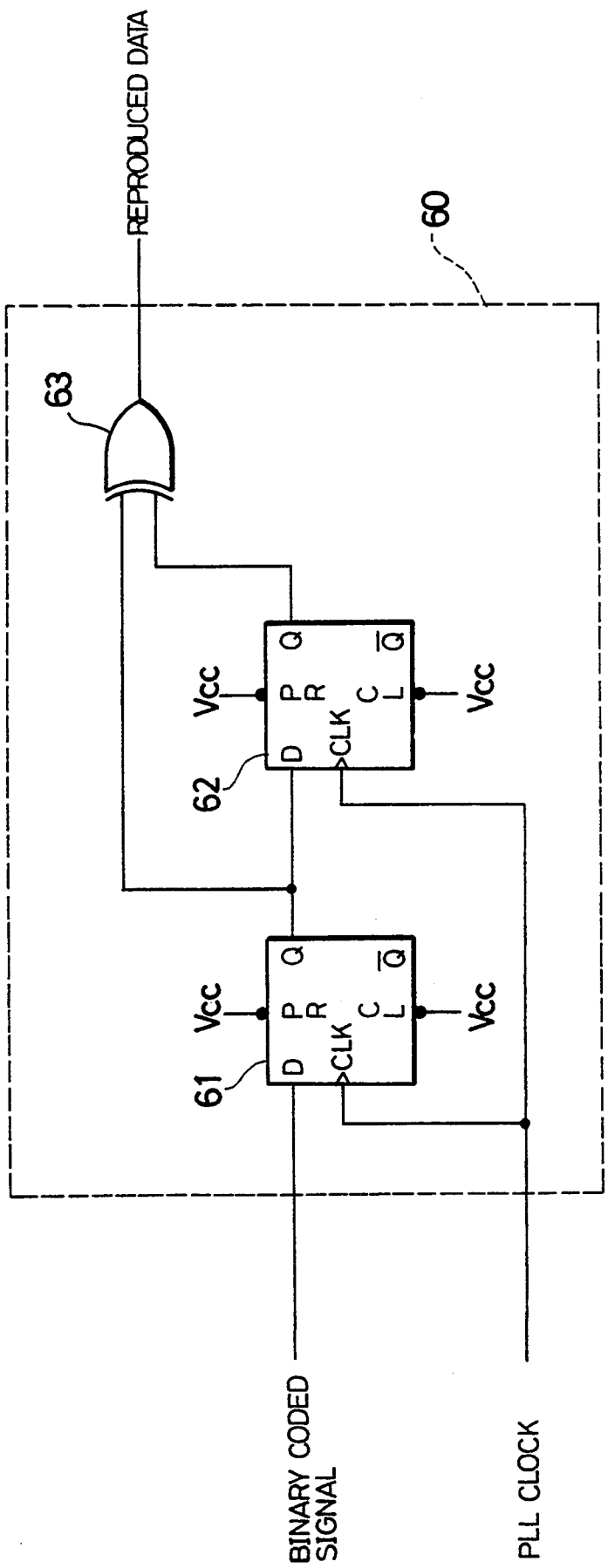
Figure 82:
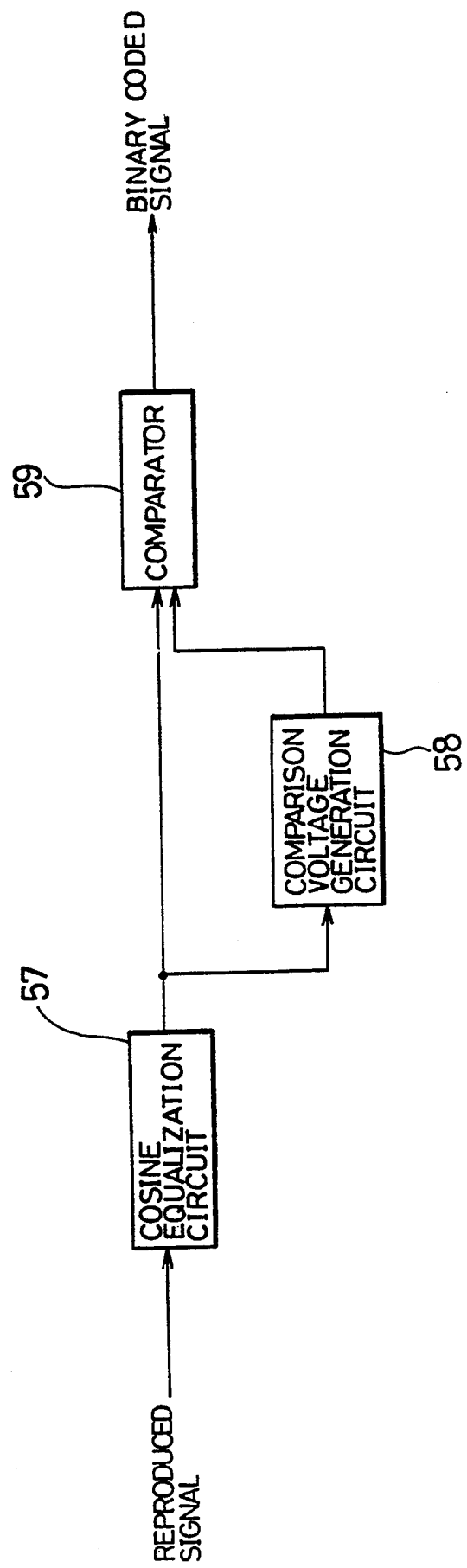
Figure 83:
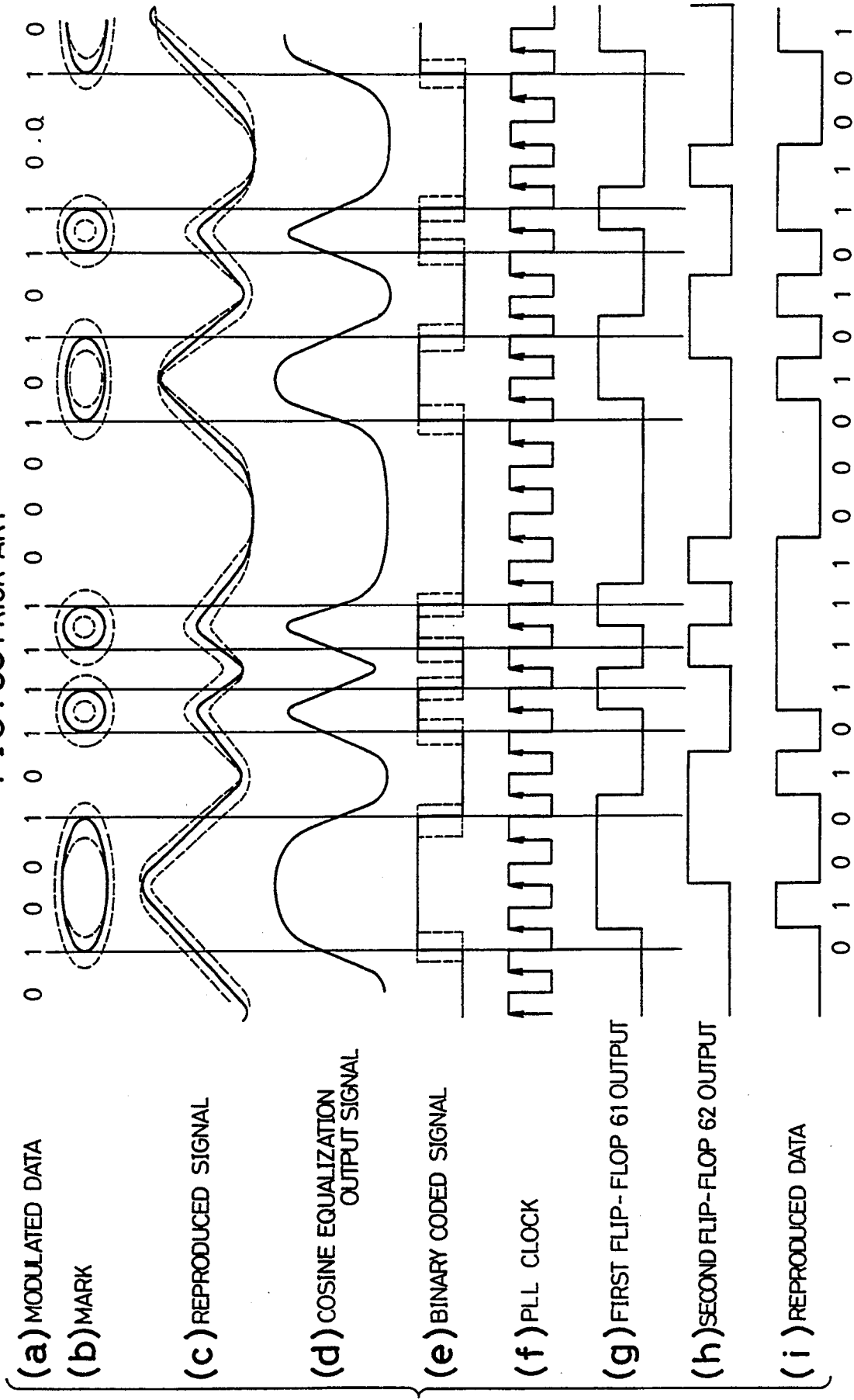

FIG. 49(d) shows the output signal 167 of the limiter circuit 154, and in comparison with FIG. 76, the signal amplitude of the sector mark section 1701 is limited so as to become as small as that of the ID section. According to these drawings, it is noted that the limitation of the signal amplitude of the sector mark section 1701 is only necessary to be applied to one side, and that by using the transient response of the ac coupling, only the signal amplitude of the sector mark section 1701 may be limited effectively. Additionally, a transient response time constant of the ac coupling is preferably made as small as possible so as not to affect reproduced information. However, if the transient response time constant is too small, the limitation of the signal amplitude of the sector mark section 1701 is not sufficiently effected, and a rear part of the amplitude of the sector mark section 1701 is apt to remain. On the contrary, if it is too great, it causes a limitation of the signal amplitude of the ID section 1702. Accordingly, the transient response time constant is preferably set so that only the signal amplitude of the sector mark section 1701 may be limited. FIG. 49(e) shows that the AGC, i.e. the adjustment of the amplification degree executed by the summing VCA 151, is performed according to the output signal 168 of the clamping circuit 155 during its operation.

Compared with an output signal of the conventional AGC amplifier shown in FIG. 76(d), it is noted that the influence due to the signal amplitude of the sector mark section 1701 is reduced, and that the AGC is operated in response to the signal amplitude of the ID section 1702. Accordingly, a desired signal amplitude for the ID section 1702 can be obtained, and reproduction of address information can be effectively achieved, thereby permitting the sector 3004 to be properly detected.

In addition, instead of the application of the limiter circuit 154, the AGC voltage can be held by hold means such as a sample holding circuit only during the period of the existence of the signals derived from the sector mark section 1701. With the arrangement, the influence on the amplification degree due to responding to the signal amplitude of the sector mark section 1701 is eliminated. In that case, the hold means functions as limiting means for restraining lowering of the amplification degree of the summing VCA 151 in reproducing the sector mark section 1701. In order to detect the period of the signals derived from the sector mark section 1701, for example, the sector mark detection circuit 2101 of FIG. 16 may be used.

Moreover, for the detection of the sector mark section 1701, for example, a pulse group detection circuit may be used, which detects whether or not recorded information exists, based on whether or not a group of pulses exists in the reproduced signal. In other words, by detecting a pre-formatted section 3003 having information preliminarily recorded in the form of protrusions and recessions by the use of the pulse group detection circuit, the leading portion of the pre-formatted section 3003 may be determined as a sector mark section 1701.

Furthermore, besides the above limiting means, by determining the time constant of the AGC amplifier (for example, the capacitor 226 in the AGC voltage generation section of FIG. 48) so as to have a sufficiently longer period than that of the sector mark section 1701, the AGC will not respond to the signal amplitude of the sector mark section 1701. With the arrangement, the AGC, although slightly influenced by it, may respond to the signal amplitude of the ID section 1702 which occupies a large part of the pre-formatted section. Therefore this arrangement can be used as limiting means for restraining the lowering of the amplification degree. However, since the response speed of the AGC is retarded, it becomes difficult to follow the fast variations of the amplitude.

Moreover, in the above example, it is arranged that the AGC may respond to the signal amplitude of the ID section 1702. On the other hand, for the AGC with respect to the sector mark section 1701, it goes without saying that by installing an AGC amplifier for its exclusive use, an arrangement capable of responding to the signal amplitude of the sector mark section 1701 is achieved.

In addition, in the above example, the explanation is given of the magneto-optical disk; however, the present invention is also applicable to optical disks and the like of read-only type.

The following description will discuss the buffer amplifier 2501 in the signal processing circuit 1401 referring to FIGS. 50 to 56.

Figure 50:
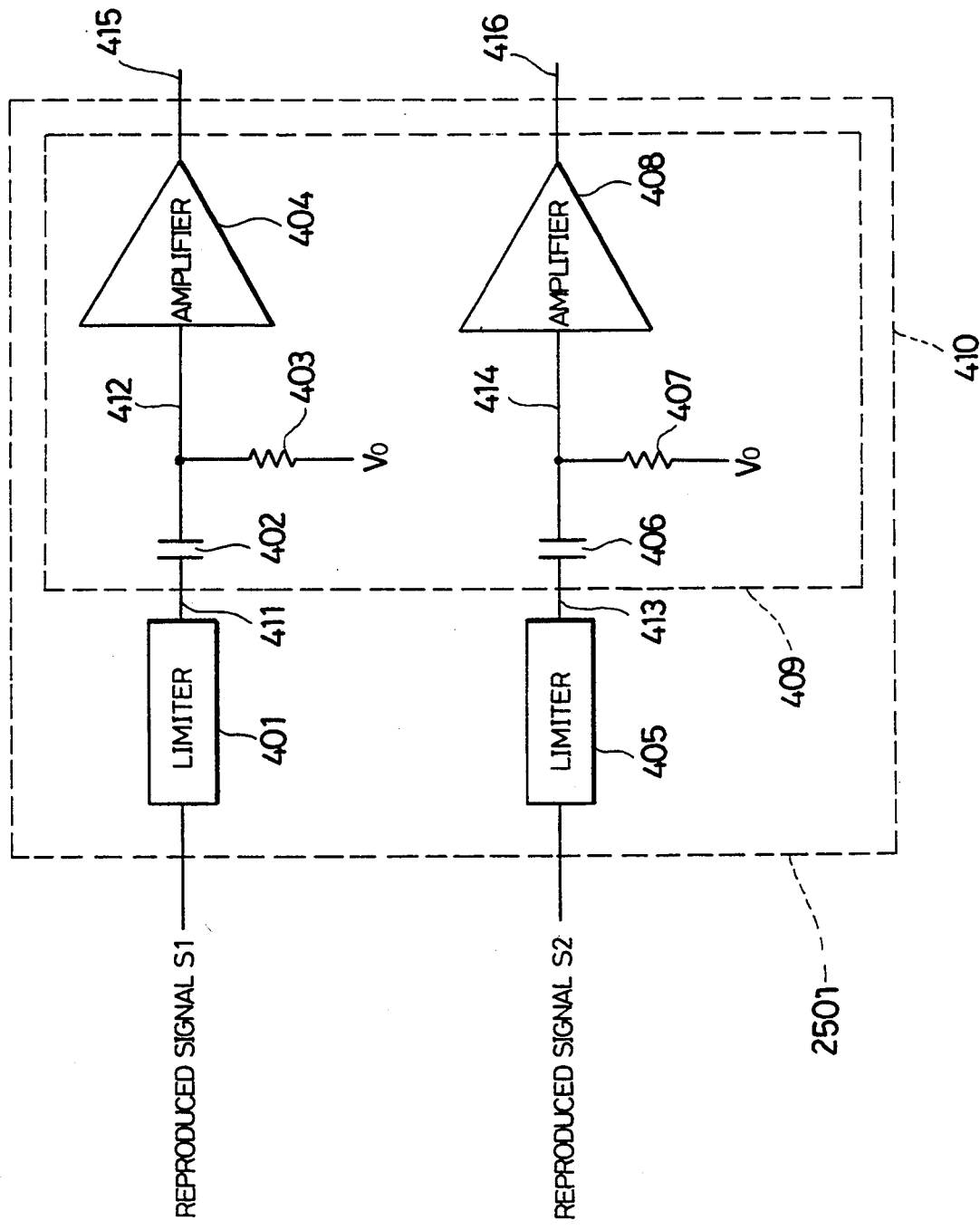
FIG. 50 is a block diagram showing the structure of a buffer amplifier.
Figure 86:
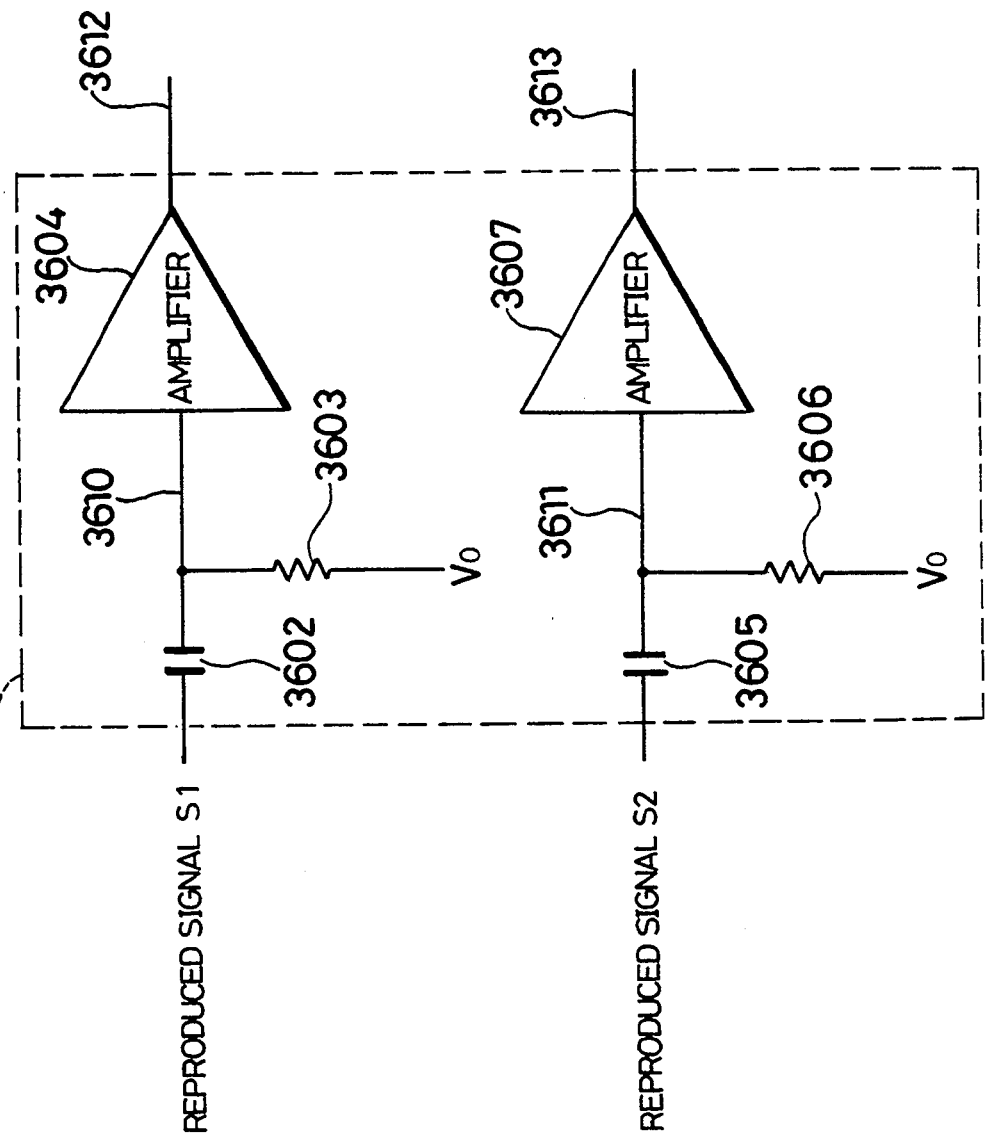

As shown in FIG. 50, the reproduced signal S1 is entered to a limiter 401 (signal level limiting means) in the buffer amplifier 2501. In the limiter 401, excessive amplitudes contained in the reproduced signal S1 are limited to a predetermined level. Only the application of the limiter 401 makes the buffer amplifier 2501 different from the buffer amplifier 3601 of FIG. 86. A limiter output signal 411 is entered to a high-pass filter including a capacitor 402 and a resistor 403. Additionally, one end of the resistor 403 is connected to the capacitor 402 while a predetermined voltage $V_O$ is applied to the other end. The high-pass filter eliminates a dc component in the reproduced signal S1, and thus makes it easier to reproduce only information signals contained in an ac component. In addition, a time constant of the high-pass filter is predeterminately set as small as possible so that reproducing errors might not occur due to phase shifts of data in the reproduced signal. In other words, the time constant of the high-pass filter is predeterminately set so as to make the transient response time as short as possible. An output signal 412 of the high-pass filter is sent to an amplifier 404, and an output signal 415 therefrom is sent to the reproduction circuit (not shown) disposed at a subsequent stage.

Similarly, the reproduced signal S2, after its excessive amplitudes having been limited to a predetermined level in a limiter 405, is sent to a high-pass filter including a capacitor 406 and a resistor 407, and thus a dc component in the reproduced signal S2 is eliminated, thereby making it easier to reproduce information signals contained in an ac component. An output signal 414 of the high-pass filter is sent to an amplifier 408 from which an output signal 416 thereof is sent to the reproduction circuit (not shown) disposed at the subsequent stage (as to the output signal 416, see S2' of FIG. 44 and 2510 of FIG. 20).

Figure 51:
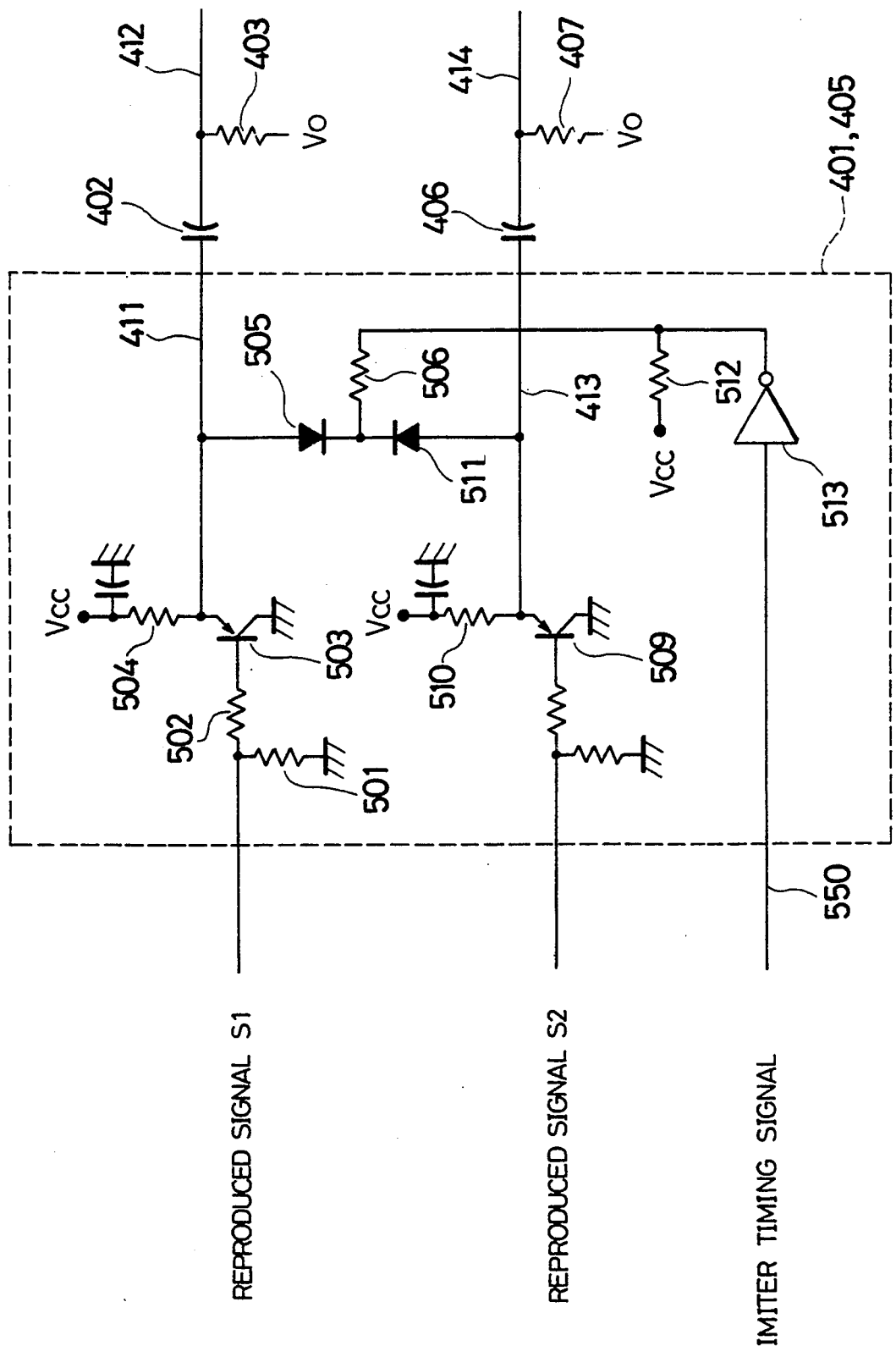
FIG. 51 is a circuit diagram showing the structure of the limiter circuit of the information recording and reproducing device relating to the present invention.

FIG. 51 shows an example of the arrangement of the limiter 401 or 405 of FIG. 50. The reproduced signal S1 is entered to an emitter follower in the limiter 401, including resistors 501, 502, 504 and a PNP transistor 503. The output signal 411 of the emitter follower is entered to a diode 505 and the capacitor 402. The output signal 412 of the high-pass filter including the capacitor 402 and the resistor 403 is sent to the buffer amplifier 404 (not shown in FIG. 51) situated at the next stage. On the other hand, the diode 505 is connected to an open collector 513 and a resistor 512 through a resistor 506. The resistor 512 is pulled up by the power source $V_{CC}$. Additionally, as the open collector 513, for example, SN 7406 of Texas Instruments may be employed. In the meantime, when a limiter timing signal 550 is set high ("1"), an output of the open collector 513 becomes low, and therefore the level of the limiter output signal 411 is limited to a limited voltage $V_L$ through the resistor 506 and the diode 505.

For example, when a base voltage of the PNP transistor 503 constituting the emitter follower exceeds the limited voltage $V_L$, the PNP transistor 503 becomes "off" state. The power source $V_{CC}$ is divided into a voltage which is determined by the resistors 504, 506 and the diode 505, and this divided voltage, that is, the limited voltage $V_L$, makes a limited emitter voltage. On the other hand, when the base voltage is below the limited voltage $V_L$, since the PNP transistor 503 becomes "on" state, the reproduced signal, as it is, makes the emitter voltage of the PNP transistor 503. Accordingly, the reproduced signal, as it is, makes the limiter output signal 411 without its amplitude being limited.

Similarly, as to the reproduced signal S2, when a base voltage of a PNP transistor 509 constituting the emitter follower exceeds the limited voltage $V_L$, the PNP transistor 509 becomes "off" state, and the power source $V_{CC}$ is divided into a voltage which is determined by the resistors 510, 506 and a diode 511, and thus this divided voltage, that is, the limited voltage $V_L$, makes the limited emitter voltage. On the other hand, when the base voltage is below the limited voltage $V_L$, the PNP transistor 509 becomes "on" state, thereby permitting the reproduced signal S2, as it is, to make a limiter output signal 413 without its amplitude being limited.

Additionally, in the above arrangement, the reproduced signals S1, S2 may be limited at the same time by the limiter timing signal 550, and when the limiter timing signal 550 is set high ("1"), the levels of the reproduced signals S1, S2 are limited, and on the other hand, when it is set low ("0"), they are not limited.

Figure 52:
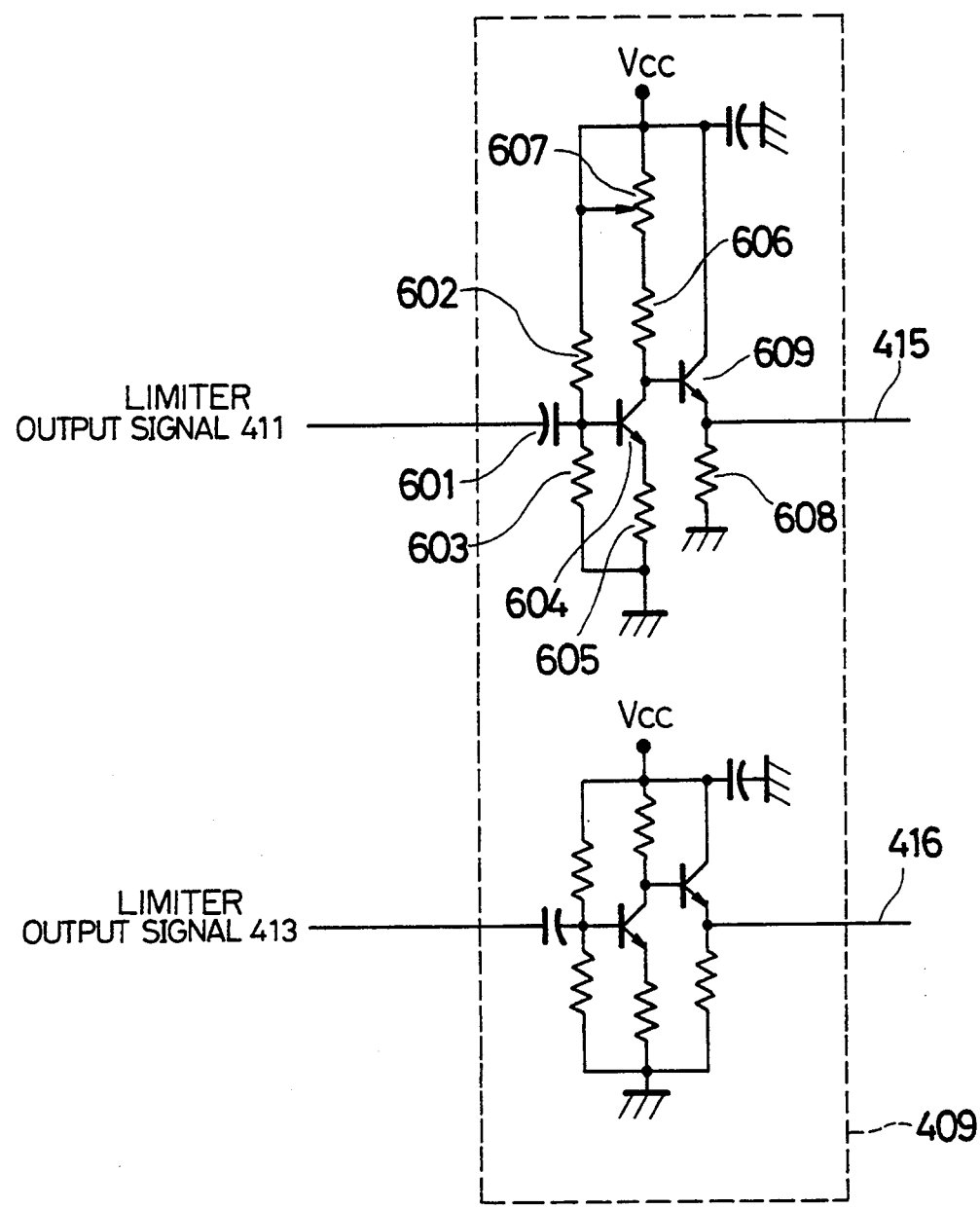
FIG. 52 is a circuit diagram for the structural example where the amplification degree is variable regarding the output signal of the limiter circuit.

Referring to FIG. 52, the following description will discuss one example of a block 409 which functions as the high-pass filter and amplifier shown in FIG. 50.

The limiter output signal 411 is entered to a circuit having both functions of a high-pass filter and an amplifier, which is mainly composed of a capacitor 601, resistors 602, 603, 605, 606, 608, NPN transistors 604, 609 and a variable resistor 607. It is designed that an amplification degree to an output signal 415 of the circuit is adjustable by the variable resistor 607.

The limiter output signal 413 is also entered to a circuit having both functions of a high-pass filter and an amplifier, which has the same composition. However, an amplification degree to an output signal 416 of the circuit is fixed. Additionally, in the present embodiment, the description is given of the case where the amplification degree to the output signal 416 is fixed; however, the arrangement is not limited to the above, and the amplification degree may be varied in the same manner as the output signal 415. These output signals 415, 416 of the buffer amplifier 410 are sent to a differential amplifier and a summing amplifier, disposed at the next stage (neither of them is shown in FIG. 52).

Figure 53:
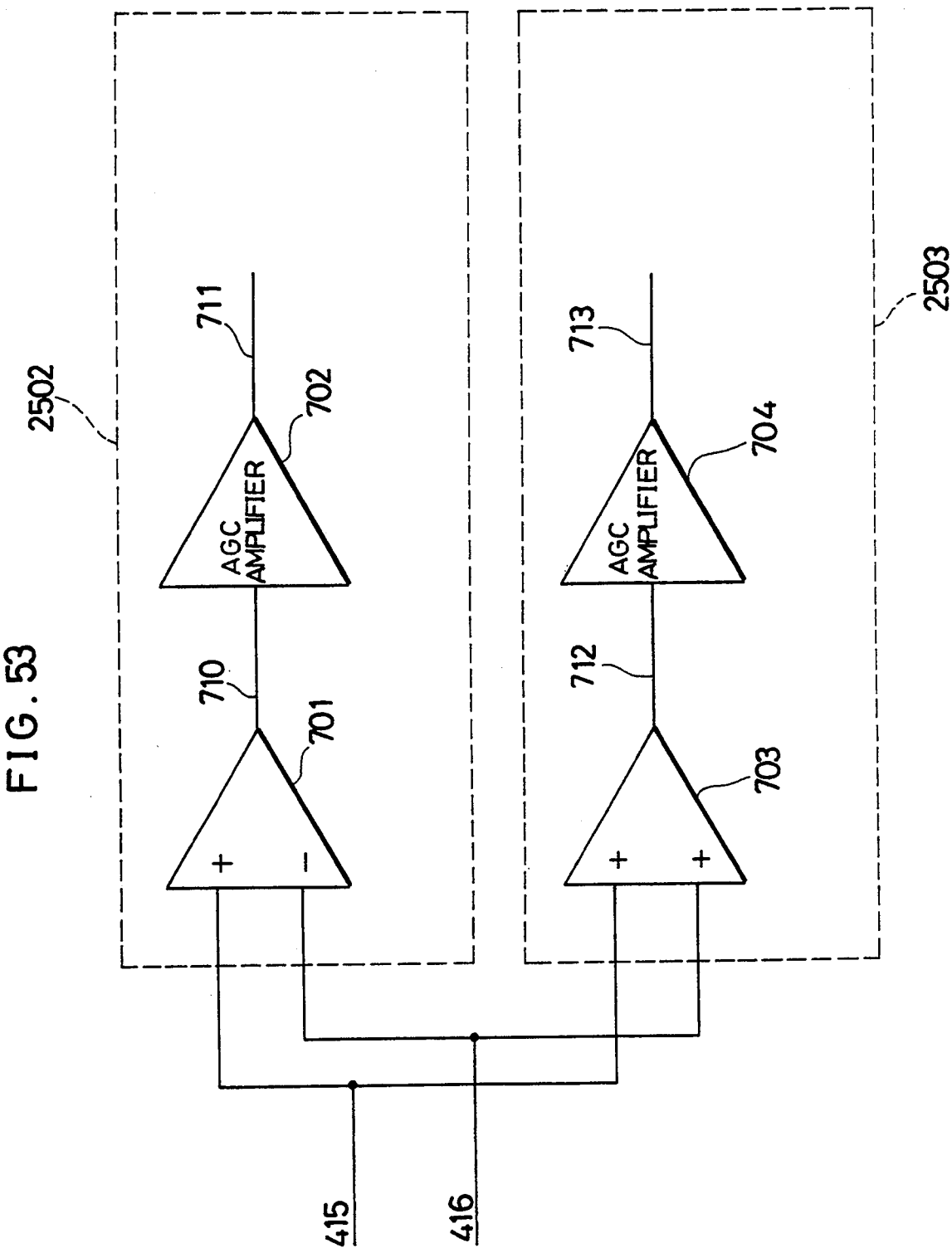
FIG. 53 is a block diagram showing respectively the circuit structure of the MO waveform processing section and of the pre-format waveform processing section.

Referring to FIG. 53, the following description will discuss main components of the MO waveform processing section 2502 and the pre-format waveform processing section 2503, both shown in FIG. 20.

The output signals 415 and 416 of the buffer amplifier 410 are entered to the differential amplifier 701 and the summing amplifier 703 in the MO waveform processing section 2502 and the pre-format waveform processing section 2503. By differentially amplifying the reproduced signals S1 and S2 in the differential amplifier 701, the S/N ratio can be improved, and at the same time only information of the MO (data) section 3002 can be extracted. Additionally, in performing the differential amplification, the differential ratio can be adjusted to a proper ratio, for example, by the use of the variable resistor 607 in FIG. 52. An output signal 710 of the differential amplifier 701 is entered to an AGC amplifier 702 where it is controlled to have a proper signal level. An output signal 711 of the AGC amplifier 702 is entered to the binary code circuit (not shown in FIG. 52) situated at the next stage, where information of the MO (data) section 3002 is converted into binary signals and read out.

Figure 54:
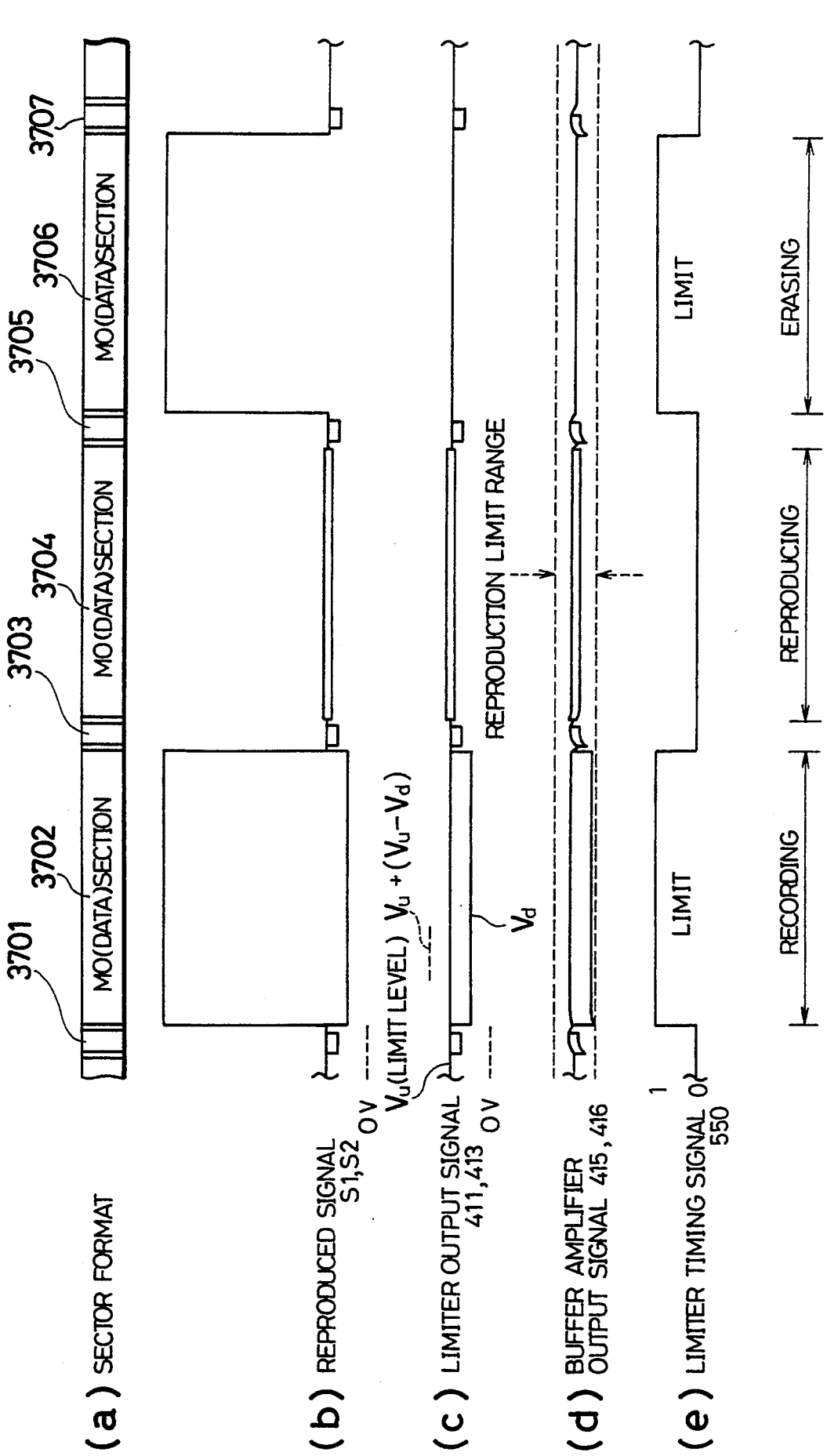
FIG. 54 is a view showing the waveforms for each part of the limiter circuit shown in FIG. 51.

Moreover, by summing the reproduced signals S1 and S2 in the summing amplifier 703, only information of the pre-formatted section 3003 can be extracted. An output signal 712 of the summing amplifier 703 is entered to an AGC amplifier 704 where it is controlled to have a proper signal level. An output signal 713 thereof is entered to a binary code circuit (not shown in FIG. 53) situated at the next stage, where information of the pre-formatted section 3003 is converted into binary signals and read out. FIG. 54 shows waveforms of the respective sections of the limiter circuit shown in FIG. 51. In FIG. 54, it is supposed that a recording operation for information is performed in a sector (see FIG. 54(a)) composed of a pre-formatted section 3701 and an MO (data) section 3702; a reproducing operation for information is performed in a sector composed of a pre-formatted section 3703 and an MO (data) section 3704; and an erasing operation for information is performed in a sector composed of a pre-formatted section 3705 and an MO (data) section 3706.

Each of these recording, reproducing and erasing operations for information is performed while reading synchronous timing information and address information of the pre-formatted sections 3701, 3703, 3705, detecting a predetermined synchronous timing, and further successively verifying whether a detected address is predetermined one or not. The reproduced signals S1, S2 have their excessive amplitudes in each of the recording and erasing operations (see FIG. 54(b)). This is because light with a great luminous intensity, reflected off from a sector is projected back to photodetectors 3203, 3204. At this time, as described above, the limiter output signals 411, 413 are limited to the level of the limited voltage $V_L$ by the limiters 401, 405. The period during which the limiter output signals are limited is controlled by the limiter timing signal 550 (see FIG. 54(e)). In other words, their levels are limited in the recording area of the MO (data) section 3702 and in the erasing area of the MO (data) section 3706 (see FIG. 54(c)).

Figure 87:
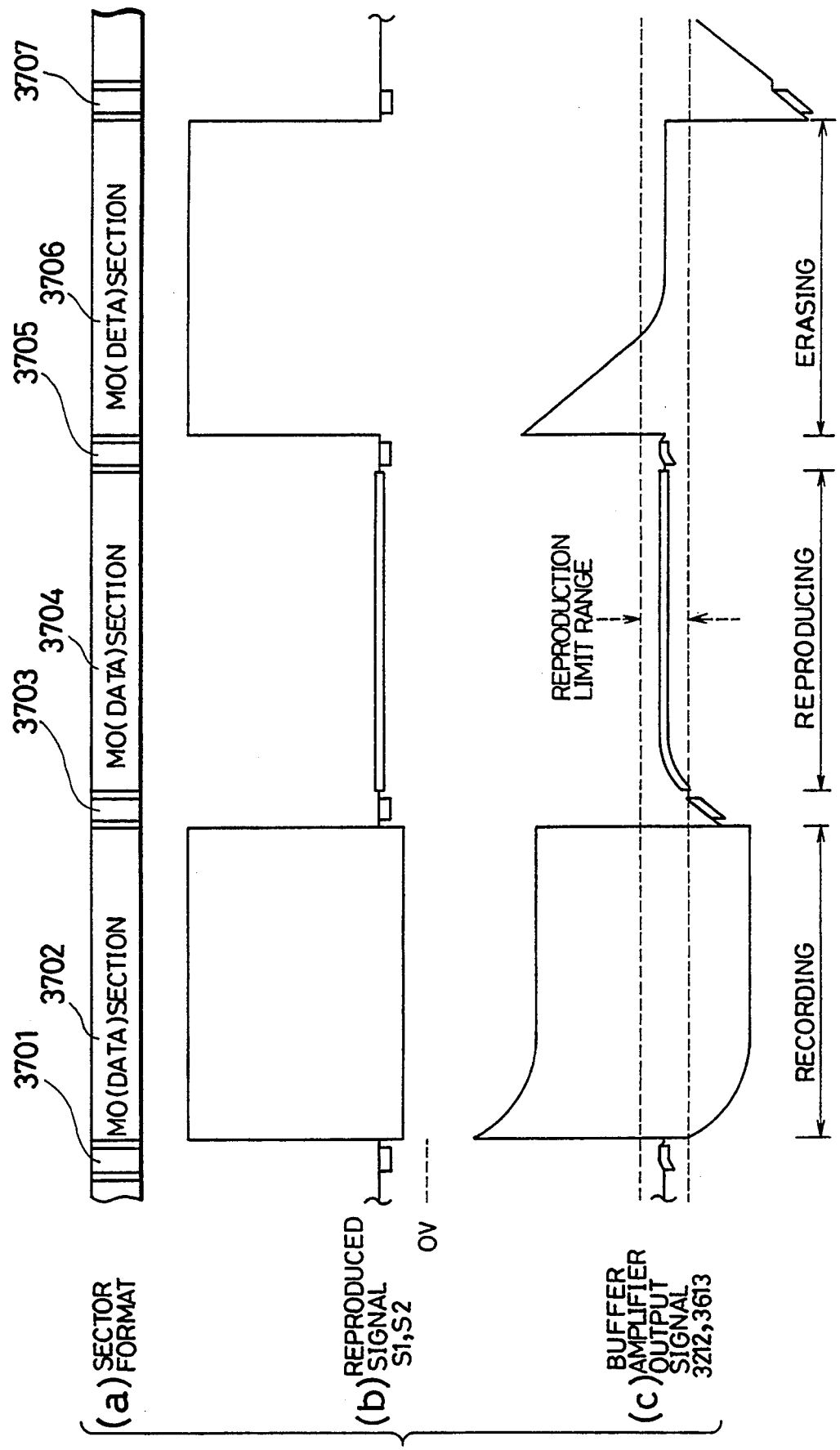
Figure 88:
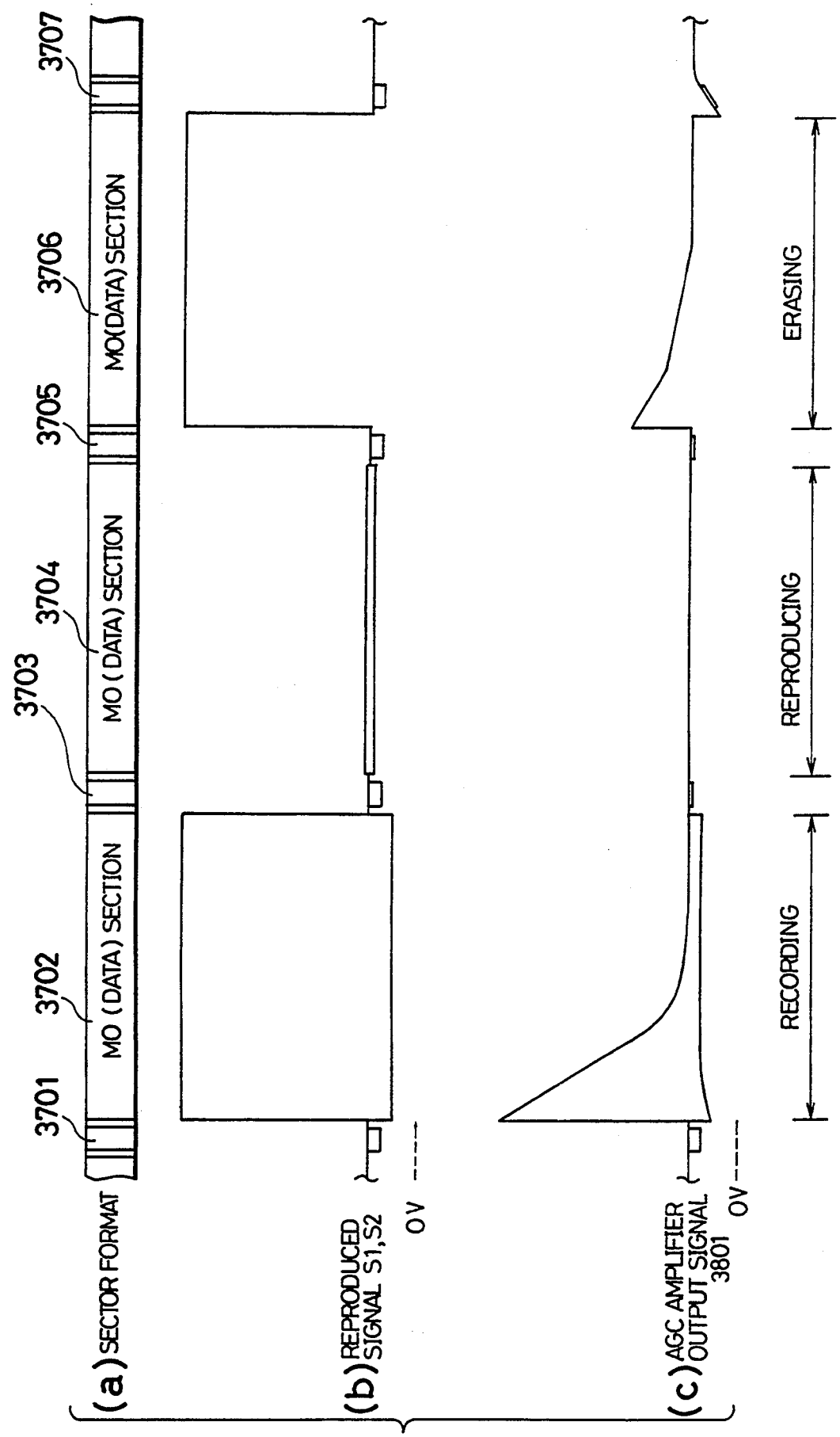

Thus, adverse effect due to the transient response by the high-pass filter is eliminated from the waveforms of the output signals 415, 416 of the buffer amplifier immediately after each of the recording and erasing operations (see FIG. 54(d)). Accordingly, in comparison with FIG. 87, since those waveforms do not exceed reproduction limit levels, the synchronous timing information and address information of the pre-formatted sections 3703, 3707 call be read even immediately after each of the recording and erasing operations. With the arrangement, each of the recording and erasing operations calm be performed while detecting predetermined synchronous timing and successively verifying whether the detected address is predetermined one or not. As a result, high transmission speed and high density for information can be achieved in magneto-optical recording and reproducing devices.

In addition, it is only necessary for the limiter timing signal 550 to be maintained high ("1") in each of the recording and erasing areas, i.e. in the areas wherein luminous intensity of the semiconductor laser 2801 is not of the reproducing operation. For example, the high-frequency superposition switch signal 1812, as it is, shown in FIGS. 13 and 14 can be used as the limiter timing signal. At this time, the operation of the high-frequency superposition circuit 1802 of FIG. 13 sometimes responds with a time delay to the high-frequency superposition switch signal 1812. In that case, taking the delay of the response into account, the limit range determined by the limiter timing signal 550 may be somewhat widened. Moreover, a signal such as the data modulation timing signal in the modulation circuit 1302 of FIG. 10, which has a similar range as the above, may be employed.

Furthermore, as to the limited voltage $V_L$ for determining the limit levels of the amplitude, major effects can be obtained when the level of an average value of signals of the MO (data) section after having been limited their levels in recording or erasing operation, is predeterminately set so as to situate in a vicinity of the level of the signals derived from the pre-formatted section. Thus, the following equation holds:

$$V_d \leq V_L \leq V_u + (V_u - V_d)$$

where $V_u$ expresses an upper limit level of the signals of the pre-formatted section; $V_d$ expresses a lower limit level of the signals of the MO (data) section in recording operation.

One of the reasons is that influence due to the transient response can be restrained to a minimum. Another of the reasons is that level errors of the reproduced signals S1, S2 produced between a plurality of magneto-optical disks of the same type or in the same magneto-optical disk are substantially situated within the above-mentioned range.

The level errors of the reproduced signals S1, S2 are produced, for example, by the changes of reflectance and the like between a plurality of magneto-optical disks of the same type or in the same magneto-optical disk. Moreover, the same effects can be obtained by keeping the limit level determined by the limited voltage $V_L$ a little higher than the upper limit level $V_u$ of the signals of the pre-formatted section so as to maintain the limiter timing signal 550 always high ("1").

Figure 56:
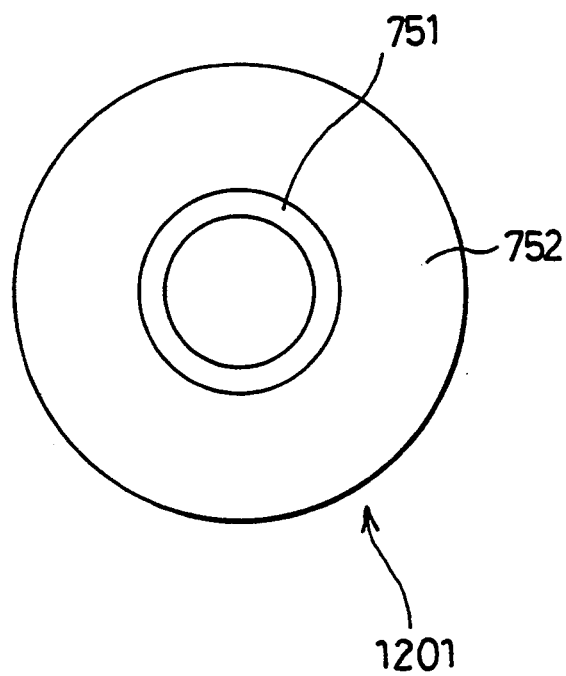
FIG. 56 is a plan view showing a magneto-optical disk provided with a control track.

In the meantime, as shown in FIG. 56, the magneto-optical disk 1201 alternatively comprises another area referred to as control tracks 751 composed of a plurality of tracks located at an innermost section thereof, besides a data area 752 wherein recording, reproducing and erasing operations for information are performed. The area is provided for preventing wrong operations of recording, reproducing, or erasing between magneto-optical disks having different characteristics and formats. The following description will discuss this function in detail.

There are various types of magneto-optical disks 1201 classified according to their respective characteristics of recording magnetic films, formats and the like. Accordingly, it is difficult to provide a magneto-optical recording and reproducing device which can perform each of recording, reproducing and erasing operations to all the types of the magneto-optical disks. In other words, each of recording, reproducing and erasing operations should be performed only in a magneto-optical recording and reproducing device which has appropriate functions to meet the characteristics and format of the relevant magneto-optical disk.

For example, it is supposed that two types of magneto-optical disks having different characteristics and formats are represented by A and B, and that magneto-optical recording and reproducing devices are represented by $D_a$ and $D_b$ which are respectively applied to A and B. In other words, the magneto-optical disk A can be used in the magneto-optical recording and reproducing device $D_a$ for recording, reproducing and erasing information; however, it can not be used in the magneto-optical recording and reproducing device $D_b$ for recording, reproducing and erasing information. On the other hand, the magneto-optical disk B can be used in the magneto-optical recording and reproducing device $D_b$ for recording, reproducing and erasing information; however, it can not be used in the magneto-optical recording and reproducing device $D_a$ for recording, reproducing and erasing information. In that case, for example, the following problems might be presented: The magneto-optical disk A might be mistakenly placed in the magneto-optical recording and reproducing device $D_b$, and a recording, reproducing or reproducing operation for information is performed thereon. In that case, information recorded in the magneto-optical disk A might be broken, reliability of the disk might be adversely affected, or the magneto-optical disk A itself might be broken.

In order to solve the above problems, for example, the following measures can be taken. In the magneto-optical disk A, information with respect to the characteristics and format thereof is preliminarily recorded in the form of marks and non-marks showing recessions physically etched and protrusions between those recessions. Then, it is suggested that this pre-format information should be reproduced in any magneto-optical recording and reproducing device including the magneto-optical recording and reproducing device $D_b$. With the arrangement, differences of the characteristics and format of the magneto-optical disk A can be detected before a recording, reproducing or erasing operation, and the recording, reproducing or erasing operation can be stopped thereafter. It is in the area of the control tracks 751 that the pre-format information is etched. No recording or erasing operation is performed in this area. The pre-format information in the control tracks 751 should have a standardized format so that any magneto-optical recording and reproducing device may read it even if the characteristics of the magneto-optical disk (for example, reflectance) are different from each other.

Figure 55:
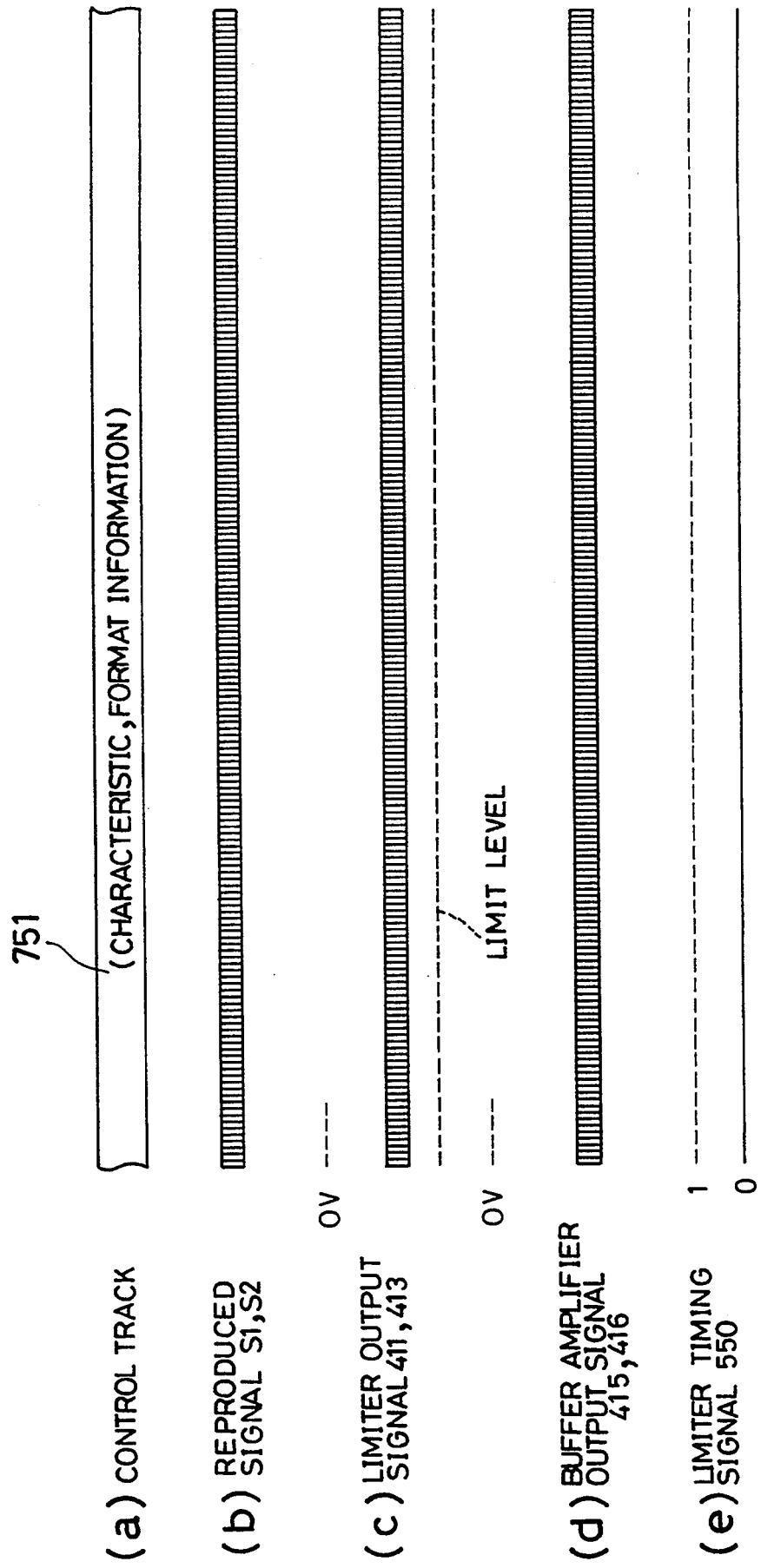
FIG. 55 is an explanatory view concerning the characteristics of a control track and a reproduction of the format information.

Referring to FIG. 55, the following description will discuss functions of the control tracks 751 and reproducing operation of the pre-format information.

As shown in FIG. 55(a), different from the data area 752 of FIG. 56, in the control tracks 751, the characteristics and format of the magneto-optical disk 1201 is preliminarily recorded (pre-formatted) in the form of marks and non-marks showing recessions physically etched and protrusions between those recessions. Each of waveforms shown in FIG. 54 is produced when, for example, each of recording, reproducing and erasing operations is performed on and from the magneto-optical disk A in the magneto-optical recording and reproducing device $D_a$, while each of those shown in FIG. 55 is produced when, for example, the information with respect to the characteristics and format in the control tracks is reproduced from the magneto-optical disk B in the magneto-optical recording and reproducing device $D_a$.

Moreover, each of the waveforms shown in FIG. 55 is obtained in the case where the reflectance of the magneto-optical disk B is greater than that of the magneto-optical disk A, and therefore a level of the reproduced signal S1 (S2) (see FIG. 55(b)) is higher than that shown in FIG. 54. In reproducing the control tracks 751, the limiter timing signal 550 is kept low ("0") (see FIG. 55(e)). At this time, the limiters 401, 405 do not limit the level of the signal entered therein. Therefore, ac components of the limiter output signal 411, 413 (see FIG. 55(c)) as they are, are released as the buffer amplifier output signals 415, 416 (see FIG. 55(d)). The buffer amplifier output signals 415,416 are controlled to have proper signal levels in the AGC amplifiers 702, 704 shown in FIG. 53, and the characteristics and format of the magneto-optical disk B can be read. Thus, since the characteristics and format of the magneto-optical disk B can be detected, wrong operation of recording, reproducing or erasing is avoidable. Further, the results of the detection can be sent to an external device, and it can also be notified that the relevant magneto-optical disk is different in its characteristics and format by the use of display means and other means.

Thus, by installing the limiter circuits 401, 405 as shown in FIG. 51, synchronous timing information and address information of the pre-formatted sections 3703, 3707 can be read even immediately after each of recording and erasing operations, and predetermined synchronous timing can be detected, and further while verifying whether the detected address is predetermined one or not, each of recording, reproducing and erasing operations can be performed. Consequently, without being affected by the transient response of the high-pass filter and the response of the AGC amplifier, high-speed transmission and high-density for information can be achieved in the magneto-optical recording and reproducing device. Moreover, wrong operation in recording, reproducing or erasing information on or from a magneto-optical disk with the different characteristics and/or format is avoidable, and the danger that the reliability is adversely affected due to breakage of the recorded information or that the magneto-optical disk itself is broken, can also be avoided beforehand.

The following description will discuss another example of the limiter referring to FIGS. 57 to 60. In addition, for convenience of explanation, those of the members having the same functions and described in the aforementioned example are indicated by the same reference numerals and the description thereof is omitted.

Figure 57:
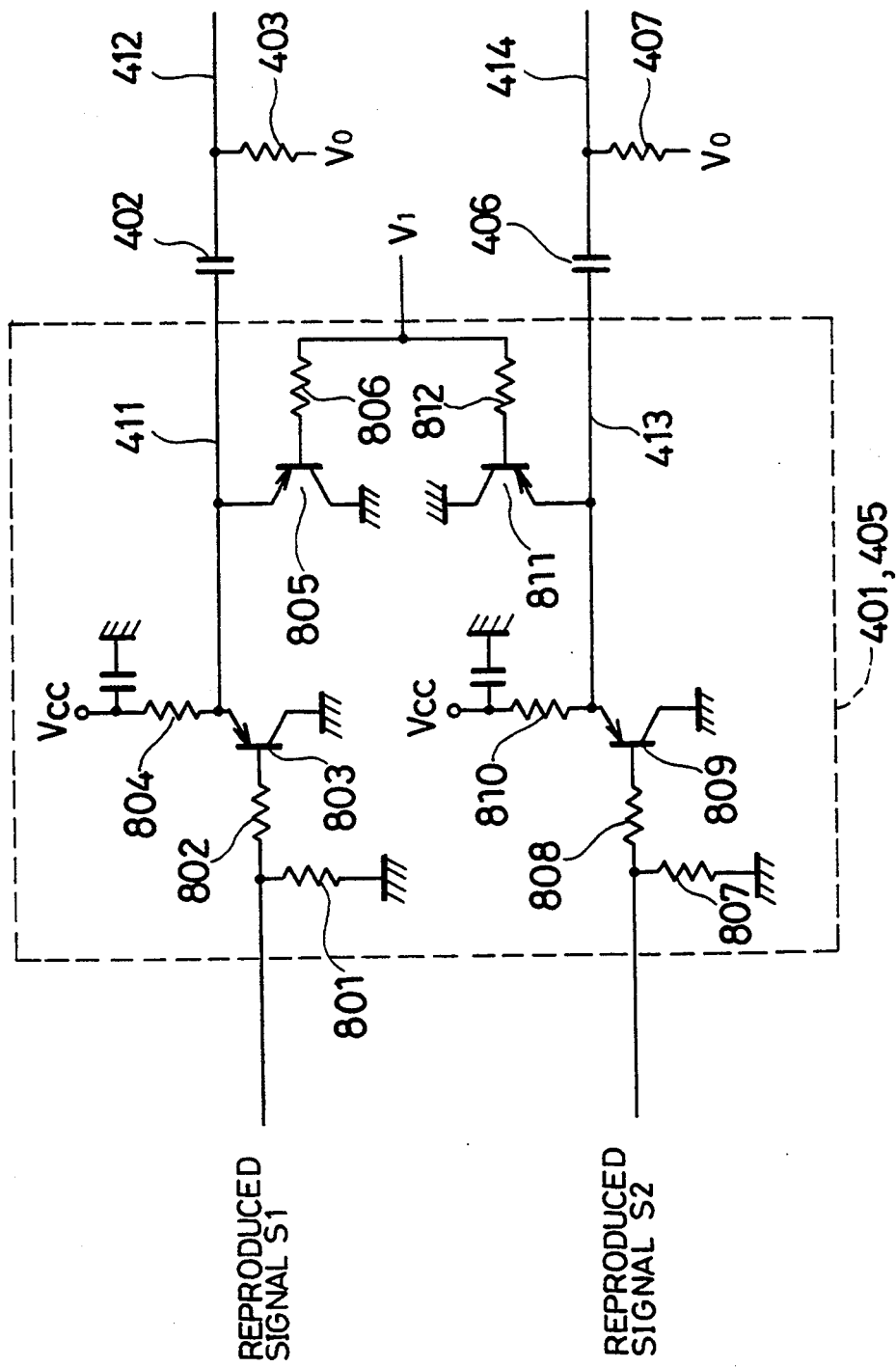
FIG. 57 is a circuit diagram showing another example of the limiter for an information recording and reproducing device relating to the present invention.

FIG. 57 shows another example of the limiter for use in a magneto-optical recording and reproducing device in accordance with the present invention. The reproduced signal S1 is entered to an emitter follower in the limiter 401, including resistors 801, 802, 804 and a PNP transistor 803. The output signal 411 of the emitter follower is entered to the emitter of a PNP transistor 805 and the capacitor 402. The output signal 412 of the high-pass filter including the capacitor 402 and the resistor 403 is sent to the buffer amplifier 404 at the next stage (not shown in FIG. 57). On the other hand, a voltage $V_1$ is applied to a base of the transistor 805 through a resistor 806. Amplitude of the limiter output signal 411 is limited in its level to an emitter voltage of the PNP transistor 805. This is because the following equation is given with respect to the limited voltage $V_L$:

$$V_L \approx V_1 + V_{BE}$$

($V_{BE}$: a base-emitter voltage of the transistor 805)

For example, when the level of the reproduced signal S1 becomes greater and therefore the base voltage of the PNP transistor 803 exceeds the emitter voltage, the PNP transistor 803 becomes "off" state. At this time, the PNP transistor 805 becomes "on" state. Following these states, the level of the limiter output signal substantially shows a level $(V_1 + V_{BE})$. In other words, when the limited voltage $V_L$ is predeterminately set so as to have a substantial level of $(V_1 + V_{BE})$, the level of the reproduced signal S1 will not become as great as the limited voltage $V_L$.

On the other hand, when the level of the reproduced signal S1 becomes smaller and therefore the base voltage of the PNP transistor 803 is smaller than the emitter voltage, i.e. the limited voltage $V_L$, the PNP transistor 803 becomes "on" state. At this time, the PNP transistor 805 becomes "off" state, and the reproduced signal S1 as it is, is entered to the buffer amplifier at the next stage as the limiter output signal 411 through the high-pass filter.

Similarly, as to the reproduced signal S2, by predeterminately setting the limited voltage $V_L$ to have a substantial level of $(V_1 + V_{BE})$, the reproduced signal S2 as it is, is released to the buffer amplifier at the next stage as the limiter output signal 413 through the high-pass filter when its level is smaller than that of the limited voltage $V_L$. The limiter output signal 413 will not become as great as the limited voltage $V_L$ even if the level of the reproduced signal S2 is greater than the limited voltage $V_L$. In addition, since the detailed description of the circuit operation is the same as that of the reproduced signal S1, it is omitted for convenience. Further, in the above example, in order to simplify the circuit, the limited voltage $V_L$ is predeterminately set at the same level with respect to the reproduced signals S1 and S2. However, the present invention is not limited to the arrangement, and the respective limited levels may be set individually.

Figure 58:
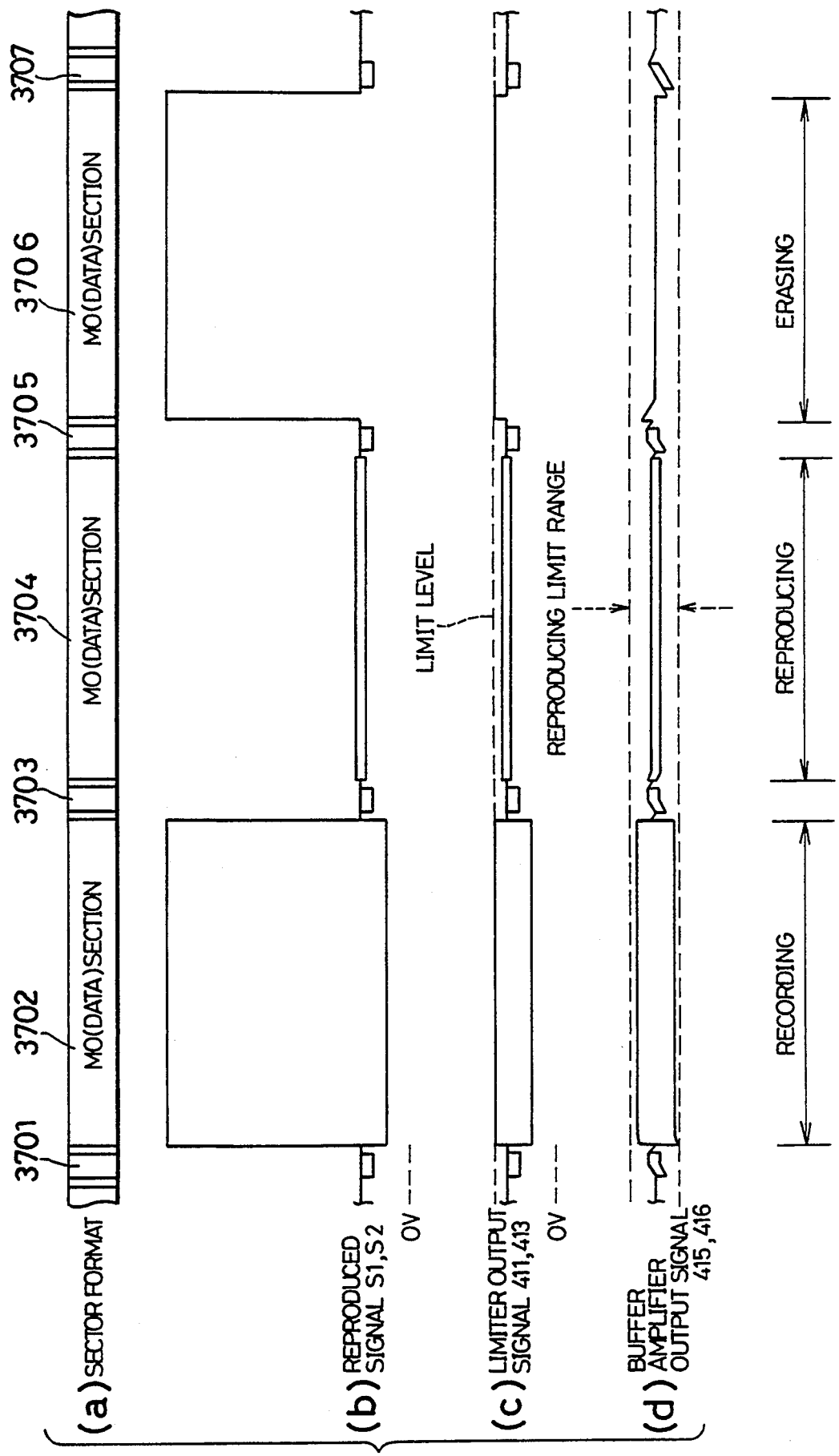
FIG. 58 is a view showing operational waveforms for each part of the limiter circuit shown in FIG. 57.

Referring to FIG. 58, the following description will discuss operating waveforms of the respective sections of the limiter circuit of FIG. 57.

As shown in FIG. 58, it is supposed that a recording operation for information is performed in a sector composed of a pre-formatted section 3701 and an MO (data) section 3702; a reproducing operation for information is performed in a sector composed of a pre-formatted section 3703 and an MO (data) section 3704; and an erasing operation for information is performed in a sector composed of a pre-formatted section 3705 and an MO (data) section 3706 (see FIG. 58(a)). Each of these recording, reproducing and erasing operations for information is performed by reproducing and reading synchronous timing information and address information of the pre-formatted sections 3701, 3703, 3705. In other words, while detecting a predetermined synchronous timing by the readout operation, and further by successively verifying whether a detected address is predetermined one or not, the relevant operation can be performed.

Meanwhile, as shown in FIG. 58(b), the reproduced signals S1, S2 have their excessive amplitudes in each of the recording and erasing operations. This is because light with a great luminous intensity, reflected off from the magneto-optical disk 1201 in recording or erasing operation is directed back to photodetectors 3203, 3204. At this time, excessive amplitudes contained in the limiter output signals 411, 413 are limited to the level of the limited voltage $V_L$ by the limiters 401, 405 (see FIG. 58(c)).

Additionally, in the example disclosed here, different from the aforementioned example, the levels are limited not only in recording or erasing operation but also in reproducing operation. With the arrangement, adverse effect due to the transient response by the high-pass filter is eliminated from the waveforms of the output signals 415, 416 of the buffer amplifier immediately after each of the recording and erasing operations (see FIG. 58(d)). Accordingly, in comparison with FIG. 87, since those waveforms do not exceed reproduction limit levels, the synchronous timing information and address information of the pre-formatted sections 3703, 3707 can be read accurately even immediately after recording or erasing operation. Further, since each of the recording and erasing operations can be performed while detecting predetermined synchronous timing and successively verifying whether the detected address is predetermined one or not, high transmission speed and high density for information can be achieved in magneto-optical recording and reproducing devices.

However, in the example disclosed here, there are cases wherein, when a magneto-optical disk with the different characteristics and format is used, information of the characteristics and format thereof recorded in the control tracks 751 may not be reproduced. The following description will discuss this problem in detail referring to FIG. 59.

Figure 59:
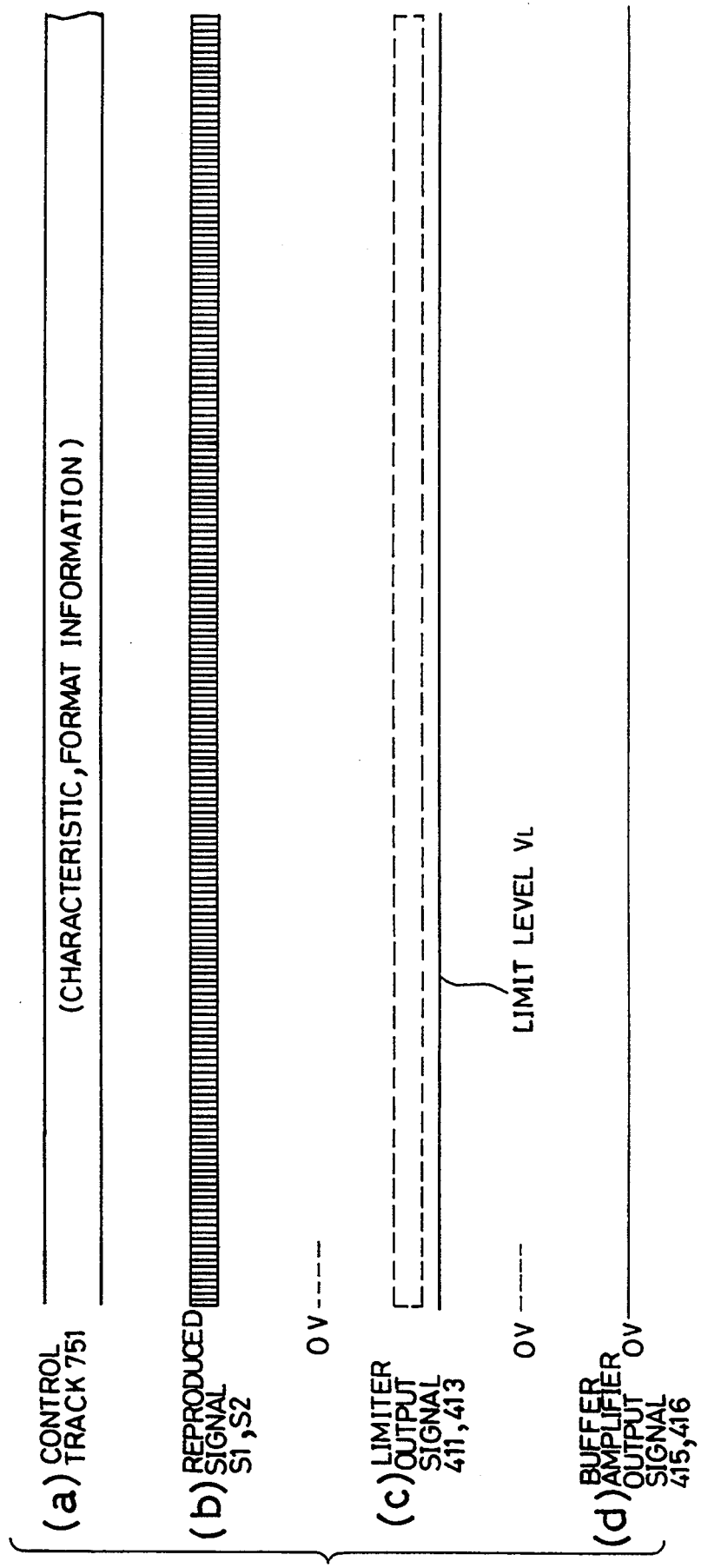
FIG. 59 is a view showing, with regard to a magneto-optical disk with differing characteristics and format, the waveforms for each part of the buffer amplifier for the case where it is not possible to reproduce format information or the characteristics within the control track.

FIG. 59 shows waveforms of the respective sections at the time when a reproducing operation for the information of the characteristics and format recorded in the control tracks 751 is performed. As shown in FIG. 59(a), different from the data area of FIG. 56, in the control tracks 751, the characteristics and format of the magneto-optical disk 1201 are preliminarily recorded (pre-formatted) in the form of marks and non-marks showing recessions physically etched and protrusions between those recessions.

Each of waveforms shown in FIG. 58 is produced when, for example, each of recording, reproducing and erasing operations is performed on and from the magneto-optical disk A in the magneto-optical recording and reproducing device $D_a$. On the other hand, each of those shown in FIG. 59 is produced when, for example, the information with respect to the characteristics and format in the control tracks is reproduced from the magneto-optical disk B in the magneto-optical recording and reproducing device $D_a$. In other words, each of the waveforms shown in FIG. 59 is obtained in the case where the reflectance of the magneto-optical disk B is greater than that of the magneto-optical disk A, and therefore a level of the reproduced signal S1 (S2) (see FIG. 59(b)) is higher than that shown in FIG. 58. Accordingly, the signal level sometimes exceeds the limited voltage $V_L$ as shown in the drawing. More specifically, as shown in FIG. 59(c), the limiter output signal 411 (413) is saturated and does not exceed the limited voltage $V_L$ (a portion shown by broken lines in FIG. 59(c) indicates the amplitude of the reproduced signal S1 (S2) before limited). Therefore, as shown in FIG. 59(d), there are cases wherein the reproduced signal may not appear in the buffer amplifier output signal 415 (416) (this varies depending on a set value of the limited voltage $V_L$). Consequently, since the characteristics and format of the magneto-optical disk B can not be detected, wrong operation in recording, reproducing or erasing information might be performed. Accordingly, in the example discussed here, although high-speed transmission and high density for information can be achieved in the magneto-optical recording and reproducing device, actually it is difficult to perform recording, reproducing or erasing operation on or from a magneto-optical disk with the different characteristics and format. In order to solve this problem, it is proposed that the voltage $V_1$ to be applied to the bases of the PNP transistors 805, 811 shown in FIG. 57 should be switched by the limiter timing signal 550.

Figure 60:
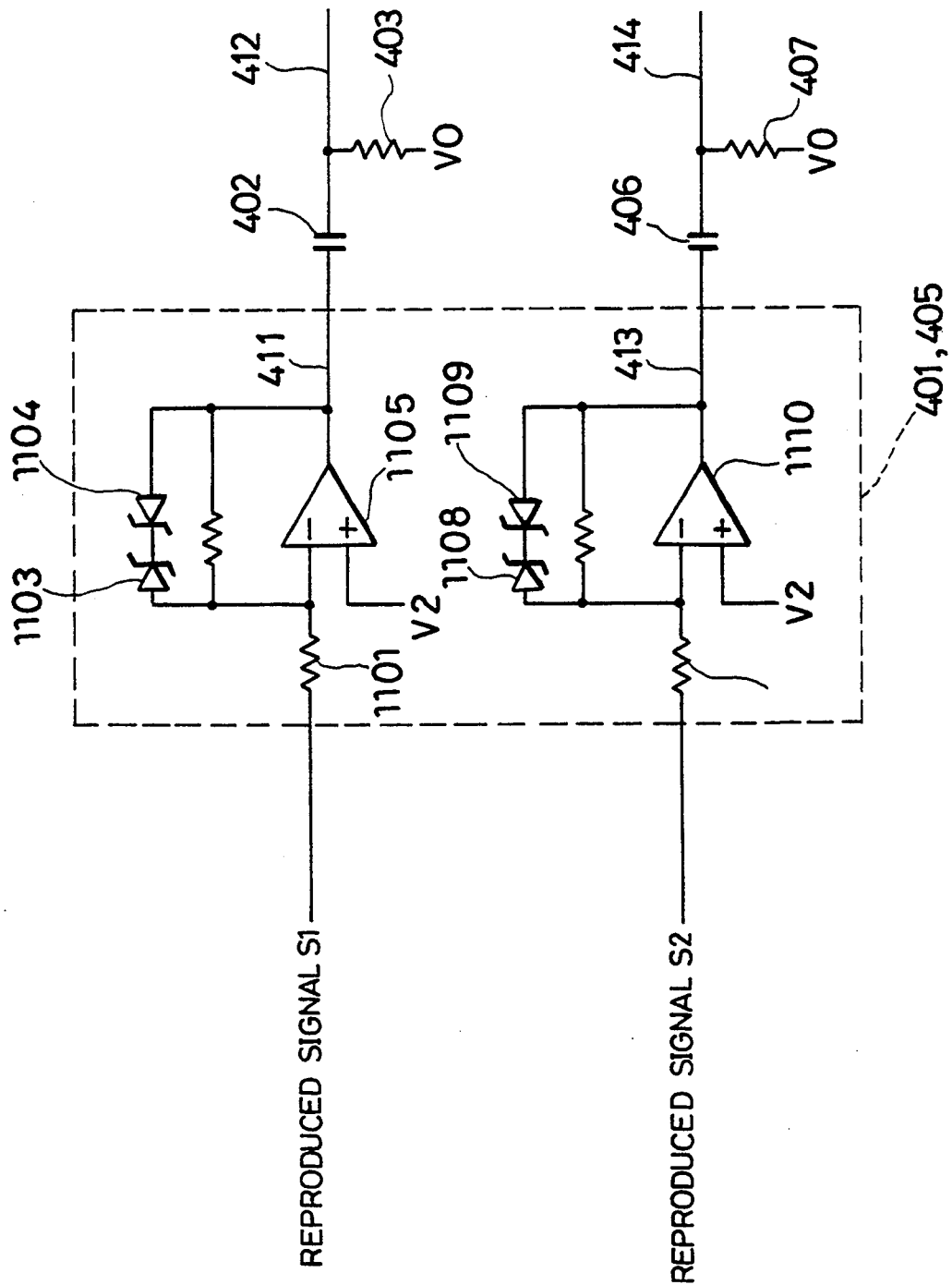

Moreover, the arrangement of the limiter circuits 401, 405 is not limited to that shown in FIG. 57, and the same effect can be achieved by using the circuit, for example, shown in FIG. 60. The following description will discuss operation of the above circuit.

The circuit disclosed hereinbelow is a limiter circuit comprising an operational amplifier. The reproduced signal S1 is sent to an inverting input terminal of an operational amplifier 1105 through a resistor 1101. At this time, if the amplitude of the reproduced signal S1 exceeds a reference voltage $V_2$, an output of the operational amplifier 1105 changes from positive to negative, yet is limited to a rated output voltage value of a constant voltage diode 1104. On the other hand, if the amplitude of the reproduced signal S1 is not more than the reference voltage $V_2$, the output of the operational amplifier 1105 changes from negative to positive, yet will not become as great as the rated output voltage value of a constant voltage diode 1103.

As described above, the amplitude of the reproduced signal S1 is limited to the rated output voltage values (two limited levels of positive and negative) of the constant voltage diodes 1103, 1104, and is sent as the limiter output signal 411 to the high-pass filter disposed at a subsequent stage.

Similarly, as to the reproduced signal S2 entered to an operational amplifier 1110, if its amplitude exceeds the reference voltage $V_2$, an output of the operational amplifier 1110 is limited to the rated output voltage value of a constant voltage diode 1109, and if its amplitude is not more than the reference voltage $V_2$, the output will not become as great as a rated output voltage value of a constant voltage diode 1108.

As described above, in the limiter circuit disclosed here, the rated output voltage values of the constant voltage diodes form limited voltage values, and therefore, different from the aforementioned case of FIG. 57, the reproduced signals S1 and S2 can be limited in both their positive and negative levels.

Additionally, in the above limiter circuit, in order to simplify the circuit, the limited voltage of the limiter is predeterminately set at the same level with respect to the reproduced signals S1 and S2. However, the levels of the reproduced signals S1 and S2 are sometimes different from each other depending on magneto-optical recording and reproducing devices. For example, errors due to the characteristics of a reproducing optical system, difference of reproduction methods with respect to reproduced signals S1 and S2 in a reproducing optical system, and the like are taken up as main causes. In those cases, the same effect as described above can be obtained by setting different limited voltages of the limiters to the respective reproduced signals S1 and S2.

Further, especially in optical memory devices including magneto-optical recording and reproducing devices, as is shown in FIG. 54 or FIG. 58, variation of dc component in the reproduced signal S1 (S2) is large, and its level tends to offset extremely only to the high level as shown in the drawing, for example, in recording or erasing operation. Accordingly, in the present invention, as shown in FIG. 51 and FIG. 57, a simplified circuit arrangement can be achieved by employing the limiter which applies level limitation only to the high level portion in the signal level. However, in the case where the signal level also tends to offset to the low level, the present invention is not limited to the circuit arrangement as described above, and as shown in FIG. 60, another limiter circuit which applies level limitation also to the low level may be employed.

Moreover, generally in the magneto-optical recording and reproducing devices, since there are two reproduced signals (S1, S2), two limiter circuits (401, 405) are provided so as to process those signals. However, in the case of optical memory devices of DRAW (Direct Read After Write) type or the like having only one reproduced signal, one limiter circuit is enough.

Furthermore, PNP transistors are employed in FIGS. 51, 52 and 57, yet the present invention is not limited to the arrangement, and another arrangement including NPN transistors is also applicable. Further, by using a sample holding circuit instead of the limiters 401, 405, the reproduced signal S1 (S2) can be held in each of recording and erasing areas, and is sampled in reproducing area. Thus, the same effects as aforementioned can be obtained. However, the sample holding circuit generally has a complicated configuration and its cost is high, and further since its frequency characteristics are poor, quality of the reproduced signal tends to deteriorate, and high-speed transmission and high density for information can not be achieved. Moreover, by using analog switches instead of the limiters 401, 405, the reproduced signal may be fixed to have a uniform voltage in recording or erasing operation, and thus the same effects as aforementioned can be obtained. However, in this case, switching pulses generated in switching the analog switches tend to become greater than the reproduced signals, and consequently cause adverse effects on reproducing operation (for example, on the AGC, PLL and the like). On the other hand, by using the arrangement in accordance with the present invention shown in FIG. 51, the effects described above can be obtained with a simple and inexpensive circuit.

Additionally, in the present invention, the description has been given of a magneto-optical recording and reproducing device as an example, yet the present invention is not limited to the device, and applicable to other magneto-optical memory devices such as magneto-optical card memory devices, to other optical memory device such as DRAW type optical memory devices, and further to other information recording and reproducing devices such as magnetic disk devices for recording, reproducing and erasing information.

As aforementioned, the recording and reproducing device in accordance with the present invention comprises signal level limiting means disposed at a stage before a reproduction circuit, for limiting excessive amplitudes contained in a reproduced signal to a predetermined level in each of recording and erasing operation for information. With the arrangement, when a reproducing operation is executed on a pre-formatted section immediately after a recording or erasing operation, the influence of a transient response due to ac coupling given on a reproduced signal may be minimized, and the reproduced signal is always restrained to stay within a reproduction limit range. Accordingly, synchronous timing information and address information of a pre-formatted section can be read out accurately even immediately after each of recording and erasing operations, and recording or erasing operation for information can be performed while detecting a predetermined synchronous timing, and further successively verifying whether the detected address is predetermined one or not. As a result, since the disposition of pre-formatted sections is determined without being affected by a transient response due to ac coupling and a response of AGC circuit, high-speed transmission as well as high-density recording for information may be achieved in a magneto-optical recording and reproducing device. Moreover, wrong operation in recording, reproducing or erasing information on or from a magneto-optical disk with the different characteristics and/or format is avoidable, and the danger that the reliability is adversely affected due to breakage of the recorded information or that the magneto-optical disk itself is broken, can also be avoided beforehand.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An information recording and reproducing device which records, erases, and reproduces on or from an optical memory, comprising:
automatic gain control means, including reproduced signal output means for amplifying and releasing a reproduced signal according to an amplification degree based on a control voltage and control signal output means for releasing the control voltage varying in response to an amplitude of the reproduced signal, the automatic gain control means being arranged such that the amplification degree of the reproduced signal output means is adjusted based on the control voltage varying in response to the amplitude of the reproduced signal; and
first control means for controlling the amplification degree of the automatic gain control means by holding the control voltage during recording and erasing.

2. An information recording and reproducing device as set forth in claim 1, further comprising:
recorded area judgment means for judging whether an instantaneous reproducing portion is in a recorded area or in an un-recorded area; and
second control means for controlling the amplification degree of the automatic gain control means by holding the control voltage in the un-recorded area when the recorded area judgment means judges that the instantaneous reproducing portion is an un-recorded area.

3. An information recording and reproducing device as set forth in claim 2, further comprising:
response speed changing means for changing a response speed of said automatic gain control means for permitting the amplification degree to follow the amplitude of the reproduced signal of the automatic gain control means in discrete intervals.

4. An information recording and reproducing device which records, erases or reproduces on or from an optical recording medium including pre-formatted sections having addresses preliminary recorded therein and data sections wherein desired information may be recorded, comprising:
a first automatic gain control section wherein a gain thereof is adjusted according to a first control voltage varying in response to an amplitude of a reproduced signal reproduced from the pre-formatted section; and
a second automatic gain control section wherein a gain thereof is adjusted according to a second control voltage varying in response to an amplitude of a reproduced signal reproduced from the data section;
said second automatic gain control section being provided therein with:
recorded area identifying means for identifying recorded areas of information in a reproducing operation; and
holding means for holding the second control voltage in an un-recorded area of information according to an identification of the recorded area identifying means.

5. An information recording and reproducing device as set forth in claim 4, comprising wherein the first automatic gain control section comprises a voltage control amplifier, a clamping circuit, a comparator and an AGC voltage generation circuit;
the voltage control amplifier being varied in a gain thereof according to a control voltage from the AGC voltage generation circuit;
the clamping circuit being installed for clamping an output of the voltage control amplifier at a predetermined level as well as eliminating a dc component of the output of the voltage control amplifier;

the comparator being installed for comparing an output of the clamping circuit with a reference voltage in it amplitude; and the AGC voltage generation circuit being installed for releasing a control voltage to the voltage control amplifier according to an output of the comparator.

6. An information reproducing device as set forth in claim 5, further comprising:

an invertor circuit for holding the first control voltage; and an AND circuit for performing an operation of logical product between an output of the comparator and an output of the invertor circuit and for releasing a result of the operation to the AGC voltage generation circuit; where a high level output from the inverter circuit holds the first control voltage and a low level output from the inverter circuit does not hold the first control voltage.

7. An information recording and reproducing device as set forth in claim 4, wherein the recorded area identifying means is a pulse group detection circuit for detecting whether or not there is a group of pulses derived from the recorded area in a reproduced digital signal that is obtained by reproducing the data section having an un-recorded area and the recorded area.

8. An information recording and reproducing device as set forth in claim 7, wherein the pulse group detection circuit comprises a re-triggerable pulse generation circuit which releases a recorded area detecting signal to be set high for a predetermined period of time upon receiving a pulse in the reproduced digital signal, and keeps releasing the recorded area detecting signal to be continuously set high for the same period of time upon receiving another pulse during the predetermined period of time.

9. An information recording and reproducing device as set forth in claim 8, wherein the re-triggerable pulse generation circuit comprises a one shot multivibrator provided with a resistor and a capacitor for changing a time constant.

10. An information recording and reproducing device as set forth in claim 8, wherein the re-triggerable pulse generation circuit is a shift register.

11. An information recording and reproducing device as set forth in claim 8, wherein the re-triggerable pulse generation circuit comprises:

a modulo-N divider including a clear input terminal, an output terminal and a clock input terminal; and an AND circuit; whereby the reproduced digital signal from the data section is entered to the clear input terminal; from the output terminal is released the recorded area detecting signal, which is entered to a first input terminal of the AND circuit; a reference clock signal is entered to a second input terminal of the AND circuit; and an output of the AND circuit is connected to the clear input terminal.

12. An information recording and reproducing device as set forth in claim 8, further comprising a leading pulse removing circuit for nullifying an output of the re-triggerable pulse generation circuit with respect to a predetermined number of leading pulses in the reproduced digital signal; thereby preventing reproduction errors even if there is at least one defect pulse contained in the reproduced digital signal.

13. An information recording and reproducing device as set forth in claim 12, wherein the leading pulse removing circuit comprising a modulo-N counter is disposed at a stage before the re-triggerable pulse generation circuit, thereby nullifying the output of the re-triggerable pulse generation circuit with respect to leading pulses the number of which is given by N in the reproduced digital signal.

14. An information recording and reproducing device as set forth in claim 12, wherein the leading pulse removing circuit is a shift register.

15. An information recording and reproducing device as set forth in claim 4, wherein the recorded area identifying means comprises:

a one shot multivibrator including a resistor and a capacitor for determining a time constant, for maintaining an output signal thereof low for another period of the time constant when a next trigger signal is entered thereto within a period of the time constant; and a timer circuit having a reset input terminal thereof connected to an output of the one shot multivibrator; whereby the timer circuit releases a signal of a high level when a signal entered to the reset input terminal has been maintained low for a predetermined period of time, and when the signal entered to the reset input terminal has not been maintained low for the predetermined period of time, the timer circuit returns the output signal to be low immediately as the signal entered to the reset input terminal becomes high.

16. An information recording and reproducing device which records, erases, or reproduces on or from an optical memory, comprising:

automatic gain control means which is adjusted in an amplification degree thereof according to an amplitude of a reproduced digital data;

reproduced signal judgement means for judging whether or not the reproduced digital data is a predetermined one corresponding to recorded digital data; and control means for permitting the automatic gain control means to adjust the amplification degree thereof when it is judged by the reproduced signal judgement means that the reproduced digital data is the predetermined one corresponding to the recorded digital data, and for fixing the amplification degree when it is judged that the reproduced digital data is not the predetermined one corresponding to the recorded digital data, wherein said reproduced signal judgment means includes, a plurality of shift registers connected in cascade one after another; and a pattern comparison circuit for comparing a pattern obtained from outputs of the shift registers with a reference pattern and for judging whether both of the patterns are the same or not.

17. An information recording and reproducing device which records, erases, or reproduces on or from an optical memory, comprising:

a voltage control amplifier, a clamping circuit, a comparator and an AGC voltage generation circuit, the voltage control amplifier being varied in a gain thereof according to a control voltage from the AGC voltage generation circuit, the clamping circuit being installed for clamping an output of the voltage control amplifier at a predetermined level as well as eliminating a dc component of the output of the voltage control amplifier, the comparator being installed for comparing an output of the clamping circuit with a reference voltage in it amplitude, and the AGC voltage generation circuit being installed for releasing the control voltage to the voltage control amplifier according to an output of the comparator, the information recording and reproducing device further comprising:

reproduced signal condition judgment means for releasing a low-level signal when reproduced digital data corresponds to recorded digital data and for releasing a high-level signal if it does not; and a holding circuit for letting an output of the AGC voltage generation circuit releases to the voltage control amplifier without holding it when an output of the reproduced signal condition judgment means is low and for holding the output and releasing it to the voltage control amplifier when the output of the reproduced digital condition judgement means is high.

18. An information recording and reproducing device as set forth in claim 17, wherein the clamping circuit comprises:

a capacitor for eliminating an dc component of an output signal of the voltage control amplifier; and a diode for clamping a positive output of an ac component of the output signal of the voltage control amplifier at a forward voltage drop value.

19. An information recording and reproducing device as set forth in claim 18, wherein the AGC voltage generation circuit comprises:

an NPN transistor having a collector whereto a predetermined dc voltage is applied, a base whereto an output of the comparator is entered and an emitter;

a charge resistor having a first end and a second end; the first end being connected to the emitter of the NPN transistor;

a capacitor connected between the second end of the charge resistor and ground, having an AGC voltage produced across it; and a discharge resistor connected in parallel with the capacitor; whereby permitting the capacitor to be charged or discharged according to the output of the comparator.

20. An information recording and reproducing device as set forth in claim 19 further comprising:

a plurality of open collectors and resistors, each of the resistors having a first end and a second end; the first end being connected to an output of each of the open collectors with each of second ends being connected to the junction between the capacitor and the charge resistor; thereby permitting a period of time required for a discharge of the capacitor to become variable when one of the outputs of the open collectors is low by an arrangement that one of the resistors of the open collectors is connected in parallel with the discharge resistor.

21. An information recording and reproducing device which reproduces information from a recording medium including at least two kinds of areas having respective different reproduced signal amplitudes, comprising:

an automatic gain control section for amplifying a reproduced signal at an amplification degree according to the reproduced signal amplitude reproduced from the recording medium; and limiting means for limiting lowering of the amplification degree of the automatic gain control section in reproducing one of the areas where a reproduced signal having a great amplitude is obtained;

said limiting means including, a first limiter circuit including a first constant voltage diode; and a second limiter circuit including a second constant voltage diode;

whereby in the first limiter circuit, an upper limit of a signal amplitude entered thereto is limited to a rated output voltage value of the first constant voltage diode, while in the second limiter circuit, a lower limit of a signal amplitude entered thereto is limited to a rated output voltage value of the second constant voltage diode.

22. An information recording and reproducing device comprising:

an AGC voltage generation section;

a voltage control amplifier whose amplification degree varies according to an AGC voltage from the AGC voltage generation section;

a low-pass filter for eliminating noise of high-frequency component contained in an output of the voltage control amplifier;

an equalizer for emphasizing a high-frequency component of an output of the low-pass filter;

a limiter circuit for limiting an upper limit or a lower limit of an output of the equalizer to a predetermined level; and a clamping circuit for eliminating a dc component of an output of the limiter circuit and for clamping an upper limit or a lower limit thereof at a predetermined level; thereby permitting the AGC voltage generation section to generate the AGC voltage according to an output of the clamping circuit.

23. An information recording and reproducing device including a reproduction circuit which reproduces from an optical recording medium including pre-formatted sections having addresses preliminary recorded therein and data sections wherein desired information is recorded, comprising:

signal level means for limiting an excessive amplitude contained in a reproduced signal to a predetermined level during each of information recording and erasing operations and for releasing the reproduced signal to the reproduction circuit a high pass filter for eliminating a dc component of the reproduced signal; and an amplifier for amplifying an output of the high-pass filter.

24. An information recording and reproducing device as set forth in claim 23, wherein the signal level limiting means comprises:

an emitter follower whereto a reproduced signal is entered, including a first resistor having a first end and a second end, the first end being connected to a dc power source, and a PNP transistor whose emitter is connected to the second end of the first resistor;

a diode having an anode and a cathode, the anode being connected to the emitter;

a second resistor having a first end and a second end, the first end being connected to the cathode of the diode; and an open collector to which a signal of high level is entered during each period of recording and erasing operations; and the second end of the second resistor is connected to an output of the open collector; whereby an amplitude of the reproduced signal is limited to a voltage level determined by the first and second resistors and the diode when the signal of high level is entered to the open collector.

25. An information recording and reproducing device as set forth in claim 23, wherein the signal level limiting means has a limited voltage level which is expressed by an equation:

$$V_d \leq V_L \leq V_u + (V_u - V_d)$$

where $V_L$ is the limited voltage level; $V_u$ is an upper level of a reproduced signal reproduced from a pre-formatted section; $V_d$ is a lower level thereof.

26. An information recording and reproducing device as set forth in claim 23, wherein the signal level limiting means comprises:

an emitter follower whereto a reproduced signal is entered including a first resistor having a first end and a second end, the first end being connected to a dc power source, and a first PNP transistor having an emitter connected to the second end of the first resistor;

a second PNP transistor having an emitter, a collector and a base, the emitter being connected to the emitter of the first PNP transistor, and the collector being connected to ground; and a second resistor having a first end and a second end, the first end being connected to the base of the second PNP transistor with the second end connected to a reference power source; whereby an amplitude of the reproduced signal is substantially limited to a level of the reference power source by the second transistor being switched on when a voltage of the reproduced signal becomes more than an emitter voltage of the first PNP transistor and also becomes more than the level of the reference power source.

27. An information recording and reproducing device as set forth in claim 23, wherein the signal level limiting means comprises:

an operational amplifier wherein a reference voltage is applied to a non-inverting input terminal thereof, and the reproduced signal is entered to an inverting input terminal thereof;

a first constant voltage diode having an anode and a cathode; and a second constant voltage diode having an anode and a cathode;

the cathodes of the first and second constant voltage diodes being connected each other;

the anode of the first constant voltage diode being connected to the inverting input terminal of the operational amplifier; and on the other hand, the anode of the second constant voltage diode being connected to the non-inverting input terminal of the operational amplifier; thereby permitting level limitation of the reproduced signal both in positive and negative levels.

28. An information recording and reproducing device including a reproduction circuit for reproducing information comprising:

signal level limiting means disposed at a stage before the reproduction circuit, for limiting an excessive amplitude contained in a reproduced signal to a predetermined level in each of recording and erasing operations for information;

a coupling capacitor for eliminating a dc component of an output of the signal level limiting means; and a transistor amplifier having a variable resistor for adjusting an amplification degree thereof.

29. A holding control method for an AGC voltage of an AGC amplifier in an information recording and reproducing device, comprising the steps of:

judging whether an instantaneous operation is a recording operation or an erasing operation, and holding the AGC voltage if it is a recording or erasing operation;

judging whether the instantaneous operation is an access operation or not if it is neither a recording operation nor an erasing operation, and holding the AGC voltage if it is an access operation;

judging whether the AGC voltage has been detected or not if it is not an access operation, and releasing a holding operation of the AGC voltage after having set a response speed of the AGC voltage fast when it has been detected;

judging whether there is a group of pulses or not in a reproduced digital signal obtained by reproducing a data section if the AGC voltage has not been detected, and holding the AGC voltage when there is no group of pulses; and releasing the holding operation of the AGC voltage after having set the response speed low, when there is a group of pulses.

* * * * *